United States Patent
Brown et al.

(10) Patent No.: US 8,027,349 B2
(45) Date of Patent: Sep. 27, 2011

(54) DATABASE EVENT DRIVEN MOTION SYSTEMS

(75) Inventors: David W. Brown, Bingen, WA (US); Jay S. Clark, Bingen, WA (US)

(73) Assignee: Roy-G-Biv Corporation, Bingen, WA (US)

( * ) Notice: Subject to any disclaimer, the term of this patent is extended or adjusted under 35 U.S.C. 154(b) by 0 days.

(21) Appl. No.: 12/557,722

(22) Filed: Sep. 11, 2009

(65) Prior Publication Data

US 2010/0064026 A1     Mar. 11, 2010

Related U.S. Application Data

(63) Continuation of application No. 11/583,233, filed on Oct. 18, 2006, now abandoned, which is a continuation-in-part of application No. 11/505,056, filed on Aug. 15, 2006, now abandoned, and a continuation-in-part of application No. 10/844,025, filed on May 12, 2004, now abandoned, said application No. 11/505,056 is a continuation-in-part of application No. 10/991,905, filed on Nov. 17, 2004, now abandoned.

(60) Provisional application No. 60/727,901, filed on Oct. 18, 2005, provisional application No. 60/708,699, filed on Aug. 15, 2005, provisional application No. 60/506,104, filed on Sep. 25, 2003, provisional application No. 60/520,918, filed on Nov. 17, 2003.

(51) Int. Cl.
    *G06F 15/16* (2006.01)

(52) U.S. Cl. ............. 370/399; 703/23; 703/27; 709/217

(58) Field of Classification Search .................. 370/399; 700/2, 56, 174, 245; 701/200, 213; 709/208, 709/223; 703/23, 27
See application file for complete search history.

(56) References Cited

U.S. PATENT DOCUMENTS

| 4,078,195 A | 3/1978 | Mathias et al. |
| 4,159,417 A | 6/1979 | Rubincam |

(Continued)

FOREIGN PATENT DOCUMENTS

CA         2222235         12/1996

(Continued)

OTHER PUBLICATIONS

Thomas, R.; "The Languages of Tape", American Machinist, Jan. 6, 1964, DEFS 00011360-00011367, Special Report No. 545.

(Continued)

*Primary Examiner* — Dang Ton
*Assistant Examiner* — Mohamed Kamara
(74) *Attorney, Agent, or Firm* — Michael R. Schacht; Schacht Law Office, Inc.

(57) ABSTRACT

A data collection system for distributing data from at least one target asset to at least one software application, comprising a machine platform and a data routing system. The machine platform stores data associated with the at least one target asset. The data routing system collects data from the machine platform. The data routing system operates in a pass through mode and a data processing mode. In the pass through mode, data is passed from the at least one target asset to the at least one software application without modification. In the data processing mode, the data routing system generates modified data based on the data stored by the machine platform and sends the modified data to the at least one software application.

12 Claims, 41 Drawing Sheets

U.S. PATENT DOCUMENTS

| | | |
|---|---|---|
| 4,199,814 A | 4/1980 | Rapp et al. |
| 4,418,381 A | 11/1983 | Molusis et al. |
| 4,422,150 A | 12/1983 | Keller et al. |
| 4,444,061 A | 4/1984 | Mathias |
| 4,494,060 A | 1/1985 | Chitayat et al. |
| 4,531,182 A | 7/1985 | Hyatt |
| 4,563,906 A | 1/1986 | Mathias |
| 4,688,195 A | 8/1987 | Thompson et al. |
| 4,713,808 A | 12/1987 | Gaskill et al. |
| 4,716,458 A | 12/1987 | Heitzman et al. |
| 4,750,888 A | 6/1988 | Allard et al. |
| 4,767,334 A | 8/1988 | Thorne et al. |
| 4,769,771 A | 9/1988 | Lippmann et al. |
| 4,782,444 A | 11/1988 | Munshi et al. |
| 4,800,521 A | 1/1989 | Carter et al. |
| 4,809,335 A | 2/1989 | Rumsey |
| 4,815,011 A | 3/1989 | Mizuno et al. |
| 4,829,219 A | 5/1989 | Penkar |
| 4,829,419 A | 5/1989 | Hyatt |
| 4,840,602 A | 6/1989 | Rose |
| 4,843,566 A | 6/1989 | Gordon et al. |
| 4,846,693 A | 7/1989 | Baer |
| 4,852,047 A | 7/1989 | Lavallee et al. |
| 4,853,877 A | 8/1989 | Parkhurst et al. |
| 4,855,725 A | 8/1989 | Fernandez |
| 4,857,030 A | 8/1989 | Rose |
| 4,868,474 A | 9/1989 | Lancraft et al. |
| 4,887,966 A | 12/1989 | Gellerman |
| 4,897,835 A | 1/1990 | Gaskill et al. |
| 4,901,218 A | 2/1990 | Cornwell |
| 4,912,650 A | 3/1990 | Tanaka et al. |
| 4,923,428 A | 5/1990 | Curran |
| 4,937,737 A | 6/1990 | Schwane et al. |
| 4,937,759 A | 6/1990 | Vold |
| 4,987,537 A | 1/1991 | Kawata |
| 5,005,134 A | 4/1991 | Nakashima et al. |
| 5,005,135 A | 4/1991 | Morser et al. |
| 5,014,208 A | 5/1991 | Wolfson |
| 5,020,021 A | 5/1991 | Kaji et al. |
| 5,025,385 A | 6/1991 | Froyd |
| 5,058,034 A | 10/1991 | Murphy et al. |
| 5,095,445 A | 3/1992 | Sekiguchi |
| 5,119,318 A | 6/1992 | Paradies |
| 5,120,065 A | 6/1992 | Driscoll et al. |
| 5,126,932 A | 6/1992 | Wolfson et al. |
| 5,162,986 A | 11/1992 | Graber et al. |
| 5,168,441 A | 12/1992 | Onarheim et al. |
| 5,175,684 A | 12/1992 | Chong |
| 5,175,817 A | 12/1992 | Adams et al. |
| 5,175,856 A | 12/1992 | Van Dyke et al. |
| 5,204,599 A | 4/1993 | Hohn |
| 5,222,193 A | 6/1993 | Brooks et al. |
| 5,230,049 A | 7/1993 | Chang et al. |
| 5,231,693 A | 7/1993 | Backes et al. |
| 5,245,703 A | 9/1993 | Hubert |
| 5,247,650 A | 9/1993 | Judd et al. |
| 5,287,199 A | 2/1994 | Zoccolillo |
| 5,291,416 A | 3/1994 | Hutchins |
| 5,309,351 A | 5/1994 | McCain et al. |
| 5,329,381 A | 7/1994 | Payne |
| 5,341,451 A | 8/1994 | Latte et al. |
| 5,368,484 A | 11/1994 | Copperman et al. |
| 5,377,258 A | 12/1994 | Bro |
| 5,382,026 A | 1/1995 | Harvard et al. |
| 5,390,304 A | 2/1995 | Leach et al. |
| 5,390,330 A | 2/1995 | Talati |
| 5,392,207 A | 2/1995 | Wilson et al. |
| 5,392,382 A | 2/1995 | Schoppers |
| 5,400,345 A | 3/1995 | Ryan, Jr. |
| 5,402,518 A | 3/1995 | Lowery |
| 5,405,152 A | 4/1995 | Katanics et al. |
| 5,412,757 A | 5/1995 | Endo |
| 5,413,355 A | 5/1995 | Gonzalez |
| 5,417,210 A | 5/1995 | Funda et al. |
| 5,418,964 A | 5/1995 | Conner et al. |
| 5,438,529 A | 8/1995 | Rosenberg et al. |
| 5,450,079 A | 9/1995 | Dunaway |
| 5,453,933 A | 9/1995 | Wright et al. |
| 5,459,382 A | 10/1995 | Jacobus et al. |
| 5,465,215 A | 11/1995 | Strickland et al. |
| 5,483,440 A | 1/1996 | Aono et al. |
| 5,485,545 A | 1/1996 | Kojima et al. |
| 5,485,620 A | 1/1996 | Sadre et al. |
| 5,491,813 A | 2/1996 | Bondy et al. |
| 5,493,281 A | 2/1996 | Owens |
| 5,511,147 A | 4/1996 | Abdel-Malek |
| 5,541,838 A | 7/1996 | Koyama et al. |
| 5,566,278 A | 10/1996 | Patel et al. |
| 5,566,346 A | 10/1996 | Andert et al. |
| 5,576,727 A | 11/1996 | Rosenberg et al. |
| 5,577,253 A | 11/1996 | Blickstein |
| 5,596,994 A | 1/1997 | Bro |
| 5,600,373 A | 2/1997 | Chui et al. |
| 5,604,843 A | 2/1997 | Shaw et al. |
| 5,607,336 A | 3/1997 | Lebensfeld et al. |
| 5,608,894 A | 3/1997 | Kawakami et al. |
| 5,613,117 A | 3/1997 | Davidson et al. |
| 5,617,528 A | 4/1997 | Stechmann et al. |
| 5,618,179 A | 4/1997 | Copperman et al. |
| 5,623,582 A | 4/1997 | Rosenberg |
| 5,625,820 A | 4/1997 | Hermsmeier et al. |
| 5,625,821 A | 4/1997 | Record et al. |
| 5,636,994 A | 6/1997 | Tong |
| 5,652,866 A | 7/1997 | Aldred et al. |
| 5,655,945 A | 8/1997 | Jani |
| 5,659,753 A | 8/1997 | Murphy et al. |
| 5,666,161 A | 9/1997 | Kohiyama et al. |
| 5,666,264 A | 9/1997 | Chandler et al. |
| 5,670,992 A | 9/1997 | Yasuhara et al. |
| 5,691,897 A | 11/1997 | Brown et al. |
| 5,691,898 A | 11/1997 | Rosenberg et al. |
| 5,692,195 A | 11/1997 | Conner et al. |
| 5,697,829 A | 12/1997 | Chainani et al. |
| 5,701,140 A | 12/1997 | Rosenberg et al. |
| 5,704,837 A | 1/1998 | Iwasaki et al. |
| 5,707,289 A | 1/1998 | Watanabe et al. |
| 5,724,074 A | 3/1998 | Chainani et al. |
| 5,733,131 A | 3/1998 | Park |
| 5,734,373 A | 3/1998 | Rosenberg et al. |
| 5,737,523 A | 4/1998 | Callaghan et al. |
| 5,739,811 A | 4/1998 | Rosenberg et al. |
| 5,746,602 A | 5/1998 | Kikinis |
| 5,752,880 A | 5/1998 | Gabai et al. |
| 5,752,976 A | 5/1998 | Duffin et al. |
| 5,754,855 A | 5/1998 | Miller et al. |
| 5,764,155 A | 6/1998 | Kertesz et al. |
| 5,766,077 A | 6/1998 | Hongo |
| 5,772,504 A | 6/1998 | Machiguchi |
| 5,790,178 A | 8/1998 | Shibata et al. |
| 5,800,268 A | 9/1998 | Molnick |
| 5,801,946 A | 9/1998 | Nissen et al. |
| 5,802,365 A | 9/1998 | Kathail et al. |
| 5,805,442 A | 9/1998 | Crater et al. |
| 5,805,785 A | 9/1998 | Dias et al. |
| 5,818,537 A | 10/1998 | Enokida et al. |
| 5,821,920 A | 10/1998 | Rosenberg et al. |
| 5,821,987 A | 10/1998 | Larson |
| 5,822,207 A | 10/1998 | Hazama et al. |
| 5,825,308 A | 10/1998 | Rosenberg |
| 5,825,361 A | 10/1998 | Rubin et al. |
| 5,828,575 A | 10/1998 | Sakai |
| 5,832,189 A | 11/1998 | Tow |
| 5,836,014 A | 11/1998 | Faiman, Jr. |
| 5,846,132 A | 12/1998 | Junkin |
| 5,848,415 A | 12/1998 | Guck |
| 5,852,441 A | 12/1998 | Nakajima et al. |
| 5,855,483 A | 1/1999 | Collins et al. |
| 5,867,385 A | 2/1999 | Brown et al. |
| 5,873,765 A | 2/1999 | Rifkin et al. |
| 5,889,670 A | 3/1999 | Schuler et al. |
| 5,889,672 A | 3/1999 | Schuler et al. |
| 5,889,924 A | 3/1999 | Okabayashi et al. |
| 5,890,963 A | 4/1999 | Yen |
| 5,907,704 A | 5/1999 | Gudmundson et al. |
| 5,907,831 A | 5/1999 | Lotvin et al. |
| 5,914,876 A | 6/1999 | Hirai |
| 5,917,840 A | 6/1999 | Cheney et al. |

| | | |
|---|---|---|
| 5,920,476 A | 7/1999 | Hennessey et al. |
| 5,921,780 A | 7/1999 | Myers |
| 5,924,013 A | 7/1999 | Guido et al. |
| 5,926,389 A | 7/1999 | Trounson |
| 5,942,869 A | 8/1999 | Katou et al. |
| 5,956,484 A | 9/1999 | Rosenberg et al. |
| 5,959,613 A | 9/1999 | Rosenberg et al. |
| 5,960,085 A | 9/1999 | de la Huerga |
| 5,960,168 A | 9/1999 | Shaw et al. |
| 5,977,951 A | 11/1999 | Danieli et al. |
| 5,984,499 A | 11/1999 | Nourse et al. |
| 5,991,528 A | 11/1999 | Taylor et al. |
| 5,999,964 A | 12/1999 | Murakata et al. |
| 6,012,961 A | 1/2000 | Sharpe, III et al. |
| 6,020,876 A | 2/2000 | Rosenberg et al. |
| 6,028,593 A | 2/2000 | Rosenberg et al. |
| 6,031,973 A | 2/2000 | Gomi et al. |
| 6,038,493 A | 3/2000 | Tow |
| 6,038,603 A | 3/2000 | Joseph |
| 6,046,727 A | 4/2000 | Rosenberg et al. |
| 6,055,579 A | 4/2000 | Goyal et al. |
| 6,057,828 A | 5/2000 | Rosenberg et al. |
| 6,061,004 A | 5/2000 | Rosenberg |
| 6,065,365 A | 5/2000 | Ostler et al. |
| 6,070,010 A | 5/2000 | Keenleyside et al. |
| 6,078,308 A | 6/2000 | Rosenberg et al. |
| 6,078,747 A | 6/2000 | Jewitt |
| 6,078,968 A | 6/2000 | Lo et al. |
| 6,080,063 A | 6/2000 | Khosla |
| 6,083,104 A | 7/2000 | Choi |
| 6,088,690 A | 7/2000 | Gounares et al. |
| 6,090,156 A | 7/2000 | MacLeod |
| 6,100,874 A | 8/2000 | Schena et al. |
| 6,101,425 A | 8/2000 | Govindaraj et al. |
| 6,101,530 A | 8/2000 | Rosenberg et al. |
| 6,104,158 A | 8/2000 | Jacobus et al. |
| 6,125,385 A | 9/2000 | Wies et al. |
| 6,128,006 A | 10/2000 | Rosenberg et al. |
| 6,131,097 A | 10/2000 | Peurach et al. |
| 6,133,867 A | 10/2000 | Eberwine et al. |
| 6,139,177 A | 10/2000 | Venkatraman et al. |
| 6,144,895 A | 11/2000 | Govindaraj et al. |
| 6,147,647 A | 11/2000 | Tassoudji et al. |
| 6,161,126 A | 12/2000 | Wies et al. |
| 6,166,723 A | 12/2000 | Schena et al. |
| 6,167,491 A | 12/2000 | McAlpine |
| 6,169,540 B1 | 1/2001 | Rosenberg et al. |
| 6,173,316 B1 | 1/2001 | De Boor et al. |
| 6,191,774 B1 | 2/2001 | Schena et al. |
| 6,192,354 B1 | 2/2001 | Bigus et al. |
| 6,195,592 B1 | 2/2001 | Schuler et al. |
| 6,201,996 B1 | 3/2001 | Crater et al. |
| 6,208,640 B1 | 3/2001 | Spell et al. |
| 6,209,037 B1 | 3/2001 | Brown et al. |
| 6,216,083 B1 | 4/2001 | Ulyanov et al. |
| 6,216,173 B1 | 4/2001 | Jones et al. |
| 6,219,032 B1 | 4/2001 | Rosenberg et al. |
| 6,219,033 B1 | 4/2001 | Rosenberg et al. |
| 6,232,891 B1 | 5/2001 | Rosenberg |
| 6,233,545 B1 | 5/2001 | Datig |
| 6,242,880 B1 | 6/2001 | Hong |
| 6,243,078 B1 | 6/2001 | Rosenberg |
| 6,246,390 B1 | 6/2001 | Rosenberg |
| 6,247,994 B1 | 6/2001 | DeAngelis et al. |
| 6,252,579 B1 | 6/2001 | Rosenberg et al. |
| 6,252,853 B1 | 6/2001 | Ohno |
| 6,259,382 B1 | 7/2001 | Rosenberg |
| 6,271,833 B1 | 8/2001 | Rosenberg et al. |
| 6,275,785 B1 | 8/2001 | Currie et al. |
| 6,278,439 B1 | 8/2001 | Rosenberg et al. |
| 6,285,351 B1 | 9/2001 | Chang et al. |
| 6,286,133 B1 | 9/2001 | Hopkins |
| 6,288,705 B1 | 9/2001 | Rosenberg et al. |
| 6,288,716 B1 | 9/2001 | Humpleman et al. |
| 6,290,565 B1 | 9/2001 | Galyean, III et al. |
| 6,290,566 B1 | 9/2001 | Gabai et al. |
| 6,292,170 B1 | 9/2001 | Chang et al. |
| 6,292,174 B1 | 9/2001 | Mallett et al. |
| 6,292,712 B1 | 9/2001 | Bullen |
| 6,292,714 B1 | 9/2001 | Okabayashi |
| 6,295,530 B1 | 9/2001 | Ritchie et al. |
| 6,300,936 B1 | 10/2001 | Braun et al. |
| 6,300,937 B1 | 10/2001 | Rosenberg |
| 6,301,634 B1 | 10/2001 | Gomi et al. |
| 6,304,091 B1 | 10/2001 | Shahoian et al. |
| 6,305,011 B1 | 10/2001 | Safonov |
| 6,309,275 B1 | 10/2001 | Fong et al. |
| 6,310,605 B1 | 10/2001 | Rosenberg et al. |
| 6,317,116 B1 | 11/2001 | Rosenberg et al. |
| 6,317,871 B1 | 11/2001 | Andrews et al. |
| 6,319,010 B1 | 11/2001 | Kikinis |
| 6,343,349 B1 | 1/2002 | Braun et al. |
| 6,345,212 B1 | 2/2002 | Nourse |
| 6,353,850 B1 | 3/2002 | Wies et al. |
| 6,366,272 B1 | 4/2002 | Rosenberg et al. |
| 6,366,273 B1 | 4/2002 | Rosenberg et al. |
| 6,366,293 B1 | 4/2002 | Hamilton et al. |
| 6,374,195 B1 | 4/2002 | Li et al. |
| 6,374,255 B1 | 4/2002 | Peurach et al. |
| 6,400,996 B1 | 6/2002 | Hoffberg et al. |
| 6,401,005 B1 | 6/2002 | Schwarz et al. |
| 6,421,341 B1 | 7/2002 | Han et al. |
| 6,425,118 B1 | 7/2002 | Molloy et al. |
| 6,430,471 B1 | 8/2002 | Kintou et al. |
| 6,439,956 B1 | 8/2002 | Ho |
| 6,442,451 B1 | 8/2002 | Lapham |
| 6,463,404 B1 | 10/2002 | Appleby |
| 6,470,235 B2 | 10/2002 | Kasuga et al. |
| 6,470,377 B1 | 10/2002 | Sevcik et al. |
| 6,473,824 B1 | 10/2002 | Kreissig et al. |
| 6,480,896 B1 | 11/2002 | Brown et al. |
| 6,491,566 B2 | 12/2002 | Peters et al. |
| 6,497,606 B2 | 12/2002 | Fong et al. |
| 6,513,058 B2 | 1/2003 | Brown et al. |
| 6,516,236 B1 | 2/2003 | Brown et al. |
| 6,518,980 B1 | 2/2003 | DeMotte et al. |
| 6,519,594 B1 | 2/2003 | Li |
| 6,519,646 B1 | 2/2003 | Gupta et al. |
| 6,523,171 B1 | 2/2003 | Dupuy et al. |
| 6,528,963 B1 | 3/2003 | Hong |
| 6,535,861 B1 | 3/2003 | O'Connor et al. |
| 6,542,925 B2 | 4/2003 | Brown et al. |
| 6,546,436 B1 | 4/2003 | Fainmesser et al. |
| 6,559,860 B1 | 5/2003 | Hamilton et al. |
| 6,560,513 B2 | 5/2003 | Krause et al. |
| 6,560,592 B1 | 5/2003 | Reid et al. |
| 6,571,141 B1 | 5/2003 | Brown |
| 6,606,665 B2 | 8/2003 | Govindaraj et al. |
| 6,615,091 B1 | 9/2003 | Birchenough et al. |
| 6,647,328 B2 | 11/2003 | Walker |
| 6,652,378 B2 | 11/2003 | Cannon et al. |
| 6,658,325 B2 | 12/2003 | Zweig |
| 6,658,627 B1 | 12/2003 | Gallup et al. |
| 6,662,361 B1 | 12/2003 | Jackson |
| 6,665,688 B1 | 12/2003 | Callahan, II et al. |
| 6,668,211 B1 | 12/2003 | Fujita et al. |
| 6,678,713 B1 | 1/2004 | Mason et al. |
| 6,684,157 B2 * | 1/2004 | Barman et al. ............... 701/213 |
| 6,704,717 B1 | 3/2004 | Tate |
| 6,733,382 B2 | 5/2004 | Oe et al. |
| 6,778,949 B2 | 8/2004 | Duan et al. |
| 6,782,374 B2 | 8/2004 | Nichols |
| 6,845,276 B2 | 1/2005 | Bocchi |
| 6,848,107 B1 | 1/2005 | Komine et al. |
| 6,850,806 B2 | 2/2005 | Yutkowitz |
| 6,859,671 B2 | 2/2005 | Brown |
| 6,859,747 B2 | 2/2005 | Yutkowitz |
| 6,865,499 B2 | 3/2005 | Yutkowitz |
| 6,879,862 B2 | 4/2005 | Brown et al. |
| 6,885,898 B1 | 4/2005 | Brown et al. |
| 6,889,118 B2 | 5/2005 | Murray, IV et al. |
| 6,892,115 B2 | 5/2005 | Berkcan et al. |
| 6,892,145 B2 | 5/2005 | Topka et al. |
| 6,907,029 B2 | 6/2005 | Brabrand |
| 6,909,942 B2 | 6/2005 | Andarawis et al. |
| 6,920,408 B2 | 7/2005 | Yutkowitz |
| 6,922,826 B2 | 7/2005 | Bates et al. |
| 6,925,357 B2 | 8/2005 | Wang et al. |

| | | | |
|---|---|---|---|
| 6,941,543 B1 | 9/2005 | Brown et al. | |
| 6,944,584 B1 | 9/2005 | Tenney et al. | |
| 7,024,255 B1 | 4/2006 | Brown et al. | |
| 7,024,666 B1 | 4/2006 | Brown | |
| 7,031,798 B2 | 4/2006 | Brown et al. | |
| 7,035,697 B1 | 4/2006 | Brown | |
| 7,076,336 B2 | 7/2006 | Murray, IV et al. | |
| 7,113,833 B1 | 9/2006 | Brown et al. | |
| 7,137,107 B1 | 11/2006 | Brown | |
| 7,137,891 B2 | 11/2006 | Neveu et al. | |
| 7,139,843 B1 | 11/2006 | Brown et al. | |
| 7,209,874 B2 * | 4/2007 | Salmonsen | 703/23 |
| 7,216,179 B2 | 5/2007 | Ott et al. | |
| 7,302,312 B2 | 11/2007 | Murray, IV et al. | |
| 7,302,676 B2 | 11/2007 | Schmitt et al. | |
| 7,617,501 B2 | 11/2009 | Peterson et al. | |
| 2001/0020944 A1 | 9/2001 | Brown et al. | |
| 2001/0029443 A1 | 10/2001 | Miyahira | |
| 2001/0032268 A1 | 10/2001 | Brown et al. | |
| 2001/0032278 A1 | 10/2001 | Brown et al. | |
| 2001/0037492 A1 | 11/2001 | Holzmann | |
| 2001/0056539 A1 | 12/2001 | Pavlin et al. | |
| 2002/0004423 A1 | 1/2002 | Minami et al. | |
| 2002/0044297 A1 | 4/2002 | Tanaka | |
| 2002/0045956 A1 * | 4/2002 | Kapitan | 700/56 |
| 2002/0049776 A1 | 4/2002 | Aronoff et al. | |
| 2002/0052939 A1 | 5/2002 | Lee | |
| 2002/0064157 A1 | 5/2002 | Krause | |
| 2002/0065941 A1 | 5/2002 | Kaan et al. | |
| 2002/0129333 A1 | 9/2002 | Chandhoke et al. | |
| 2002/0150093 A1 | 10/2002 | Ott et al. | |
| 2002/0156872 A1 | 10/2002 | Brown | |
| 2002/0163909 A1 | 11/2002 | Sarkinen et al. | |
| 2002/0165627 A1 | 11/2002 | Brown et al. | |
| 2002/0165708 A1 | 11/2002 | Kumhyr | |
| 2002/0173877 A1 | 11/2002 | Zweig | |
| 2002/0177453 A1 | 11/2002 | Chen | |
| 2002/0181937 A1 | 12/2002 | Yamamoto et al. | |
| 2003/0033150 A1 | 2/2003 | Balan et al. | |
| 2003/0037117 A1 | 2/2003 | Tabuchi | |
| 2003/0046380 A1 * | 3/2003 | Steger et al. | 709/223 |
| 2003/0061023 A1 | 3/2003 | Menezes et al. | |
| 2003/0069998 A1 | 4/2003 | Brown et al. | |
| 2003/0093187 A1 | 5/2003 | Walker | |
| 2003/0109959 A1 | 6/2003 | Tajima et al. | |
| 2003/0165227 A1 | 9/2003 | De Beer | |
| 2003/0171846 A1 | 9/2003 | Murray, IV et al. | |
| 2003/0230998 A1 | 12/2003 | Miyaji et al. | |
| 2004/0019683 A1 | 1/2004 | Lee et al. | |
| 2004/0025150 A1 | 2/2004 | Heishi et al. | |
| 2004/0044794 A1 | 3/2004 | Srinivasan | |
| 2005/0114444 A1 | 5/2005 | Brown et al. | |
| 2005/0132104 A1 | 6/2005 | Brown | |
| 2005/0286457 A1 | 12/2005 | Foster et al. | |
| 2006/0064503 A1 | 3/2006 | Brown et al. | |
| 2006/0146820 A1 | 7/2006 | Friedman et al. | |
| 2006/0149824 A1 | 7/2006 | Park et al. | |
| 2006/0206219 A1 | 9/2006 | Brown et al. | |
| 2006/0241811 A1 | 10/2006 | Brown et al. | |
| 2006/0247801 A1 | 11/2006 | Brown et al. | |
| 2006/0282180 A1 | 12/2006 | Brown et al. | |
| 2007/0022194 A1 | 1/2007 | Brown et al. | |
| 2008/0275576 A1 | 11/2008 | Brown et al. | |
| 2008/0275577 A1 | 11/2008 | Brown et al. | |
| 2009/0030977 A1 | 1/2009 | Brown et al. | |
| 2009/0063628 A1 | 3/2009 | Brown et al. | |
| 2009/0082686 A1 | 3/2009 | Brown et al. | |
| 2009/0157199 A1 | 6/2009 | Brown et al. | |
| 2009/0157807 A1 | 6/2009 | Brown et al. | |
| 2009/0271007 A1 | 10/2009 | Brown et al. | |
| 2010/0005192 A1 | 1/2010 | Brown et al. | |
| 2010/0064026 A1 | 3/2010 | Brown et al. | |

FOREIGN PATENT DOCUMENTS

| | | |
|---|---|---|
| CA | 2586401 | 12/1996 |
| CA | 2389183 | 5/2001 |
| CA | 2625283 | 5/2001 |
| EP | 0275826 | 7/1988 |
| EP | 0281427 | 9/1988 |
| EP | 0442676 | 8/1991 |
| EP | 0508912 | 10/1992 |
| EP | 0583908 | 2/1994 |
| EP | 821522 | 1/1998 |
| EP | 0829039 | 3/1998 |
| EP | 1174779 | 4/2000 |
| EP | 1260891 | 11/2002 |
| EP | 1560093 | 8/2005 |
| EP | 1678589 | 7/2006 |
| EP | 1690173 | 8/2006 |
| EP | 2081094 | 7/2009 |
| GB | 2244896 | 12/1991 |
| JP | 59-228473 | 12/1984 |
| JP | 06-168157 | 6/1994 |
| JP | 8161335 | 6/1996 |
| JP | 11506234 | 6/1999 |
| JP | 2000020114 | 1/2000 |
| JP | 2000155693 | 6/2000 |
| JP | 2003513348 | 4/2003 |
| JP | 2004078904 | 3/2004 |
| JP | 2007102796 | 4/2007 |
| JP | 2008159046 | 7/2008 |
| WO | 9211731 | 7/1992 |
| WO | 9308654 | 4/1993 |
| WO | 9507504 | 3/1995 |
| WO | 96/38769 | 12/1996 |
| WO | 9638769 | 12/1996 |
| WO | 0067081 | 11/2000 |
| WO | 0131408 | 5/2001 |
| WO | 0163431 | 8/2001 |
| WO | 02054184 | 7/2002 |
| WO | 02071241 | 9/2002 |
| WO | 03019397 | 3/2003 |
| WO | 2005031542 | 4/2005 |
| WO | 2005048086 | 5/2005 |

OTHER PUBLICATIONS

Aerotech, Inc.; "Aerotech UNIDEX 31 Series Machine Controller Brochure", Date Unknown, Aerotech 613-623.

Mishra, B., Antoniotti, M.; "ED I: NYU Educational Robot", Date Unknown, DEFS 00007791-00007873.

Wright, P., Hong, J., Tan, X., Pavlakos, L., Hansen, F.; "MOSAIC: Machine-tool, Open-System, Advanced Intelligent Controller", Date Unknown, DEFS 00030957-00030962.

Wizdom Controls, Inc.; "Paradym-31 User's Guide and Reference", Date Unknown, DEFS 00047946-00048274.

Precision Microcontrol; "Precision MicroControl Product Guide (with DEFS)", Date Unknown, RGB00076292-RGB00076323.

Wright, P., Hansen, F., Pavlakos, L.; "Tool Wear and Failure Monitoring on an Open-Architecture Machine Tool", New York University, Date Unknown, DEFS 00031419-00031436.

Allen-Bradley Company, Inc.; "Servo Positioning Assembly User Manual", Oct. 1, 1985, DEFS 00034317-00034563.

GMFANUC Robotics Corporation; "GMFCOMM Communications Program Reference Manual—Version 2.11", 1986, DEFS 00058429-00058553.

GMFANUC Robotics Corporation; "KCS-PC Karel Communications Software Reference Manual—Version 1.0", 1986, DEFS 00058611-00058786.

GMFANUC Robotics Corporation; "KAREL OLPC Off-line Programming Software Operations Guide—Version OLPC-V1.50P", 1987, DEFS 00058098-00058305.

GMFANUC Robotics Corporation; "KAREL-VAX Communication Software Reference Manual—Version 1.1", 1987, DEFS 00057536-00057757.

Greenfeld, I., Hansen, F., Wright, P.; "Self-Sustaining, Open-System Machine Tools", NAMR/SME, 1989, DEFS 00030204-00030210, 1989 Transactions of NAMR/SME.

Greenfeld, I., Hansen, F., Fehlinger, J., Pavlakos, L.; "Robotics Research Technical Report", New York University, Jun. 15, 1989, DEFS 00040323-00040398.

FANUC Ltd.; "FANUC MMC-II Product Literature", Aug. 1, 1989, DEFS 00055223-00055228.

Reeker, L., Wright, P., Greenfeld, I., Hansen, F., Fehlinger, J., Pavlakos, L.; "Investigation and Design of Open System Controllers for Machine Tools", Defense Advanced Research Projects Agency, Nov. 1, 1989, DEFS 00030700-00030946.

FANUC Ltd.; "FANUC MMC-II Programming Manual", 1990, DEFS 00055273-00055555.

Microsoft Corporation; "Microsoft Windows Software Development Kit Reference—vol. 2", 1990, DEFS 00050303-00050674.

Denardo, P., LaPage, S., Staniulis, E.; "Network Communications with DAE 1.0", IBM Corporation, Mar. 6, 1990, DEFS 00002923-00002935.

Aerotech, Inc.; "UNIDEX 31 Integrated Machine Controller Software Manual", Jun. 29, 1990, Aerotech 001-357.

Compumotor Division, Parker Hannifin; "Compumotor 6000 Series Software Reference Guide", 1991, RGBINSP00001703-RGBINSP00001970.

Intellution, Inc.; "I/O Driver Manual Allen-Bradley KT/KT2", 1991, DEFS 00020252-00020340.

IEC/TC; "Electrical Equipment of Industrial Machines—Serial Data Link for Real-time Communications Between Controls and Drives", Nov. 22, 1991, DEFS 00039926-00040070.

Intellution, Inc.; "FIXDMACS Product Documentation", 1992, DEFS 00018984-00019624.

Intellution, Inc.; "I/O Driver Manual I/O Driver Toolkit", 1992, DEFS 00020348-00020516.

Intellution, Inc.; "I/O Driver Manual I/O Driver Toolkit (Duplicate with different DEFS)", 1992, DEFS 00035971-00036139.

GE FANUC Automation; "MMC-II Application Reference Manual", 1992, DEFS 00054848-00055222.

GE FANUC Automation; "MMC-II Programming Manual", 1992, DEFS 00054538-00054847.

Tele-Denken Resources, Inc.; "VIEWpoint Product Documentation", May 18, 1992, DEFS 00014912-00015830.

Sercos Interface; "Digital Interface for Communication between Controls and Drives in Numerically Controlled Machines", Jul. 1, 1992, DEFS 00041190-00041207.

Hewlett Packard Company; "PCL 5 Printer Language Technical Reference Manual—Part 1", Oct. 1, 1992, HP 0001-0369.

Shaw, L., Bidstrup, E., Wu, Z.; "United States Pat. 5,604,843 (with DEFS)", USPTO, Dec. 23, 1992, RGB00061667-RGB00061713.

Smith, M.; "CNC Machining Technology—vol. III Part Programming Techniques", Springer-Verlag, Inc., 1993, DEFS 00010649-00010723.

Intellution, Inc.; "FIX DMACS Recipe Manual", 1993, DEFS 00035624-00035793.

Ability Systems; "HPGL Controller Design Reference", 1993, DEFS 00043010-00043052.

Intellution, Inc.; "I/O Driver Manual Eurotherm 800 Series", 1993, DEFS 00036515-00036600.

FANUC Robotics America, Inc; "KFLOPPY-DOS PS-100/200 Floppy Disk Drive Emulator—Version 3.07P", 1993, DEFS 00058306-00058404.

FANUC Robotics North America, Inc., "Robot Controller Terminal Emulator Manual (Version 3.0)", 1993, DEFS 00058405-00058428.

Cahners Publishing Company; "The First Open Architecture, Multitasking Machine Controller Plus Computer", 1993, DEFS 00045272-00045237, Article in Jan. 1993 issue of Control Engineering.

Hewlett Packard Company; "The HP-GL/2 and HP RTL Reference Guide", 1993, DEFS 00031028-00031418.

Pritschow, G., Daniel, C., Junghans, G., Sperling, W.; "Open System Controllers: A Challenge for the Future of the Machine Tool Industry (with DEFS)", Jan. 15, 1993, RGB00076341-RGB00076344, Annals of the CIRP, pp. 449-452, vol. 42.

Microsoft Corporation; "WOSA Backgrounder: Delivering Enterprise Services to the Windows-based Desktop (with DEFS)", Jul. 1, 1993, RGB00078542-RGB00078560, Backgrounders and Whitepapers: Operating Systems Extensions—MSDN Archive Edition, pp. 1-19.

National Instruments; "LabVIEW for Windows User Manual", Aug. 1, 1993, DEFS 00031588-00032047.

Wonderware; "Wonderware NetDDE for Windows Users Guide", Nov. 1, 1993, DEFS 00017524-00017663.

Ace Technical Sales; "Third Party I/O Driver List", Dec. 7, 1993, DEFS 00055557-00055565.

Wonderware; "InTouch Getting Started Reference", 1994, DEFS 00016956-00017007.

Wonderware; "InTouch User's Guide", 1994, DEFS 00017008-00017523.

Proctor, F., Damazo, B., Yang, C., Frechette, S.; "Open Architectures for Machine Control (with DEFS)", NIST, 1994, DEFS 00010471-00010487.

FANUC Robotics North America, Inc.; "Pontiac Truck and Bus PAINTworks II Manual", 1994, DEFS 00055734-00055920.

FANUC Ltd.; "FANUC MMC-IV Operator's Manual", Mar. 1, 1994 DEFS 00053795-00054125.

GE FANUC Automation; "MMC-IV Descriptions Manual", Mar. 1, 1994 DEFS 00054457-00054479.

Wonderware; "Extensibility Toolkit for InTouch", Jul. 1, 1994, DEFS 00016606-00016955.

GE FANUC Automation; "MMC-IV Connection and Maintenance Manual", Dec. 1, 1994, DEFS 00054480-00054537.

Hibbard, S.; "Open Drive Interfaces for Advanced Machining Concepts", Indramat Division, Rexroth Corporation, 1995, DEFS 00051134-00051151.

Mitchell, D.; "OLE Based Real-Time Device Interface", USDATA, Mar. 24, 1995, DEFS 00007882-00007908.

Schofield, S.; "Open Architecture Controllers for Advanced Machine Tools", Dec. 12, 1995, DEFS 00030394-00030590.

"OSACA Open System Architecture for Controls within Automation Systems Final Report", Feb. 21, 1996, DEFS 00009106-00009173.

Compumotor Division, Parker Hannifin; "Compumotor Motion Builder Start-Up Guide and Tutorial", Oct. 1, 1996, DEFS 00009960-00010053.

Schneeman, R.; "Device Driver Development for Microsoft Windows NT: Accessing Motion Control Hardware Using a Multimedia Framework (with DEFS)", NIST, Oct. 1, 1996, DEFS 00010531-00010580.

Compumotor Division, Parker Hannifin; "Motion Toolbox User Guide", Jul. 1, 1997, DEFS 00010095-00010214.

ROY-G-BIV Corporation; "Pleadings: Plaintiff Roy-G-Biv Corp.'s Answers and Objections to Defendants First Set of Interrogatories", Feb. 28, 2008.

GE FANUC; "Pleadings: Objections and Responses of Defendants to Plaintiff First Set of Requests for Documents (Nos. 1-25)", Mar. 7, 2008, pp. 1-31.

ROY-G-BIV Corporation; "Pleadings: Plaintiff Roy-G-Biv Corp.'s First Supplementary Answers and Objections to Defendants' First Set of Interrogatories", Mar. 20, 2008, pp. 1-6.

GE FANUC; "Pleadings: Defendant's Objections and Responses to Plaintiff's Second Set of Requests for Documents (Nos. 26-94)", Mar. 24, 2008, pp. 1-60.

ROY-G-BIV Corporation; "Pleadings: Plaintiff's First Supplemental Objections and Responses of Defendant's First Set of Interrogatories (Nos. 1, 2, 8, 11, and 12)", Apr. 14, 2008, pp. 1-15.

GE FANUC; "Pleadings: Defendant's Second Set of Document Requests (Nos. 88-123) to Plaintiff", Apr. 18, 2008, pp. 1-16.

"Pleadings: Plaintiff's Second Supplemental Answers and Objections to Defendant's First Set of Interrogatories", Apr. 25, 2008, pp. 1-11.

GE FANUC; "Pleadings: Invalidity Contentions of Defendants (Redacted)", Jul. 11, 2008, pp. 1-87.

GE FANUC; "Pleadings: Invalidity Contentions of Defendants—Exhibit A-058", Jul. 11, 2008, pp. 1-37.

GE FANUC; "Pleadings: Invalidity Contentions of Defendants—Exhibit A-236", Jul. 11, 2008, pp. 1-50.

GE FANUC; "Pleadings: Invalidity Contentions of Defendants—Exhibit A-543", Jul. 11, 2008, pp. 1-47.

GE FANUC; "Pleadings: Invalidity Contentions of Defendants—Exhibit A-897", Jul. 11, 2008, pp. 1-129.

GE FANUC; "Pleadings: Invalidity Contentions of Defendants—Exhibit AA-058", Jul. 11, 2008, pp. 1-85.

GE FANUC; "Pleadings: Invalidity Contentions of Defendants—Exhibit AA-236", Jul. 11, 2008, pp. 1-74.

GE FANUC; "Pleadings: Invalidity Contentions of Defendants—Exhibit AA-543", Jul. 11, 2008, pp. 1-74.

GE FANUC; "Pleadings: Invalidity Contentions of Defendants—Exhibit AA-897", Jul. 11, 2008, pp. 1-148.

GE FANUC; "Pleadings: Invalidity Contentions of Defendants—Exhibit B-058", Jul. 11, 2008, pp. 1-19.
GE FANUC; "Pleadings: Invalidity Contentions of Defendants—Exhibit B-236", Jul. 11, 2008, pp. 1-22.
GE FANUC; "Pleadings: Invalidity Contentions of Defendants—Exhibit B-543", Jul. 11, 2008, pp. 1-16.
GE FANUC; "Pleadings: Invalidity Contentions of Defendants—Exhibit B-897", Jul. 11, 2008, pp. 1-42.
GE FANUC; "Pleadings: Invalidity Contentions of Defendants—Exhibit BB-543", Jul. 11, 2008, pp. 1-18.
GE FANUC; "Pleadings: Invalidity Contentions of Defendants—Exhibit C-543", Jul. 11, 2008, pp. 1-11.
GE FANUC; "Pleadings: Invalidity Contentions of Defendants—Exhibit CC-058", Jul. 11, 2008, pp. 1-25.
GE FANUC; "Pleadings: Invalidity Contentions of Defendants—Exhibit CC-236", Jul. 11, 2008, pp. 1-25.
GE FANUC; "Pleadings: Invalidity Contentions of Defendants—Exhibit CC-543", Jul. 11, 2008, pp. 1-20.
Ge FANUC; "Pleadings: Invalidity Contentions of Defendants—Exhibit CC-897", Jul. 11, 2008, pp. 1-57.
GE FANUC; "Pleadings: Invalidity Contentions of Defendants—Exhibit D-058", Jul. 11, 2008, pp. 1-24.
GE FANUC; "Pleadings: Invalidity Contentions of Defendants—Exhibit D-236", Jul. 11, 2008, pp. 1-22.
GE FANUC; "Pleadings: Invalidity Contentions of Defendants—Exhibit D-543", Jul. 11, 2008, pp. 1-26.
GE FANUC; "Pleadings: Invalidity Contentions of Defendants—Exhibit D-897", Jul. 11, 2008, pp. 1-49.
GE FANUC; "Pleadings: Invalidity Contentions of Defendants—Exhibit DD-543", Jul. 11, 2008, pp. 1-6.
GE FANUC; "Pleadings: Invalidity Contentions of Defendants—Exhibit E-543", Jul. 11, 2008, pp. 1-5.
GE FANUC; "Pleadings: Invalidity Contentions of Defendants—Exhibit EE-058", Jul. 11, 2008, pp. 1-15.
GE FANUC; "Pleadings: Invalidity Contentions of Defendants—Exhibit EE-236", Jul. 11, 2008, pp. 1-13.
GE FANUC; "Pleadings: Invalidity Contentions of Defendants—Exhibit EE-543", Jul. 11, 2008, pp. 1-17.
GE FANUC; "Pleadings: Invalidity Contentions of Defendants—Exhibit EE-897", Jul. 11, 2008, pp. 1-30.
GE FANUC; "Pleadings: Invalidity Contentions of Defendants—Exhibit F-058", Jul. 11, 2008, pp. 1-24.
GE FANUC; "Pleadings: Invalidity Contentions of Defendants—Exhibit FF-058", Jul. 11, 2008, pp. 1-24.
GE FANUC; "Pleadings: Invalidity Contentions of Defendants—Exhibit FF-236", Jul. 11, 2008, pp. 1-18.
GE FANUC; "Pleadings: Invalidity Contentions of Defendants—Exhibit FF-543", Jul. 11, 2008, pp. 1-18.
GE FANUC; "Pleadings: Invalidity Contentions of Defendants—Exhibit FF-897", Jul. 11, 2008, pp. 1-37.
GE FANUC; "Pleadings: Invalidity Contentions of Defendants—Exhibit G-058", Jul. 11, 2008, pp. 1-24.
GE FANUC; "Pleadings: Invalidity Contentions of Defendants—Exhibit G-236", Jul. 11, 2008, pp. 1-16.
GE FANUC; "Pleadings: Invalidity Contentions of Defendants—Exhibit G-543", Jul. 11, 2008, pp. 1-18.
GE FANUC; "Pleadings: Invalidity Contentions of Defendants—Exhibit G-897", Jul. 11, 2008, pp. 1-32.
GE FANUC; "Pleadings: Invalidity Contentions of Defendants—Exhibit GG-543", Jul. 11, 2008, pp. 1-14.
GE FANUC; "Pleadings: Invalidity Contentions of Defendants—Exhibit H-543", Jul. 11, 2008, pp. 1-5.
GE FANUC; "Pleadings: Invalidity Contentions of Defendants—Exhibit HH-058", Jul. 11, 2008, pp. 1-68.
GE FANUC; "Pleadings: Invalidity Contentions of Defendants—Exhibit HH-236", Jul. 11, 2008, pp. 1-41.
GE FANUC; "Pleadings: Invalidity Contentions of Defendants—Exhibit HH-543", Jul. 11, 2008, pp. 1-63.
GE FANUC; "Pleadings: Invalidity Contentions of Defendants—Exhibit HH-897", Jul. 11, 2008, pp. 1-92.
GE FANUC; "Pleadings: Invalidity Contentions of Defendants—Exhibit II-058", Jul. 11, 2008, pp. 1-143.
GE FANUC; "Pleadings: Invalidity Contentions of Defendants—Exhibit II-236", Jul. 11, 2008, pp. 1-84.
GE FANUC; "Pleadings: Invalidity Contentions of Defendants—Exhibit II-543", Jul. 11, 2008, pp. 1-144.
GE FANUC; "Pleadings: Invalidity Contentions of Defendants—Exhibit II-897", Jul. 11, 2008, pp. 1-179.
GE FANUC; "Pleadings: Invalidity Contentions of Defendants—Exhibit J-058", Jul. 11, 2008, pp. 1-104.
GE FANUC; "Pleadings: Invalidity Contentions of Defendants—Exhibit J-236", Jul. 11, 2008, pp. 1-76.
GE FANUC; "Pleadings: Invalidity Contentions of Defendants—Exhibit J-543", Jul. 11, 2008, pp. 1-73.
GE FANUC; "Pleadings: Invalidity Contentions of Defendants—Exhibit J-897", Jul. 11, 2008, pp. 1-169.
GE FANUC; "Pleadings: Invalidity Contentions of Defendants—Exhibit JJ-058", Jul. 11, 2008, pp. 1-80.
GE FANUC; "Pleadings: Invalidity Contentions of Defendants—Exhibit JJ-236", Jul. 11, 2008, pp. 1-56.
GE FANUC; "Pleadings: Invalidity Contentions of Defendants—Exhibit JJ-543", Jul. 11, 2008, pp. 1-65.
GE FANUC; "Pleadings: Invalidity Contentions of Defendants—Exhibit JJ-897", Jul. 11, 2008, pp. 1-129.
GE FANUC; "Pleadings: Invalidity Contentions of Defendants—Exhibit K-543", Jul. 11, 2008, pp. 1-4.
GE FANUC; "Pleadings: Invalidity Contentions of Defendants—Exhibit L-058", Jul. 11, 2008, pp. 1-47.
GE FANUC; "Pleadings: Invalidity Contentions of Defendants—Exhibit L-236", Jul. 11, 2008, pp. 1-34.
GE FANUC; "Pleadings: Invalidity Contentions of Defendants—Exhibit L-543", Jul. 11, 2008, pp. 1-39.
GE FANUC; "Pleadings: Invalidity Contentions of Defendants—Exhibit L-897", Jul. 11, 2008, pp. 1-66.
GE FANUC; "Pleadings: Invalidity Contentions of Defendants—Exhibit LL-058", Jul. 11, 2008, pp. 1-55.
GE FANUC; "Pleadings: Invalidity Contentions of Defendants—Exhibit LL-236", Jul. 11, 2008, pp. 1-41.
GE FANUC; "Pleadings: Invalidity Contentions of Defendants—Exhibit LL-543", Jul. 11, 2008, pp. 1-59.
GE FANUC; "Pleadings: Invalidity Contentions of Defendants—Exhibit LL-897", Jul. 11, 2008, pp. 1-98.
GE FANUC; "Pleadings: Invalidity Contentions of Defendants—Exhibit MM-543", Jul. 11, 2008, pp. 1-3.
GE FANUC; "Pleadings: Invalidity Contentions of Defendants—Exhibit NN-058", Jul. 11, 2008, pp. 1-37.
GE FANUC; "Pleadings: Invalidity Contentions of Defendants—Exhibit NN-236", Jul. 11, 2008, pp. 1-35.
GE FANUC; "Pleadings: Invalidity Contentions of Defendants—Exhibit NN-543", Jul. 11, 2008, pp. 1-33.
GE FANUC; "Pleadings: Invalidity Contentions of Defendants—Exhibit NN-897", Jul. 11, 2008, pp. 1-63.
GE FANUC; "Pleadings: Invalidity Contentions of Defendants—Exhibit O-058", Jul. 11, 2008, pp. 1-44.
GE FANUC; "Pleadings: Invalidity Contentions of Defendants—Exhibit O-236", Jul. 11, 2008, pp. 1-24.
GE FANUC; "Pleadings: Invalidity Contentions of Defendants—Exhibit O-543", Jul. 11, 2008, pp. 1-35.
GE FANUC; "Pleadings: Invalidity Contentions of Defendants—Exhibit O-897", Jul. 11, 2008, pp. 1-58.
GE FANUC; "Pleadings: Invalidity Contentions of Defendants—Exhibit OO-058", Jul. 11, 2008, pp. 1-24.
GE FANUC; "Pleadings: Invalidity Contentions of Defendants—Exhibit OO-543", Jul. 11, 2008, pp. 1-8.
GE FANUC; "Pleadings: Invalidity Contentions of Defendants—Exhibit P-058", Jul. 11, 2008, pp. 1-24.
GE FANUC; "Pleadings: Invalidity Contentions of Defendants—Exhibit P-236", Jul. 11, 2008, pp. 1-24.
GE FANUC; "Pleadings: Invalidity Contentions of Defendants—Exhibit P-543", Jul. 11, 2008, pp. 1-28.
GE FANUC; "Pleadings: Invalidity Contentions of Defendants—Exhibit P-897", Jul. 11, 2008, pp. 1-55.
GE FANUC; "Pleadings: Invalidity Contentions of Defendants—Exhibit Q-058", Jul. 11, 2008, pp. 1-83.

GE FANUC; "Pleadings: Invalidity Contentions of Defendants—Exhibit Q-236", Jul. 11, 2008, pp. 1-53.
GE FANUC; "Pleadings: Invalidity Contentions of Defendants—Exhibit Q-543", Jul. 11, 2008, pp. 1-90.
GE FANUC; "Pleadings: Invalidity Contentions of Defendants—Exhibit Q-897", Jul. 11, 2008, pp. 1-110.
GE FANUC; "Pleadings: Invalidity Contentions of Defendants—Exhibit S-058", Jul. 11, 2008, pp. 1-26.
GE FANUC; "Pleadings: Invalidity Contentions of Defendants—Exhibit S-236", Jul. 11, 2008, pp. 1-17.
GE FANUC; "Pleadings: Invalidity Contentions of Defendants—Exhibit S-543", Jul. 11, 2008, pp. 1-29.
GE FANUC; "Pleadings: Invalidity Contentions of Defendants—Exhibit S-897", Jul. 11, 2008, pp. 1-38.
GE FANUC; "Pleadings: Invalidity Contentions of Defendants—Exhibit T-058", Jul. 11, 2008, pp. 1-43.
GE FANUC; "Pleadings: Invalidity Contentions of Defendants—Exhibit T-236", Jul. 11, 2008, pp. 1-31.
GE FANUC; "Pleadings: Invalidity Contentions of Defendants—Exhibit T-543", Jul. 11, 2008, pp. 1-48.
GE FANUC; "Pleadings: Invalidity Contentions of Defendants—Exhibit T-897", Jul. 11, 2008, pp. 1-80.
GE FANUC; "Pleadings: Invalidity Contentions of Defendants—Exhibit V-058", Jul. 11, 2008, pp. 1-43.
GE FANUC; "Pleadings: Invalidity Contentions of Defendants—Exhibit V-236", Jul. 11, 2008, pp. 1-37.
GE FANUC; "Pleadings: Invalidity Contentions of Defendants—Exhibit V-543", Jul. 11, 2008, pp. 1-47.
GE FANUC; "Pleadings: Invalidity Contentions of Defendants—Exhibit V-897", Jul. 11, 2008, pp. 1-91.
GE FANUC; "Pleadings: Invalidity Contentions of Defendants—Exhibit W-058", Jul. 11, 2008, pp. 1-93.
GE FANUC; "Pleadings: Invalidity Contentions of Defendants—Exhibit W-236", Jul. 11, 2008, pp. 1-68.
ROY-G-BIV Corporation; "Pleadings: RGB Internal Documents #9", Nov. 6, 2008, p. 14 (RGB00056075).
ROY-G-BIV Corporation; "Pleadings: RGB Related Document #1", Nov. 6, 2008, PDF pp. 1-23 (RGB00051652-RGB00051674).
ROY-G-BIV Corporation; "Pleadings: RGB Related Document #2", Nov. 6, 2008, PDF pp. 1-5 (RGB00052822-RGB00052826).
ROY-G-BIV Corporation; "Pleadings: RGB Related Document #3", Nov. 6, 2008, PDF p. 1 (RGB00004196).
ROY-G-BIV Corporation; "Pleadings: RGB Related Document #4", Nov. 6, 2008, PDF p. 1 (RGB00004200).
ROY-G-BIV Corporation; "Pleadings: RGB Related Document #5", Nov. 6, 2008, PDF p. 1 (RGB00004201).
ROY-G-BIV Corporation; "Pleadings: RGB Related Document #6", Nov. 6, 2008, PDF p. 1 (RGB00004202).
ROY-G-BIV Corporation; "Pleadings: RGB Related Document #7", Nov. 6, 2008, PDF pp. 1-3 (RGB00052984-RGB00052986).
GE FANUC; "Pleadings: Invalidity Contentions of Defendants—Exhibit W-543", Jul. 11, 2008, pp. 1-67.
GE FANUC; "Pleadings: Invalidity Contentions of Defendants—Exhibit W-897", Jul. 11, 2008, pp. 1-161.
GE FANUC; "Pleadings: Invalidity Contentions of Defendants—Exhibit X-236", Jul. 11, 2008, pp. 1-37.
GE FANUC; "Pleadings: Invalidity Contentions of Defendants—Exhibit X-543", Jul. 11, 2008, pp. 1-51.
GE FANUC; "Pleadings: Invalidity Contentions of Defendants—Exhibit X-897", Jul. 11, 2008, pp. 1-73.
GE FANUC; "Pleadings: Invalidity Contentions of Defendants—Exhibit Y-058", Jul. 11, 2008, pp. 1-28.
GE FANUC; "Pleadings: Invalidity Contentions of Defendants—Exhibit Y-236", Jul. 11, 2008, pp. 1-15.
GE FANUC; "Pleadings: Invalidity Contentions of Defendants—Exhibit Y-543", Jul. 11, 2008, pp. 1-19.
GE FANUC; "Pleadings: Invalidity Contentions of Defendants—Exhibit Y-897", Jul. 11, 2008, pp. 1-34.
GE FANUC; "Pleadings: Invalidity Contentions of Defendants—Exhibit Z-058", Jul. 11, 2008, pp. 1-117.
GE FANUC; "Pleadings: Invalidity Contentions of Defendants—Exhibit Z-236", Jul. 11, 2008, pp. 1-103.
GE FANUC; "Pleadings: Invalidity Contentions of Defendants—Exhibit Z-543", Jul. 11, 2008, pp. 1-97.
GE FANUC; "Pleadings: Invalidity Contentions of Defendants—Exhibit Z-897", Jul. 11, 2008, pp. 1-227.
ROY-G-BIV Corporation; "Pleadings: Plaintiff Indentification of Ten Asserted Claims", Aug. 8, 2008, p. 1.
GE FANUC ; "Pleadings: Fourth Supplemental Objections and Responses of Defendants to Plantiff First Set of Interrogatories (Nos. 1 and 2)", Aug. 14, 2008, pp. 1-26.
GE FANUC; "Pleadings: Fifth Supplemental Objections and Responses of Defendants to Plantiff First Set of Interrogatories (Nos. 1)", Aug. 26, 2008, pp. 1-23.
ROY-G-BIV Corporation; "Pleadings: RGB Internal Document #8", Nov. 6, 2008, p. 4 (RGB00055568).
Daniel A. Norton, "Writing Windows Device Drivers", 1992, pp. 1-202, Addison-Wesley Publishing Company, Inc.
Daniel A. Norton, "Writing Windows Device Drivers", 1992, pp. 202-436, Addison-Wesley Publishing Company, Inc.
Microsoft Corporation, "Win32 Programmer's Reference: vol. I—Windows Management and Graphics Device Interface", 1993, pp. 1-428, Microsoft Press.
Microsoft Corporation, "Win32 Programmer's Reference: vol. I—Windows Management and Graphics Device Interface", 1993, pp. 429-876, Microsoft Press.
Microsoft Corporation, "Windows NT Device Driver Kit: Win32 Subsystem Driver Design Guide", 1993, pp. 1-80, Microsoft Corporation.
Microsoft Corporation, "Windows NT Device Driver Kit: Network Drivers", 1993, pp. 1-12, Microsoft Corporation.
Microsoft Corporation, "Windows NT Device Driver Kit: Win32 Subsystem Driver Reference", 1993, pp. 1-11, Microsoft Corporation.
Microsoft Corporation, "Windows NT Device Driver Kit: Programming Guide", 1993, pp. 1-11, Microsoft Corporation.
Microsoft Corporation, "Windows NT Device Driver Kit: Kernel-Mode Driver Design Guide", 1993, pp. 1-7. Microsoft Corporation.
Microsoft Corporation, "Windows NT Device Driver Kit: Kernel-Mode Driver Reference", 1993, pp. 1-5. Microsoft Corporation.
Martin Marietta, "Next Generation Workstation/Machine Controller (NGC): vol. VI—Sensor/Effector Standardized Application (SESA)", 1992, pp. 1-38.
Martin Marietta, "Next Generation Workstation/Machine Controller (NGC): vol. V—Controls Standardized Application (CSA)", 1992, pp. 1-95.
Martin Marietta, "Next Generation Workstation/Machine Controller (NGC): vol. IV—Workstation Planning Standardized Application (WPSA)", 1992, pp. 1-120.
Martin Marietta, "Next Generation Workstation/Machine Controller (NGC): vol. III—Workstation Management Standardized Application (WMSA)", 1992, pp. 1-85.
Martin Marietta, "Next Generation Workstation/Machine Controller (NGC): vol. II—NGC Data", 1992, pp. 1-309.
Martin Marietta, "Next Generation Workstation/Machine Controller (NGC): vol. I—Specification for an Open System Architecture Standard (SOSAS)", 1992, pp. 1-259.
Steven K. Sorensen, "An Off-line Approach to Task Level State Driven Robot Programming", 1989, pp. 1-229.
SERCOS Interface, Inc., "SERCOS Interface: Digital Interface for Communications Between Controls and Drives for Numerically Controlled Machines", 1991, pp. 1-366.
Charles Petzoid, "Programming Windows: The Microsoft Guide to Writing Applications for Windows 3—Second Edition", 1990, pp. 1-95 (Chapters 1 and 2), Microsoft Press.
Charles Petzoid, "Programming Windows: The Microsoft Guide to Writing Applications for Windows 3—Second Edition", 1990, pp. 96-180 (Chapters 3 and 4), Microsoft Press.
Charles Petzoid, "Programming Windows: The Microsoft Guide to Writing Applications for Windows 3—Second Edition", 1990, pp. 181-268 (Chapters 5 and 6), Microsoft Press.
Charles Petzoid, "Programming Windows: The Microsoft Guide to Writing Applications for Windows 3—Second Edition", 1990, pp. 269-341 (Chapters 7 and 8), Microsoft Press.

Charles Petzoid, "Programming Windows: The Microsoft Guide to Writing Applications for Windows 3—Second Edition", 1990, pp. 342-408 (Chapter 9), Microsoft Press.

Charles Petzoid, "Programming Windows: The Microsoft Guide to Writing Applications for Windows 3—Second Edition", 1990, pp. 409-496 (Chapter 10), Microsoft Press.

Charles Petzoid, "Programming Windows: The Microsoft Guide to Writing Applications for Windows 3—Second Edition", 1990, pp. 497-609 (Chapters 11 and 12), Microsoft Press.

Charles Petzoid, "Programming Windows: The Microsoft Guide to Writing Applications for Windows 3—Second Edition", 1990, pp. 610-718 (Chapters 13 and 14), Microsoft Press.

Charles Petzoid, "Programming Windows: The Microsoft Guide to Writing Applications for Windows 3—Second Edition", 1990, pp. 719-777 (Chapters 15), Microsoft Press.

Charles Petzoid, "Programming Windows: The Microsoft Guide to Writing Applications for Windows 3—Second Edition", 1990, pp. 778-877 (Chapters, 16, 17, and 18), Microsoft Press.

Charles Petzoid, "Programming Windows: The Microsoft Guide to Writing Applications for Windows 3—Second Edition", 1990, pp. 878-952 (Chapter 19 and Index), Microsoft Press.

Paul Wright et al., "Mosaic: An Open-Architecture Machine Tool for Precision Manufacturing", 1993, pp. 1-10.

Steven Ashley, "A Mosaic for Machine Tools", Mechanical Engineering CIME, 1990, pp. 1-6.

Adrian King, "Inside Windows 95", 1994, pp. 1-129 (Chapters 1, 2, and 3), Microsoft Press.

Adrian King, "Inside Windows 95", 1994, pp. 129-247 (Chapters 4 and 5), Microsoft Press.

Adrian King, "Inside Windows 95", 1994, pp. 248-505 (Chapters 6-10), Microsoft Press.

Bruel & Kjaer, "Bruel & Kjaer Product Brochure: A System to Build Systems", 1991, pp. 1-64.

Bruel & Kjaer, "Major Challenges in Test Systems for the 1990's", 1991, pp. 1-22.

Bruel & Kjaer, "Modular Test System: A Second Generation VXI Architecture", date unknown, pp. 1-23.

VME Bus Extensions for Instrumentation, "System Specification VXI-1, Draft 1.4", 1991, pp. 1-24.

Bruel & Kjaer, "Short Form Catalog 1991", 1991, pp. 1-68.

Bruel & Kjaer, "Modular Test System Software Presentation", date unknown, pp. 1-36.

Ability Systems Corporation, "Development in Motion", 1990, p. 1.

Ability Systems Corporation, "Indexer LPT Version 5", 1989, pp. 1-214.

Furness, Harry, "New Family of 'NT' Process Software Set to Move in", Control Engineering, Apr. 1993, 2 pages.

Agrusa, Russell L., "Is Windows NT the PC Platform for the Future?", Control Engineering, Apr. 1993, 3 pages.

Faber, Tom, "From Distributed Control to Integrated Information", Control Engineering, Mid-Mar. 1992, 3 pages, published by Cahners Publishing Company.

GE FANUC; "Pleadings: Defendants Proposed Terms and Claim Elements for Construction Pursuant to Patent Rule 4-1", Jul. 25, 2008, pp. 1-16 (pdf pages).

ROY-G-BIV Corporation; "Pleadings: Plaintiff Proposed Terms and Claim Elements for Construction", Jul. 25, 2008, pp. 1-4 (pdf pages).

ROY-G-BIV Corporation; "Pleadings: Plaintiff Identification of Ten Asserted Claims", Aug. 8, 2008, pp. 1-3.

GE FANUC; "Pleadings: Defendants Claim Constructions and Preliminary Identification of Extrinsic Evidence Pursuant to Patent Rule 4-2", Oct. 3, 2008, pp. 1-13 (pdf pages).

ROY-G-BIV Corporation; "Pleadings: Plaintiff Proposed Claim Constructions and Extrinsic Evidence", Oct. 3, 2008, pp. 1-22 (pdf pages).

GE FANUC; "Pleadings: Defendant's Preliminary Constructions for Three Terms Identified by Plaintiff", Oct. 16, 2008, pp. 1-2.

GE FANUC; "Pleadings: Defendant'S Second Set of Interrogatories to Plaintiff", Oct. 17, 2008, pp. 1-9 (pdf pages).

GE FANUC; "Pleadings: Defendants Preliminary Claim Constructions and Preliminary Identification of Extrinsic Evidence Pursuant to Patent Rule 4-2", Oct. 17, 2008, pp. 1-29 (pdf pages).

ROY-G-BIV Corporation; "Pleadings: Plaintiff's Proposed Constructions and Extrinsic Evidence for Terms Identified in Defendant's Letter Dated Oct. 7, 2008", Oct. 17, 2008, pp. 1-9.

ROY-G-BIV Corporation and GE FANUC; "Pleadings: Joint Claim Construction and Prehearing Statement of Plaintiff and Defendant", Oct. 24, 2008, pp. 1-5 (pdf pages).

ROY-G-BIV Corporation and GE FANUC; "Pleadings: Joint Claim Construction and Prehearing Statement of Plaintiff and Defendant—Exhibit A", Oct. 24, 2008, pp. 1-2 (pdf pages).

ROY-G-BIV Corporation and GE FANUC; "Pleadings: Joint Claim Construction and Prehearing Statement of Plaintiff and Defendant—Exhibit B", Oct. 24, 2008, pp. 1-19.

ROY-G-BIV Corporation and GE FANUC; "Pleadings: Joint Claim Construction and Prehearing Statement of Plaintiff and Defendant—Exhibit C", Oct. 24, 2008, pp. 1-64.

ROY-G-Biv Corporation and GE FANUC; "Pleadings: Joint Claim Construction and Prehearing Statement of Plaintiff and Defendant—Exhibit C", Oct. 24, 2008, pp. 65-133.

ROY-G-BIV Corporation and GE FANUC; "Pleadings: Joint Claim Construction and Prehearing Statement of Plaintiff and Defendant—Exhibit D", Oct. 24, 2008, pp. 1-22.

GE FANUC; "Pleadings: Sixth Supplemental Objections and Responses of Defendants to Plaintiff's First Set of Interrogatories (Nos. 3-5)", Nov. 12, 2008, pp. 1-11 (pdf pages).

ROY-G-BIV Corporation; "Pleadings: Plaintiff's Answers and Objections to Defendant's Second Set of Interrogatories", Nov. 20, 2008, pp. 1-9 (pdf pages).

ROY-G-BIV Corporation; "Pleadings: Plaintiff Opening Markman Brief", Nov. 21, 2008, pp. 1-43 (pdf pages).

ROY-G-BIV Corporation; "Pleadings: Plaintiff Opening Markman Brief—Exhibit 1", Nov. 21, 2008, pp. 1-12 (pdf pages).

ROY-G-BIV Corporation; "Pleadings: Plaintiff Opening Markman Brief—Exhibit 10", Nov. 21, 2008, pp. 1-21 (pdf pages).

ROY-G-BIV Corporation; "Pleadings: Plaintiff Opening Markman Brief—Exhibit 11", Nov. 21, 2008, pp. 1-20 (pdf pages).

ROY-G-BIV Corporation; "Pleadings: Plaintiff Opening Markman Brief—Exhibit 12", Nov. 21, 2008, pp. 1-11 (pdf pages).

ROY-G-BIV Corporation; "Pleadings: Plaintiff Opening Markman Brief—Exhibit 13", Nov. 21, 2008, pp. 1-11 (pdf pages).

ROY-G-BIV Corporation; "Pleadings: Plaintiff Opening Markman Brief—Exhibit 14", Nov. 21, 2008, pp. 1-6 (pdf pages).

ROY-G-BIV Corporation; "Pleadings: Plaintiff Opening Markman Brief—Exhibit 15", Nov. 21, 2008, pp. 1-4 (pdf pages).

ROY-G-BIV Corporation; "Pleadings: Plaintiff Opening Markman Brief—Exhibit 16", Nov. 21, 2008, pp. 1-19 (pdf pages).

ROY-G-BIV Corporation; "Pleadings: Plaintiff Opening Markman Brief—Exhibit 17", Nov. 21, 2008, pp. 1-3 (pdf pages).

ROY-G-BIV Corporation; "Pleadings: Plaintiff Opening Markman Brief—Exhibit 18", Nov. 21, 2008, pp. 1-11 (pdf pages).

ROY-G-BIV Corporation; "Pleadings: Plaintiff Opening Markman Brief—Exhibit 19", Nov. 21, 2008, pp. 1-8 (pdf pages).

ROY-G-BIV Corporation; "Pleadings: Plaintiff Opening Markman Brief—Exhibit 20", Nov. 21, 2008, pp. 1-3 (pdf pages).

ROY-G-BIV Corporation; "Pleadings: Plaintiff Opening Markman Brief—Exhibit 21", Nov. 21, 2008, pp. 1-2 (pdf pages).

ROY-G-BIV Corporation; "Pleadings: Plaintiff Opening Markman Brief—Exhibit 2", Nov. 21, 2008, pp. 1-64 (pdf pages).

ROY-G-BIV Corporation; "Pleadings: Plaintiff Opening Markman Brief—Exhibit 2", Nov. 21, 2008, pp. 65-130 (pdf pages).

ROY-G-BIV Corporation; "Pleadings: Plaintiff Opening Markman Brief—Exhibit 3", Nov. 21, 2008, pp. 1-40 (pdf pages).

ROY-G-BIV Corporation; "Pleadings: Plaintiff Opening Markman Brief—Exhibit 3", Nov. 21, 2008, pp. 41-81 (pdf pages).

ROY-G-BIV Corporation; "Pleadings: Plaintiff Opening Markman Brief—Exhibit 4", Nov. 21, 2008, pp. 1-50 (pdf pages).

ROY-G-BIV Corporation; "Pleadings: Plaintiff Opening Markman Brief—Exhibit 4", Nov. 21, 2008, pp. 51-99 (pdf pages).

ROY-G-BIV Corporation; "Pleadings: Plaintiff Opening Markman Brief—Exhibit 6", Nov. 21, 2008, pp. 1-50.

ROY-G-BIV Corporation; "Pleadings: Plaintiff Opening Markman Brief—Exhibit 6", Nov. 21, 2008, pp. 51-94.

ROY-G-BIV Corporation and GE FANUC; "Pleadings: Supplemental Joint Claim Construction and Prehearing Statement of Plaintiff and Defendant—Exhibit C", Nov. 21, 2008, pp. 1-64 (pdf pages).
ROY-G-BIV Corporation and GE FANUC; "Pleadings: Supplemental Joint Claim Construction and Prehearing Statement of Plaintiff and Defendant—Exhibit C", Nov. 21, 2008, pp. 65-131 (pdf pages).
ROY-G-BIV Corporation and GE FANUC; "Pleadings: Supplemental Joint Claim Construction and Prehearing Statement of Plaintiff and Defendant—Exhibit D", Nov. 21, 2008, pp. 1-50 (pdf pages).
ROY-G-BIV Corporation and GE FANUC; "Pleadings: Supplemental Joint Claim Construction and Prehearing Statement of Plaintiff and Defendant—Exhibit D", Nov. 21, 2008, pp. 51-98 (pdf pages).
GE FANUC; "Pleadings: Declaration of Christina M. Finn—Exhibit B", Dec. 6, 2008, pp. 1-2 (pdf pages).
GE FANUC; "Pleadings: Declaration of Christina M. Finn—Exhibit C", Dec. 6, 2008, pp. 1-2 (pdf pages).
GE FANUC; "Pleadings: Declaration of Christina M. Finn—Exhibit D", Dec. 6, 2008, pp. 1-2 (pdf pages).
GE FANUC; "Pleadings: Declaration of Christina M. Finn—Exhibit E", Dec. 6, 2008, pp. 1-17 (pdf pages).
GE FANUC; "Pleadings: Declaration of Christina M. Finn—Exhibit F", Dec. 6, 2008, pp. 1-2 (pdf pages).
GE FANUC; "Pleadings: Declaration of Christina M. Finn—Exhibit G", Dec. 6, 2008, pp. 1-2 (pdf pages).
GE FANUC; "Pleadings: Declaration of Christina M. Finn—Exhibit H", Dec. 6, 2008, pp. 1-2 (pdf pages).
GE FANUC; "Pleadings: Declaration of Christina M. Finn—Exhibit I", Dec. 6, 2008, pp. 1-8 (pdf pages).
GE FANUC; "Pleadings: Declaration of Christina M. Finn—Exhibit J", Dec. 6, 2008, pp. 1-9 (pdf pages).
GE FANUC; "Pleadings: Declaration of Christina M. Finn—Exhibit K", Dec. 6, 2008, pp. 1-8 (pdf pages).
GE FANUC; "Pleadings: Declaration of Christina M. Finn—Exhibit L", Dec. 6, 2008, pp. 1-5 (pdf pages).
GE FANUC; "Pleadings: Declaration of Melvin Ray Mercer", Dec. 6, 2008, pp. 1-34 (pdf pages).
GE FANUC; "Pleadings: Declaration of Melvin Ray Mercer—Exhibit A", Dec. 6, 2008, pp. 1-22 (pdf pages).
GE FANUC; "Pleadings: Declaration of Melvin Ray Mercer—Exhibit B", Dec. 6, 2008, pp. 1-2 (pdf pages).
GE FANUC; "Pleadings: Declaration of Melvin Ray Mercer—Exhibit C", Dec. 6, 2008, pp. 1-2 (pdf pages).
GE FANUC; "Pleadings: Declaration of Melvin Ray Mercer—Exhibit D", Dec. 6, 2008, pp. 1-2 (pdf pages).
GE FANUC; "Pleadings: Declaration of Melvin Ray Mercer—Exhibit E", Dec. 6, 2008, pp. 1-2 (pdf pages).
GE FANUC; "Pleadings: Declaration of Melvin Ray Mercer—Exhibit F", Dec. 6, 2008, pp. 1-5 (pdf pages).
GE FANUC; "Pleadings: Declaration of Melvin Ray Mercer—Exhibit G", Dec. 6, 2008, pp. 1-8 (pdf pages).
ROY-G-BIV Corporation; "Pleadings: Plaintiff's Motion to Dismiss GE FANUC Intelligenc Platforms, Inc. and General Electric Company's Infringement Claims or, alternatively Motion to Server", Jan. 8, 2009, pp. 1-7 (pdf pages).
GE FANUC; "Pleadings: Defendant's Reply in Support of Their Motion to Stay the Litigation Plending the Outcome of the Reexamination Proceedings", Jan. 12, 2009, pp. 1-8 (pdf pages).
GE FANUC; "Pleadings: Defendant's Reply in Support of Their Motion to Stay the Litigation Plending the Outcome of the Reexamination Proceedings—Exhibit 1", Jan. 12, 2009, pp. 1-2 (pdf pages).
GE FANUC; "Pleadings: Defendant's Reply in Support of Their Motion to Stay the Litigation Plending the Outcome of the Reexamination Proceedings—Exhibit 2", Jan. 12, 2009, pp. 1-2 (pdf pages).
GE FANUC; "Pleadings: Defendant's Reply in Support of Their Motion to Stay the Litigation Plending the Outcome of the Reexamination Proceedings—Exhibit 3", Jan. 12, 2009, pp. 1-2 (pdf pages).
US Dist Court EDTX, Marshal Div; "Order: Order Resetting Markman Date", Jan. 14, 2009, p. 1.
ROY-G-BIV Corporation; "Pleadings: Plaintiff's Opposition to Defendant's Motion to Stay the Litigation Pending the Outcome of the Reexamination Proceedings (Corrected)", Jan. 27, 2009, pp. 1-8 (pdf pages).

ROY-G-BIV Corporation; "Pleadings: Plaintiff's Second Set of Interrogatories (Nos. 17-18) for Each Defendant", Feb. 6, 2009, pp. 1-4.
ROY-G-BIV Corporation; Pleadings: Plaintiff Opening Markman Brief— Exhibit 5, Nov. 21, 2008, pp. 1-50.
ROY-G-BIV Corporation; Pleadings: Plaintiff Opening Markman Brief—Exhibit 5, Nov. 21, 2008, pp. 51-92.
ROY-G-BIV Corporation; "Pleadings: Plaintiff Opening Markman Brief—Exhibit 7", Nov. 21, 2008, p. 1.
ROY-G-BIV Corporation; "Pleadings: Plaintiff Opening Markman Brief—Exhibit 8", Nov. 21, 2008, pp. 1-10 (pdf pages).
ROY-G-BIV Corporation; "Pleadings: Plaintiff Opening Markman Brief—Exhibit 9", Nov. 21, 2008, pp. 1-3 (pdf pages).
ROY-G-BIV Corporation and GE FANUC; "Pleadings: Supplemental Joint Claim Construction and Prehearing Statement of Plaintiff and Defendant", Nov. 21, 2008, pp. 1-4.
ROY-G-BIV Corporation and GE FANUC; "Pleadings: Supplemental Joint Claim Construction and Prehearing Statement of Plaintiff and Defendant—Exhibit B", Nov. 21, 2008, pp. 1-13 (pdf pages).
ROY-G-BIV Corporation and GE FANUC; "Pleadings: Supplemental Joint Claim Construction and Prehearing Statement of Plaintiff and Defendant—Exhibit A", Nov. 21, 2008, pp. 1-2 (pdf pages).
ROY-G-BIV Corporation; "Pleadings: Plaintiff's Answer to Defendant's Second Amended Answer and Counterclaims", Dec. 5, 2008, pp. 1-15 (pdf pages).
ROY-G-BIV Corporation; "Pleadings: Plaintiff's Motion to Dismiss GE FANUC Intelligent Platforms, Inc. and General Electric Company's Infringement Claims or, Alternatively, Motion to Sever—and Proposed Order", Dec. 5, 2008, pp. 1-11 (pdf pages).
GE FANUC; "Pleadings: Claim Construction Brief of Defendants", Dec. 6, 2008, pp. 1-46 (pdf pages).
GE FANUC; "Pleadings: Claim Construction Brief of Defendants—Exhibit A", Dec. 6, 2008, pp. 1-2 (pdf pages).
GE FANUC; "Pleadings: Claim Construction Brief of Defendants—Exhibit B", Dec. 6, 2008, pp. 1-2 (pdf pages).
GE FANUC; "Pleadings: Claim Construction Brief of Defendants—Exhibit C", Dec. 6, 2008, pp. 1-2 (pdf pages).
GE FANUC; "Pleadings: Claim Construction Brief of Defendants—Exhibit D", Dec. 6, 2008, pp. 1-2 (pdf pages).
GE FANUC; "Pleadings: Declaration of Christina M. Finn", Dec. 6, 2008, pp. 1-6 (pdf pages).
GE FANUC; "Pleadings: Declaration of Christina M. Finn—Exhibit A", Dec. 6, 2008, pp. 1-13 (pdf pages).
Health Hero Network, Inc.; "USPTO Patent FileHist: (U.S. Appl. No. 08/944,529) File History", Oct. 7, 1997, Now Abandoned (123 pages).
ROY-G-BIV Corporation; "USPTO Patent FileHist: (U.S. Appl. No. 09/191,981) File History", Nov. 13, 1998, Now Abandoned (290 pages).
ROY-G-BIV Corporation; "USPTO Patent FileHist: (U.S. Appl. No. 09/882,800) File History", Jun. 14, 2001, Now Abandoned (132 pages).
ROY-G-BIV Corporation; "USPTO Patent FileHist: (U.S. Appl. No. 10/074,552) File History", Feb. 11, 2002, Now Abandoned (115 pages).
ROY-G-BIV Corporation; "USPTO Patent FileHist: (U.S. Appl. No. 10/150,237) File History", May 17, 2002, Now Abandoned (39 pages).
ROY-G-BIV Corporation; "USPTO Patent FileHist: (U.S. Appl. No. 10/405,883) File History", Apr. 1, 2003, Pending (1144 pages).
ROY-G-BIV Corporation; "USPTO Patent FileHist: (U.S. Appl. No. 10/409,393) File History", Apr. 7, 2003, Now Abandoned (140 pages).
ROY-G-BIV Corporation; "USPTO Patent FileHist: (U.S. Appl. No. 10/412,166) File History", Apr. 10, 2003, Now Abandoned (282 pages).
ROY-G-BIV Corporation; "USPTO Patent FileHist: (U.S. Appl. No. 10/643,533) File History", Aug. 18, 2003, Now Abandoned (311 pages).
ROY-G-BIV Corporation; "USPTO Patent FileHist: (U.S. Appl. No. 11/067,327) File History", Feb. 25, 2005, Now Abandoned (311 pages).

ROY-G-BIV Corporation; "USPTO Patent FileHist: (U.S. Appl. No. 11/368,231) File History", Mar. 3, 2006, Now Abandoned (113 pages).
ROY-G-BIV Corporation; "Uspto Patent FileHist: (U.S. Appl. No. 11/370,082) File History", Mar. 6, 2006, Pending (1226 pages).
ROY-G-BIV Corporation; "USPTO Patent FileHist: (U.S. Appl. No. 11/375,502) File History", Mar. 13, 2006, Pending (1306 pages).
ROY-G-BIV Corporation; "USPTO Patent FileHist: (U.S. Appl. No. 11/583,233) File History", Oct. 18, 2006, Now Abandoned (664 pages).
ROY-G-BIV Corporation; "USPTO Patent FileHist: (U.S. Appl. No. 11/728,801) File History", Mar. 26, 2007, Pending (1338 pages).
ROY-G-BIV Corporation; "USPTO Patent FileHist: (U.S. Appl. No. 12/271,724) File History", Nov. 14, 2008, Pending (361 pages).
ROY-G-BIV Corporation; "USPTO Patent FileHist: (U.S. Appl. No. 12/546,566) File History", Aug. 24, 2009, Pending (646 pages).
USPTO; "USPTO Patent FileHist: (U.S. Appl. No. 11/370,082) File History—Office Action", Mar. 16, 2010, pp. 1-88.
National Electrical Manufacturers Association; "ReEx: Malina Exhibit B—Excerpts from NEMA Motion Control Handbook", Nov. 1, 1992, all pages.
Armstrong Teasdale LLP; "ReEx: U.S. Patent No. 5,691,897 Reexamination (Control No. 90/009,282)—Third Party Request", Sep. 23, 2008, all pages.
Armstrong Teasdale LLP; "ReEx: U.S. Patent No. 6,513,058 Reexamination (Control No. 95/000,398)—Third Party Request", Sep. 23, 2008, all pages.
Armstrong Teasdale LLP; "ReEx: U.S. Patent No. 6,516,236 Reexamination (Control No. 95/000,396)—Third Party Request", Sep. 23, 2008, all pages.
USPTO; "ReEx: U.S. Patent No. 5,691,897 Reexamination (Control No. 90/009,282)—Notice of Assignment of Request", Sep. 26, 2008, pp. 1-2.
USPTO; "ReEx: U.S. Patent No. 6,516,236 Reexamination (Control No. 95/000,396)—Notice of Assignment of Request", Oct. 2, 2008, all pages.
USPTO; "ReEx: U.S. Patent No. 6,513,058 Reexamination (Control No. 95/000,398)—Notice of Assignment of Request", Oct. 6, 2008, all pages.
USPTO; "ReEx: U.S. Patent No. 5,691,897 Ex-Partes Reexamination (Control No. 90/009,282)—Granted", Nov. 10, 2008, all pages.
USPTO; "ReEx: U.S. Patent No. 6,516,236 Inter-Partes Reexamination (Control No. 95/000,396)—Granted", Nov. 20, 2008, all pages.
USPTO; "ReEx: U.S. Patent No. 6,513,058 Inter-Partes Reexamination (Control No. 95/000,398)—Granted", Nov. 25, 2008, all pages.
USPTO; "ReEx: U.S. Patent No. 6,941,543 Inter-Partes Reexamination (Control No. 95/000,397)—Granted", Nov. 25, 2008, all pages.
USPTO; "ReEx: U.S. Patent No. 6,516,236 Reexamination (Control No. 95/000,396)—Non-Final Office Action", Jan. 23, 2009, all pages.
USPTO; "ReEx: U.S. Patent No. 6,513,058 Reexamination (Control No. 95/000,398)—Non-Final Office Action", Jan. 29, 2009, all pages.
USPTO; "ReEx: U.S. Patent No. 6,941,543 Reexamination (Control No. 95/000,397)—Non-Final Office Action", Jan. 29, 2009, all pages.
USPTO; "ReEx: U.S. Patent No. 5,691,897 Reexamination (Control No. 90/009,282)—Non-Final Office Action", Feb. 4, 2009, all pages.
USPTO; "ReEx: U.S. Patent No. 5,691,897 Reexamination (Control No. 90/009,282)—Decision for Petition for Extension of Time", Feb. 12, 2009, all pages.
Black, Lowe and Graham; "ReEx: U.S. Patent No. 6,941,543 Reexamination (Control No. 95/000,397)—Decision on Petition Extension for Time", Feb, 12, 2009, all pages.
Black, Lowe and Graham; "ReEx: U.S. Patent No. 6,516,236 Reexamination (Control No. 95/000,396)—Decision for Petition for Extension of Time", Feb. 13, 2009, all pages.
USPTO; "ReEx: U.S. Patent No. 6,513,058 Reexamination (Control No. 95/000,398)—Decision for Petition for Extension of Time", Feb. 17, 2009, all pages.
Ard, J.; "ReEx: U.S. Patent No. 5,691,897 Reexamination (Control No. 90/009,282)—Response Declaration: Ard", Apr. 23, 2009, Black, Lowe and Graham, (declaration—8 pages) and (supporting Exhibits A-BB—237 pages). See supporting Exhibit CC listed in "RGRX_06 Exhibit Index".
Chouinard, D.; "ReEx: U.S. Patent No. 5,691,897 Reexamination (Control No. 90/009,282)—Response Declaration: Chouinard", Apr. 23, 2009, (declaration—8 pages) and (supporting Exhibit A—4 pages).
Levy, A.; "ReEx: U.S. Patent No. 5,691,897 Reexamination (Control No. 90/009,282)—Response Declaration: Levy", Apr. 23, 2009, (declaration—9 pages) and (supporting Exhibits A-C—7 pages).
Malina, R.; "ReEx: U.S. Patent No. 5,691,897 Reexamination (Control No. 90/009,282)—Response Declaration: Malina", Apr. 23, 2009, (declaration—34 pages) and (supporting Exhibits A-F—19 pages).
Mathias, R., "ReEx: U.S. Patent No. 5,691,897 Reexamination (Control No. 90/009,282)—Response Declaration: Mathias", Apr. 23, 2009, (declaration—73 pages). See supporting Exhibits AA1-AA3, Y1-Y25, and Z1-Z10—listed in "RGRX_06 Exhibit Index".
McConnell, S.; "ReEx: U.S. Patent No. 5,691,897 Reexamination (Control No. 90/009,282)—Response Declaration: McConnell", Apr. 23, 2009, (12 pages).
Omoigui, N.; "ReEx: U.S. Patent No. 5,691,897 Reexamination (Control No. 90/009,282)—Response Declaration: Omoigui", Apr. 23, 2009, (declaration—22 pages) and (supporting Exhibit C—8 pages). See supporting Exhibits A-B—listed in "RGRX_06 Exhibit Index".
Petzold, C.; "ReEx: U.S. Patent No. 5,691,897 Reexamination (Control No. 90/009,282)—Response Delcaration: Petzold", Apr. 23, 2009, (declaration—12 pages) and (supporting Exhibit A-B, where Exhibit B includes sub-exhibit A-G—78 pages).
Richter, J.; "ReEx: U.S. Patent No. 5,691,897 Reexamination (Control No. 90/009,282)—Response Declaration: Richter", Apr. 23, 2009, (declaration—27 pages) and (supporting Exhibits A-B where Exhibit B includes sub-exhibits A-G—80 pages).
Stone, M.; "ReEx: U.S. Patent No. 5,691,897 Reexamination (Control No. 90/009,282)—Response Declaration: Stone", Apr. 23, 2009, (declaration—13 pages) and (supporting Exhibit A—4 pages).
Black, Lowe and Graham; "ReEx: U.S. Patent No. 6,516,236 Reexamination (Control No. 95/000,396)— Certificate of Service", Apr. 23, 2009, all pages.
Black, Lowe and Graham; "ReEx: U.S. Patent No. 6,516,236 Reexamination (Control No. 95/000,396)—Fee Transmittal", Apr. 23, 2009, all pages.
Black, Lowe and Graham; "ReEx: U.S. Patent No. 6,516,236 Reexamination (Control No. 95/000,396)—Information Disclosure Statement", Apr. 23, 2009, all pages.
Ard, J.; "ReEx: U.S. Patent No. 6,516,236 Reexamination (Control No. 95/000,396)—Response Declaration: Ard", Apr. 23, 2009, (declaration—8 pages) and (supporting Exhibits A-BB—237 pages). See supporting Exhibit CC listed in "RGRX_06 Exhibit Index".
Chouinard, D.; "ReEx: U.S. Patent No. 6,516,236 Reexamination (Control No. 95/000,396)—Response Declaration: Chouinard", Apr. 23, 2009, (declaration—8 pages) and (supporting Exhibit A—4 pages).
Levy, A.; "ReEx: U.S. Patent No. 6,516,236 Reexamination (Control No. 95/000,396)—Response Declaration: Levy", Apr. 23, 2009, (declaration—9 pages) and (supporting Exhibits A-C—7 pages).
Malina, R.; "ReEx: U.S. Patent No. 6,516,236 Reexamination (Control No. 95/000,396)—Response Declaration: Malina", Apr. 23, 2009, (declaration—34 pages) and (supporting Exhibits A-F—19 pages).
Mathias, R.; "ReEx: U.S. Patent No. 6,516,236 Reexamination (Control No. 95/000,396)—Response Declaration: Mathias", Apr. 23, 2009, (declaration—74 pages). See supporting Exhibits AA1-AA3, Y1-Y25, and Z1-Z10—listed in "RGRX_06 Exhibit Index".
McConnell, S.; "ReEx: U.S. Patent No. 6,516,236 Reexamination (Control No. 95/000,396)—Response Declaration: McConnell", Apr. 23, 2009, (12 pages).
Omoigui, N.; "ReEx: U.S. Patent No. 6,516,236 Reexamination (Control No. 95/000,396)—Response Declaration: Omoigui", Apr. 23, 2009, (declaration—22 pages) and (supporting Exhibit C—8 pages). See supporting Exhibits A-B—listed in "RGRX_06 Exhibit Index".

Petzold, C.; "ReEx: U.S. Patent No. 6,516,236 Reexamination (Control No. 95/000,396)—Response Declaration: Petzold", Apr. 23, 2009, (declaration—12 pages) and (supporting Exhibit A-B, where Exhibit B includes sub-exhibits A-G—78 pages).

Richter, J.; "ReEx: U.S. Patent No. 6,516,236 Reexamination (Control No. 95/000,396)—Response Declaration: Richter", Apr. 23, 2009, (declaration—27 pages) and (supporting Exhibits A-B where Exhibit B includes sub-exhibits A-G—80 pages).

Stone, M.; "ReEx: U.S. Patent No. 6,516,236 Reexamination (Control No. 95/000,396)—Response Declaration: Stone", Apr. 23, 2009, (declaration—13 pages) and (supporting Exhibit A—4 pages).

Black, Lowe and Graham; "ReEx: U.S. Patent No. 6,516,236 Reexamination (Control No. 95/000,396)—Transmittal Letter", Apr. 23, 2009, all pages.

Black, Lowe and Graham; "ReEx: U.S. Patent No. 6,513,058 Reexamination (Control No. 95/000,398)—Certificate of Service", Apr. 28, 2009, all pages.

Black, Lowe and Graham; "ReEx: U.S. Patent No. 6,513,058 Reexamination (Control No. 95/000,398)—Fee Transmittal", Apr. 28, 2009, all pages.

Black, Lowe and Graham; "ReEx: U.S. Patent No. 6,513,058 Reexamination (Control No. 95/000,398)—Information Disclosure Statement", Apr. 28, 2009, all pages.

Ard, J.; "ReEx: U.S. Patent No. 6,513,058 Reexamination (Control No. 95/000,398)—Response Declaration: Ard", Apr. 28, 2009, (declaration—8 pages) and (supporting Exhibits A-BB—237 pages). See supporting Exhibit CC listed in "RGRX_06 Exhibit Index".

Chouinard, D.; "ReEx: U.S. Patent No. 6,513,058 Reexamination (Control No. 95/000,398)—Response Declaration: Chouinard", Apr. 28, 2009, (declaration—8 pages) and (supporting Exhibit A—4 pages).

Levy, A., "ReEx: U.S. Patent No. 6,513,058 Reexamination (Control No. 95/000,398)—Response Declaration: Levy", Apr. 28, 2009, (declaration—9 pages) and (supporting Exhibits A-C—7 pages).

Malina, R.; "ReEx: U.S. Patent No. 6,513,058 Reexamination (Control No. 95/000,398)—Response Declaration: Malina", Apr. 28, 2009, (declaration—34 pages) and (supporting Exhibits A-F—19 pages).

Mathias, R.; "ReEx: U.S. Patent No. 6,513,058 Reexamination (Control No. 95/000,398)—Response Declaration: Mathias", Apr. 28, 2009, See supporting Exhibits AA1-AA3, Y1-Y25, and Z1-Z10—listed in "RGRX_06 Exhibit Index".

McConnell, S.; "ReEx: U.S. Patent No. 6,513,058 Reexamination (Control No. 95/000,398)—Response Declaration: McConnell", Apr. 28, 2009, (12 pages).

Omoigui, N.; "ReEx: U.S. Patent No. 6,513,058 Reexamination (Control No. 95/000,398)—Response Declaration: Omoigui", Apr. 28, 2009, (declaration—22 pages). See supporting Exhibits A-B—listed in "RGRX_06 Exhibit Index".

Petzold, C.; "ReEx: U.S. Patent No. 6,513,058 Reexamination (Control No. 95/000,398)—Response Declaration: Petzold", Apr. 28, 2009, (declaration—11 pages) and (supporting Exhibit A-B, where Exhibit B includes sub-exhibits A-G—78 pages).

Richter, J.; "ReEx: U.S. Patent No. 6,513,058 Reexamination (Control No. 95/000,398)—Response Declaration: Richter", Apr. 28, 2009, (declaration—27 pages) and (supporting Exhibits A-B where Exhibit B includes sub-exhibits A-G—80 pages).

Stone, M.; "ReEx: U.S. Patent No. 6,513,058 Reexamination (Control No. 95/000,398)—Response Declaration: Stone", Apr. 28, 2009, (declaration—13 pages) and (supporting Exhibit A—4 pages).

USPTO; "ReEx: U.S. Patent No. 6,513,058 Reexamination (Control No. 95/000,398)—Returned Postcards", Apr. 28, 2009, all pages.

Black, Lowe and Graham; "ReEx: U.S. Patent No. 6,513,058 Reexamination (Control No. 95/000,398)—Transmittal Letter", Apr. 28, 2009, all pages.

Black, Lowe and Graham; "ReEx: U.S. Patent No. 6,941,543 Reexamination (Control No. 95/000,397)—Information Disclosure Statement", Apr. 28, 2009, all pages.

Black, Lowe and Graham; "ReEx: U.S. Patent No. 6,513,058 Reexamination (Control No. 95/000,398)—Response after Non-Final Office Action", Apr. 29, 2009, all pages.

Black, Lowe and Graham; "ReEx: U.S. Patent No. 6,941,543 Reexamination (Control No. 95/000,397)—Certificate of Service", Apr. 29, 2009, all pages.

Black, Lowe and Graham; "ReEx: U.S. Patent No. 6,941,543 Reexamination (Control No. 95/000,397)—Fee Transmittal", Apr. 29, 2009, all pages.

Black, Lowe and Graham; "ReEx: U.S. Patent No. 6,941,543 Reexamination (Control No. 95/000,397)—Response after Non-Final Office Action", Apr. 29, 2009, all pages.

Ard, J.; "ReEx: U.S. Patent No. 6,941,543 Reexamination (Control No. 95/000,397)—Response Declaration: Ard", Apr. 29, 2009, (declaration—8 pages) and (supporting Exhibits A-BB—237 pages). See supporting Exhibit CC listed in "RGRX_06 Exhibit Index".

Chouinard, D.; "ReEx: U.S. Patent No. 6,941,543 Reexamination (Control No. 95/000,397)—Response Declaration: Chouinard", Apr. 29, 2009, (declaration—8 pages) and (supporting Exhibit A—4 pages).

Levy, A.; "ReEx: U.S. Patent No. 6,941,543 Reexamination (Control No. 95/000,397)—Response Declaration: Levy", Apr. 29, 2009, (declaration—9 pages) and (supporting Exhibits A-C—7 pages).

Malina, R.; "ReEx: U.S. Patent No. 6,941,543 Reexamination (Control No. 95/000,397)—Response Declaration: Malina", Apr. 29, 2009, (declaration—34 pages) and (supporting Exhibits A-F—19 pages).

Mathias, R.; "ReEx: U.S. Patent No. 6,941,543 Reexamination (Control No. 95/000,397)—Response Declaration: Mathias", Apr. 29, 2009, (declaration—73 pages). See supporting Exhibits AA1-AA3, Y1-Y25, and Z1-Z10—listed in "RGRX_06 Exhibit Index".

McConnell, S.; "ReEx: U.S. Patent No. 6,941,543 Reexamination (Control No. 95/000,397)—Response Declaration: McConnell", Apr. 29, 2009, (12 pages).

Omoigui, N.; "ReEx: U.S. Patent No. 6,941,543 Reexamination (Control No. 95/000,397)—Response Declaration: Omoigui", Apr. 29, 2009, (22 pages) and (supporting Exhibit C—8 pages). See supporting Exhibits A-B—listed in "RGRX_06 Exhibit Index".

Petzold, C.; "ReEx: U.S. Patent No. 6,941,543 Reexamination (Control No. 95/000,397)—Response Declaration: Petzold", Apr. 29, 2009, (declaration—12 pages) and (supporting Exhibit A-B, where Exhibit B includes sub-exhibits A-G—78 pages).

Richter, J.; "ReEx: U.S. Patent No. 6,941,543 Reexamination (Control No. 95/000,397)—Response Declaration: Richter", Apr. 29, 2009, (declaration—27 pages) and (supporting Exhibits A-B where Exhibit B includes sub-exhibits A-G—80 pages).

Stone, M.; "ReEx: U.S. Patent No. 6,941,543 Reexamination (Control No. 95/000,397)—Response Declaration: Stone", Apr. 29, 2009, (declaration—13 pages) and (supporting Exhibit A—4 pages).

USPTO; "ReEx: U.S. Patent No. 6,941,543 Reexamination (Control No. 95/000,397)—Returned Postcards", Apr. 29, 2009, all pages.

Black, Lowe and Graham; "ReEx: U.S. Patent No. 6,941,543 Reexamination (Control No. 95/000,397)—Transmittal Letter", Apr. 29, 2009, all pages.

Black, Lowe and Graham; "ReEx: U.S. Patent No. 5,691,897 Reexamination (Control No. 90/009,282)—Certificate of Service", May 1, 2009, all pages.

Black, Lowe and Graham; "ReEx: U.S. Patent No. 5,691,897 Reexamination (Control No. 90/009,282)—Fee Transmittal", May 1, 2009, all pages.

Black, Lowe and Graham; "ReEx: U.S. Patent No. 5,691,897 Reexamination (Control No. 90/009,282)—Information Disclosure Statement", May 1, 2009, all pages.

Black, Lowe and Graham; "ReEx: U.S. Patent No. 5,691,897 Reexamination (Control No. 90/009,282)—Response after Non-Final Office Action", May 1, 2009, all pages.

Black, Lowe and Graham; "ReEx: U.S. Patent No. 5,691,897 Reexamination (Control No. 90/009,282)—Transmittal Letter", May 1, 2009, all pages.

USPTO; "ReEx: U.S. Patent No. 5,691,897 Reexamination (Control No. 90/009,282)—Returned Postcards", May 6, 2009.

Armstrong Teasdale LLP; "ReEx: U.S. Patent No. 6,516,236 Reexamination (Control No. 95/000,396)—Third Party Requester Comments after Non-Final Office Action", May 22, 2009, all pages.

Individual; "ReEx: U.S. Patent No. 6,516,236 Reexamination (Control No. 95/000,396)—Third Party Requester Comments after Non-Final Office Action: Exhibits A-1 thru A-47", May 22, 2009, all pages.

Individual; "ReEx: U.S. Patent No. 6,516,236 Reexamination (Control No. 95/000,396)—Third Party Requester Comments after Non-Final Office Action: Exhibits B thru Q", May 22, 2009, all pages. See transcript—Contains multiple refs. with varying pub. dates.

Individual; "ReEx: U.S. Patent No. 6,513,058 Reexamination (Control No. 95/000,398)—Third Party Certificate of Mailing", May 28, 2009, all pages.

Armstrong Teasdale LLP; "ReEx: U.S. Patent No. 6,513,058 Reexamination (Control No. 95/000,398)—Third Party Requester Comments after Non-Final Office Action", May 28, 2009, all pages.

Individual; "ReEx: U.S. Patent No. 6,513,058 Reexamination (Control No. 95/000,398)—Third Party Requester Comments after Non-Final Office Action: Exhibits A-1 thru A-55", May 28, 2009, all pages.

Individual; "ReEx: U.S. Patent No. 6,513,058 Reexamination (Control No. 95/000,398)—Third Party Requester Comments after Non-Final Office Action: Exhibits B thru S", May 28, 2009, all pages.

Armstrong Teasdale LLP; "ReEx: U.S. Patent No. 6,941,543 Reexamination (Control No. 95/000,397)—Third Party Requester Comments after Non-Final Office Action", May 29, 2009, all pages.

Individual; "ReEx: U.S. Patent No. 6,941,543 Reexamination (Control No. 95/000,397)—Third Party Requester Comments after Non-Final Office Action: Exhibits T thru V", May 29, 2009, all pages.

Individual; "ReEx: U.S. Patent No. 6,513,058 Reexamination (Control No. 95/000,398)—Third Party Certificate of Service", Jun. 11, 2009, all pages.

Individual; "ReEx: U.S. Patent No. 6,516,236 Reexamination (Control No. 95/000,396)—Third Party Certificate of Service", Jun. 11, 6009, all pages.

Individual; "ReEx: U.S. Patent No. 6,513,058 Reexamination (Control No. 95/000,398)—Petition and Request for Return of 3rd Party Req. Comments Without Consideration", Jun. 12, 2009, all pages.

Black, Lowe and Graham; "ReEx: U.S. Patent No. 6,516,236 Reexamination (Control No. 95/000,396)—Petition and Request of 3rd Party Req. Comments Without Consideration", Jun. 12, 2009, all pages.

Armstrong Teasdale LLP; "ReEx: U.S. Patent No. 6,941,543 Reexamination (Control No. 95/000,397)—Third Party Request", Sep. 23, 2009, all pages.

USPTO; "ReEx: U.S. Patent No. 5,691,897 Reexamination (Control No. 90/009,282)—Final Office Action" , Jan. 13, 2010, all pages.

USPTO; "ReEx: U.S. Patent No. 6,516,236 Reexamination (Control No. 95/000,396)—Non-Final Office Action #2", Feb. 4, 2010, all pages.

USPTO; "ReEx: U.S. Patent No. 6,941,543 Reexamination (Control No. 95/000,397)—Non-Final Office Action #2", Feb. 4, 2010, all pages.

USPTO; "ReEx: U.S. Patent No. 6,513,058 Reexamination (Control No. 95/000,398)—Non-Final Office Action #2", Feb. 8, 2010, all pages.

Black, Lowe and Graham; "ReEx: U.S. Patent No. 6,516,236 Reexamination (Control No. 95/000,396)—Response after Non-Final Office Action", Feb. 16, 2010, all pages.

Black, Lowe and Graham; "ReEx: U.S. Patent No. 6,513,058 Reexamination (Control No. 95/000,398)—Response after PTO's Notice Dated Feb. 4, 2010", Feb. 19, 2010, (52 pages).

Black, Lowe and Graham; "ReEx: U.S. Patent No. 6,941,543 Reexamination (Control No. 95/000,397)—Response after PTO's Notice Dated Feb. 4, 2010", Feb. 19, 2010, (59 pages).

ROY-G-BIV Corporation; "ReEx: RGRX_06 Exhibit Index", Feb. 24, 2010, (7 pages).

Black, Lowe and Graham; "ReEx: U.S. Patent No. 5,691,897 Ex-Partes Reexamination (Control No. 90/009,282)—Response after Final Office Action", Mar. 12, 2010, 43 pages.

Black, Lowe and Graham; "ReEx: U.S. Patent No. 6,516,236 Reexamination (Control No. 95/000,396)—Response after PTO's Notice Dated Feb. 4, 2010", Mar. 19, 2010, (56 pages).

ROY-G-BIV Corporation; "Pleadings: Plaintiff ROY-G-BIV Corporation's Complaint for Patent Infringement and Demand for Jury Trial", Sep. 19, 2007, pp. 1-9.

GE FANUC; "Pleadings: Defendants FANUC Ltd., FANUC Robotics America, Inc., GE FANUC Automation Americas, Inc., and GE FANUC Intelligent Platforms, Inc.'s Answer to Plaintiff's Complaint for Patent Infringement and Counterclaims for Invalidity and Noninfringement", Nov. 15, 2007, pp. 1-12.

GE FANUC; "Pleadings: Motion to Dismiss", Nov. 21, 2007, 9 pages.

ROY-G-BIV Corporation: "Pleadings: Plaintiff ROY-G-BIV Corporation's Reply to Defendants' Counterclaims for Invalidity and Noninfringement", Dec. 10, 2007, pp. 1-5.

ROY-G-BIV Corporation; "Pleadings: Plaintiff ROY-G-BIV Corporation's Response to GE FANUC Automation Corporation's Motion to Dismiss", Dec. 13, 2007, pp. 1-54.

GE FANUC; "Pleadings: Defendant GE FANUC Automation Americas, Inc.'s Notice of Change of Corporate Name", Dec. 14, 2007, pp. 1-3.

GE FANUC; "Pleadings: GE FANUC Automation Corporation's Reply in Support of Its Motion to Dismiss for Lack of Personal Jurisdiction", Dec. 28, 2007, pp. 1-25.

ROY-G-BIV Corporation; "Pleadings: Joint Conference Report", Jan. 4, 2008, pp. 1-6.

ROY-G-BIV Corporation; "Pleadings: ROY-G-BIV Corporation's First Set of Interrogatories (Nos. 1-16) for Each Defendant", Jan. 18, 2008, pp. 1-16.

ROY-G-BIV Corporation; "Pleadings: ROY-G-BIV Corporation's First Set of Requests to Defendants for Document, Electronically Stored Information, and Things", Jan. 18, 2008, pp. 1-19.

GE FANUC; "Pleadings: Defendants FANUC Ltd.'s, FANUC Robotics America, Inc.'s, GE FANUC Automation Americas, Inc.'s, and GE FANUC Intelligent Platforms, Inc.'s First Set of Interrogatories to Plaintiff ROY-G-BIV Corporation", Jan. 25, 2008, pp. 1-10.

GE FANUC; "Pleadings: Defendants FANUC Ltd.'s, FANUC Robotics America, Inc.'s, GE FANUC Automation Americas, Inc.'s, and GE FANUC Intelligent Platforms, Inc.'s First Set of Requests for Production to Plaintiff ROY-G-BIV Corporation", Jan. 31, 2008, pp. 1-25.

GE FANUC; "Pleadings: Defendant's Initial Disclosures Pursuant to Federal Rule of Civil Procedure 26(a)(1)", Feb. 1, 2008, pp. 1-6.

ROY-G-BIV Corporation; "Pleadings: Plaintiff ROY-G-BIV Corporation's Initial Disclosures", Feb. 1, 2008, pp. 1-5.

ROY-G-BIV Corp, FANUC Ltd, FANUC Robotics, and GE FANUC; "Pleadings: Notice of Compliance With P.R. 4-5(d)", Jan. 9, 2009, pp. 1-3.

ROY-G-BIV Corp, FANUC Ltd, FANUC Robotics, and GE FANUC; "Pleadings: Supplemental Joint Claim Construction and Prehearing Statement—Exhibit A", Jan. 9, 2009, pp. 1-2.

ROY-G-BIV Corp, FANUC Ltd, FANUC Robotics, and GE FANUC; "Pleadings: Supplemental Joint Claim Construction and Prehearing Statement—Exhibit B", Jan. 9, 2009, pp. 1-9.

ROY-G-BIV Corp, FANUC Ltd, FANUC Robotics, and GE FANUC; "Pleadings: Supplemental Joint Claim Construction and Prehearing Statement —Exhibit C", Jan. 9, 2009, pp. 1-110.

ROY-G-BIV Corp, FANUC Ltd, FANUC Robotics, and GE FANUC; "Pleadings: Supplemental Joint Claim Construction and Prehearing Statement —Exhibit D", Jan. 9, 2009, pp. 1-80.

ROY-G-BIV Corp, FANUC Ltd, FANUC Robotics, and GE FANUC; "Pleadings: Supplemental Joint Claim Construction and Prehearing Statement", Jan. 9, 2009, pp. 1-4.

FANUC Ltd, FANUC Robotics, and GE FANUC; "Pleadings: Defendants Third Set of Interrogatories to Plaintiff (Nos. 19-28)", Jun. 17, 2009, All pages.

ROY-G-BIV Corporation; "Pleadings: Plaintiffs Fourth Set of Interrogatories (Nos. 25-27) for Each Defendant", Jun. 19, 2009, All pages.

FANUC Ltd, FANUC Robotics, and GE FANUC; "Pleadings: Objections and Responses of Defendants to Plaintiffs Fourth Set of Interrogatories (Nos. 25-27)", Jul. 2, 2009, All pages.

Individual; "Order: (Denying) Defendants Motion for Reconsideration re Protective Order", Jul. 9, 2009, All pages.

Folsom, D.; "Order: (Granting) Motion for Continuance", Aug. 25, 2009, US Dist Court EDTX, Marshal Div, p. 1.
Folsom, D.; "Order: Claim Construction ('897, '058, '236 and '543 Patents)", Aug. 25, 2009, US Dist Court EDTX, Marshal Div, pp. 1-64.
Folsom, D.; "Order: Judgment Dismissing Action by Reason of Settlement", Oct. 19, 2009, US Dist Court EDTX, Marshal Div, pp. 1-2.
Folsom, D.; "Order: Reopen and Dismissal of Case", Nov. 20, 2009, US Dist Court EDTX, Marshal Div, p. 1.
FANUC Ltd, FANUC Robotics, and GE FANUC; "Pleadings: Defendants and Counterclaim Plaintiffs Fourth Set of Requests for Production to Plaintiff and Counterclaim Defendant (Nos. 144 to 183)", Feb. 19, 2009, pp. 1-11.
FANUC Ltd. FANUC Robotics, and GE FANUC; "Pleadings: Objections and Responses of Defendants to Plaintiff's Second Set of Interrogatories (Nos. 17-18)—Redacted", Mar. 16, 2009, All pages.
FANUC Ltd, FANUC Robotics, and GE FANUC; "Pleadings: Defendant's Markman Claim Construction Hearing Tutorial", Apr. 15, 2009, all pages.
ROY-G-BIV Corporation; "Pleadings: Plaintiff Markman Claim Construction Tutorial", Apr. 15, 2009, all pages.
FANUC Ltd, FANUC Robotics, and GE FANUC; "Pleadings: Defendant's Markman Presentation for Claim Construction Hearing", Apr. 16, 2009, all pages.
ROY-G-BIV Corporation; "Pleadings: Plaintiff Markman Claim Construction Argument", Apr. 16, 2009, all pages.
Everingham IV, C.; "Order: (Granted in Part) Plaintiff Motion for Proctective Order re Experts", Jun. 4, 2009, US Dist Court EDTX, Marshal Div, All pages.
Everingham IV, C.; "Order: (Granted) Plaintiff Motion to Compel re FANUC Witnesses", Jun. 4, 2009, US Dist Court EDTX, Marshal Div, All pages.
FANUC Ltd, FANUC Robotics, and GE FANUC; "Pleadings: Defendant's Request for Leave to File a Motion for Summary Adjudication of Non-Infringement", Jun. 15, 2009, All pages.
FANUC Ltd, FANUC Robotics, and GE FANUC; "Pleadings: Defendants Motion for Reconsideration of Order Granting Plaintiff's (Amended) Motion for Protective Order (D.E. 170)", Jun. 15, 2009, All pages.
Numerical Control Society; "Who's Who in Numerical Control—1972", 1972, all pages.
Numerical Control Society; "Who's Who in Numerical Control—1973", 1973, all pages.
Greenfeld, I.; Wright, P.; "A Generic User-Level Specification for Open-System Machine Controllers", Date Unknown, New York University, pp. 1-17.
Pacific Scientific; "Advanced Motion Language", Date Unknown, pp. C-2 thru C-11.
Moore; "Advanced Process Automation and Control System (APACS Product Literature)", Date Unknown, pp. 1-13.
Aerotech, Inc.; "Aerotech Motion Control Product Guide", Date Unknown, pp. 233-234.
Katila, P.; "Applying Total Productive Maintenance—TPM Principles in the Flexible Manufacturing Systems", Date Unknown, Lulea Tekniska Universitet, pp. 1-41.
SILMA; "CimStation Product Literature", Date Unknown, pp. 1-12.
Galil Motion Control; "Galil Dynamic Data Exchange Server for DMC-1000", Date Unknown, pp. 1-2.
Galil Motion Control; "Galil OPINT600 Product Features", Date Unknown, pp. 1-3.
FANUC Robotics North America; "Manufacturing solutions for value-minded companies (Product Brochure)", Date Unknown, pp. 1-5.
INTEC Controls Corp; "Paragon TNT Product Brochure", Date Unknown, 6 pages.
Highland Technology, Inc.; "Perfect Parts Product Literature", Date Unknown, pp. 1-4.
Precision Microcontrol; "Precision MicroControl Product Guide", Date Unknown, pp. 11, 27-28.
Mitutoyo; "Quick Vision Product Literature", Date Unknown, pp. 1-8.
FANUC Robotics North America; "Robotic Palletizing Provides Flexibility at High Speeds", Date Unknown, pp. 1-2.
Penton Media, Inc.; "Technology Trends section of American Machinist", Date Unknown, all pages. (publish date unknown, from American Machinist).
Seven Technologies A/S; "The complete, computer-based automation tool—Control at your fingertips (IGSS)", Date Unknown, 6 pages.
FANUC Robotics North America; "The Growing Demand for Advanced Robotic Packaging Systems", Date Unknown, pp. 1-2.
Semi; "Semi E4-0699 Semi Equipment Communications Standard 1 Message Transfer (SECS-I)", Jan. 2, 1980.
Semi; "Semi E5-1104 Semi Equipment Communications Standard 2 Message Content (SECS-II)", 1982, Sections 1-9 (pp. 1-9).
ISO—International Standards Organization; "ISO 6983/1: Numerical control of machines—Program format and definition of address words: Part 1: Data format for positioning, line motion and contouring control systems: First Edition", Sep. 15, 1982, pp. 1-16.
Tal, J.; "Motion Control by Microprocessors", 1984, Galil Motion Control.
Fitzgerald, M.; Barbera, A.; "A Low-Level Control Interface for Robot Manipulators", 1985, Robotics and Computer-Integrated Manufacturing, vol. 2, No. 3/4, pp. 201-213.
Rembold, J.; Blume, C.; Frommherz, B.; "The Proposed Robot Software Interfaces SRL and IRDATA", 1985, Robotics and Computer-Integrated Manufacturing, vol. 2, No. 3/4, pp. 219-225.
ISO—International Standards Organization; "ISO 4342: Numerical control of machines—NC processor input—Basic part program reference language, First Edition", Dec. 15, 1985, all pages.
Taylor, R.; "A General Purpose Control Architecture for Programmable Automation Research", 1986, IBM T.J. Watson Research Center, pp. 165-173.
Hayward, V.; Paul, R.; "Robot Manipulator Control under Unix RCCL: A Robot Control "C" Library", 1986, The International Journal of Robotics Research, vol. 5, No. 4, pp. 94-111.
Mack, B.; Bayoumi, M.; "Design and Integration of New Software for the Robot Controller Test Station", 1988, IEEE, pp. 866-873.
Lloyd, J.; Parker, M.; McClain, R.; "Extending the RCCL Programming Environment to Multiple Robots and Processors", 1988, IEEE, pp. 465-469.
Petzold, C.; "The GDI Philosophy", 1988, Microsoft Development Library, Jul. 1994 MSDN, Programming Windows 3.1, pdf pp. 1-2.
Mangaser, A.; Wang, Y.; Butner, S.; "Concurrent Programming Support for a Multi-Manipulator Experiment on RIPS", 1989, IEEE, pp. 853-859.
Stegbauer, W.; "Intertask-Communication Inside a Real-Time Database", 1989, IFAC Distributed Databases in Real-time, pp. 63-69.
Tal, J.; "Motion Control Applications", 1989, Galil Motion Control.
Electronic Industries Association; "EIA-511 Manufacturing Message Specification—Service Definition and Protocol", Mar. 1, 1989, pp. 1-177.
Galil Motion Control; "Galil G-Code Translator News Release", Apr. 14, 1989, pp. 1-2.
Electronic Industries Association; "EIA-511 Errata", Apr. 18, 1989, pp. 1-7.
Pritchard, K.; "Applying Simulation to the Control Industry", May 1, 1989, Cahners Publishing Company, pp. 1-3 (reprinted from Control Engineering, May 1989).
Tesar, D.; Butler, M.; "A Generalized Modular Architecture for Robot Structures", Jun. 1, 1989, American Society of Mechanical Engineers, pp. 91-118.
Galil Motion Control; "Galil OPINT600 Product Literature", Jun. 1, 1989, pp. 1-2.
Galil Motion Control; "Galil ServoTRENDS vol. V. No. 3", Jul. 1, 1989, pp. 1-3.
Galil Motion Control; "Galil OPINT600 Press Release", Jul. 10, 1989, pp. 1-2.
Popovic, D.; Bhatkar, V.; "Distributed Computer Control for Industrial Automation", 1990, Marcel Dekker, Inc., (721 pages).
Bloom, H.; "Software and Computer Integrated Manufacturing", 1990, pp. 1-14.
Wright, P.; Greenfeld, I.; "Open Architecture Manufacturing: The Impact of Open-System Computers on Self-sustaining Machinery and the Machine Tool Industry", 1990, Proc. Manuf. Int. 90, Part2: Advances in Manufacturing, pp. 41-47.

Stewart; Schmitz; Khosla; "Implementing Real-Time Robotic Systems Using CHIMERA II", 1990, IEEE, pp. 254-255, Sections 3.1 and 3.2.

Kasahara, T.; "MAP 3.0 Entering the Practical Use Period in the CIM Era: MAP 3.0 MMS Architecture and Mounting Method", Mar. 1, 1990, Ohmsha Ltd., pp. 57-62, Computer and Network LAN vol. 8, No. 3.

Altintas, Y.; Peng, J.; "Design and Analysis of a Modular CNC System", Mar. 4, 1990, Elsevier Science Publishers B. V, pp. 305-316, vol. 13, Computers in Industry.

Salkind, L.; "Robotics Research Technical Report—SAGE A Real-Time Operating System for Robotic Supervisory Control", May 1, 1990, New York University, pp. 1-132. (DEFS 00040941-00041085).

ISO/IEC; "ISO/IEC 8824: Information Technology—Open Systems Interconnection—Specification of Abstract Syntax Notation One", Dec. 15, 1990, all pages.

Compumotor Division, Parker Hannifin; "6000 Series Programmer's Guide", 1991, all pages.

Iyengar, S.; Elfes, A.; "Autonomous Mobile Robots: Control, Planning, and Architecture", 1991, IEEE Computer Society Press, All pages.

Iyengar, S.; Elfes, A.; "Autonomous Mobile Robots: Perception, Mapping, and Navigation", 1991, IEEE Computer Society Press, All pages.

Paidy; Reeve; "Software Architecture for a Cell Controller", 1991, IEEE, pp. 344-349.

Miller, D.; Lennox, C.; "An Object-Oriented Environment for Robot System Architectures", Feb. 1, 1991 IEEE Control Systems, pp. 14-23.

Yared, W.; Sheridan, T.; "Plan Recognition and Generalization in Command Languages with Application to Telerobotics", Mar. 1, 1991, IEEE, vol. 21, No. 2, pp. 327-338.

Senehi, M.; Wallace, S.; Barkmeyer, E.; Ray, S.; Wallace, E.; "Control Entity Interface Document", Jun. 1, 1991, pp. 1-38.

Payton, D.; Bihari, T.; "Intelligent Real-Time Control of Robotic Vehicles", Aug. 1, 1991, ACM, pp. 49-63, vol. 34, No. B.

Robert Bosch GMBH; "CAN Specification", Sep. 1, 1991, 72 pages, Version 2.0.

Takase, K; "Project of a robot performing in an extreme situation", Oct. 15, 1991, vol. 9, No. 5, pp. 79-82, p. 59.

Microsoft Development Library; "1.1 Printer Driver Operation", 1992, Jul. 1994 MSDN, Windows NT DDK: Win32 Subsystem Driver Design Guide, pdf pp. 1-6.

Vaataja, H.; Hakala, H.; Mattila, P.; Suoranta, R.; "3-D Simulation of Ultrasonic Sensor System in Mobile Robots", 1992, IEEE, pp. 333-336.

Microsoft Development Library; "3.1.1 Using Unitool", 1992, Jul. 1994 MSDN, Windows NT DDK: Win32 Subsystem Driver Design Guide, pdf pp. 1-101.

Microsoft Development Library; "3.4 Specifying Cursor-Movement Commands", 1992, Jul. 1994 MSDN, Windows NT DDK: Win32 Subsystem Driver Design Guide, pdf pp. 1-7.

Microsoft Development Library; "4.1.22 Banding Drivers", 1992, Jul. 1994 MSDN, Windows 3.1 DDK: Device Driver Adaptation Guide, pdf pp. 1-3.

Amy, L.; "Automation Systems for Control and Data Acquisition", 1992, Instrument Society of America, (235 pages).

Microsoft Development Library; "Chapter 11—Graphics-Driver Escapes", 1992, Jul. 1994 MSDN, Windows 3.1 DDK: Device Driver Adaptation Guide, pdf pp. 1-50.

Microsoft Development Library; "Chapter 2 Supporting DDI Printing and User Interface Functions", 1992, Jul. 1994 MSDN, Windows NT DDK: Win32 Subsystem Driver Design Guide, pdf pp. 1-5.

Microsoft Development Library; "Chapter 4—Specifying Control Information", 1992, Jul. 1994 MSDN, Windows 3.1 DDK: Minidriver Development Guide, pdf pp. 1-16.

Microsoft Development Library; "Chapter 5 Printer Escapee", 1992, Jul. 1994 MSDN, Windows 3.1 SDK: Programmers Reference, vol. 3: Messages, Structures, Macros, pdf pp. 1-54.

Microsoft Development Library; "Chapter 7 Minidriver", 1992, Jul. 1994 MSDN, International SDKS: Hanguel Windows DDK, pdf pp. 1-8.

Lynch, M.; "Computer Numerical Control for Machining", 1992, McGraw-Hill Inc., All pages (Copyright 1992).

USDATA; "FactoryLink IV for Microsoft Windows and NT", 1992, pp. 1-4.

Motion Engineering, Inc.; "PC/DSP-Series Motion Controller C Programming Guide", 1992, pp. 1-54.

Delta TAU Data Systems, Inc.; "PMAC Product Catalog", 1992, p. 43.

Semi; "Semi E30-1103 General Model for Communications and Control of Manufacturing Equipment (GEM)", 1992.

Microsoft Development Library; "Win32 SDK Programmers API Reference, Escape Function", 1992, Jul. 1994 MSDN, Win32 SDK Programmers API Reference, vol. 3, pdf pp. 1-2.

Microsoft Development Library; "Windows 3.1 SDK: Programmers Reference vol. 2: Functions—SpoolFile", 1992, Jul. 1994 MSDN, Windows 3.1 Programmers Reference vol. 2: Functions, pdf p. 1.

Microsoft Corporation; "Win32 SDK Programming Reference vol. 2", 1992, Dynamic Data Exchange Management Library, Chapter 77, 26 pages.

Microsoft Corporation; "Windows 3.1 SDK Guide to Programming", 1992, Dynamic Data Exchange, Chapter 22, 21 pages.

Microsoft Corporation; "Windows for Workgroups 3.1 Resource Kit", 1992, Network Dynamic Data Exchange, Chapter 11, 19 pages.

Smith, M.; "An Environment for More Easily Programming a Robot", May 1, 1992, International Conference on Robotics and Automation, pp. 10-16.

Nielsen, L.; Trostmann, S.; Trostmann, E.; "Robot Off-line Programming and Simulation As a True CIME-Subsystem", May 1, 1992, International Conference on Robotics and Automation, pp. 1089-1094.

Allen-Bradley Company, Inc.; "CNCnet Software Library", Oct. 1, 1992, Publication 8000-6.1.1.

Ambrose, C.; "The Development of an Interactive Synthesis Tool for Intelligent Controllers of Modular Reconfigurable Robots", Dec. 1, 1992, pp. 1-304.

Albus, J.; "A Reference Model Architecture for Intelligent Systems Design", 1993, NIST, pp. 1-38.

TA Engineering Co., Inc; "AIMAX-WIN MMI Software for the New DCS Era", 1993, 8 pages.

Compumotor Division, Parker Hannifin; "Compumotor Digiplan Positioning Control Systems and Drives", 1993, 1993-94 Catalog, pp. 10-11.

Gerry Engineering Software, Inc.; "ExperTune PID Tuning Software Product Brochure", 1993, 6 pages.

National Instruments; "IEEE 488 and VXIbus Control, Data Acquisition, and Analysis (Catalog)", 1993, pp. Main Table of Contents, Introduction pp. ii-xi, Section 1 Instrumentation Software Products.

Software Horizons, Inc.; "Operator Interface Software for Supervisory Control, Monitoring and Reporting for Windows Operating System (Product Literature)", 1993, pp. 1-12.

Oregon Micro Systems, Inc.; "Precision Motion Controls At Affordable Prices Product Guide", 1993, pp. 1-20.

Pro-Log Corporation; "Pro-Log Motion Control for Allen-Bradley PLCs (Product Literature)", 1993, pp. 1-5.

Iconics, Inc.; "Software Products for Industrial Automation", 1993, 6 pages.

Tele-Denken Resources, Inc.; "VIEWpoint (Product Data Sheet)", 1993, pp. 1-11.

Dictionary.com LLC; "www.dictionary.com definition of 'persistent'", 1993.

Farsi, M.; "Flexible and Reliable Robotics Cells in Factory Automation", 1993, pp. 520-525.

Anderson, R.; "SMART: A Modular Architecture for Robotics and Teleoperation", 1993, IEEE, pp. 416-421.

Pritschow, G.; Daniel, C.; Junghans, G.; Sperling, W.; "Open System Controllers: A Challenge for the Future of the Machine Tool Industry (with DEFS)", Jan. 15, 1993, RGB00076341-RGB00076344, Annals of the CIRP, pp. 449-452, vol. 42.

Pritchard, K.; "PC-based Simulation in Control System Design", Feb. 1, 1993, Cahners Publishing Company, pp. 1-2 (reprinted from Control Engineering, Feb. 1993).
Laduzinsky, A.; "An Open Look for PLC Programs", May 1, 1993, Cahners Publishing Company, p. 1 (reprint from Control Engineering—May 1993).
Katayama, Y.; Nanjo, Y.; Shimokura, K.; "A Motion Control System with Event-driven Motion-module Switching Mechanism for Robotic Manipulators", Jul. 1, 1993, IEEE, International Workshop on Robot and Human Communication pp. 320-325., U.S.
Microsoft Corporation; "WOSA Backgrounder: Delivering Enterprise Services to the Windows-based Desktop", Jul. 1, 1993, Backgrounders and Whitepapers: Operating Systems Extensions—MSDN Archive Edition, pp. 1-19.
Wallace, S.; Senehi, M.; Barkmeyer, E.; Ray, S.; Wallace, E.; "Control Entity Interface Specification", Sep. 1, 1993, pp. 10-20.
Galil Motion Control; "Galil ServoTRENDS vol. IX. No. 2", Sep. 1, 1993, pp. 1-4.
Microsoft Corporation; "Object Linking and Embedding 2.0 Backgrounder", Sep. 1, 1993, pp. 1-15.
Cahners Publishing Company; "Control Engineering Software", Oct. 1, 1993, p. 184 of Oct. 1993 issue of Control Engineering.
Christensen, J.; "Programmable controller users and makers to go global with IEC 1131-3", Oct. 1, 1993, Instrument and Control Systems, pp. 1-4 (reprint from Instrument and Control Systems—Oct. 1993).
Tuggle, E.; "Introduction to Device Driver Design", Oct. 5, 1993, Proceedings of the Fifth Annual Embedded Systems Conference, pp. 455-468, vol. 2.
Microsoft Development Library; "How to Send Printer Escape Codes from a WinWord Document", Oct. 25, 1993, Jul. 1994 MSDN, Knowledge Base Article, PSS ID No. Q93658, pdf p. 1.
Microsoft Corporation; "Microsoft OLE Today and Tomorrow: Technology Overview", Dec. 1, 1993, pp. 1-9.
Richter, J.; "Advanced Windows NT—The Developer's Guide to the Win32 Application Programming Interface", 1994, Microsoft Press, (732 pages) Copyright 1994.
Lin, S.; "Computer Numerical Control—From Programming to Networking", 1994, Delmar Publishers, Inc, All pages. (Copyright 1994).
Intellution, Inc.; "FIX Product Brochure", 1994, 6 pages.
Kruglinski, D.; "Inside Visual C++—Version 1.5; Second Edition", 1994, Microsoft Press, (754 pages) Copyright 1994.
King, A.; "Inside Windows 95 Book", 1994, Microsoft Press, DEFS 00024891-00025395.
National Instruments; "LabWindows/CVI Product Literature", 1994, pp. 1-8.
Microsoft Press; "Microsoft Windows NT(TM) 3.5 Guidelines for Security, Audit, and Control", 1994, (296 pages) Copyright 1994.
Proctor, F.; Damazo, B.; Yang, C.; Frechette, S.; "Open Architectures for Machine Control", 1994, NIST, pp. 1-17.
Microsoft Development Library; "Using Passthrough Escape to Send Data Directly to Printer", Feb. 2, 1994, Jul. 1994 MSDN, Knowlege Base Article, PSS ID No. Q96795, pdf pp. 1-2.
Microsoft Corporation; "Open Systems: Technology, Leadership, and Collaboration", Mar. 1, 1994, Backgrounders and Whitepapers: Operating System Extensions—MSDN Archive Edition, pp. 1-15.
Microsoft Corporation; "The Microsoft Object Technology Strategy", Mar. 1, 1994, Backgrounders and Whitepapers: Operating System Extensions—MSDN Archive Edition, pp. 1-33.
Miller, D.; "Using Generic Tool Kits to Build Intelligent Systems (AIAA 94-1214)", Mar. 9, 1994, Sandia National Laboratories, pp. 1-9.
Tele-Denken Resources, Inc.; "The History of Programmable Controllers", Apr. 1, 1994, pp. 1-26.
Wonderware; "InTouch 5 Lite (Product Data Sheet)", Apr. 14, 1994, pp. 1-4.
Wonderware; "InTouch 5 (Product Data Sheet)", Apr. 19, 1994, pp. 1-4.
Wonderware; "InTouch 5 PDK/NT (Product Data Sheet)", Apr. 19, 1994, pp. 1-4.
Can in Automation (CIA); "CAN Physical Layer for Industrial Applications", Apr. 20, 1994, pp. 1-4, CiA Draft Standard 102, Version 2.0.
Kramer, T.; Proctor, F.; Michaloski, J.; "The NIST RS274/NGC Interpreter—Version 1", Apr. 28, 1994, NIST, pp. 1-26.
PID, Inc; "OpenBatch Product Brief", 1994, 6 pages.
Honeywell Inc.; "SDS Physical Layer Specification", 1994, pp. 1-34.
Tal, J.; "Step-by-Step Design of Motion Control Systems", 1994, Galil Motion Control.
Steeplechase Software, Inc.; "Visual Logic Controller (Product Literature)", 1994, pp. 1-3.
Trihedral Engineering Ltd; "Web 3.0 Product Brochure", 1994, 6 pages.
Xanalog; "Model NL-SIM Product Brochure", 1994, 4 pages.
Farsi, M.; "Device Communication for Flexible Manufacturing:—A New Concept", 1994, pp. 328-334.
SISCO, Inc.; "Overview and Introduction to the Manufacturing Message Specification (MMS)", 1994, pp. 1-47, Revision 2.
Chen, S.; Lin, S.; "Computer Numerical Control: Essentials in Programming and Networking", 1994, Delmar Publishers, Inc, pp. 824-848, Part V, Chapter 27.
US Department of Energy; "Robotic Technology Development Program", Feb. 1, 1994, pp. 1-114.
ISO—International Standards Organization; "ISO/CD 10303-204: Application protocol: Mechanical design using boundary representation—Draft", Apr. 29, 1994, pp. 1-214.
Chu; Wang; "Development of a Practical SFC System for CNC Machine Shop: International Conference on Data and Knowledge Systems for Manufacturing and Engineering", May 11, 1994, pp. 362-367, vol. 1; pp. xx+745, vol. 2.
Microsoft Development Library; "INF: An Alternative to SpoolFile()", May 6, 1994, Jul. 1994 MSDN, Knowledge Base Article, PSS ID No. Q111010, pdf pp. 1-5.
Microsoft Development Library; "INF: Banding, Printing, and the Number of Bands", May 6, 1994, Jul. 1994 MSDN, Knowledge Base Article, PSS ID No. Q72691.
Microsoft Development Library; "INF: Basics of Banding Printing in Windows", May 6, 1994, Jul. 1994 MSDN, Knowledge Base, PSS ID No. Q75471, pdf pp. 1-2.
ISO/IEC; "ISO/IEC 9506-6: Industrial automation systems—Manufacturing message specification—Part 6: Companion Standard for Process Control", Jun. 1, 1994, pp. 1-267.
Sakai, K.; "Object Orientation and C++ Language: Facts of Object-Oriented Programming", Jun. 1, 1994, CQ Publishing Co., Ltd., vol. 20, No. 6, pp. 83-93.
Control; "Simulation Software Helps Troubleshoot PLC Code", Jun. 1, 1994, p. 1 (reprinted from Control, Jun. 1994).
Tele-Denken Resources, Inc.; "SoftPLC (Product Data Sheet)", Jun. 1, 1994, pp. 1-5.
Blasvaer; Pirjanian; "An Autonomous Mobile Robot System", Jun. 8, 1994, pp. 52-61 and 122-124, Chapters 4 and 6.7.
Galil Motion Control; "Galil ServoTRENDS vol. X. No. 2", Jul. 1, 1994, pp. 1-4.
ISO/IEC; "ISO/IEC 9545: Information technology—Open Systems Interconnection—Application Layer structure", Aug. 15, 1994, pp. 1-20.
Ford, W.; "What Is an Open Architecture Robot Controller", Aug. 16, 1994, IEEE, pp. 27-32.
Hori, K.; "Protocol Conversion Software That Makes Possible Communication between Different Types of Field Devices", Sep. 1, 1994, Cosmo Technica, pp. 1-12.
Brockschmidt, K.; "Notes on Implementing an OLE Control Container", Sep. 21, 1994, Microsoft Development Library, pp. 1-47.
Daiyo, M.; "The Full Color Era Has Arrived with Scanner and Printer Development", Oct. 1, 1994, Nikkei Byte, No. 130, pp. 160-172.
Tele-Denken Resources, Inc.; "TopDoc (Product Data Sheet)", Oct. 1, 1994, pp. 1-7.
Senehi, M.; Kramer, T.; Michaloski, J.; Quintero, R.; Ray, S.; Rippey, W.; Wallace, S.; "Reference Architecture for Machine Control Systems Integration: Interim Report", Oct. 20, 1994, pp. 1-52.
ISO/IEC; "ISO/IEC 7498-1 Information Technology; Open Systems Interconnection-Basic Reference Model: The Basic Model", Nov. 1, 1994.
Putnam, F.; "The WinSEM OLE Messaging Architecture Working Paper", Dec. 1, 1994, Labtech.

OMAC Users Group; "Requirements of Open Modular Architecture Controllers for Applications in the Automotive Industry", Dec. 13, 1994, pp. 1-13, Version 1.1.

ISO—International Standards Organization; "ISO 10303-1: Industrial automation systems and integration—Product data representation and exchange—Part 1: Overview and fundamental principles: First Edition", Dec. 15, 1994, pp. 1-28.

ISO—International Standards Organization; "ISO 10303-11: Part 11: Description methods: The Express language reference manual", Dec. 15, 1994, all pages.

Fredriksson, L.; "A CAN Kingdom", 1995, KVASER AB, pp. 1-109, Rev 3.01.

FANUC Ltd.; "FANUC Robot i series Product Manual", 1995, pp. 1-8.

Brockschmidt, K.; "Inside OLE—Second Edition", 1995, Microsoft Press, (1236 pages) Copyright 1995.

National Instruments; "LabVIEW Graphical Programming for Instrumentation", 1995, pp. 1-16.

Wizdom Controls, Inc.; "Paradym-31 Software Brochure", 1995, pp. 1-4.

Webb, J.; Reis, R.; "Programmable Logic Controllers—Principles and Applications (Third Edition)", 1995, Prentice-Hall, Inc., All pages. (Copyright 1995).

FANUC Robotics North America; "SpotTool Application Software", 1995, pp. 1-2.

Cahners Publishing Company; "PC Software Adds 'Joy-of-Use' to Power and Flexibility", Sep. 1, 1995, pp. 2-3 (reprinted from Control Engineering, Sep. 1995).

Wonderware; "InTouch 5.6 (Product Data Sheet)", Sep. 15, 1995, pp. 1-4.

ARC Advisory Group; "PC-Based Control Strategies", Oct. 1, 1995.

Leitao; Lopes; Machado; "A Manufacturing Cell Integration Solution: paper developed at CCP as a part of the ESPRIT 5629 Project", Oct. 1, 1995.

Fedrowitz; "IRL-Based Expansion of the Commonly Used High-Level Language C for Robot Programming", Oct. 1, 1995, 5 pages.

Kramer, T.; Proctor, F.; "The NIST RS274/NGC Interpreter—Version 2", Oct. 26, 1995, NIST, pp. 1-58.

Pirjanian; Christensen; "Hierarchical Control for Navigation Using Heterogeneous Models", Nov. 1, 1995, 19 pages, Denmark.

Wonderware; "InTrack Manufacturing Execution System (Product Data Sheet)", Nov. 15, 1995, pp. 1-5.

Selamoglu, H.; "Component Categories", Dec. 1, 1995, Microsoft Development Library, pp. 1-19.

OPC Foundation; "OLE for Process Control Standard—Version 1.0 Draft", Dec. 22, 1995, pp. 1-70.

Farsi, M.; "A Production Cell Communication Model in Factory Automation Using the Controller Area Network", 1995, pp. 90-95.

Iconics, Inc.; "Configuring Input/Output (I/O) Devices (GENISIS Product Guide)", Feb. 15, 1995, pp. 1-31.

Quinn, T.; George, G.; "Windows 95 Marks a New Era in PC-Based Automation", Mar. 1, 1995, Cahners Publishing Company, pp. 19-20, 22 (Control Engineering, Mar. 1995).

Automation and Control; "PLC Programming Standard Expands", Apr. 1, 1995, pp. 3-4 (Reprinted from Automation and Control, Apr. 1995).

Cahners Publishing Company; "PC Control Software Combines Ladder Logic, HMI and I/O", May 1, 1995, pp. 1-3 (reprint from Control Engineering—May 1995).

Koizumi, A.; "Pursuing Design Development with a Focus on Compatibility and Permeability with Incorporation of Worldwide Standard Specifications", May 1, 1995, Instrumentation: Instrumentation and Control Engineering, vol. 38, No. 5, pp. 58-62.

Electronic Industries Association; "ANSI/EIA-484-A: Electrical and Mechanical Interface Characteristics and Line Control Protocol Using Communication Control Characters for Serial Data Link Between a Direct Numerical Control System and Numerical Control Equipment Employing Asynchronous Full Duplex Transmission", Jun. 1, 1995, ANSI/EIA Specification 484-A.

OASYS Group, Inc.; "OASYS Open Architecture System", Jul. 11, 1995, pp. 1-23.

Schuett, T.; "The Benefits and Data Bottlenecks of High Speed Milling: Conference paper presented at Southeastern Michigan Chapter American Mold Builders Association", Aug. 1, 1995, Creative Technology Corporation.

ISO—International Standards Organization; "ISO/CD 10303-214—Application protocol: Core Data for Automotive Mechanical Design Process—Draft", Aug. 8, 1995, pp. 1-1967.

Farsi, M.; "CANopen: The Open Communications Solution", 1996, pp. 112-116.

SISCO, Inc.; "MMS-EASE", 1996, pp. 1-4.

Jackman; "Robotic Control Using Sequential Function Charts", 1996, SPIE, pp. 120-128, vol. 2911.

Schuett, T.; "The Ultimate DNC; Direct CNC Networking (DCN)", 1996, Modern Machine Shop, Creative Technology Corporation.

Proctor, F.; "Validation of Standard Interfaces from a Machine Control", 1996, NIST, NIST Internal Report, pp. 659-664.

Team ICLP API Working Group; "Technologies Enabling Agile Manufacturing (TEAM) Intelligent Closed Loop Processing", Jan. 11, 1996, pp. 1-30.

Baruch, J.; Cox, M.; "Remote control and robots: an Internet solution", Feb. 1, 1996, Computing and Control Engineering Journal.

Burchard, R.; Feddema, J.; "Generic Robotic and Motion Control API Based on GISC-Kit Technology and CORBA Communications", Apr. 1, 1996, Sandia National Laboratories, pp. 712-717.

Sperber, B.; "Try These Two Little Disks for a Bit Step in Streamlined, Object-Oriented SCADA", Apr. 1, 1996, Control, pp. 1-2 (reprinted from Control—Apr. 1996).

ESPRIT 5629 Project; "Open System Architecture for Controls within Automation Systems EP 6379 and EP 9115, OSACA I and II Final Report", Apr. 30, 1996, pp. 1-79.

Kagami, S.; Tamiya, Y.; Inaba, M.; Inoue, H.; "Design of Real-Time Large Scale Robot Software Platform and its Implementation in the Remote-Brained Robot Project", 1996, IEEE, pp. 1394-1399.

Factorysoft, Inc.; "FactorySoft Report Product Literature", 1996, pp. 1-2.

Kruglinski, D.; "Inside Visual C++—The Standard Reference for Programming with Microsoft Visual C++ version 4", 1996, Microsoft Press, (946 pages) Copyright 1996.

Galil Motion Control; "Motion Control Product Catalog", 1996, pp. 1-10, 82-91, 106-125.

GE FANUC Automation; "PowerMotion Servo and Machine Control (Product Brochure)", 1996, pp. 1-8.

Shinskey, F.; "Process Control Systems: Application, Design, and Tuning—Fourth Edition", 1996, McGraw-Hill Inc., (450 pages).

Compumotor Division, Parker Hannifin; "Step Motor and Servo Motor Systems and Controls", 1996, pp. 1, 28-29.

GE FANUC; "TCP/IP Ethernet Communications for the Series 90-70 PLC", 1996.

Chappell, D.; "Understanding ActiveX and OLE—A Guide for Developers and Managers", 1996, Microsoft Press, (347 pages) Copyright 1996.

McGraw; "A Friendly Command, Control, and Information System for Astronomy", 1996, ASP Conference Series, pp. 356-367.

GE FANUC Automation; "GE FANUC Automation Product Guide", May 1, 1996, pp. 1-8.

Sperling, W.; Lutz, P.; "Enabling Open Control Systems: An Introduction to the OSACA System Platform", May 1, 1996, ASME Press, Robotics and Manufacturing, pp. 1-8, vol. 6.

Schuett, T.; "Advanced Controls for High Speed Milling"; conference paper presented at the SME "High Speed Machining", May 7, 1996, Creative Technology Corporation.

General Motors; "Open, Modular Architecture Controls at GM Powertrain", May 14, 1996, 39 pages, Version 1.

National Instruments; "Lookout Product Literature", May 15, 1996, pp. 1-12.

Fusaro, D.; "A Standard for Programming PLCs Emerges—Now What?", Jun. 1, 1996, Control, pp. 1-4 (reprint from Control—Jun. 1993).

GE FANUC Automation; "Cimplicity Product Brochure", Jun. 1, 1996, pp. 1-4.

Siemens Energy and Automation, Inc.; "Siemens Automation Technology Newsletter (Q2/96)", Jul. 1, 1996, pp. 1-24.

Brockschmidt, K.; "What OLE Is Really About; OLE (General) Technical Articles", Jul. 1, 1996, Microsoft Corporation, 33 pages.
Mitsubishi Electric Corporation; "Mitsubishi Electric Advance: Programmable Logic Controllers Edition", Sep. 1, 1996, vol. 76.
Marcos, M.; Orive, D.; "A New Solution for Integrating Control Devices Involved in Computer-Integrated Manufacturing", Sep. 2, 1996, IEEE, UKACC International Conference Publication No. 427, pp. 485-490.
Individual; "SC4 Framework Presentation—Annex A-N326 Presentation", Sep. 30, 1996, pp. 1-8, document creation date: Sep. 30, 1996.
Schneeman, R.; "Device Driver Development for Microsoft Windows NT: Accessing Motion Control Hardware Using a Multimedia Framework", Oct. 1, 1996, NIST, pp. 1-43.
Steeplechase Software, Inc.; "Flow Charts Give Focus to Manufacturing", Oct. 1, 1996, pp. 1-2 (Reprinted from Managing Automation, Oct. 1996)
ISO/IEC; "ISO/IEC 8649: Information Technology—Open Systems Interconnection—Service definition for the Association Control Service Element", Oct. 15, 1996, all pages.
Wonderware; "Wonderware InTouch DDE I/O Server Listing", Nov. 1, 1996, pp. 1-14.
Suzuki, T.; Fujii, T.; Yokota, K.; Asama, H.; Kaetsu, H.; Endo, I.; "Teleoperation of Multiple Robots through the Internet", Nov. 14, 1996, pp. 84-88.
Kapoor, C.; "A Reusable Operational Software Architecture for Advanced Robotics", Dec. 1, 1996, UMI, pp. vi-vii, 1-79, 111-253, 302-368 (ch1, ch2, ch4, ch5 and ch7).
Sycara, K.; Pannu, A.; Williamson, M.; Zeng, D.; "Distributed Intelligent Agents—1", Dec. 1, 1996, IEEE Expert, Downloaded IEEE, 11(6): pp. 36-46.
Sycara, K.; Pannu, A.; Williamson, M.; Zeng, D.; "Distributed Intelligent Agents—2", IEEE Expert, (Downloaded from CiteSeer) 11(6): 36-46.
National Electronic Manufacturing Initiative, Inc.; "NEMI Low-cost Controller Project", Dec. 1, 1996, pp. 1-392.
Penton Media, Inc.; "Computer Store (American Machinist)", 1997, p. 83 (Jan. 1997 issue of American Machinist).
Johnson, C.; "Process Control Instrumentation Technology—Fifth Edition", 1997, Prentice-Hall, Inc., (645 pages).
Wonderware; "The Factory Suite Product Literature", 1997, pp. 1-34.
Matsui; "An Event-Driven Architecture for Controlling Behaviors of the Office Conversant Mobile Robot, Jijo-2: Proceedings of the 1997 IEEE International Conference on Robotics and Automation", 1997, IEEE, pp. 3367-3372, vol. 4.
Lawrenz, W.; "CAN System Engineering—From Theory to Practical Applications", 1997, Springer-Verlag, Inc., Chps. 1, 2.1, 2.2, 3.2 and 4.1.
Cahners Publishing Company; "Software Allows Combined Relay Ladder Logic and Flowchart Programming", Feb. 1, 1997, p. 1 (Reprint from Control Engineering, Feb. 1997).
Lewis, M.; "Five best bets for the machine-tool industry", Mar. 1, 1997, Penton Media, Inc., p. 79, 80, 92 (Mar. 1997 issue of American Machinist).
Nematron Corporation; "Nematron OpenControl Product Literature", Mar. 15, 1997, pp. 1-7.
Penton Media, Inc.; "CAM software offers simultaneous 5-axis machining", Apr. 1, 1997, p. 32, Apr. 1997 edition of American Machinist.
ISO/IEC; "ISO/IEC 7498-3 Information Technology—Open Systems Interconnection—Basic Reference Model: Naming and Addressing", Apr. 1, 1997, ISO/IEC 7498-3.
Compumotor Division, Parker Hannifin; "Motion Toolbox User Guide (A Library of LabVIEW Virtual Instruments for Motion Control)", Jun. 1, 1997, pp. i-v, 7-10, 85-93.
Proctor, F.; Albus, J.; "Open Architecture Controllers", Jun. 1, 1997, IEEE Spectrum, pp. 60-64.
Penton Media, Inc.; "Software opens up many possibilities", Sep. 1, 1997, p. 36 (Sep. 1997 issue of American Machinist).
Szabo; "Validation Results of Specifications for Motion Control Interoperability", Sep. 1, 1997, SPIE, pp. 166-176, vol. 2912.
OPC Foundation; "OLE for Process Control, Data Access Standard", Sep. 11, 1997, Updated, version 1.0A, Chapter 1-5 (pp. 1-169).

Redmond III, F.; "DCOM—Microsoft Distributed Component Object Model", Sep. 22, 1997, IDG Books Worldwide, Inc., (371 pages) Copyright 1997.
Jennings, R.; "Special Edition Using Access 97, Second Edition", Oct. 9, 1997, Que, Chapter 25.
Fritz, K.; Grant, K.; Khambholja, K.; Krueger, J.; "Circuit Board Prototyping System, CS400 Senior Design", Oct. 10, 1997, Milwaukee School of Engineering, pp. 1-17.
GE FANUC; "Windows '95 and Windows NT 32-Bit Drivers and Libraries for Open CNC Systems", Nov. 1, 1997, pp. 8-828.
Feng; "Distributed Control of a Multiple-Tethered Mobile Robot System for Highway Maintenance and Construction", Nov. 1, 1997, Microcomputers in Civil Engineering, pp. 383-392, vol. 12.
Sperling; "Designing Applications for an OSACA Control", Nov. 16, 1997, Proceedings of the International Mechanical Engineering Congress and Exposition, 5 pages.
Lutz, P.; "OSACA—The vendor-neutral Control Architecture", Dec. 1, 1997, The European Conference on Integration in Manufacturing, pp. 247-256.
Scholar's International Publishing Corp.; "Chapter 1—CNC Programming Fundamentals—From MasterCam Documentation", 1998, all pages.
Iconics, Inc.; "GENESIS32 Version 5.2 Product Workshop", 1998, pp. 1-247.
Hall, E.; "Intelligent Robot Trends for 1998", 1998, University of Cincinnati, pp. 1-13.
Siemens AG Automation and Drives; "IT-Solutions for Machine Tools: SinCOM Computer Link SINUMERIK 840D/810D Description of Functions", 1998, 272 pages.
Xiaowei, M.; Xiaoli, L.; Yulin, M.; Hegao, C.; "Real-time Self-reaction of Mobile Robot with Genetic Fuzzy Neural Network in Unknown Environment", 1998, Proceedings of the IEEE Intl. Conf. on Sys, Man, and Cybernetics, vol. 4.
Petzold, C.; "The Technique of Banding", 1998, Microsoft Development Library, Jul. 1994 MSDN, Programming Windows 3.1, pdf pp. 1-9.
Morales; "A Generalised Software Control System for Industrial Robots", 1998, IEEE, pp. 411-416.
Can In Automation (CIA); "CAN Specification 2.0, Addendum—Implementation Guide for the CAN Protocol", Jul. 7, 1998, pp. 1-3, document created on Jul. 7, 1998.
ISO—International Standards Organization; "ISO—DIS 14649-1: Industrial automation systems and integration—Physical device control—Data model for Computerized Numerical Controllers—Part 1: Overview and Fundamental Principles", Sep. 1, 1998, pp. 1-15.
Claverie, S.; "Working the 'NET: Developing Applications with Internet Information Server and Visual Basic Active X Controls", Sep. 1, 1998, Loyola University, pp. 158-162.
Haynes, T.; "Data Interface for Numerical Controls", Sep. 21, 1998, National Center for Manufacturing Sciences, all pages, NCMS Fall Conference.
BARCO Gerber Systems Corporation; "Gerber RS-274X Format User's Guide", Sep. 21, 1998, pp. 1-55.
GE FANUC; "Open Systems (Type II High Speed Serial Bus Setup for 32-Bit Windows 95 and Windows NT Applications) User's Manual", Oct. 1, 1998, pp. 1-1 to B-5.
Price, D.; West, M.; Fowler, J.; "The STEP Data Integration Architecture Activity", Oct. 1, 1998, pp. 1-9, document creation date: Oct. 1, 1998.
ISO 10303 Editing Committee; "ISO 10303—STEP on a Page", Oct. 23, 1998, p. 1.
ISO 10303 Editing Committee; "ISO 10303: STEP on a p. #2", Oct. 23, 1998, p. 1.
OPC Foundation; "OPC Overview", Oct. 27, 1998, Version 1.0.
Chang; "Development and Implementation of an Application Programming Interface for PC/DSP-based Motion Control System", 1998, SPIE, pp. 94-105, vol. 3518.
Bargen, B.; Donnely, P.; "Inside Direct X—In Depth Techniques for Developing High-Performance Multimedia Applications", 1998, Microsoft Press, Chps. 1, 18-20, 22-27.
Loffredo, D.; "Efficient Database Implementation of EXPRESS Information Models (Presentation)", Apr. 10, 1998, pp. 1-26.

Loffredo, D.; "Efficient Database Implementation of EXRESS Information Models", May 1, 1998, pp. 1-133.
Bouzouia, B.; Guerrouni, F.; Boukhezar, A.; "A Three-Layer Workcell Control Architecture Design", May 1, 1998, IEEE, pp. 1185-1191.
Think and Do Software, Inc.; "Think and Do Smart Distributed System Brochure", May 18, 1998, pp. 1-2, (document creation date May 18, 1998).
Can in Automation (CIA); "CAN Specification 2.0, Part A", Jun. 12, 1998, pp. 1-31, document created on Jun. 12, 1998.
Can in Automation (CIA); "CAN Specification 2.0, Part B", Jun. 12, 1998, pp. 1-38, document created on Jun. 12, 1998.
ISO—International Standards Organization; "ISO 10303-49: Industrial automation systems and integration—Product data representation and exchange—Part 49: Integrated generic resources: Process structure and properties: First Edition", Jun. 15, 1998, pp. 1-64.
ISO—IInternational Standards Organization; "ISO 13584-20: Industrial automation systems and integration—Parts library—Part 20: Logical resource: Logical model of expressions: First Edition", Jul. 1, 1998, pp. 1-96.
Michaloski, J.; Birla, S.; Weinert, G.; Yen, J.; "A Framework for Component-base CNC Machines", Nov. 1, 1998, SPIE, pp. 132-143, vol. 3518.
Leu, K.; Ang JR., M.; Wong, Y.; "A Telemanufacturing Workcell Over the Internet", Nov. 1, 1998, SPIE, pp. 230-237.
Muir, P.; Homer, J.; "Mechatronic Objects for Real-Time Control Software Development", Nov. 1, 1998, SPIE, pp. 251-265, vol. 3518.
ISO/IEC; "ISO/IEC 8824-1: Information technology—Abstract Syntax Notation One (ASN.1): Specification of basic notation: Second Edition", Dec. 15, 1998, all pages.
GlobalSpec; "About CNC Controllers", 1999, Internet Location: http://motion-controls.globalspec.com/LearnMore/Motion_Controls/Machine_Motion_Controllers/CNC_Controllers.
Birla, S.; Yen, J.; Skeries, F.; Berger, D.; "Controls Software Requirements for Global Commonization", 1999, Cahners Publishing Company, pp. 1-4, Jan. 1999 issue of Control Engineering.
Lee, K.; "Principles of CAD/CAM/CAE Systems", 1999, Addison Wesley Longman, Inc., All pages. (Copyright 1999).
Manufacturing Science and Technology Center (MSTC); "The Introduction of Standard Protocol in Japanese Manufacturing Systems and a Proposal of Collaboration", 1999, pp. 1-48.
Brooks, M.; "CAN Bus Simulation Results", Mar. 30, 1999, pp. 1-4.
GE FANUC; "Cimplicity HMI OPC Server", Apr. 1, 1999.
Cho, Y.; You, B.; Lee, C.; "A Compact/Open Network-based Controller Incorporating Modular Software Architecture for a Humanoid Robot", Apr. 19, 1999, Kluwer Academic Publishers, Journal of Intelligent and Robotic Systems, pp. 341-355.
Nilsson, K.; Johansson, R.; "Integrated Architecture for Industrial Robot Programming and Control", May 20, 1999, Elsevier Science Publishers B.V, Robotics and Autonomous Systems, pp. 205-226, vol. 29.
Brooks, M.; "Rate Monotonic Analysis of an Antenna CAN Bus", May 28, 1999, pp. 1-3.
Mathias, D.; Hellmann, R.; "Boeing Implements HMI", Jun. 1, 1999, Manufacturing Engineering, pp. 1-3.
Rockwell Automation; "Interchange for Windows Release Notes", Jun. 1, 1999, pp. 1-14.
Hardwick, D.; "STEP Database Tutorial, Chapter One—Making Business Objects Using EXPRESS-X", Jun. 21, 1999, STEP Tools, Inc., pp. 1-20.
Platt, D.; "Understanding COM+: Events", Jun. 30, 1999, Microsoft Press, pp. 149-182.
Platt, D.; "Understanding COM+: Security", Jun. 30, 1999, Microsoft Press, pp. 44-57.
ISO/IEC; "CEI/IEC 9506-5: Industrial automation systems—Manufacturing message specification—Part 5: Companion Standard for Programmable Controllers", Jul. 1, 1999, pp. 1-129.
Manufacturing Science and Technology Center (MSTC); "MST/JOP-1012: FL-net Protocol Specifications, Version 1.0", Jul. 1, 1999, pp. 1-65.
Manufacturing Science and Technology Center (MSTC); "MSTC/JOP-1013: FL-net DEvice Profile Common Specification, Version 1.0", Jul. 1, 1999, pp. 1-28.
Manufacturing Science and Technology Center (MSTC); "MSTC/JOP-1014: FL-net Implementation Guideline, Version 1.0", Jul. 1, 1999, pp. 1-39.
Manufacturing Science and Technology Center (MSTC); "MSTC/JOP-1015: Basic Specifications of FL-net Product Certification System, Version 1.0", Jul. 1, 1999, pp. 1-11.
Manufacturing Science and Technology Center (MSTC); "MSTC/JOP1302: CNC Application Programming Interface, PAPI Specification Common Specification 1.01E", Jul. 26, 1999, pp. i-v, 1-143.
Can in Automation (CIA); "CAN Application Fields", Jul. 28, 1999, pp. 1-5, document created on Jul. 28, 1999.
JARA; "Specifications of ORiN (Ver. 0.5)", Aug. 1, 1999.
Valera, A.; Robertsson, A.; Nilsson, K.; Johansson, R.; "Interactive Online Evaluation of Robot Motion Control", Aug. 2, 1999, IEEE, Proceedings of the 1999 IEEE International Conference on Control Applications, pp. 1039-1043.
Can in Automation (CIA); "CAN Data Link Layer", Aug. 9, 1999, pp. 1-44, document created on Aug. 9, 1999.
Can in Automation (CIA); "CAN Implementation", Aug. 9, 1999, pp. 1-33, document created on Aug. 9, 1999.
Can in Automation (CIA); "CAN Physical Layer", Aug. 9, 1999, pp. 1-45, document created on Aug. 9, 1999.
Loffredo, D.; "Fundamentals of STEP Implementation", Sep. 9, 1999, STEP Tools, Inc., pp. 1-12, document creation date: Sep. 9, 1999.
Natale, C.; Siciliano, B.; Villani, L.; "Robust Hybrid Force/Position Control with Experiments on an Industrial Robot", Sep. 19, 1999, IEEE, Proceedings of the 1999 IEEE/ASME Intl. Conf. on Advanced Intelligent Mechatronics, pp. 956-961.
Manufacturing Science and Technology Center (MSTC); "MSTC/JOP-1101: Specifications for Autonomous Decentralized Protocol (R 3.0)", Sep. 30, 1999, pp. 1-79.
Mizukawa, M.; Matsuka, H.; Koyama, T.; Matsumoto, A.; "De-Facto Standard API for Open and Networked Industrial Robots", Oct. 1, 1999, pp. 455-462.
Pirjanian, P.; "Behavior Coordination Mechanisms—State-of-the-art", Oct. 7, 1999, USC Robotics Research Laboratory, pp. 1-49.
ISO—International Standards Organization; "EXPRESS-X Language Reference Manual—Draft", Oct. 15, 1999, all pages.
Morales, E.; "GENERIS: The EC-JRC Generalized Software Control System for Industrial Robots", Nov. 1, 1999, MCB University Press, Industrial Robot, pp. 26-32, vol. 26, No. 1.
Jeppsson, J.; "Sensor Based Adaptive Control and Prediction Software—Keys to Reliable HSM", Nov. 3, 1999, The Boeing Company.
Manufacturing Science and Technology Center (MSTC); "MSTC/JOP-1304: Management-data Format for Machine tool", Nov. 30, 1999, pp. i-iii, 1-10.
GE FANUC; "Cimplicity HMI for CNC-CNC Machining Interface Plus Operation Manual", Dec. 1, 1999, pp. 1-1 to B-2.
Hemmett, J.; Fussell, B.; Jerard, R.; "A Robust and Efficient Approach to Feedrate Selection for 3-axis Machining", 2000, ASME IMECE, pp. 1-15, Submission for "Dynamics and Control of Material Removal Process", 2000 ASME IECE.
Proctor, F.; Kamatsu, C.; Glantschnig, F.; "ISO/DIS 14649-1: Industrial automation systems and integration—Physical device control—Data model for computerized numerical controllers—Part 1: Overview and fundamental principles: Draft", 2000, ISO—International Standards Organization, all pages.
ISO—International Standards Organization; "ISO/DIS 14649-10: Industrial automation systems and integration—Physical device control—Data model for computerized numerical controllers—Part 10: General process data: Draft", 2000, pp. 1-149.
Westenberg, A.; "Linux CAN-bus HOWTO", 2000, pp. 1-33.
EPM Technology; "STEP-NC A NewData Interface for NC-Programming", 2000, p. 1, The Expressway web-site.
Loffredo, D.; "The STEP ISO Standard Presentation", 2000, STEP Tools, Inc., pp. 1-15.
Farsi, M.; Barbosa, M.; "CANopen Implementation—Applications to Industrial Networks", 2000, Research Studies Press Ltd, Chps. 1, 2 and 3.
Kovach, P.; "Inside Direct3D—The Definitive Guide for Real-Time 3D Power and Performance for Microsoft Windows", 2000, Microsoft Press, Chps. 1, 7 and 15.

Jerard, R.; Ryou, O.; "Internet Based Fabrication of Discrete Mechanical Parts", Jan. 3, 2000, Proceedings of the 2000 Design and Mfg Research Conference, pp. 1-9.
Can in Automation (CIA); "CANopen Representation of SI Units and Prefixes", Jan. 19, 2000, pp. 1-7.
Individual; "Non-Neutral Comparison of the Part 28 Early Bindings", Mar. 24, 2000, pp. 1-10.
Step Tools, Inc.; "Database Use Case Presentation", Apr. 1, 2000, p. 1.
ARC Advisory Group; "HMI Software Strategies", Apr. 1, 2000, pp. 1-16.
Can in Automation (CIA); "CANopen", Apr. 3, 2000, pp. 1-125, document created on Apr. 3, 2000.
Manufacturing Science and Technology Center (MSTC); "MIMOSA CRIS V2.1 Terminology", Apr. 7, 2000, pp. 1-3, document created Apr. 7, 2000.
Individual; "Containment Early Binding—Draft 1.2", Apr. 12, 2000, pp. 1-17.
ARC Advisory Group; "E-Security Strategies for Enterprises", May 1, 2000, pp. 1-20.
ARC Advisory Group; "Open Control Strategies", May 1, 2000, pp. 1-20.
Mizukawa, M.; Matsuka, H.; Koyama, T.; Matsumoto, A.; "OriN: Open Robot Interface for the Network: A Proposed Standard", May 1, 2000, MCB University Press, Industrial Robot, 7 pages, pp. 344-350.
ISO/IEC; "Part 203: Application Protocol: Configuration controlled 3D designs of mechanical Parts and assemblies, Amendment 1", May 4, 2000, all pages.
Machinery Information Management Open Systems Alliance (MIMOSA); "Common Relational Information Schema, CRIS Version 2.1", May 8, 2000, all pages.
Individual; "Containment Early Binding—Draft 1.6", May 24, 2000, pp. 1-23.
Can in Automation (CIA); "CANopen: Electronic Data Sheet Specification for CANopen", May 31, 2000, pp. 1-24, CiA Draft Standard Proposal 306, Version 1.0.
Can in Automation (CIA); "CANopen: Layer Setting Services and Protocol", May 31, 2000, pp. 1-17, CiA Draft Standard Proposal 305, Version 1.0.
Yee, K.; "STEP @ Boeing", Jun. 1, 2000, The Boeing Company, pp. 1-19.
Microsoft Corporation; "How to Write and Use Activex Controls for Microsoft Windows CE 3.0", Jun. 1, 2000, Windows CE 3.0 Technical Articles, 5 pages.
Mitsuishi, M.; Mutou, K.; Anmi, S.; Inazuru, I.; Kanemoto, M.; Shirakata, N.; Takagi, T.; Naitou, M.; Matsuda, S.; Yamaguchi, M.; Miyajima, H.; "User Interface for an Open-Architecture Controller", Jul. 1, 2000, 2000 Japan USA Symposium on Flexible Automation, pp. 1-4.
LEGO; "LEGO MindStorms RCX 2.0 Firmware Command Overview", Jul. 4, 2000.
ISO/IEC; "ISO-9506-1 Industrial Automation Systems;Manufacturing Message Specification;Part 1: Service definition", Aug. 1, 2000, pp. i-22, 38 pages.
ISO/IEC; "ISO-9506-2 Industrial Automation Systems; Manufacturing Message Specification;Part 2: Protocol specification", Aug. 1, 2000, pp. i-6, 18 pages.
ISO—IInternational Standards Organization; "ISO 10303-42: Industrial automation systems and integration—Product data representation and exchange—Part 42: Integrated generic resource: Geometric and topological representation", Sep. 1, 2000, pp. 1-346.
Manufacturing Science and Technology Center (MSTC); "MSTC/JOP-1202: Specifications of the OpenMES Framework, Version 1.0 (Draft alpha 2)", Sep. 11, 2000, pp. 1-72.
GE, S.; Lee, T.; Woon, L.; "A One-Stop Solution in Robotic Control System Design", Sep. 1, 2000, IEEE, Robotics and Automation Magazine, pp. 42-55.
Erol, N.; Altintas, Y.; Ito, M.; "Open System Architecture Modular Tool Kit for Motion and Machine Processing Control", Sep. 11, 2000, IEEE, pp. 281-291, vol. 5, No. 3.
Brown, K.; "SOAP for Platform Neutral Interoperability", Sep. 1, 2000, 16 pages.

Spada, S.; "Roy-G-Biv Tames the Motion Control Tiger", Sep. 6, 2000, ARC Advisory Group, pp. 1-4.
Red, E.; "Introduction to Robotics", Sep. 8, 2000, BYU Mechanical Engineering Department, pp. 1-30, document created on Sep. 8, 2000.
ISO-International Standards Organization; "ISO 3592: Industrial automation systems—Numerical control of machines—NC processor output—File structure and language format, Second Edition", Sep. 15, 2000, all pages.
ISO— International Standards Organization; "CEB Binding—Draft 3.0", Sep. 29, 2000, pp. 1-45.
Deltheil, C.; Didier, L.; Hospital, E.; Brutzman, D.; "Simulating an Optical Guidance System for the Recovery of an Unmanned Underwater Vehicle", Oct. 1, 2000, IEEE Journal of Oceanic Engineering, pp. 568-574.
Price, D.; "STEP Modularization Overview Presentation", Oct. 1, 2000, IBM Corporation, pp. 1-41.
Weyrich, M.; Rommel, B.; Haasis, S.; Mueller, P.; "First Prototype of a NC Controller based on STEP-NC", Oct. 4, 2000, pp. 1-11, document creation date Oct. 4, 2000.
Individual; "ISO 4343: Industrial Automation Systems—Numerical control of machines—NC processor output—Post processor commands: Second Edition", Oct. 15, 2000, all pages.
ISO—International Standards Organization; "ISO/PDTS 10303-28: XML representation of EXPRESS schemas and data", Oct. 16, 2000, all pages.
ISO—International Standards Organization; "Proposal of New Process Data Model based on AP213", Oct. 16, 2000, all pages.
ISO—International Standards Organization; "ISO 10303-41: Industrial automation systems and integration—Product data representation and exchange—Part 41: Integrated generic resource: Fundamentals of product description and support: Second Edition", Nov. 1, 2000, all pages.
GE FANUC; "Cimplicity Integrator's Toolkit—Application Developers Guide", Dec. 1, 2000, pp. 1-1 to 48-12.
Penton Media, Inc.; "When data transfer goes awry", Dec. 7, 2000, all pages, Dec. 7, 2000 issue of Machine Design (www.machinedesign.com).
Nacsa, J.; "Comparison of Three Different Open Architecture Controllers", 2001.
Evolution Robotics, Inc.; "ERSP 3.0—Getting Started Guide", 2001.
STEP Tools, Inc.; "Introduction to STEP-NC: Stock", 2001, pp. 1-3.
STEPTools, Inc.; "Introduction to STEP-NC: The Step-NC Backbone: Executables", 2001, pp. 1-20.
STEP Tools, Inc.; "Introduction to STEP-NC: The STEP-NC Backbone: Workpiece and Features", 2001, pp. 1-37.
STEP Tools, Inc.; "Introduction to STEP-NC: What is STEP-NC and What Does it Cover?", 2001, pp. 1-31.
Jara; "Outline of ORiN (Open Robot Interface for the Network)", 2001.
Terakado, Y.; "Standardization Group—STEP Group", 2001, ECOM Journal, pp. 1-5, Published in ECOM Journal, No. 3 (believed published in 2001 or later—article describes events occurring in 2001).
Loffredo, D.; "STEP-NC: E-Manufacturing Using STEP Presentation", 2001, STEP Tools, Inc., pp. 1-22.
Shah, H.; "Packaging Industry Encourages Broad Adoption of Motion Control Technology", Jan. 4, 2001, ARC Advisory Group, pp. 1-4.
Techno-Isel; "Techno-isel CAD/CAM and CNC Brochure", Feb. 11, 2001, pp. 8-9.
OSACA Association; "OSACA Handbook, Version 2.0", Feb. 16, 2001, pp. 1-440 (all pages).
Evolution Robotics, Inc.; "ERSP3.0—Robotic Development Platform", 2001, pp. 1-1134.
Evolution Robotics, Inc.; "ERSP 3.0—Tutorials", 2001.
Evolution Robotics, Inc.; "ERSP 3.0—User's Guide", 2001.
STEP Tools, Inc.; "Introduction to STEP-NC: Advanced Control Flow for NC Workplans", 2001, pp. 1-14.
STEP Tools, Inc.; "Introduction to STEP-NC: AP-238 and the STEP Integrated Resources", 2001, pp. 1-19.
STEP Tools, Inc.; "Introduction to STEP-NC: Cutting Tools for Milling", 2001, pp. 1-12.

STEP Tools, Inc.; "Introduction to STEP-NC: Explicit Toolpaths", 2001, pp. 1-11.
STEP Tools, Inc.; "Introduction to STEP-NC: In-Process Features", 2001, pp. 1-12.
STEP Tools, Inc.; "Introduction to STEP-NC: Milling Operations", 2001, pp. 1-18.
STEP Tools, Inc.; "Introduction to STEP-NC: Project and Setups", 2001, pp. 1-12.
Radack, G.; "WG3 Presentation to SC4 Opening Plenary—T24—STEP-Manufacturing Presentation", Feb. 19, 2001, ISO—International Standards Organization, pp. 1-2.
Popular Mechanics; "United Internet Technologies Transforms Toy Industry With Intelligent Creative Interactive Technology", Mar. 1, 2001.
Slansky, D.; Spada, S.; "OMAC Embraces the Internet to Enable Machine Tool Collaboration", Mar. 7, 2001, ARC Advisory Group, pp. 1-4.
Acroloop Motion Control Systems, Inc.; "Acroloop—Perfection in Motion Catalog", Mar. 29, 2001, pp. 3-54, document created on Mar. 29, 2001.
AB Journal; "AB Journal New and Noteworthy", Apr. 1, 2001, pp. 1-5.
ISO—International Standards Organization; "ISO 13584-1: Industrial automation systems and integration—Parts library—Part 1: Overview and fundamental principles: Apr. 15, 2001", pp. 1-26.
Can in Automation (CIA); "CANopen Cabling and Connector Pin Assignment", Apr. 20, 2001, pp. 1-22.
Compumotor Division, Parker Hannifin; "CompuCAM Computer Aided Motion", May 6, 2001, pp. 1-27.
Kanehiro, F.; Inaba, M.; Inoue, H.; Hirukawa, H.; Hirai, S.; "Developmental Software Environment that is applicable to Small-size Humanoids and Life-sized Humanoids", May 21, 2001, IEEE, pp. 4084-4089.
Lutz, P.; "OSACA Proposal of an XML Model for OSACA", May 23, 2001, OSACA Association, pp. 1-13.
Can in Automation (CIA); "CANopen Indicator Specification", Jun. 1, 2001, pp. 1-7, Draft Recommendation 303-3.
GE FANUC; "Cimplicity HMI for CNC—Operation Manual", Jun. 1, 2001, 260 pages.
Nell, J.; "ISO 10303: STEP on a Page—#3", Jun. 7, 2001, p. 1.
Loffler, M.; Dawson, D.; Zergeroglu, E.; Costescu, N.; "Object-Oriented Techniques in Robot Manipulator Control Software Development", Jun. 25, 2001, Proceedings of the American Control Conference, pp. 4520-4525.
ISO—International Standards Organization; "ISO/FDIS 14649-10: Industrial automation systems and integration—Physical device control—Data model for Computerized Numerical Controls—Part 10: General Process Data: Draft", Aug. 29, 2001, pp. 1-172.
ISO—International Standards Organization; "ISO/FDIS 14649-11: Industrial automation systems and integration—Process device control—Data model for Computerized Numerical Controllers—Part 11: Process Data for Milling: Draft", Aug. 29, 2001, pp. 1-76.
ISO—International Standards Organization; "ISO/FDIS 4649-111: Industrial automation systems and integration—Physical device control—Data model for Computerized Numerical Controllers—Part 111: Tools for Milling: Draft", Aug. 29, 2001, pp. 1-27.
Ryou, O.; Jerard, R.; "FACILE: A Clean Interface for Design and Fabrication of Mechanical Parts", Sep. 1, 2001, University of New Hampshire, Mechanical Engineering Department, pp. 1-85.
Michaloski, J.; "OMAC HMI Data Type Overview using W3C XML and STEP", Sep. 18, 2001, OMAC HMI Working Group, pp. 1-11, document created on Sep. 18, 2001.
National Electronic Manufacturing Initiative, Inc.; "NEMA Members Letter: Industry Input on Data Exchange Convergence", Sep. 21, 2001, pp. 1-6.
Stark, J.; "2PDM e-zine Web Article (www.johnstark.com)", Sep. 24, 2001, pp. 1-10, vol. 4, No. 3.
Loffredo, D.; "STEP-NC Mapping Notes", Sep. 26, 2001, STEP Tools, Inc., pp. 1-21.
Hoske, M.; "Connect the plant floor to supply chain", Oct. 1, 2001, Cahners Publishing Company, pp. 1-7, Oct. 2001 issue of Control Engineering.
Hardwick, D.; "STEP-NC Frequently Asked Questions", Oct. 1, 2001, pp. 1-10.
Bengtsson, K.; "Industry Interest—Design, Engineering Simulation", Nov. 1, 2001, EPM Technology, pp. 1-24, NorduGrid Workshop.
Microsoft Corporation; "Categorizing by Component Capabilities", Nov. 1, 2001, Platform SDK: COM.
Michaloski, J.; "STEP-NC Architecture Overview", Nov. 28, 2001, NIST, pp. 1-2, document creation date: Nov. 28, 2001.
ROY-G-BIV Corporation; "ROY-G-BIV Teams With OKUMA to Help Lean Manufacturing Vision Become Reality", Dec. 1, 2001, pp. 1-2.
ROY-G-BIV Corporation; "XMC Powers Robotic Welding Application for Future NASA Space Shuttles", Dec. 1, 2001, pp. 1-2.
Delta TAU Data Systems, Inc.; "PMAC Quick Reference Guide", Dec. 10, 2001, pp. 1-79.
Downie, B.; Hardwick, D.; "3D Data for Pipe Bending and Cutting Machines", 2002, STEP Tools, Inc., pp. 1-12.
Jerard, R.; Ryou, O.; "E-Commerce for the Metal Removal Industry", Jan. 7, 2002, International Business Machines Corporation, pp. 1-28.
ISO—International Standards Organization; "ISO/FDIS 14649-10: Industrial automation systems and integration—Physical device control—Data model for Computerized Numerical Controllers—Part 10: General Process Data: Draft 2002", Feb. 6, 2002, pp. 1-179.
ISO—International Standards Organization; "ISO/FDIS 14649-11: Industrial automation systems and integration—Physical device control—Data model for Computerized Numerical Controllers—Part 11: Process Data for Milling: Draft 2002", Feb. 6, 2002, pp. 1-76.
ISO—International Standards Organization; "ISO/FDIS 14649-111: Industrial automation systems and integration—Physical device control—Data model for Computerized Numerical Controllers—Part 111: Tools for Milling: Draft 2002", Feb. 6, 2002, pp. 1-27.
Brown, D.; "OMAC-HMI, OSACA, JOP Standard CNC Data Type Analysis", Feb. 9, 2002, ROY-G-BIV Corporation.
ISO—International Standards Organization; "ISO/WD 10303-238: STEP-NC AIM v2.8—Draft", Feb. 24, 2002, pp. 1-810.
Krar, S.; Gill, A.; "Open Architecture CNC (Advanced Manufacturing Magazine)", Mar. 1, 2002, CLB Media Inc., pp. 23-27. vol. 4, No. 2.
Cover, R.; "The XML Cover Pages: STEP/EXPRESS and XML", Mar. 29, 2002, pp. 1-11.
STEP Tools, Inc.; "ST-XML Manual", Apr. 1, 2002, pp. 1-60.
Individual; "AAM for AP2xx (Process Plans for Machined Products) Presentation", Apr. 11, 2002, pp. 1-11, document creation date: Apr. 11, 2002.
Callen, J.; "A View from the CAM Side—Moving into 3D", May 1, 2002, Desktop Engineering Magazine, pp. 1-3, Desktop Engineering Magazine Web Article (www.deskeng.com).
OMAC Users Group; "OMAC STEP-NC: The Value Proposition for STEP-NC", May 1, 2002, pp. 1-23.
GE FANUC; "TCP/IP Ethernet Communications—Station Manager Manual", May 1, 2002, Chapters 1, 3, 4 and 5, pp. 1-9, 14-56.
I++ Working Group; "I++ DME Interface, Version 1.09", May 17, 2002, pp. 1-76, document created on May 17, 2002.
Wood, R.; "Integrated Steel Processing Environment (ISPE) Project Presentation", Jun. 10, 2002, Northrop Grumman Corporation, pp. 1-3.
Vorburger, T.; "Report on AP219—Dimensional Inspection Information Exchange Project Presentation", Jun. 10, 2002, NIST, pp. 1-16.
Radack, G.; "WG3 Presentation to SC4 Opening Plenary—TC4—STEP-Manufacturing", Jun. 10, 2002, ISO—International Standards Organization, pp. 1-4, document creation date: Jun. 10, 2002.
Individual; "AP2XX_ARM_060602 Presentation", Jun. 11, 2002, pp. 1-18, document creation date: Jun. 11, 2002.
Individual; "TC 184, SC4, WG3, T24 (Manufacturing) Session on AP219 Meeting Notes", Jun. 12, 2002, pp. 1-2.
Danner, B.; Frechette, S.; Vorburger, T.; "AP219 Dimensional Inspection—Informational requirements document Presentation", Jun. 14, 2002, Seneca-IT.com, pp. 1-24.
Danner, B.; Frechette, S.; Vorburger, T.; "A Step-Based Information Model for Dimensional Inspection—Draft", Jun. 20, 2002, ISO—International Standards Organization, pp. 1-95.

Kepware Technologies; "KEPServerEX OPC Server Software", Jul. 12, 2002, pp. 1-202.
Siemens AG Automation and Drives; "SCADA: The Strategic Centre—IT and Business Integration Technical Article", Dec. 10, 2002.
Rockwell Automation Technologies, Inc.; "FactoryTalk—Enabled Solutions", 2003.
FANUC Ltd.; "FANUC Series 30i/31i/32i:300i/310i/320i:300is/310is/320is—Model A Brochure", 2003, pp. 1-28.
FANUC Robotics America, Inc; "HandlingWorks Product Brochure", 2003, pp. 1-2.
Baron, M.; "Process Visualization—Up to Date—Technical Article", 2003, Siemens AG Automation and Drives.
FANUC Robotics North America, Inc.; "R-J3/R-J3iB Integrated PMC", 2003, pp. 1-2.
Siemens AG Automation and Drives; "SIMATIC WinCC Version 6 System Description Product Brochure", 2003.
ROY-G-BIV Corporation; "XMC Helps Systems Integrator Improve Customer's Efficiency With CNC Machine-Tool Retrofit", 2003, pp. 1-2.
Individual; "AP240_ARM_DIS_012003 Presentation", Feb. 25, 2003, pp. 1-20, document creation date: Feb. 25, 2003.
Van Der Wal, E.; "PLCopen: changing the world of industrial automation—status, structuring tools, activities and libraries", Nov. 18, 2003, PLCopen, pp. 1-108.
KEPWARETechnologies; "User Configurable Driver Users Manual", 2004.
Rockwell Automation Technologies, Inc.; "Integrated Architecture Product Literature", Apr. 1, 2004.
GE FANUC; "Proficy Machine Edition—a suite of Proficy products for Control, Motion, and Operator Interface applications", Jul. 1, 2004, pp. 1-120.
Siemens AG Automation and Drives; "Standardized access to process data Product Brochure", Nov. 1, 2004.
FANUC Robotics America, Inc; "Flexible Loading Solutions", 2005, All pages (copyright 2005).
FANUC Robotics America, Inc; "HandlingTool Application Software Product Brochure", 2005, pp. 1-2.
Alvares, A.; Da Silva, F.; Ferreira, J.; "WebTurning: Teleoperation of a Turning Center Via Internet", 2005.
Microsoft Corporation; "Microsoft.NET Interface for LEGO Mindstorms", Feb. 11, 2005.
RENU Electronics PVT Ltd.; "Gateway Protocol Converter Product Brochure", Mar. 3, 2005, pp. 1-4 (pdf marked with creation date of Mar. 3, 2005).
FANUC Ltd.; "FANUC Sales Brochure", Apr. 1, 2005, All pages. (pdf created date: Apr. 1, 2005).
Rockwell Automation Technologies, Inc.; "Logix5000 Controllers Motion Instructions", May 1, 2005.
Rockwell Automation Technologies, Inc.; "Rsassetsecurity Product Profile", May 1, 2005.
Rockwell Automation Technologies, Inc.; "Rsassetsecurity Technical Data", May 1, 2005.
Rockwell Automation Technologies, Inc.; "RSView Machine Edition—Technical Data", May 1, 2005.
Rockwell Automation Technologies, Inc.; "RSView Supervisory Edition—Technical Data", May 1, 2005.
Rockwell Automation Technologies, Inc.; "RSLINX Classic—Getting Results Guide", Jun. 1, 2005.
Siemens AG Automation and Drives; "SIMATIC IT MES Extended Manufacturing—Modeling with innovations Product Brochure", 2006.
Siemens AG Automation and Drives; "SIMATIC IT Production Suite—Synchronize your production Product Brochure", 2006.
Siemens Energy and Automation, Inc.; "Why integrate MES and ERP? Because you can't afford not to!", Feb. 1, 2006, pdf pp. 1-8.
ABB; "RobotWare DieCast—Industrial IT Software Product Brochure", Apr. 1, 2006, pp. 1-2.
Siemens AG Automation and Drives; "SIMATIC WinCC—Process Visualization using Plant Intelligence Product Brochure", Apr. 1, 2006.
Siemens AG Automation and Drives; "SIMATIC WinCC Flexible—Flexibility in every HMI application—from Micro Panels to PCs Product Brochure", Apr. 1, 2006.
Danner, B.; "AP219 Dimensional Inspection: Information requirements and harmonization Presentation", Apr. 9, 2006, Seneca-IT.com, pp. 1-26.
Microsoft Corporation; "Web Service Application Protocol—WSAP", Jun. 18, 2006.
Microsoft Corporation; "Microsoft Robotic Studio Help", Jun. 30, 2006.
OPC Foundation; "OPC Unified Architecture Specification—Part 1: Concepts", Jul. 28, 2006, Version 1.00.
Ismat, N.; "Home Grown MES-OUT and Large Vendor's MES-IN", Oct. 1, 2006, Automation Media, pdf pp. 1-2. (Oct. 2006 Editorial Section of http://www.automationmedia.com).
ARC Advisory Group; "Rockwell Automation Process Industry Strategies", Oct. 1, 2006, pp. 1-37.
ROY-G-BIV Corporation; "USPTO Patent FileHist: (U.S. Appl. No. 11/454,053) File History—Terminal Disclaimer", Apr. 23, 2010, 2 pages.
ROY-G-BIV Corporation; "USPTO Patent FileHist: (U.S. Appl. No. 12/244,673) File History—Remarks", Apr. 23, 2010, 2 pages.
ROY-G-BIV Corporation; "USPTO Patent FileHist: (U.S. Appl. No. 12/244,673) File History—Supplemental Amendment After Non-Final Rejection", Apr. 23, 2010, 1 page.
ROY-G-BIV Corporation; "USPTO Patent FileHist: (U.S. Appl. No. 12/244,673) File History—Terminal Disclaimer", Apr. 23, 2010, 2 pages.
USPTO; "ReEx: U.S. Patent No. 5,691,897 Reexamination (Control No. 90/009,282)—Examiner Interview Summary", May 12, 2010 (9 pages).
ROY-G-BIV Corporation; "ReEx: U.S. Patent No. 5,691,897 Reexamination (Control No. 90/009,282)—Supplemental Response to Final Office Action", May 18, 2010, (48 pages).
USPTO; "ReEx: U.S. Patent No. 5,691,897 Reexamination (Control No. 90/009,282)—Examiner Advisory Action", May 24, 2010, (5 pages).
Brown, D.; Clark, J.; "FileHist: Canadian Patent Application No. 2,586,401—Notice of Allowance", Oct. 27, 2009, CIPO, (641 pages).
EPO; "FileHist: European Patent Application No. EP04816957—Search Report", Mar. 24, 2010, (4 pages).
ROY-G-BIV Corporation; "USPTO Patent FileHist: (U.S. Appl. No. 10/405,883) File History; Amend after Final Rejection Office Action", Mar. 29, 2010, (6 pages).
USPTO; "USPTO Patent FileHist: 7110.00002 (U.S. Appl. No. 12/263,953) File History; Non-Final Office Action", Mar. 31, 2010, (476 pages).
ROY-G-BIV Corporation; "USPTO Patent FileHist: (U.S. Appl. No. 11/375,502) File History; Response After Oct. 1, 2009 Non-Final Office Action", Mar. 31, 2010, (13 pages).
ROY-G-BIV Corporation; "USPTO Patent FileHist: (U.S. Appl. No. 11/454,053) File History; Supp Amend after Non-Final Office Action", Apr. 1, 2010, (15 pages).
ROY-G-BIV Corporation; "USPTO Patent FileHist: (U.S. Appl. No. 11/454,053) File History; Supp Amend after Non-Final Office Action", Apr. 5, 2010, (8 pages).
USPTO; "USPTO Patent FileHist:(U.S. Appl. No. 10/405,883) File History; Notice of Allowance", Apr. 19, 2010, (58 pages).
ROY-G-BIV Corporation; "USPTO Patent FileHist: (U.S. Appl. No. 11/454,053) File History—Remarks", Apr. 23, 2010, 2 pages.
ROY-G-BIV Corporation; "USPTO Patent FileHist: (U.S. Appl. No. 11/454,053) File History—Supplemental Amendment After Non-Final Rejection", Apr. 23, 2010, 1 page.
JPO; "Japanese Patent Application No. JP2003513348—FileHist: Office Action", Jun. 10, 2010, (13 pages).
USPTO; "USPTO Patent FileHist: (U.S. Appl. No. 11/728,801) Notice of Allowance", Jun. 16, 2010, (72 pages).
USPTO; "USPTO Patent FileHist: (U.S. Appl. No. 10/966,848)—Notice of Allowance", Jun. 22, 2010, (50 pages).
USPTO; "USPTO Patent FileHist: (U.S. Appl. No. 10/966,848)—Notice of Allowance", Jul. 12, 2010, (17 pages).

ROY-G-BIV Corporation; "ReEx: U.S. Patent No. 5,691,897 Ex-Partes Reexamination (Control No. 90/009,282)—Appeal Brief", Jul. 12, 2010, (75 pages).
Schaffer, J.; Whitley, D.; Eshelman, L.; "Combinations of Genetic Algorithms and Neural Networks: A Survey of the State of Art", 1992, COGANN-92 Intl. Wkshp. on Comb. of Gen. Alg and Neural Networks., (40 pages).
Kunze, M.; Steffens, J.; "The Neural Network Objects", 1996, World Scientific, Proceedings of the 5th AIHENP Workshop, Lausanne.
Palade, V.; Bumbaru, S.; Negoita, G.; "A Method for Compiling Neural Networks into Fuzzy Rules Using Genetic Algorithms and Hierarchical Approach", Apr. 1, 1998, 1998 Intl. Conf on Knowledge-Based Intel. Elec. Sys., pp. 21-23.
Delgado, M.; Gomez-Skarme, A.; Marin-Blazqu, J.; Barbera, H.; "A Multiagent Architecture for Fuzzy Modeling", 1999, Int. J. Intelligent Systems, vol. 14, pp. 305-329.
IRobot; "Mobility Robot Integration Software Users Guide", 2000, 129 pages.
International Business Machines Corporation; "Neural Network Utility Family", Oct. 16, 2000, Downloaded using Internet Archive Wayback Machine.
Noel, L.; Wong, K.; Hopgood, A.; "DARBS: A Distributed Blackboard System", 2001, Springer-Verlag, Inc., Proc. ES2001, pp. 161-170.
Internet Archive Wayback Machine; "Mathematical Programming Glossary—N", Mar. 6, 2001.
Bruyninckx, H.; "Orocos: design and implementation of a robot control software framework", Apr. 1, 2002, Orocos.Org, (9 pages).
Mallet, A.; Fleury, S.; Bruyninckx, H.; "A specification of generic robotics software components: future evolutions of GenoM in the Orocos context", Nov. 24, 2003, 6 pages. pdf creation date Nov. 24, 2003.
Baillie, J.; "The URBI Tutorial—v1.1", May 1, 2006, Gostai, (84 pages).
AIST (Nat. Inst. Of Adv. Industrial Sicence and Tech.); "OpenRTM-aist-0.2.0 Developer's Guide", Sep. 20, 2006, (116 pages) pdf creation date Sep. 20, 2006.
Robot Information Forum; "Robot Information Forum in OMG TM (Quebec) and Associated Presentations", Aug. 24, 2004, (55 pages).
Fumio, O.; "Open Robot Controller Architecture (ORCA)", Oct. 29, 2004, Toshiba Corporation, (38 pages) pdf creation date Oct. 29, 2004.
Munich, M.; Ostrowski, J.; Pirjanian, P.; "ERSP: A Software Platform and Architecture for the Service Robot Industry", 2005, International Conference on Intelligent Robots and Systems, (8 pages) Proc. of the Int. Conf. on Intelligent Robots and Systems (IROS) 2005.
Narita, M.; Shimamura, M.; Oya, M.; "Reliable Protocol for Robot Communication on Web Services", 2005, IEEE Computer Society Press, (8 pages) Proceedings of the 2005 International Conference on Cyberworlds (CW05).
Smith, G.; Smith, R.; Wardhani, A.; "Software reuse across robotic platforms: Limiting the effects of diversity", 2005, Australian Software Engineering Conference, (10 pages) copyright 2005, Proceedings of the 2005 ASWEC.
AIST (Nat. Inst. of Adv. Industrial Sicence and Tech.); "Robotics DSIG Plenary Meeting and Associated Presentations", Apr. 3, 2005, (57 pages).
Narita, M.; Shimamura, M.; Oya, M.; "Reliable Robot Communication on Web Services", Apr. 12, 2005, Journal of Robotics and Mechatronics, (2 pages) vol. 18, No. 1, 2006, pp. 36-37.
Tansley, S.; "Robots in Academia", Jun. 20, 2005, Microsoft Corporation, (31 pages) pdf creation date Jun. 20, 2005.
Collett, T.; Gerkey, B.; "Player 2.0: Toward a Practical Robot Programming Framework", Nov. 18, 2005, (8 pages) pdf creation date Nov. 18, 2005.
Tribelhorn, B.; Dodds, Z.; "Envisioning the Roomba as AI Resource: A Classroom and Laboratory Evaluation", 2006, American Association for Artificial Intelligence, (6 pages) copyright date 2006.
USPTO; "USPTO Patent FileHist: (U.S. Appl. No. 12/271,724)—Office Action", Apr. 27, 2010, (153 pages).

ROY-G-BIV Corporation; "USPTO Patent FileHist: (U.S. Appl. No. 11/370,082) File History—Response to Office Action", Jul. 16, 2010, (10 pages).
USPTO; "USPTO Patent FileHist: (U.S. Appl. No. 11/375,502) File History; Final Office Action", Jul. 21, 2010, (195 pages).
ROY-G-BIV Corporation; "USPTO Patent FileHist: (U.S. Appl. No. 10/966,848)—Amend After Notice of Allowance, Formal Drawings", Jul. 29, 2010, (19 pages).
ROY-G-BIV Corporation; "USPTO Patent FileHist: (U.S. Appl. No. 12/406,921) File History—Preliminary Amendment", Jul. 29, 2010, (21 pages).
USPTO; "USPTO Patent FileHist: (U.S. Appl. No. 10/405,883) File History; Non-Final Office Action", Aug. 5, 2010, (30 pages).
Pava, G.; "Design Specification for the Real Time Platform Middleware—Revision 2.4", Jan. 13, 2005, (51 pages).
JPO; "JPO FileHist: Japanese Patent Application No. JP2003513348: Office Action", Jun. 10, 2010, (7 pages).
ROY-G-BIV Corporation; "USPTO Patent FileHist: (U.S. Appl. No. 12/271,724)—Response to Non-Final Office Action", Aug. 27, 2010, (10 pages).
ROY-G-BIV Corporation; "USPTO Patent FileHist: 7110.00002 (U.S. Appl. No. 12/263,953) File History: Response to Non-Final Office Action", Aug. 31, 2010, (7 pages).
USPTO; "USPTO Patent FileHist: 7110.00001 (U.S. Appl. No. 12/400,098) File History", Feb. 11, 2010, (1075 pages).
USPTO; "USPTO Patent FileHist: 7110.00002 (U.S. Appl. No. 12/263,953) File History", Feb. 11, 2010, (1054 pages).
USPTO; "USPTO Patent FileHist: 7110.00003 (U.S. Appl. No. 12/326,565) File History", Feb. 11, 2010, (1063 pages).
USPTO; "USPTO Patent FileHist: 7110.00004 (U.S. Appl. No. 12/390,779) File History", Feb. 11, 2010, (968 pages).
USPTO; "USPTO Patent FileHist: (U.S. Appl. No. 11/454,053) File History", Feb. 11, 2010, (835 pages).
USPTO; "USPTO Patent FileHist: (U.S. Appl. No. 12/244,673) File History", Feb. 11, 2010, (1005 pages).
USPTO; "USPTO Patent FileHist: (U.S. Appl. No. 12/406,921) File History", Feb. 11, 2010, (539 pages).
USPTO; "USPTO Patent FileHist: (U.S. Appl. No. 12/494,163) File History", Feb. 11, 2010, (384 pages).
USPTO; "USPTO Patent FileHist: (U.S. Appl. No. 12/244,673) File History: Terminal Disclaimer", Feb. 16, 2010, (13 pages).
ROY-G-BIV Corporation; "USPTO Patent FileHist: (U.S. Appl. No. 11/454,053) File History: Response to Office Action", Feb. 22, 2010, (14 pages).
Michalewicz, Z.; "Genetic Algorithms plus Data Structures equals Evolution Programs", 1992, Springer-Verlag, Inc., (393 pages).
Teller, A.; "Algorithm Evolution with Internal Reinforcement for Signal Understanding", Dec. 5, 1998, (166 pages).
PLCopen; "Function blocks for motion control—Version 1.0", Nov. 23, 2001, (68 pages) Technical Specification PLCopen—Technical Committee 2—Task Force.
PLCopen; "Function blocks for motion control—Version 1.1", Apr. 9, 2005, (86 pages) Technical Specification PLCopen—Technical Committee 2—Task Force.
Automationdirect; "Automation Notebook", Sep. 1, 2005, (31 pages).
PLCopen; "Function Blocks for motion control: Part 2—Extensions—Version 1.0", Sep. 16, 2005, (44 pages) Technical Paper PLCopen Technical Committee—PLC open Official Document.
ABB; "IndustrialIT Compact HMI 800, System Version 4.1—Product Guide", Oct. 1, 2005, (98 pages).
Individual; "Function Blocks for motion control: Part 5—Homing—Version 0.99", Nov. 10, 2005, (31 pages) Technical Paper PLCopen Technical Committee 2—Task Force.
ROY-G-BIV Corporation; "USPTO Patent FileHist: (U.S. Appl. No. 11/084,673) File History", Jun. 25, 2008, (800 pages).
ROY-G-BIV Corporation; "USPTO Patent FileHist:(U.S. Appl. No. 10/844,025) File History", Dec. 2, 2008, (1318 pages).
USPTO; "USPTO Patent FileHist: (U.S. Appl. No. 10/844,025) File History—Final Office Action", Dec. 29, 2008, (22 pages).
USPTO; "USPTO Patent FileHist: (U.S. Appl. No. 10/405,883) File History—Non-Final Office Action", Feb. 25, 2009, (65 pages).

JPO; "Foreign FileHist: Japanese Patent Application No. JP2007102796—Office Action", Nov. 12, 2009, (1 pages).
ROY-G-BIV Corporation; "USPTO Patent FileHist: (U.S. Appl. No. 11/728,801)—Response After Notice of Allowance", Nov. 1, 2010, (2 pages).
ROY-G-BIV Corporation; "Foreign FileHist: European Patent Application No. EP04816957—Response to Examination Report", Nov. 9, 2010, (7 pages).
USPTO; "USPTO Patent FileHist: (U.S. Appl. No. 12/271,724)—Final Office Action", Nov. 10, 2010, (269 pages).
USPTO; "USPTO Patent FileHist: (U.S. Appl. No. 10/966,848)—Issue Notification", Nov. 23, 2010, (1 page).
USPTO; "USPTO Patent FileHist: (U.S. Appl. No. 11/454,053)—Final Office Action", Nov. 23, 2010, (20 pages).
ROY-G-BIV Corporation; "USPTO Patent FileHist: 7110.00002 (U.S. Appl. No. 12/263,953)—Letter to Examiner", Nov. 24, 2010, (4 pages).
USPTO; "USPTO Patent FileHist: (U.S. Appl. No. 12/244,673) File History—Final Office Action", Nov. 29, 2010, (228 pages).
USPTO; "USPTO Patent FileHist: (U.S. Appl. No. 12/406,921) File History—Non-Final Office Action", Dec. 3, 2010, (278 pages).
ROY-G-BIV Corporation; "USPTO Patent FileHist: (U.S. Appl. No. 10/405,883) Amendment and Response to Non-Final Office Action", Dec. 6, 2010, (8 pages).
USPTO; "USPTO Patent FileHist: (U.S. Appl. No. 11/728,801)—Notice of Allowance", Dec. 14, 2010, (8 pages).
ROY-G-BIV Corporation; "USPTO Patent FileHist: (U.S. Appl. No. 11/454,053) File History—Second Request for Reconsideration After Final Rejection", Dec. 22, 2010, (4 pages).
ROY-G-BIV Corporation; "USPTO Patent FileHist: 7110.00001 (U.S. Appl. No. 12/400,098) File History—Response after Non-Final Office Action", Dec. 28, 2010, (8 pages).
ROY-G-BIV Corporation; "USPTO Patent FileHist: 7110.00004 (U.S. Appl. No. 12/390,779) File History—Response after Non-Final Office Action", Dec. 30, 2010, (9 pages).
ROY-G-BIV Corporation; "USPTO Patent FileHist: (U.S. Appl. No. 12/244,673) File History—Response after Final Office Action", Jan. 5, 2011, (4 pages).
USPTO; "USPTO Patent FileHist: (U.S. Appl. No. 10/405,883) File History—Final Office Action", Dec. 28, 2009, (77 pages).
EPO; "Foreign FileHist: European Patent Application No. EP04809804—Examination Report", Dec. 15, 2010, (5 pages).
USPTO; "USPTO Patent FileHist: (U.S. Appl. No. 11/454,053) File History—Advisory Action after Final Office Action", Jan. 13, 2011, (3 pages).
USPTO; "USPTO Patent FileHist: (U.S. Appl. No. 12/244,673) File History—Advisory Action after Final Office Action", Jan. 13, 2011, (2 pages).
ROY-G-BIV Corporation; "USPTO Patent FileHist: (U.S. Appl. No. 11/454,053) File History—Second Request For Reconsideration After Final Rejection", Feb. 4, 2011, (3 pages).
ROY-G-BIV Corporation; "USPTO Patent FileHist: (U.S. Appl. No. 12/244,673) File History—Second Request for Reconsideration after Final Office Action", Feb. 4, 2011, (3 pages).
USPTO; "USPTO Patent FileHist: (U.S. Appl. No. 10/405,883) File History—Final Office Action", Feb. 10, 2011, (28 pages).
ROY-G-BIV Corporation; "Canadian Patent FileHist: Canadian Patent Application No. 2,625,283 Petition for Reinstatement", Feb. 16, 2011, (7 pages).
USPTO; "USPTO Patent FileHist: (U.S. Appl. No. 12/244,673) File History—Final Office Action", Feb. 25, 2011, (17 pages).
USPTO: "USPTO Patent FileHist: (U.S. Appl. No. 11/454,053) File History—Final Office Action", Mar. 1, 2011, (21 pages).
Neitzel, L.; "OPC Unified Architecture Internals", Oct. 5, 2004, ISA, (13 pages).
ROY-G-BIV Corporation; "USPTO Patent FileHist: (U.S. Appl. No. 11/370,082) File History—Request for Continued Examination", Mar. 7, 2011, (9 pages).
CIPO; "Foreign FileHist: Canadian Patent Application No. CA 2,625,283—Notice of Reinstatement", Mar. 8, 2011, 1 page.
USPTO; "USPTO Patent FileHist: (U.S. Appl. No. 11/728,801) Issue Notification", Mar. 8, 2011, (1 page).
ROY-G-BIV Corporation; "USPTO Patent FileHist: (U.S. Appl. No. 11/454,053) File History—Petition for Extension of Time", Mar. 14, 2011, (2 pages).
USPTO; "USPTO Patent FileHist: 7110.00001 (U.S. Appl. No. 12/400,098) File History—Final Office Action", Mar. 17, 2011, (37 pages).
USPTO; "USPTO Patent FileHist: 7110.00004 (U.S. Appl. No. 12/390,779) File History—Final Office Action", Mar. 22, 2011, (41 pages).
Brown, D.; Stein, S.; "USPTO Patent FileHist: (U.S. Appl. No. 12/896,750) File History—Published Application US 2011/0071652", Mar. 24, 2011, USPTO, (33 pages).
Brown, D.; Clark, J.; "Foreign FileHist: European Patent Publication No. EP2302475", Mar. 30, 2011, EPO, (149 pages).
ROY-G-BIV Corporation; "USPTO Patent FileHist: (U.S. Appl. No. 12/406,921) File History—Response to Non-Final Office Action", Apr. 4, 2011, (3 pages).
EPO; "Foreign FileHist: European Patent Application No. EP08013237—Examination Report", Apr. 5, 2011, (5 pages).
USPTO; "USPTO Patent FileHist: (U.S. Appl. No. 11/370,082) File History—Non-Final Office Action", Apr. 11, 2011, (34 pages).
USPTO; "ReEx: U.S. Patent No. 5,691,897 Ex-Partes Reexamination (Control No. 90/009,282)—Ex Parte Reexamination Certificate (7971st)", Jan. 11, 2011, 9 pages.
USPTO; "ReEx: U.S. Patent No. 6,513,058 Reexamination (Control No. 95/000,398)—Right of Appeal Notice", Jan. 26, 2011, (10 pages).
USPTO; "ReEx: U.S. Patent No. 6,516,236 Reexamination (Control No. 95/000,396)—Right of Appeal Notice", Jan. 26, 2011, (10 pages).
USPTO; "ReEx: U.S. Patent No. 6,941,543 Reexamination (Control No. 95/000,397)—Right of Appeal Notice", Jan. 26, 2011, (13 pages).
ROY-G-BIV Corporation; "ReEx: U.S. Patent No. 5,691,897 Reexamination (Control No. 90/009,282)—Certificate of Correction Filing", Feb. 24, 2011, (9 pages).
ROY-G-BIV Corporation; "ReEx: U.S. Patent No. 6,941,543 Reexamination (Control No. 95/000,397)—Notice of Appeal", Feb. 24, 2011, (4 pages).
USPTO; "ReEx: U.S. Patent No. 6,513,058 Reexamination (Control No. 95/000,398)—Notice of Intent to Issue Inter Partes ReExamination Certificate", Mar. 28, 2011, (5 pages).
USPTO; "ReEx: U.S. Patent No. 6,516,236 Reexamination (Control No. 95/000,396)—Notice of Intent to Issue Inter Partes ReExamination Certificate", Mar. 28, 2011, (5 pages).
Zadeh, L.; "Fuzzy Logic, Neural Networks, and Soft Computing", Mar. 1, 1994, ACM, (8 pages) Mar. 1994 issue of Communications of the ACM/vol. 37, No. 3.
Gerkey, B.; Vaughan, R.; Howard, A.; "Player Version 1.5 User Manual", Jun. 2, 2004, (169 pages).
Ha, Y.; Sohn, J.; Cho, Y.; Yoon, H.; "Towards a Ubiquitous Robotic Companion: Design and Implementation of Ubiquitous Robotic Service Framework", Jul. 20, 2005, ETRI Journal, (11 pages) vol. 27, No. 6, Dec. 2005.
Brown, D.; Clark, J.; "Foreign FileHist: Canadian Patent Application No. CA 2,705,404—File History", Jun. 1, 2010, CIPO, (190 pages).
EPO; "Foreign FileHist: European Patent Application No. EP04809804—Search Report", Sep. 2, 2010, (3 pages).
USPTO; "USPTO Patent FileHist: (U.S. Appl. No. 11/728,801) Notice of Allowance", Sep. 13, 2010, (31 pages).
ROY-G-BIV Corporation; "USPTO Patent FileHist: (U.S. Appl. No. 11/728,801) Amendment after Notice of Allowance", Sep. 17, 2010, (2 pages).
USPTO; "USPTO Patent FileHist: 7110.00004 (U.S. Appl. No. 12/390,779) File History—Non-Final Office Action", Sep. 30, 2010, (352 pages).
USPTO; "USPTO Patent FileHist: (U.S. Appl. No. 11/370,082) File History—Final Office Action", Oct. 5, 2010, (122 pages).
Brown, D.; Clark, J.; "Foreign FileHist: European Patent Application No. EP08013237—File History", Oct. 8, 2010, EPO, (198 pages).
USPTO; "USPTO Patent FileHist: (U.S. Appl. No. 11/454,053) File History—Final Office Action", Oct. 14, 2010, (127 pages).

USPTO; "ReEx: U.S. Patent No. 6,513,058 Reexamination (Control No. 95/000,398)—Action Closing Prosecution", Sep. 22, 2010, (144 pages).

USPTO; "ReEx: U.S. Patent No. 6,516,236 Reexamination (Control No. 95/000,396)—Action Closing Prosecution", Sep. 22, 2010, (147 pages).

USPTO; "ReEx: U.S. Patent No. 6,941,543 Reexamination (Control No. 95/000,397)—Action Closing Prosecution", Sep. 22, 2010, (141 pages).

ROY-G-BIV Corporation; "ReEx: U.S. Patent No. 6,513,058 Reexamination (Control No. 95/000,398)—Petition Requesting Termination of Reexamination Proceedings", Sep. 28, 2010, (34 pages).

ROY-G-BIV Corporation; "ReEx: U.S. Patent No. 6,516,236 Reexamination (Control No. 95/000,396)—Petition Requesting Termination of Reexamination Proceedings", Sep. 28, 2010, (34 pages).

ROY-G-BIV Corporation; "ReEx: U.S. Patent No. 6,941,543 Reexamination (Control No. 95/000,397)—Petition Requesting Termination of Reexamination Proceedings", Sep. 28, 2010, (34 pages).

ROY-G-BIV Corporation; "ReEx: U.S. Patent No. 6,516,236 Reexamination (Control No. 95/000,396)—Patent Owner's Comments in Response to the Action Closing Prosecution", Oct. 8, 2010, (40 pages).

ROY-G-BIV Corporation; "ReEx: U.S. Patent No. 6,513,058 Reexamination (Control No. 95/000,398)—Patent Owner's Comments in Response to the Action Closing Prosecution", Oct. 12, 2010, (38 pages).

ROY-G-BIV Corporation; "ReEx: U.S. Patent No. 6,941,543 Reexamination (Control No. 95/000,397)—Patent Owner's Comments in Response to the Action Closing Prosecution", Oct. 13, 2010, (43 pages).

USPTO; "USPTO Patent FileHist: 7110.00001 (U.S. Appl. No. 12/400,098) File History—Non-Final Office Action", Sep. 28, 2010, (479 pages).

ROY-G-BIV Corporation; "USPTO Patent FileHist: (U.S. Appl. No. 11/454,053) File History —Request for Reconsideration After Final Rejection", Oct. 26, 2010, (4 pages).

USPTO; "ReEx: U.S. Patent No. 5,691,897 Reexamination (Control No. 90/009,282)—All Rejections Withdrawn", Oct. 14, 2010, (6 pages).

ROY-G-BIV Corporation; "ReEx: U.S. Patent No. 6,941,543 Reexamination (Control No. 95/000,397)—Patent Owner's Appeal Brief", Apr. 22, 2011, (23 pages).

USPTO; "ReEx: U.S. Patent No. 5,691,897 Ex-Partes Reexamination (Control No. 90/009,282)—Certificate of Correction", May 24, 2011, (4 pages).

ROY-G-BIV Corporation; "USPTO Patent FileHist: (U.S. Appl. No. 10/405,883) File History—Amendment After Final Rejection", May 10, 2011, (9 pages).

USPTO; "USPTO Patent FileHist: (U.S. Appl. No. 12/494,163)—Non Final Office Action", May 12, 2011, (7 pages).

USPTO; " USPTO Patent FileHist: (U.S. Appl. No. 10/405,883) File History; Notice of Allowance", May 26, 2011, (8 pages).

ROY-G-BIV Corporation; "USPTO Patent FileHist: 7110.00002 (U.S. Appl. No. 12/263,953)—Request for Continued Examination", Jun. 19, 2011, (7 pages).

ROY-G-BIV Corporation; "Foreign FileHist: European Patent Application No. EP04809804—Response to Examination Report", Jun. 16, 2011, (16 pages).

USPTO; "USPTO Patent FileHist: (U.S. Appl. No. 12/406,921) File History—Notice of Allowance", Jun. 23, 2011, (32 pages).

CIPO; "Foreign FileHist: Canadian Patent Application No. CA 2,705,404—Office Action", Jul. 4, 2011, (4 pages).

CIPO; "Foreign FileHist: Canadian Patent Application No. CA 2,625,283—Office Action", Jul. 11, 2011, (2 pages).

\* cited by examiner

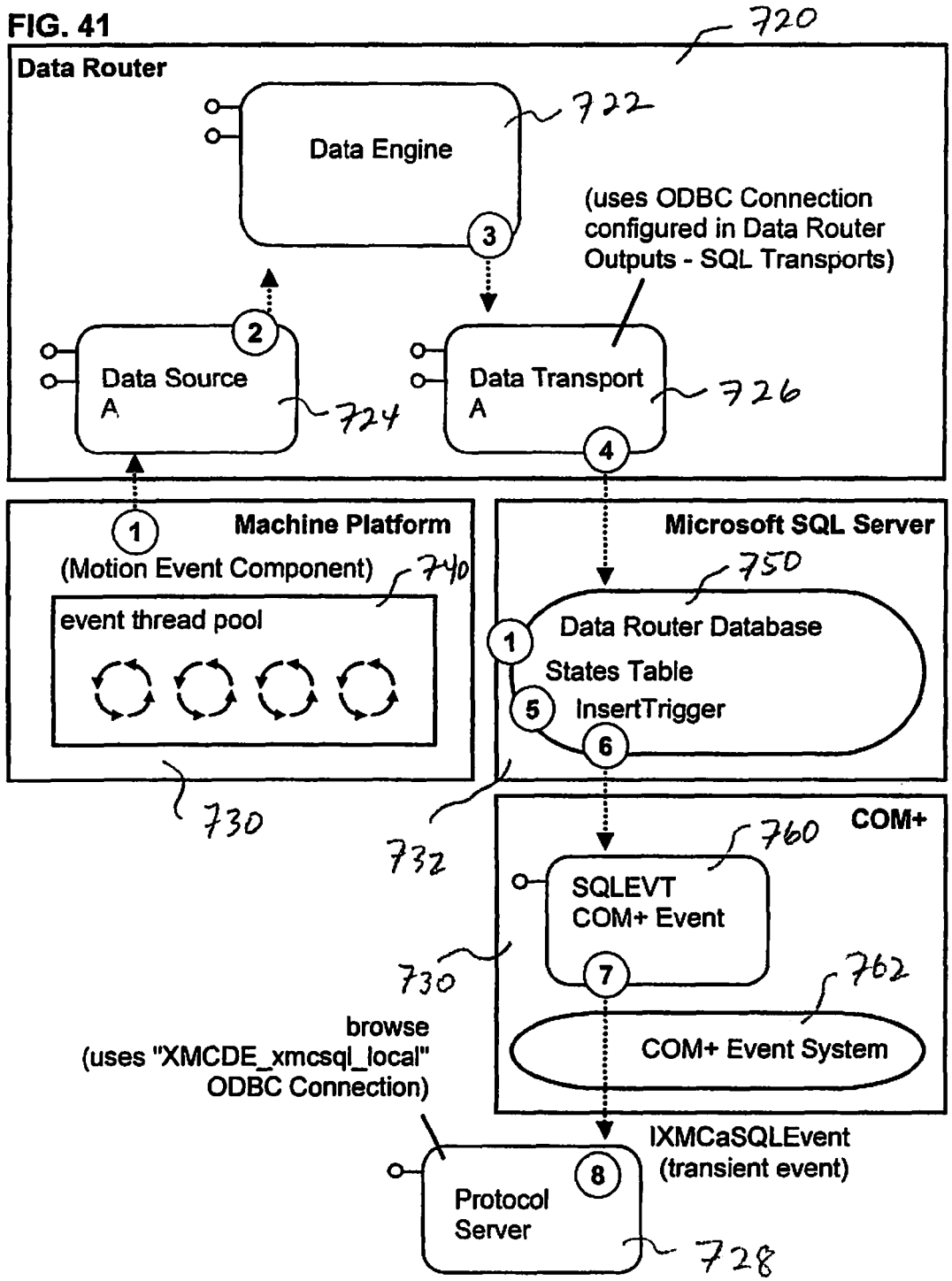

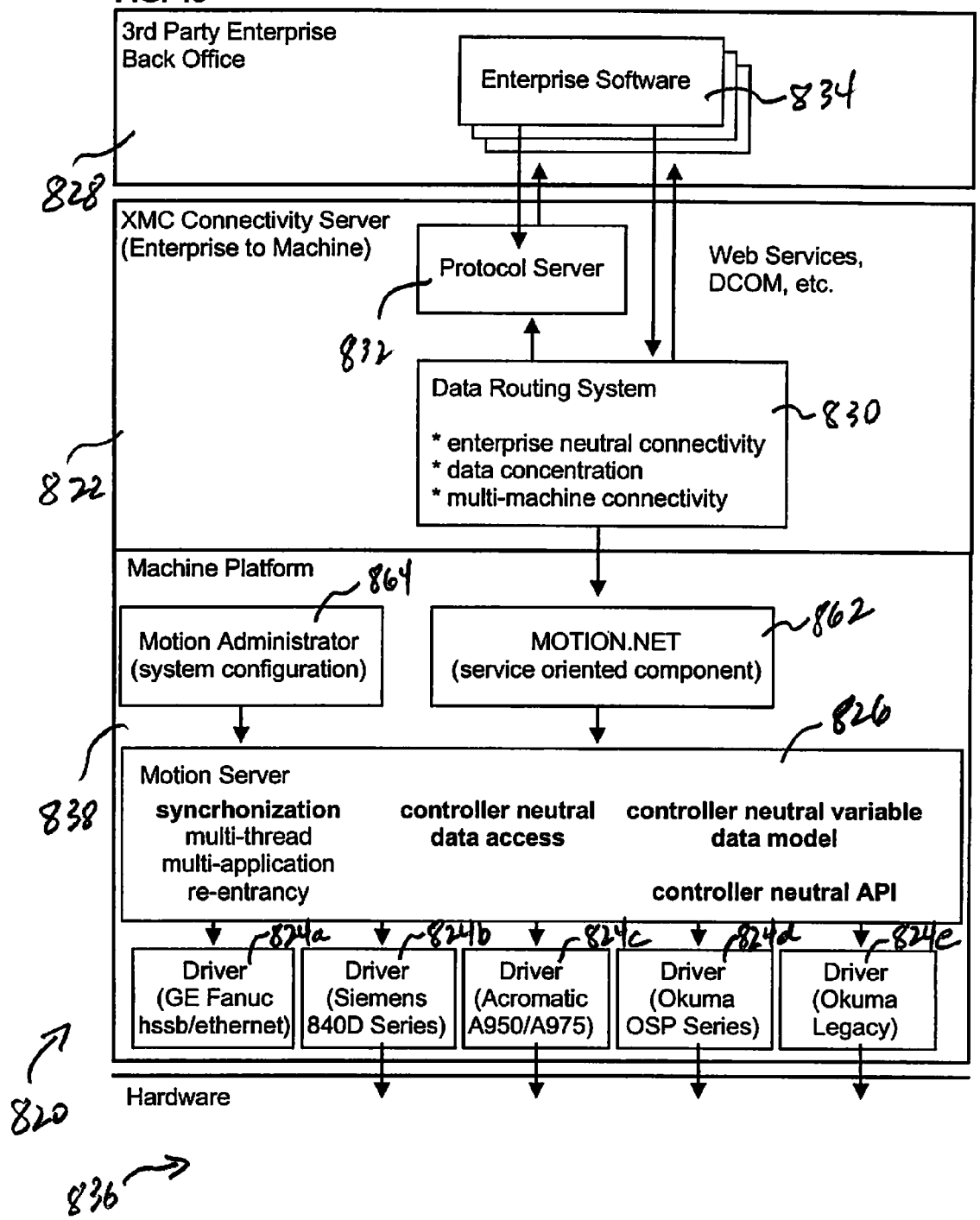

DATABASE EVENT DRIVEN MOTION SYSTEMS

RELATED APPLICATIONS

This application is a continuation of U.S. patent application Ser. No. 11/583,233 filed Oct. 18, 2006, which claims priority of U.S. Provisional Patent Application Ser. No. 60/727,901 filed Oct. 18, 2005.

U.S. patent application Ser. No. 11/583,233 is also a continuation-in-part of U.S. patent application Ser. No. 11/505,056 filed Aug. 15, 2006, now abandoned, which claims priority of U.S. Provisional Patent Application Ser. No. 60/708,699 filed Aug. 15, 2005.

U.S. patent application Ser. No. 11/583,233 is also a continuation-in-part of U.S. patent application Ser. No. 10/844,025 filed May 12, 2004, now abandoned, which claims priority of U.S. Provisional Patent Application Ser. No. 60/506,104 filed Sep. 25, 2003.

U.S. patent application Ser. No. 11/505,056, is also a continuation-in-part of U.S. patent application Ser. No. 10/991,905 filed Nov. 17, 2004, now abandoned, which claims priority of U.S. Provisional Patent Application Ser. No. 60/520,918 filed Nov. 17, 2003.

The contents of all related applications listed above are incorporated herein by reference.

TECHNICAL FIELD

The present invention relates to computer systems for collecting data from one or more disparate data sources and distributing the collected data to one or more disparate data destinations and distributing software commands from one or more command sources to one or more command targets.

BACKGROUND

The present invention is used in the context of collecting and distributing data and control commands in the context of motion control machines or devices. The present application uses the term "routing" to refer to the process of both collecting data from data origins and distributing data to data destinations. The terms "data" and "data items" are used herein to refer to numeric, binary, or string data generated in an analog or digital format. Data is typically generated by machines, devices, or the like forming part of a larger working environment. The term "machine" as used herein refers to a physical asset used to perform a predetermined task. The term "device" is typically applied to a machine with a relatively small footprint.

The data origin or origins thus may be formed by any machine or device (mobile or not) that stores data and which is either directly controlled by humans through a user interface or automatically controlled via a computer based system. However, the present invention is of particular significance in the context of a working environment defined by a motion control system, and that application of the present invention will be described in detail below. The present invention may have broader application to other working environments, however, and the scope of the present invention should be determined by the claims appended hereto and not the following detailed description.

A motion control system typically comprises a plurality of motion control machines or devices each programmed to perform an individual task. The motion control system is configured to coordinate the individual tasks so that the motion control system itself performs a combined task. In the context of motion control systems, control commands are transmitted to motion control devices such as computer numeric control (CNC) systems, general motion control (GMC) automation systems, and hardware independent data engines for motion control systems. The term "command target" will be used to refer to any destination motion control device or machine or any location on device or machine that can carry out a command using command data as described herein. In some situations, these control commands come from a variety of sources, which will be referred to herein as command sources.

Each motion control machine or device comprises a controller that generates and/or stores data indicative of the state of the machine or device at a particular point in time. Typically, some or all of this data changes because the state of the machine changes as the machine performs its individual task.

The data generated and/or stored by the motion control machines and/or devices of a motion control system can be used to optimize the performance of one or more of the individual machines as well as the entire motion control system. The data destinations where the data is sent can thus take any one or more of a number of forms, including a database system, a plant floor process management system, software used to optimize overall production flow, other software systems, and/or another data routing system as described herein.

The collection and distribution of the data and control commands associated with individual motion control machines is, however, complicated by several factors. The sheer volume of data can overwhelm the ability of the data destination to store and/or process the data collected. In addition, the data origins and data destination may employ different, unique, or proprietary hardware and software systems that utilize different data acquisition commands, data formats, and data transmission protocols.

The need thus exists for data routing systems and methods that organize the distribution of control commands form a variety of types of command sources to a variety of types of command targets, facilitate the collection of data from diverse data origins, and facilitate the subsequent distribution of data to diverse data destinations.

SUMMARY

The present invention may be embodied as a data collection system for distributing data from at least one target asset to at least one software application, comprising a machine platform and a data routing system. The machine platform stores data associated with the at least one target asset. The data routing system collects data from the machine platform. The data routing system operates in a pass through mode and a data processing mode. In the pass through mode, data is passed from the at least one target asset to the at least one software application without modification. In the data processing mode, the data routing system generates modified data based on the data stored by the machine platform and sends the modified data to the at least one software application.

DETAILED DESCRIPTION OF THE DRAWINGS

FIG. 41 is a module interaction map depicting the process of updating data;

FIG. 49 depicts further details of an example data router collection; and

DETAILED DESCRIPTION

I. First Embodiment

Data Distribution

Figure 1:
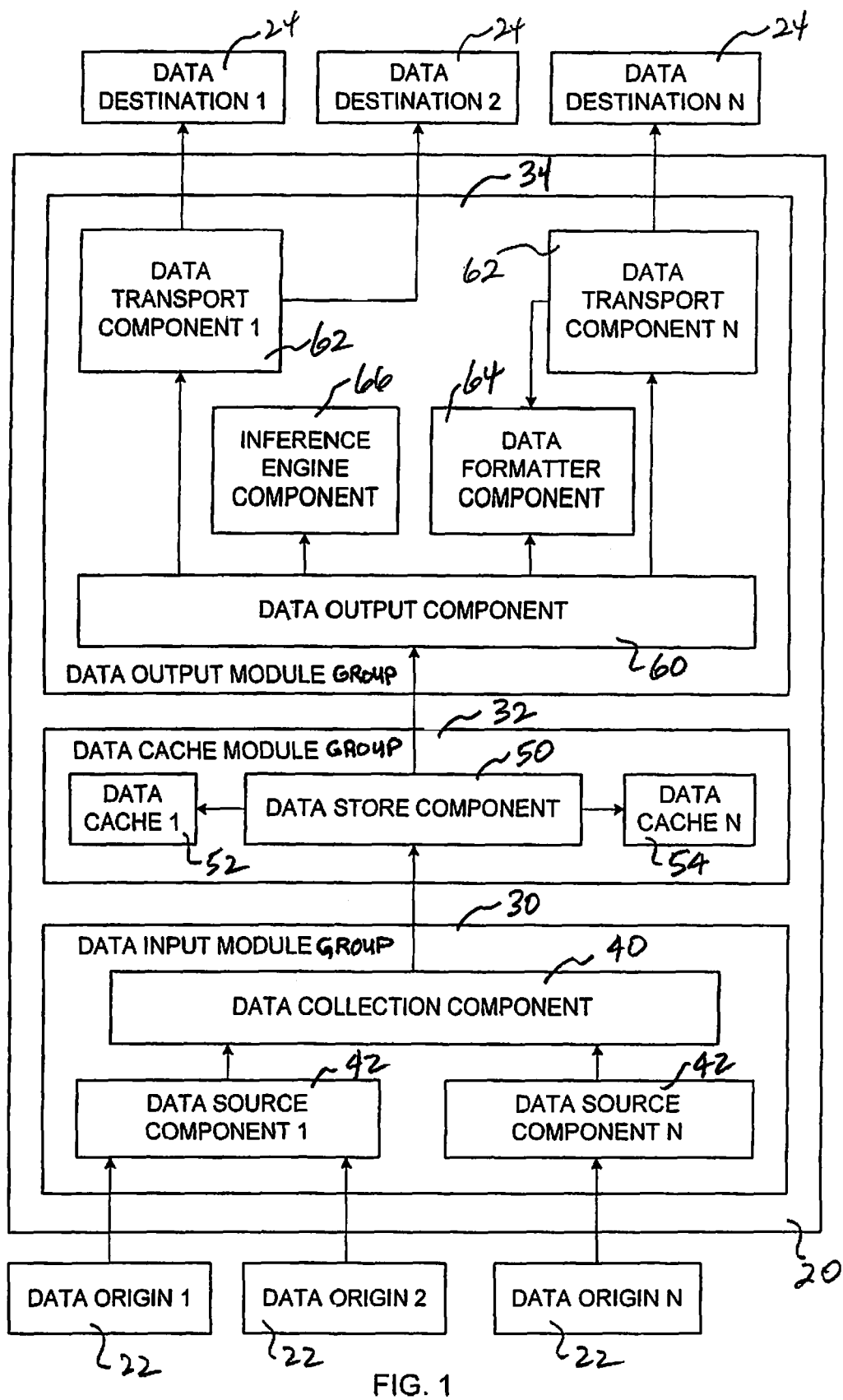
FIG. 1 is a somewhat schematic block diagram of a data routing system of a first embodiment of the present invention.

Referring initially to FIG. 1 of the drawing, depicted therein is a data routing system 20 constructed in accordance with, and embodying, the principles of the present invention. The data routing system 20 is used to route data or data items collected from data origins 22 to one or more data destinations 24.

As described above, the terms "data" and "data items" will be used herein to refer to numeric, binary, or string data values collected in an analog or digital format from a data origin 22. Examples of data types that represent data or data items as defined herein include ADDRESS, ARRAY, BIT, BYTE, WORD, DWORD, LONG, REAL, DOUBLE, FLOAT, BINARY BLOB, STRUCTURE, STRING, and ASCII STRING.

The data origins 22 are machines, devices, or the like forming part of a larger working environment. The working environment is not a part of the present invention and thus will not be described herein beyond what is necessary for a complete understanding of the invention. The terms "machine" as used herein refers to a physical asset used to perform a predetermined task. The term "device" is typically applied to a machine with a relatively small footprint.

Examples of machines as defined herein include a CNC mill used to shape metal, a pick-n-place machine used to position parts on a circuit board, a robotic machine used to perform surgery, a medical data input device (i.e. blood glucose meter, asthma meter, etc), a gaming device, a robotic toy, an animatronics figure, a robotic machine used to deliver goods to a warehouse or to people, an automobile, a truck or farm vehicle, a boat or ship, an airplane, a jet, a helicopter, a spacecraft, and/or a hardware or software-based control system within a personal computer or even just a personal computer or hand-held computer itself. The data origin or origins thus may be formed by any machine or device (mobile or not) that stores data and which is either directly controlled by humans through a user interface or automatically controlled via a computer based system.

As shown in FIG. 1, the data collected by the data routing system 20 is delivered to one or more data destinations 24. The data destinations 24 can take on many forms and serve many functions, but a primary function of the data destinations 24 is to use the data collected from the machines in the working environment to optimize operation of the individual machines and the overall working environment.

The example data routing system 20 is a software system that comprises a data input module group 30, an optional data cache module group 32, and a data output module group 34. The term "module" as used herein refers to a binary block of computer logic that contains functions, objects, components, ActiveX components, .NET source, HTML, XML and/or other computer code that can be executed in real-time or in script form. Several examples of a module include an executable EXE, a dynamic link library DLL, an OLE component or set of components housed within a DLL or EXE, an ActiveX Control, an HTML or XML based Control, a VB script source file, a Java Serverlet, Java Control, Java Object, .NET Package, etc.

The data input module group 30, data cache module group 32, and data output module group 34 typically run on a processor forming part of a computer system, but may be configured to operate across several discrete processors forming part of one or more computer systems.

The data routing system 20 operates basically as follows. The data input module group 30 communicates with one or more data origins 22 to obtain data indicative of a state or condition of the machine or device forming each of the data origins 22. If used, the data cache module group 32 temporarily or persistently stores the data collected by the data input module group 30. The data output module group 34 determines the conditions under which data collected by the data input module group 30 stored in the data cache module group 32 is sent to one or more of the data destinations 24. The data output module group 34 optionally also determines the format in which data is sent to the data destination 24 and/or the method of transporting the data to the data destination 24.

The example data input module group 30 comprises a data collection component 40 and one or more data source components 42. The term "component" as used herein refers to a logical organization of computer commands designed to perform an operation or set of operations. Examples of components include OLE components, ActiveX controls, HTML or XML based controls, HTML or XML based objects, .NET objects, C++ objects, C function set, Visual Basic objects, and the like. A component may operate on a single processor or may be distributed across a plurality of processors.

The data collection component 40 associates all of the data collected with the data origins 22 from which the data was collected. The data collection component 40 may be connected directly to one or more of the data origins 22 or may be connected to one or more of the data origins 22 through the data source components 42 as shown. If the data collection component 40 is connected directly to a data origin 22, the data collection component 40 and the data origin 22 must be pre-configured to work with each other, and the data collection component 40 is considered data origin independent, whereas the data source component 42 is considered data origin dependent. However, if the data collection component 40 communicates directly with a data origin 22, it then becomes data origin dependent.

Preferably, however, one or more data source components 42 are provided to allow the data collection component 40 to operate in a data origin independent manner. In this case, the example data source components 42 are each associated with one or more of the data origins 22. The data source components 42 collect data from a particular data origin 22 or class of data origins 22 and pass this data to the data collection component 40 in a predetermined format. The data source components 42 may run entirely on the same processor or processors as the data routing system 20, entirely on a processor or processors associated with the data origin 22, or on processors associated with both the data routing system 20 and the data origin 22. Although optional, the use of the data source components 42 is preferred to isolate the data collection component 40 from the operational details of each of the data origins 22.

The data input module group 30 may collect data from the data origins 22 by one or more of a number of methods. For example, the data source components 42 and/or data collection component 40 may read register values on the machine or device, read shared memory provided by the machine or device, send commands to the machine or device for which a data response is given containing the data requested, read variables provided by the machine or device, read and write to variables in a sequence necessary to produce data values, query data using a proprietary or standard data protocol, call a function provided by the machine or device, build and send a command based on a protocol used to communicate with the machine or device for which a data response is provided by the machine or device from which the data is extracted, and/or the like.

The optional data cache module group 32 comprises a data store component 50 and at least one data cache 52. The data collection component 40 passes data to the data store component 50; the data store component 50 stores this data in one or more of the data caches 52. The data caches 52 may be temporary or volatile memory devices such as RAM or may be permanent or persistent memory such as a hard drive or database system. The data store component 50 further retrieves data from the appropriate data cache 52 as necessary. If the data cache module 32 is not used, data collected by the data collection component 40 is passed directly to the data output module group 34 in real time.

The data output module 34 comprises a data output component 60. As mentioned, the data output component 60 may receive data directly from the data collection component 40. However, if the data cache module 32 is used, the data output component 60 may direct the data store component 50 to read data stored in one or more of the data caches 52 and transfer the stored data to the data output component 60.

The data output module group 34 further comprises one or more data transport components 62. Each of the data transport components 62 defines or is associated with a method or system of transporting data from the data output component 60 to one or more of the data destinations 24. The data output component 60 selects an appropriate one of the data transport components 62 for each data element based on the data destination 24 to which the data element is to be sent.

Optionally, the data output module group 34 further comprises a data formatter component 64. The data formatter component 64 contains logic, templates, or the like for arranging data elements in a format appropriate for one or more of the data destinations 24. The data formatter component 64 allows the data destinations 24 to be implemented in a machine or device independent manner by obviating the need for the data destinations 24 to process data elements in the format generated by the data origins 22.

The data output module group 34 further optionally comprises an inference engine component 66. If used, the inference engine component 66 helps the data output component 60 to determine the data destination or destinations 24 where each data element is set. The inference engine component 66 may further assist the data output component 60 to make the determination of which data is to be output (if any) and/or which data transport component 62 to use and/or whether the data formatter component 64 is to be used.

The data routing system 20 of the present invention thus collects data from one or more data origins 22 and routes this data to one or more data destinations 24. The use of the data routing system 20 allows the data destination or destinations 24 to operate independent of the implementation details of the data origin or origins 22. In addition, the data routing system 20 can be configured to be independent of the data destination 20 through the use of the data transport components 62, and data formatter components 64.

Turning now to FIGS. 2-21 of the drawing, depicted therein is a data routing system 120 of the present invention. The example data routing system 120 operates in the same basic manner as the data routing system 20 described above but is optimized to operate in a working environment defined by a motion control system.

Figure 2A:
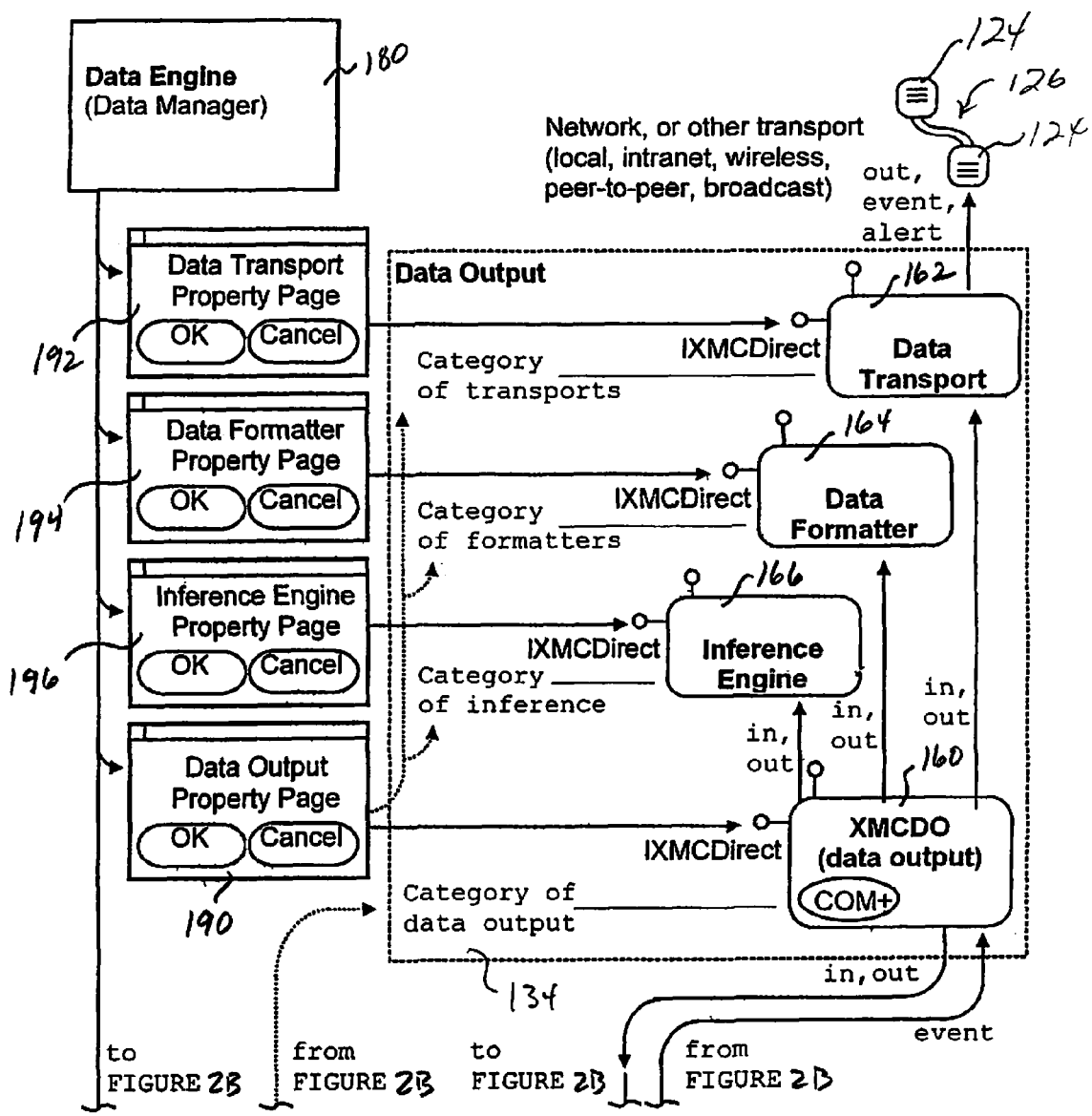
FIG. 2 is a somewhat schematic block diagram of a data routing system of a second embodiment of the present invention, where the data routing system has been optimized for use with a motion control system.
Figure 2B:
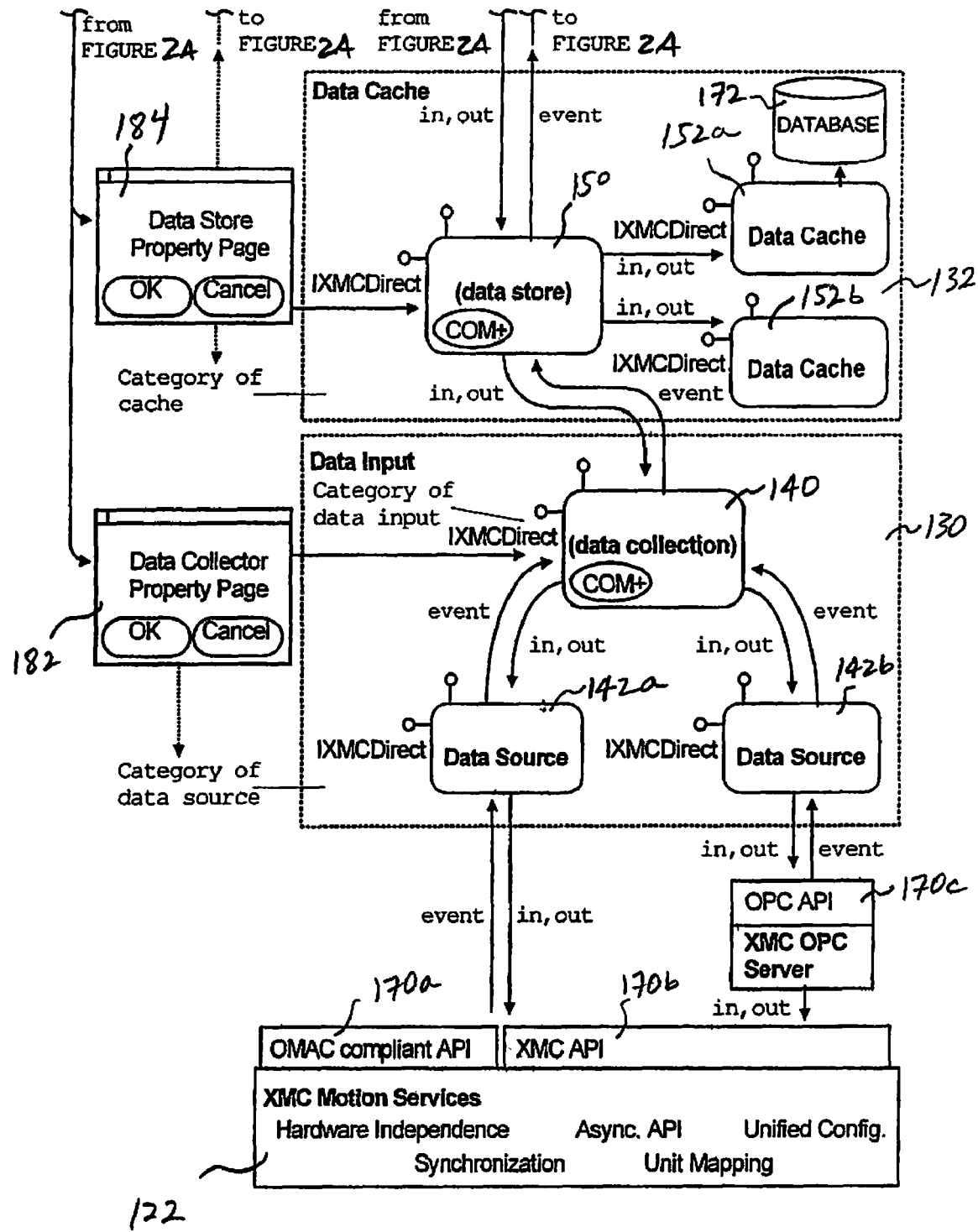

FIG. 2 illustrates that the data routing system 120 is a collection of modules or components used to collect machine data from the data origins 122 and then send some or all of the data collected to the data destinations 124. The data destinations 124 may be either a local data destination (for later replication to a remote data destination) or a remote site (either a remote data routing system or third party data destination).

The example motion system 122 as defined in U.S. Pat. No. 5,691,897, but other motion systems may be used instead or in addition. As will be described in further detail below, the motion system 122 defines or is associated with one or more application programming interfaces. The motion system 122 is not per se part of the present invention and will not be described herein beyond what is necessary for a complete understanding of the present invention.

The data destinations 124 may use the data delivered by the data routing system 20 for a variety of purposes. A primary function of the data destinations 124 is to optimize and/or monitor the operation of the machines and/or devices forming the motion control system that the motion services 122 or other software used by the data sources 142 communicate with. The data destinations 124 can thus take any one or more of a number of forms, including a database system, a plant floor process management system, software used to optimize overall production flow, or other software systems, and/or another data routing system as described herein.

The example data routing system 120 is connected to the data destination 124 through a network 126. The network 126 is a combination of hardware and software architectures that forms a link between two or more computer systems. Examples of network architectures include a packet based network, a streaming based network, broadcast based network, or peer-to-peer based network. Examples of networks that may be used as the network 126 include a TCP/IP network, the Internet, an Intranet, a wireless network using WiFi, a wireless network using radio waves and/or other light based signals, and the like.

The software components making up the example data routing system 120 may be organized into three module groups: a data input module group 130, a data cache module group 132, and a data output module group 134. The data input module group 130, data cache module group 132, and data output module group 134 typically run on a processor forming part of a computer system, but may be configured to operate across several discrete processors forming part of one or more computer systems connected by a computer network.

The data input module group 130 comprises a data collection component 140 and a plurality of data source components 142a and 142b. The data cache module group 132 comprises a data store component 150 and one or more data cache components 152. The data output module group 134 comprises a data output component 160, one or more data transport components 162, a data formatter component 164, and an inference engine component 166.

The data collection component 140 is responsible for collecting data from the machine asset and routing all data collected to the data cache module group 132. The data collection component 140 is responsible for managing one or more data source components 142 for which data is collected and route the data collected to the data cache module group 132.

The data source components 142a and 142b communicate with the motion system 122. Each data source communicates with the motion system using whatever means are available including to the use of application programming interfaces (API) 170a, 170b, and 170c associated with the motion system 122, using (API) provided by a motion system vendor, or using network or other communication protocols. The example data source component 142a is configured to receive data from the API's 170a and 170b, while the example data source component 142b is configured to receive data from the API 170c.

The example data collection component 40 manages one or more data source components 142 and is responsible for routing the data collected to the data store component 150 of the data cache module 132. Optionally, each data collection component 140 may communicate directly to the motion system 122 without the need for an intermediary data source component 142. However, the use of the data source component 142 allows for code reuse as the data collection component 140 may then implement all common functionality, thus making each data source component 142 extremely thin and easy to build and maintain. In addition, the use of each data source components 142 allows the data collection component 150 itself to be independent of each data origin with which each data source component 142 communicates to collect data.

Each data source component 142 is responsible for mapping the data collected from the data source (i.e. XMC API, XMC CNC API, Protocol Server, or proprietary data source) into the format expected by the data collection component 140 and ultimately the data store component 150. The main goal of the data source components 142 is to provide a consistent interface to the data origin 122, thereby freeing the client from the details of the data origin 122 and allowing all data source components 142 to act and operate in the same manner from the perspective of the data collection component 140.

The data cache module group 132 caches the data received so that it may later be analyzed or otherwise processed. In particular, the data store component 150 manages one or more data caches 152 and is responsible for storing all data received and giving access to all data stored. Optionally, each data store component 150 could cache all data received directly without the need for an intermediary data cache 152. However, the use of the data cache or caches 152 allows for code reuse and also allows the data store component 150 to remain independent of any caching technologies used by each data cache component 152. The data store component 150 may then implement all common functionality, thus making each data cache module 132 also extremely thin and easy to build and maintain.

The terms "primary data cache" and "secondary data cache" may be used to refer to one or more of the data caches 152 depending upon whether certain features of the data cache module 132 are implemented and/or used as will be discussed in detail below. The suffix "a" is used in FIG. 2B to designate a primary data cache, and the suffix "b" is used to designate a secondary data cache.

Each data cache 152 stores data in a data target 172 such as a database on a hard drive, RAM memory, or another persistent or volatile storage medium. The term "data target" is used herein to refer to any device or machine or location on a device or machine that can produce data as defined herein. The main purpose of the data caches 152 is to provide a consistent interface to the data storage medium used so that the caches 152 appear to be the same to the user, thus freeing the client of any details handling various caching mechanisms.

The data output module group 134 is responsible for sending the data collected by the data input module group 30 and/or stored by the data cache module group 32 to the data destination 122. The data output component 160 manages the other components forming the data output module 34, namely, the data transport components 162, the data formatter component 164, and the inference engine component 166.

More specifically, the data output component 160 is responsible for sending data to one or more data destinations 124. As generally described above, the data destination may be an enterprise data management system, an artificial intelligence system, a plant floor process management system, software used to optimize overall production flow, another data routing system such as the systems 20 and 120 described herein, and/or other software systems used to optimize and/or monitor how the overall factory operates based on how each machine making up the factory runs.

The inference engine component 166 is responsible for mapping the data elements received from the data input module group 130 or data cache module group 132 through the data output component 160 to the data destinations 124 to which the data elements are to be sent. The data transport component 162 defines which data elements are to be sent to which data destination 124. When performing this mapping, the inference engine component 166 also optionally provides a set of rules and/or other criteria that are used to determine whether or not each output defined by the data transport component 162 should 'fire'. For example, the inference engine component 166 may use one or more of the following logic systems: artificial intelligence systems, fuzzy logic algorithms, neural network pattern matching, genetic algorithms, expert system logic, and/or other computer based decision-making and/or pattern matching based systems, to determine when a given set of one or more data elements should be sent out. In the simplest case, an identity transform may be used which causes all data inputs received to be sent out as matching data outputs.

The data formatter component 164 is used to format all or portions of the data set to be transported to the data destinations 124. For example the data formatter component 164 may be used to format data output by the inference engine component 166 into a certain XML schema or other proprietary data format.

The data transport component 162 is responsible for sending the data to the ultimate data destination 124, including an enterprise database, an enterprise software system, or even another data routing system such as the data routing system 120.

Referring still to FIG. 2, also depicted therein is a data manager 180 that allows the user to manage operation of the data routing system 120. The data manager 180 controls access to property pages exposed or generated by user-interface components associated with the components 140, 150, 160, 162, 164, and 166. Property pages may also be exposed or generated by user interface components associated with the components 142 and 152. In particular, the example data routing system 120 comprises data collector property pages 182, data store property pages 184, data output property pages 190, data transport property pages 192, data formatter property pages 194, and inference engine property pages 196. As will be described in further detail below, the property pages 182, 184, 190, 192, 194, and 196 allow the user to initialize, configure, and control the components 140, 150, 160, 162, 164, and 166, respectively.

In the following discussion and in the drawings, the property pages 182, 184, 190, 192, 194, and 196 also refer to the user-interface components associated with these property pages. The property pages 182, 184, 190, 192, 194, and 196 and other interface elements are separated from the components 140, 150, 160, 162, 164, and 166 in the system 120 to optimize the overall system flexibility and facilitate evolution toward new and future user interface technologies such as HTML based web user interface, SOAP/XML based interfaces, Microsoft .NET based interfaces, etc. Optionally, however, the components 140, 150, 160, 162, 164, and 166 could directly expose property pages and other user-interface elements.

Referring now to FIGS. 3-8, the interactions of the components and property pages forming the data input module group 130, data cache module group 132, and data output module group 134 will now be described in further detail in the various scenarios required to implement the functions of the example data routing system 120.

Before using the data routing system 120, the system must first be initialized. During initialization, all components are started and configured with their initial settings. Initializing the system involves configuring the data routing system 120 so that it knows what data to collect, where to collect it from, how to process the data collected and where to send the processed data. Once initialized, the system is ready to begin collecting, storing and processing machine and/or device data.

The initialization process includes to levels. First, the overall data routing system 120 must be configured by connecting one or more data collection components 140 data and one or more data output components 160 to the data store component 150. Once connected, the components making up each of the data input module 130, data output module 134, and data cache module 132 groups must next be configured.

Figure 3:
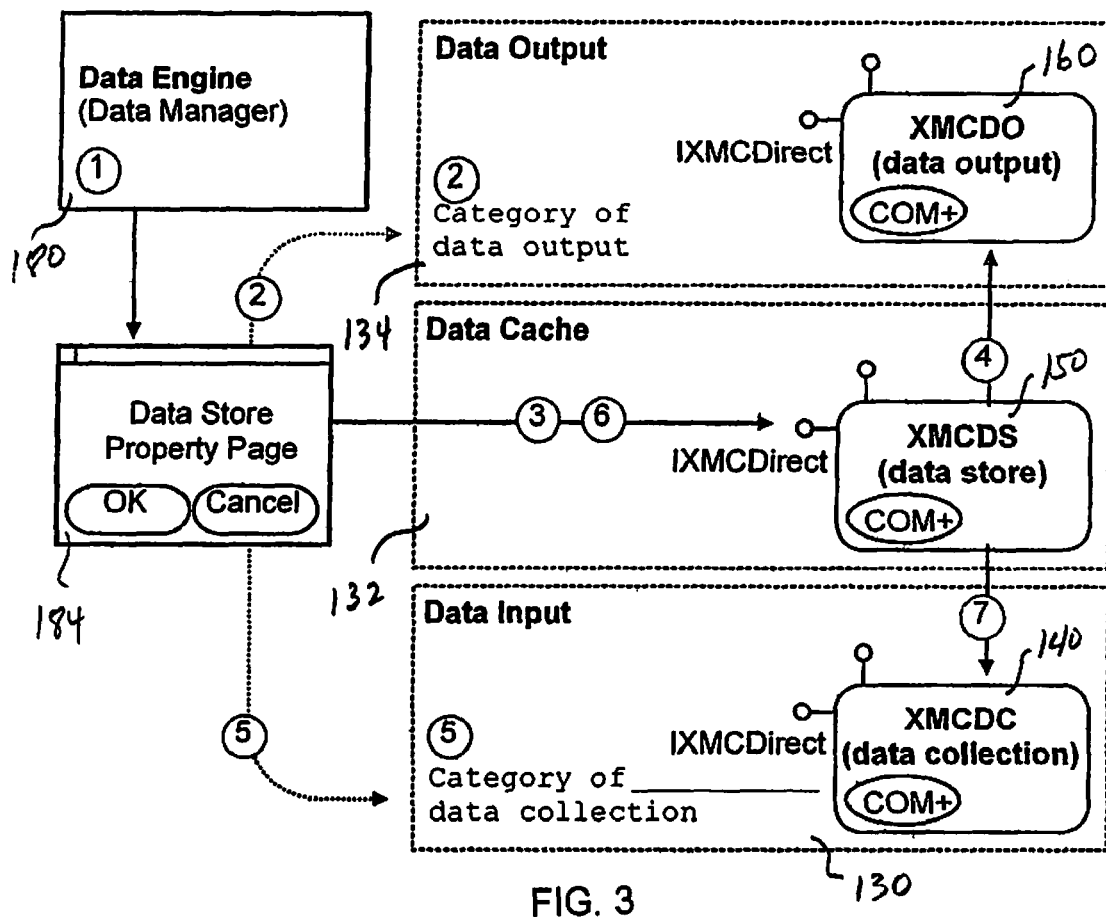
FIGS. 3-8 are scenario maps depicting the interaction of one or more components of the data routing system of FIG. 2 in different operational scenarios.

The process of initializing the data routing system 120 will now be described with reference to FIG. 3

Initially, the data manager 180 is run to configure the overall system 120.

The data manager 180 of the data routing system 120 next uses the data store property pages 184 paired with the data store component 150. The data store property pages 184 query the data store component 150 for all entries in the data output module group 134 category (or optionally queries for each entry directly using the OLE Component Categories) and displays each entry visually in the property page 184.

Next, after the user selects which data output module or systems 134 to activate, the list of active data output components 160 associated with the selected data output module or systems 134 is sent back to the data store component 150 so that it may use the active components. The data store component 150 could optionally query a separate 'configuration' component used to select the active data output modules 134 to use later when processing data to be output. Additionally, the activation of each active component 160 may optionally be activated programmatically instead of by the user.

During its initialization, the data store component 150 creates an instance of each activated data output component 160 so that the data store component 150 can send data update events to each upon receiving new cache data.

Similar to the configuration of the data output module group 134, the data store property pages 184 query the data input module group 130 for a list of supported data collection components 140. Optionally, the data store component 150 may query the data collection components 140 of the data input module group 130 and display each these data collection components 140 visually so that the user can activate all components 140 that are appropriate for collecting data.

Once selected visually by the user, the active list of one or more data collection components 140 is sent to the data store component 150. Optionally, the data store component 150 could query a separate 'configuration' component used to select the active data output modules 134 to use later when processing data to be output. Additionally, the activation of each component may optionally be activated programmatically instead of by the user.

During initialization, the data store component 150 creates an instance of each active data collection component 140.

Once the main components data store component 150, data collection component 140, and data output component 160 of the data output module 134 are configured, the user (or configuration program) must configure the components used by each of the systems 140, 150, and 160. The main configuration task for the data collection component 140 is that of selecting the data source components 142 (and the data items supplied by each) from which data is to be collected. The process of configuring the components used by the systems 140, 150, and 160 will now be described with reference to FIG. 4.

The following steps take place when configuring the data collection component 140 and related components.

First, the data manager 180 is used to configure the data collection component 140.

Second, the data collector property pages 182 are used to configure the data collection component 140. Optionally, all configuration may be done programmatically by another software module.

Each of the data collector property pages 182 queries the Data Source OLE Category of components to see what data source components 142 are available. Optionally, the data collection component 140 may be queried for the list of all data source components 142 available.

A visual list of available data source components 142 is next constructed, thus allowing the user to select which data source component or components 142 to use when collecting data. Optionally, the data collection component 140 could directly talk to the data source components 142; however such direct communication would reduce code reuse as the data collection component 140 allows each data source component 142 to be very thin, making these components 142 easy to build and maintain.

Finally, after the user selects the data source components 142 to use, a list of active data source components 142 is passed to the data collection component 140, which then creates an instance of each selected component.

Optionally, each data source component 142 may use an associated property page (not shown) that allows the user to visually (or software to programmatically) configure and select the data inputs from which data is to be collected by each data source component 142. Each data collector component 140 may also define a set of data inputs that the user may configure and select; however this it not optimal as the data source components 142 allow each data collector component 140 to remain independent of how each data origin actually works; i.e. the data items they provide and how the data for each data item is actually collected.

Figure 5:
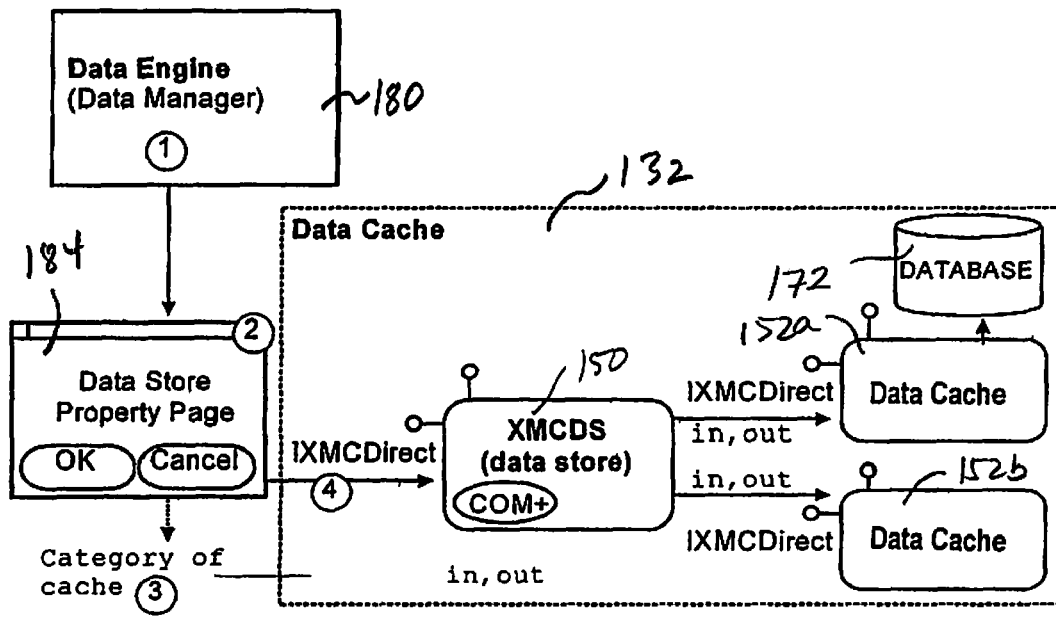
Figure 4:
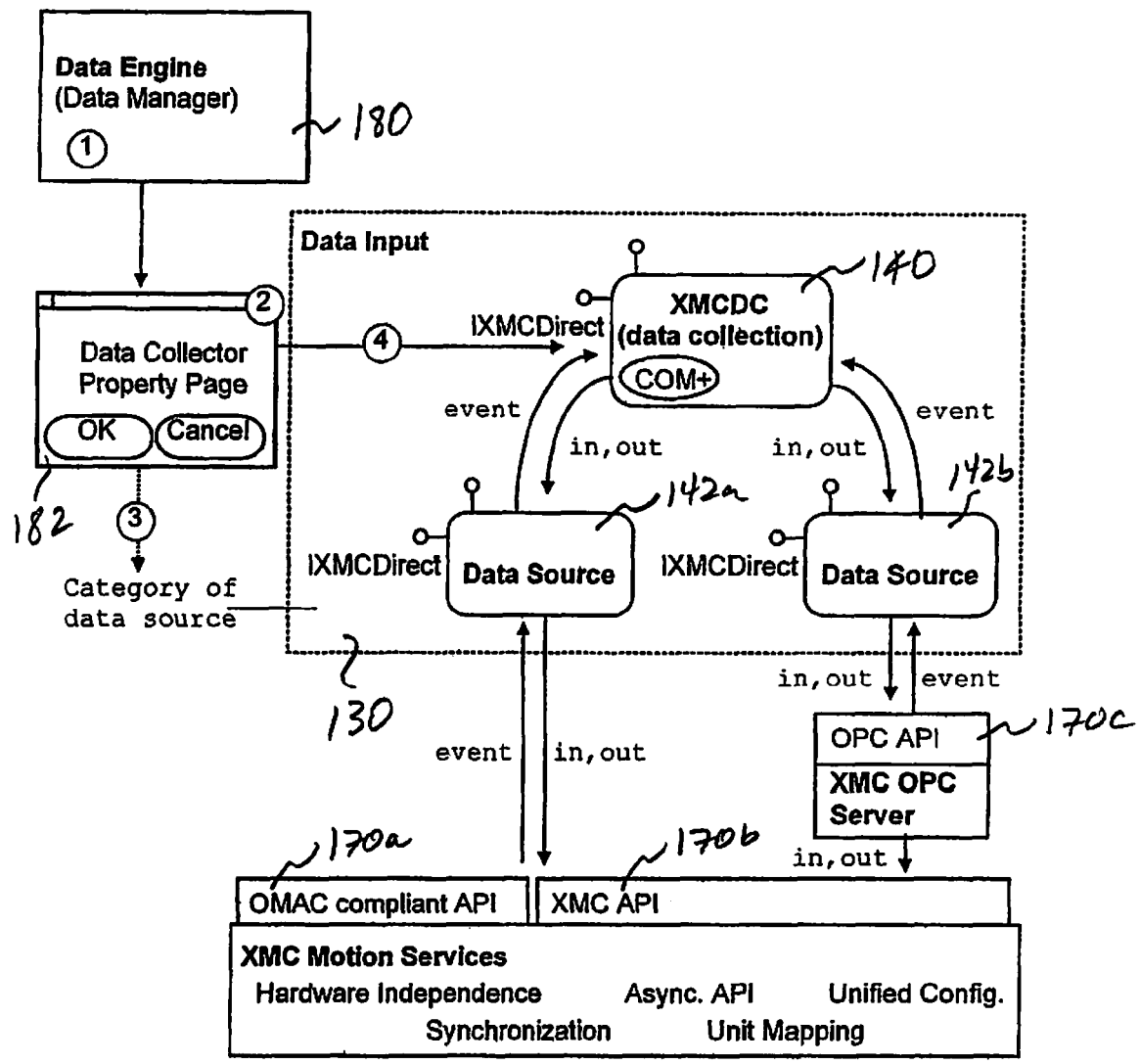

Referring now to FIG. 5, the following steps take place when configuring the data cache module group 132, which includes the data store component 150 thereof. Configuring the data store component 150 requires the selecting of the data cache 152 to use. When caching data there are three main methods that may be employed: (1) cache all data to memory only; (2) cache all data to a persistent storage such as a database, or (3) a mixture where data is initially cached to memory and then 'rolled-over' into the persistent store at certain intervals or after a specified amount of data has been collected. All three models are utilized by the data cache module group 132 of the data routing system 120, where only one method is necessary to build a picture of the overall state of the data origin at a given moment in time.

In a first step shown in FIG. 5, the data manager 180 of the data routing system 120 is used to configure the data store component 150 and associated components using the embedded data store property page 184. As described above, the data store component 150 can be configured to implement all user aspects that it needed to edit and otherwise allow the user interact with the data and configuration managed by the component. However, separating the user interface from the component in a parallel component has several advantages that allow for easily adopting future user-interface based technologies such as HTML, Windows .NET, and thin client. For these reasons the user interface has optionally been separated from the main logic making up the data store component 150.

As generally described above, this same design organization is used throughout the entire system 120 by all components having an associated property page.

The data store property page 184 component queries the data store component 150 for the list of data cache components 152 that are available and displays the list visually. The list of available components 152 may optionally be provided programmatically by a separate component used for configuration. As an additional option, the data store property page 184 may directly query the Cache Category of components in the OLE Component Category.

From the data store property page 184, the user visually selects the specific data cache components 152 to use and the specific caching strategy to employ (single caching or rollover where data from one cache is rolled over to another cache based on certain criteria such as an interval of time, or a data cache data threshold being met). The selected data cache components 152 and strategy selected by the user are transferred to the data store component 150 which then stores the settings.

Figure 6:
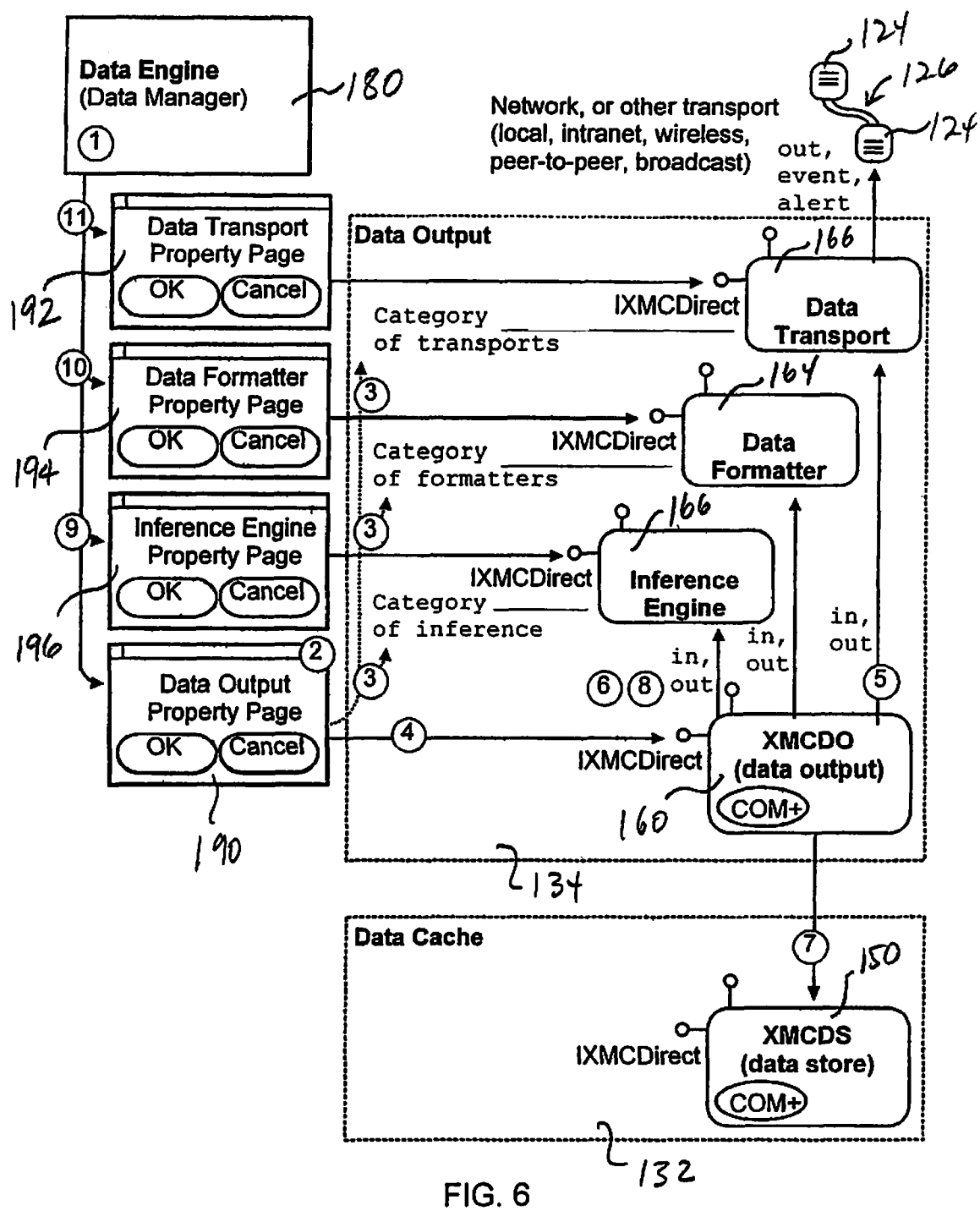

Each data output component 160 and associated components act as a data output 'pipeline' where data follows a set of steps that determines what data will be output, what format that data will be output in, and where the data will be sent. Referring now to FIG. 6 of the drawing, depicted therein are the steps that take place when configuring the data output component 160 and its related components.

First, the data manager 180 is used to configure the various aspects of the data output component 160 and its associated components.

When configuring the data output component 160, the data output property page 190 parallel component acquires the list of inference engine components 166, data formatter components 164, and data transport components 162 that are available. Once the list of data transport, data formatter, and inference engine components 162, 164, and 166 is acquired, a visual display of the list is created on the data output property page 190 so that the user can select one or more of the components 162, 164, and 166 from the list as appropriate for their application.

To obtain this list of components, the data output property page 190 may either query the data output component 160 or directly query the OLE Category for each of the data transport component 162, data formatter component 164, and inference engine component 166. If the data output component 160 is queried for the list of available components in each category, the data output component 160 in turn may then internally query a pre-configured list or the OLE components falling into each respective OLE Category for the data transport component 162, data formatter component 164, and inference engine component 166.

After the user selects one or more data transport components 162, one or more data formatter components 164, and one or more inference engine components 166, the list of components to activate is sent to the data output component 160, which stores the component information as its active components and then creates an instance of each component.

Next, each data transport component 162 is queried for its list of supported outputs. The list of supported data outputs is then passed to the inference engine component or components 166 selected.

Next, the data output component 160 queries the data store component 150 for its list of supported data items, usually stored in the data cache components 152 and previously selected when configuring the data collection component 140. The list of supported input data items is then passed to the inference engine component or components 166 selected.

When the inference engine component or components 166 have both the inputs and outputs available, the user may optionally configure rules or other criteria used to determine when each output is 'fired' based on the input data received. As examples, one or more of a set of Fuzzy Logic rules, a previously trained Neural Network pattern, a Genetic Algorithm fitness, Expert System logic, or other custom logic may be used to determine when certain outputs are sent through the data output pipeline to the data destination.

In addition, the data formatter component or components 164 may also be configured to output data in data formats supported by each data destination 124. For example, a data formatter component 164 may be used to output data items received in a certain proprietary schema. However, the data formatter component 164 would need to be configured so that it would know how to match the data items received to the proprietary schema. This step in the configuration process would allow the user, or another software program, to make this configuration.

And finally, the data transport component or components 162 would need to be configured so that they could properly send data received to the end data targets that it supported. For example, a data transport component 162 configured to use TCP/IP may need to have target TCP/IP addresses configured or TCP/IP ports configured telling the component 42 where to send the data.

Figure 7A:
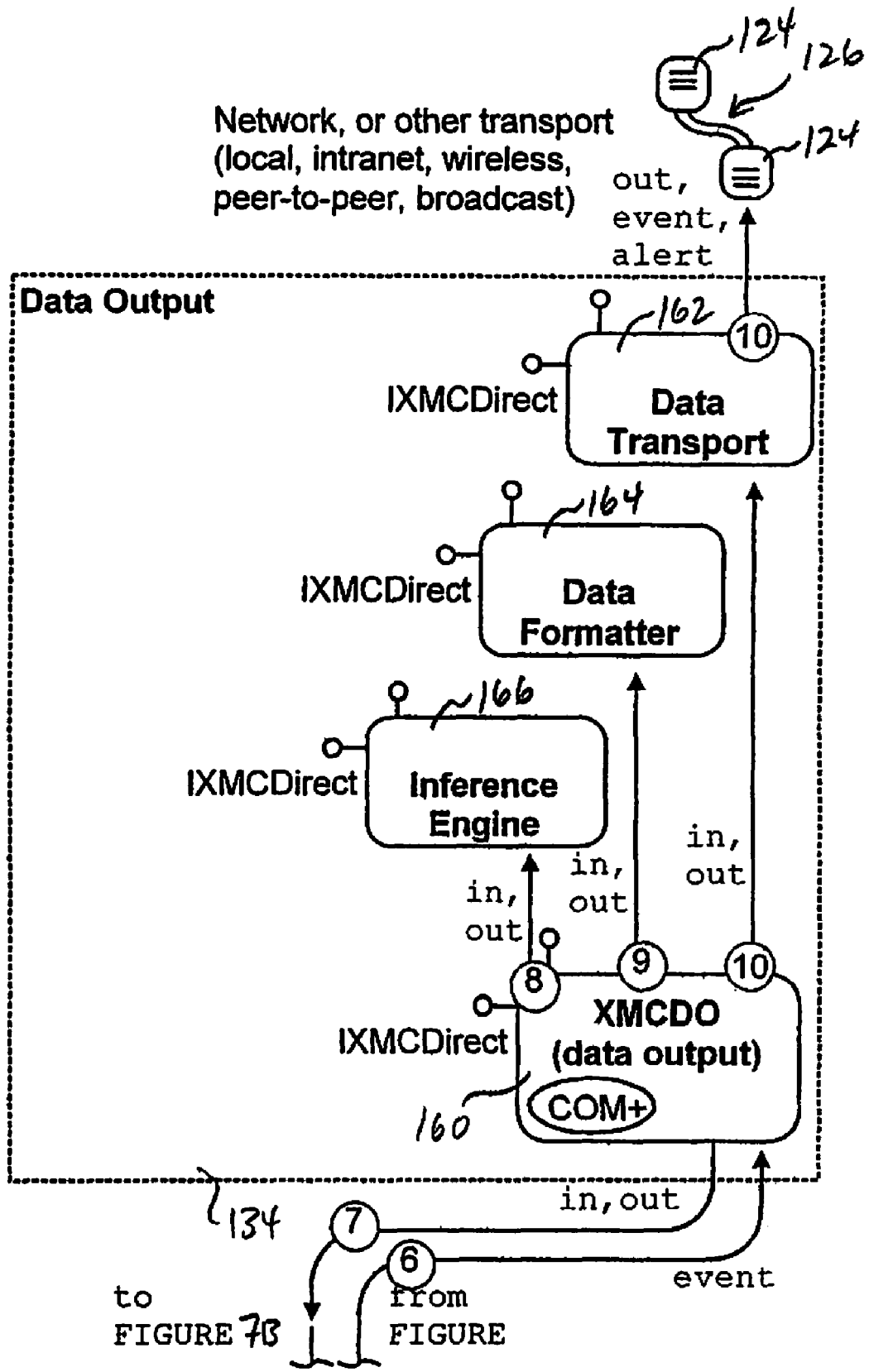
Figure 7B:
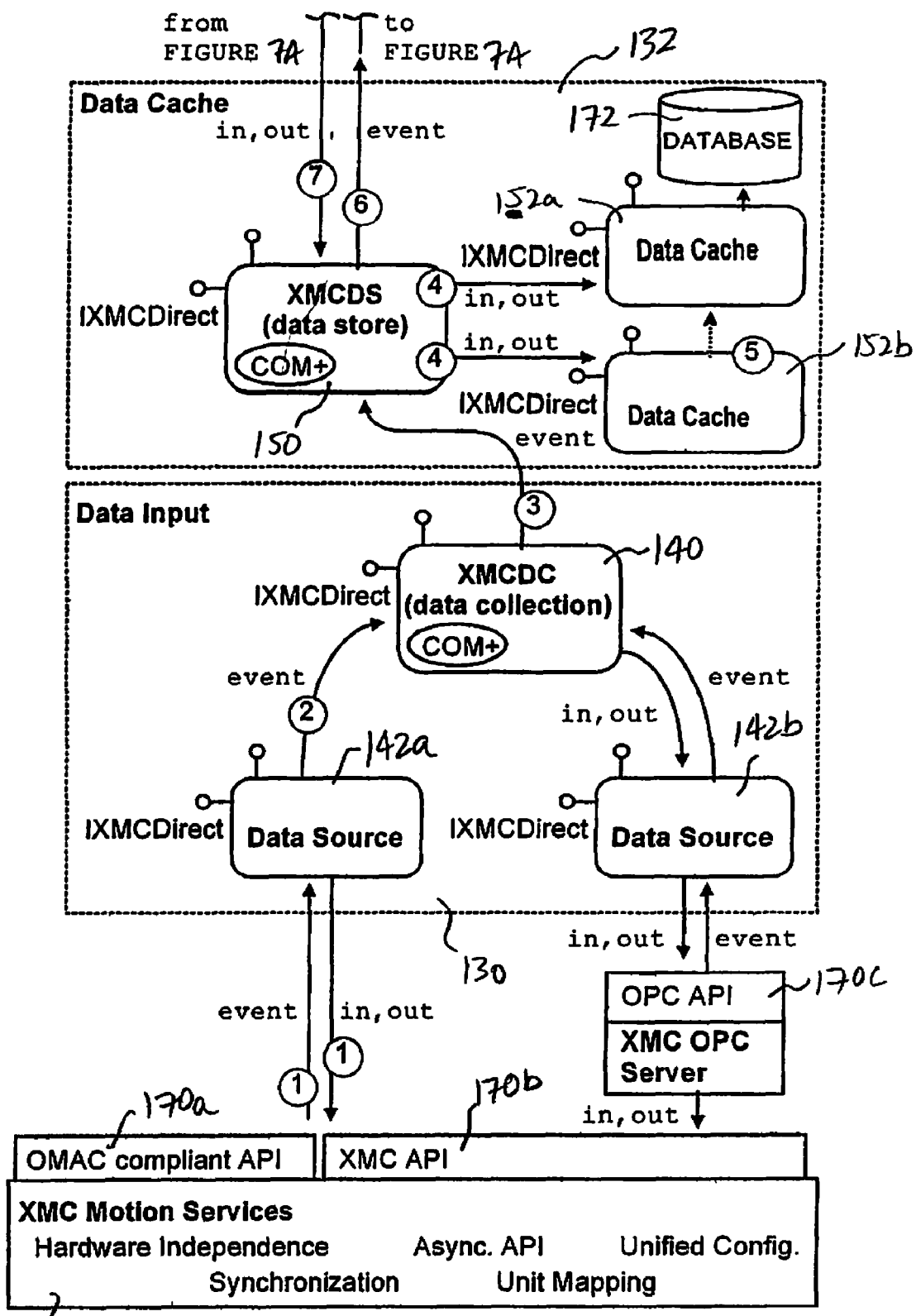

Once initialized, the data routing system 120 is ready to start collecting data and storing all data collected as previously configured. FIGS. 7A and 7B depict the interactions that take place when collecting data.

First each data source component 142 either polls for data or receives previously configured events from its data origination. For example, when using the motion system 124 or an Protocol Server as the data origin, events may be received telling the data source component 142 that new data is available.

Upon receiving a data update event, the data source component 142 fires an event to its respective parent data collection component 140.

Upon receiving its event, the data collection component 140 then fires an event to the data store component 150.

Upon receiving each data update event, the data store component 150 uses the active caching component or components 152 to store the data. Optionally, the data cache module 132 may employ a roll-over strategy in which data received is passed to one or more data cache modules 132 after a certain criteria is met such as in interval of time passing or a data caching threshold being met.

After caching the data, the data store component 150 fires a data update event to any data output component or components 160 connected to the data store system 132.

Upon receiving the data update event, the data output component 160 may optionally query the data store component 150 for more data if needed to gain a full description of the current state of the machines forming the motion system 122.

All data input information is then passed to the inference engine component 166 for processing. Upon receiving the data, the inference engine component 166 runs its preconfigured rule set against the data set received and produces the output (if any) that is eligible to be sent to the data destinations 124. If the inference engine component 166 employs a dynamic model of the data, its internal model may alter itself based on the input data received. For example, an inference engine component 166 that uses a neural network may 'learn' from the data by changing the neural network's weights based on the data input values received.

If data is eligible to be output, and a data formatter component 164 is used, the output data received from the inference engine component 166 is then sent to the data formatter component 164. Upon receiving the data, the data formatter component 164 transforms the data received into the supported output data format and passes the new output data back to the data output component 160.

The formatted data is then passed to the data transport component or components 162 to be transported or sent to the data destinations 124. If a data formatter component 164 is not used, the raw data format output from the inference engine component 166 is used and passed directly to any active data transport component 162. Upon receiving the output data, the active data transport component or components 162 send the data to their respective data destinations 124. For example, a TCP/IP transport would packetize the data into TCP/IP packets and send the data stream to a preconfigured TCP/IP address/port. Alternatively, a wireless transport may broadcast the data out on a pre-configured frequency.

Figure 8:
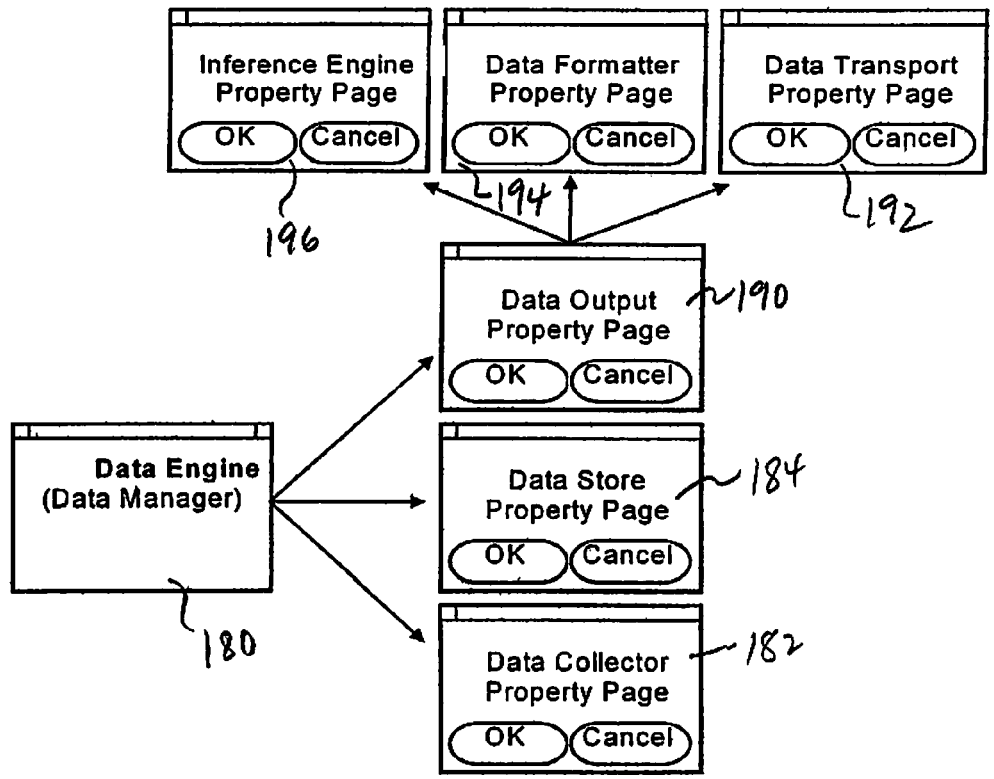

Referring now to FIG. 8 of the drawing, depicted therein is a relationship among the interface windows and dialogs that form the property pages used to configure the example data routing system 120. The data manager 180 presents to the user a main window 220 (FIG. 9) that is used to access the data property pages 182, 184, 190, 192, 194, and 196 used to configure all settings of the data collection component 140, data store component 150, and data output component 160 forming up the system 120.

Figure 9:
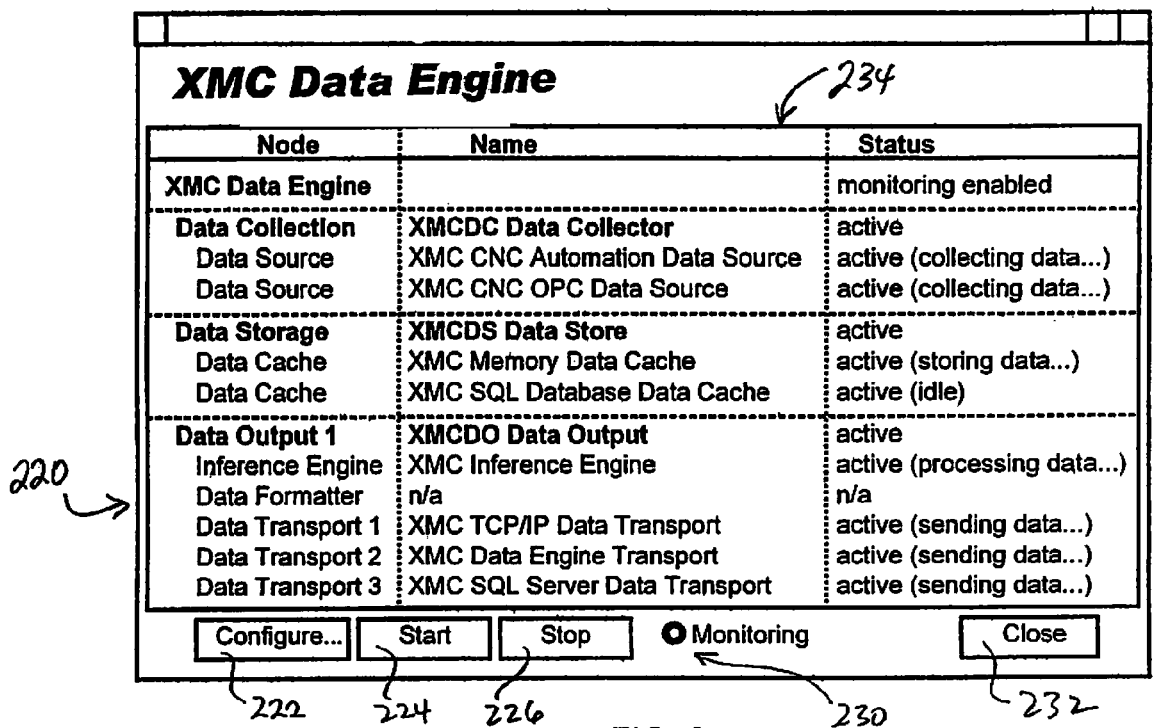
FIGS. 9-19 are examples of user interface configurations that may be used by the example data routing system of FIG. 2.

The example main window 220 presented by the data manager 180 to configure each of the main components 140, 150, and 160 is shown in FIG. 9. In particular, the main page 220 of the data manager 180 acts as a control panel that allows the user to configure and monitor how data flows from each data source 122 to the eventual data destination 124.

Each of the user interface elements of the main page 220 on the data manager 180 will now be described with reference to FIG. 7.

A "Configure" button 222 allows the user to configure the overall system 120 by building up the overall data transfer pipeline. This option is only available when running the application as an Administrator on the system.

A "Start" button 224 starts monitoring the data source components 142 and feeds the data received through the system 220.

A "Stop" button 226 stops monitoring the data source components 142 and shuts down the entire monitoring process.

A "Monitoring" icon 230 visually displays whether or not monitoring is currently enabled.

A "Close" button 232 closes the monitoring application window but does not close the application. Since the application runs as a system tray application, you must exit the application by right clicking on the system tray icon.

A "Status" window 234 visually shows the overall configuration and status of the system including all nodes making up the data input module 130, data store system 132, and data output module 134.

The following sections describe how to build and configure the overall system 120 using examples of the various property pages 182, 184, 190, 192, 194, and 196.

Figure 10:
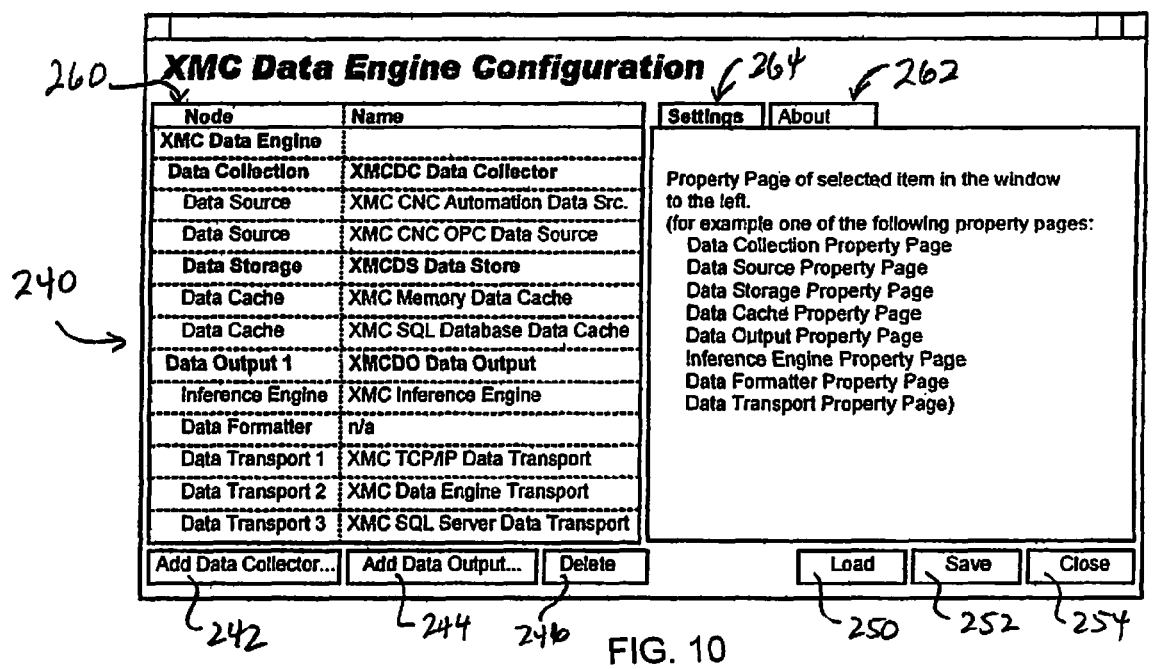

Referring initially to FIG. 10, depicted therein is a configuration dialog window 240 that is associated with the data manager 180. The configuration dialog window allows a user to build the overall data routing system 120. The user interface elements making up the configuration dialog window 240 are as follows.

An "Add Data Collector . . . " button 24 displays a dialog containing a list of all data collection components 140 available to the system. Once selected, the selected data collection components 140 are added to the system 120. The data collection components 140 are connected to the data store component 150 so that data events are sent to the data store component 150 each time data items are received by each of the data collection components 140 from their respective various data source components 142.

An "Add Data Output . . . " button 244 displays a dialog containing a list of all data output modules 134 available to the system. Once selected, the data output modules 134 are added to the system. Each data output module 134 manages a data pipeline that may involve inference rules or other decision-making technology that tell when to fire each data output.

A "Delete" button 246 removes a module from the list of components making up the overall data routing system 120.

A "Load" button 250 loads the components of a previously saved data routing system 120 from a persistent storage medium such as a file or database.

A "Save" button 252 saves the current data routing system 120 to a persistent storage medium such as a file or database.

A "Close" button 254 closes the configuration dialog.

A "Node" control 260 contains the current modules making up the data routing system 120, including data collection components 140, data store components 150, and data output components 160.

An "About" property page 262 displays information about the currently selected module in the node list.

A "Settings" property page 264 displays a property page corresponding to the currently selected node in the node list. The property page allows the user to configure the settings specific to the node selected.

Examples of interface elements that may be used to implement the property pages 182, 184, 190, 192, 194, and 196, as well as other related property pages, will now be described with reference to FIGS. 11-18. The "Delete", "Load", "Save", and "Close" interface elements depicted in FIGS. 11-18 apply to the "Node" Control on the left part of each figure (not shown) and will not be described in detail below.

Figure 11:
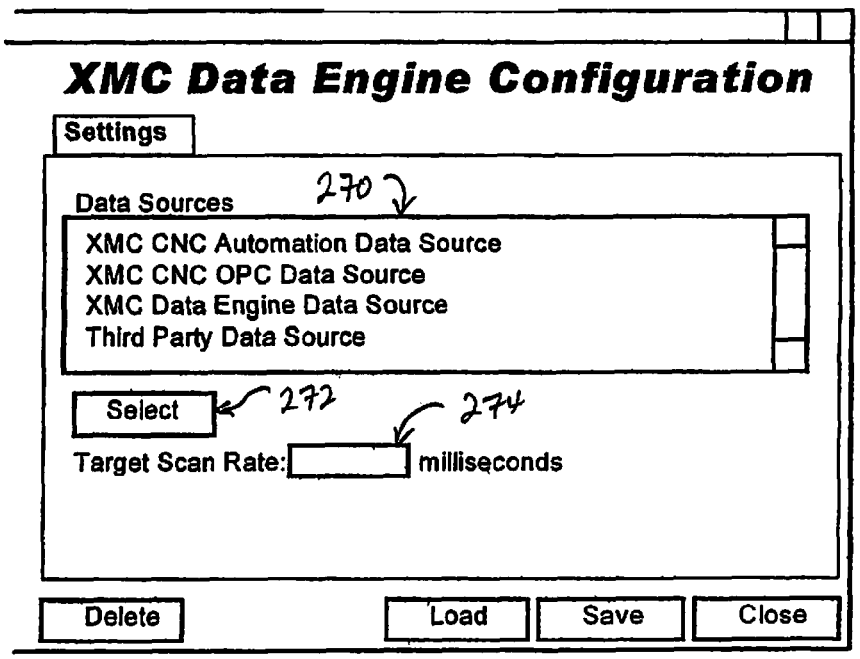

An example of the data collector property page 182 is depicted in FIG. 11 of the drawing. The data collector property page 182 allows a user to configure the components, such as the data collection components 140 and/or data source components 142, of the data input module group 130.

A "Data Sources" list box 270 contains a list of all data source components 142 available to the system. The list of available data source components 142 is acquired by either directly enumerating the Data Source OLE Category of components or by querying the data collection component 140 for all data source components 142 that it 'knows' about.

A "Select" button 272 adds the currently selected item in the list of data source components 142 to the currently selected data output module 134 in the main node list.

A "Target Scan Rate" edit field 274 allows the user to input a global scan rate that applies to all data source components 142 that may be controlled using a global scan rate.

Figure 12:
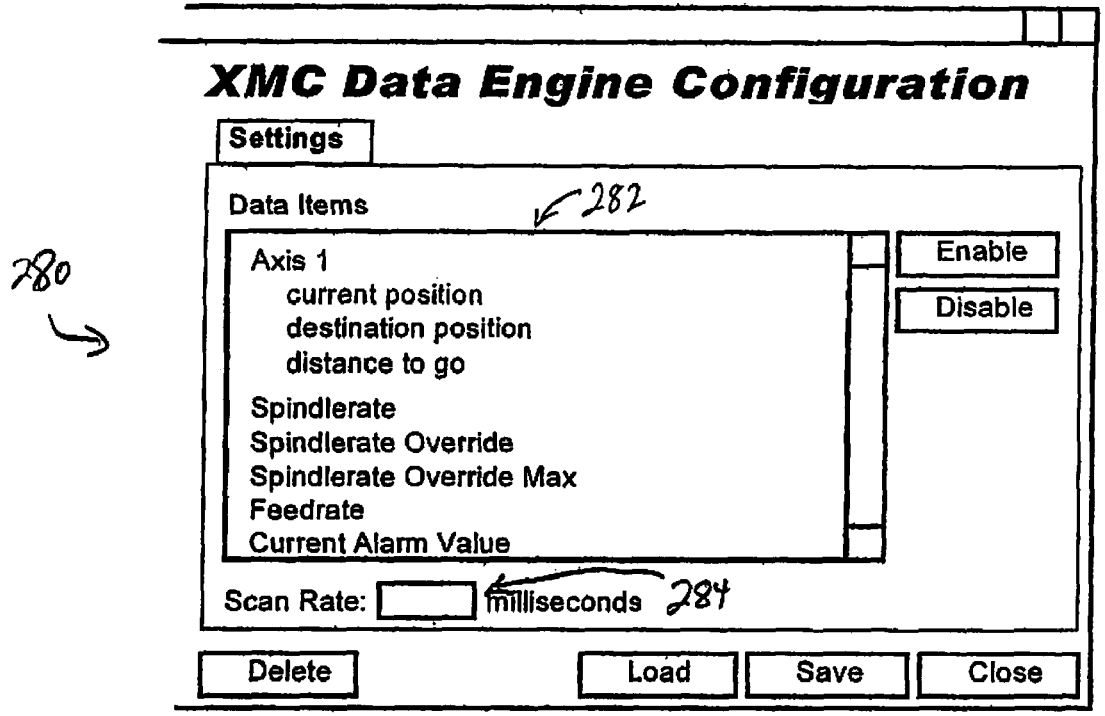

A data source property page 280 is depicted in FIG. 12. The data source property page 280 allows the user to select the data items made available by each data source component 142. The selected data items are then fed into the data store component 150 and eventually on into the selected inference engine component 166. The following user-interface elements make up the data source property page 280.

A "Data Items" list box 282 contains a list of all data items made available by each data source component 142. The user must enable the data items that they want to monitor in their system. The list of available data items is acquired by browsing a particular data source component 142.

A "Scan Rate" edit box 284 allows the user to enter the scan rate to use for this specific data source (which may be different from the global scan rate). If no scan rate is entered, the default global scan rate is used when appropriate.

Figure 13:
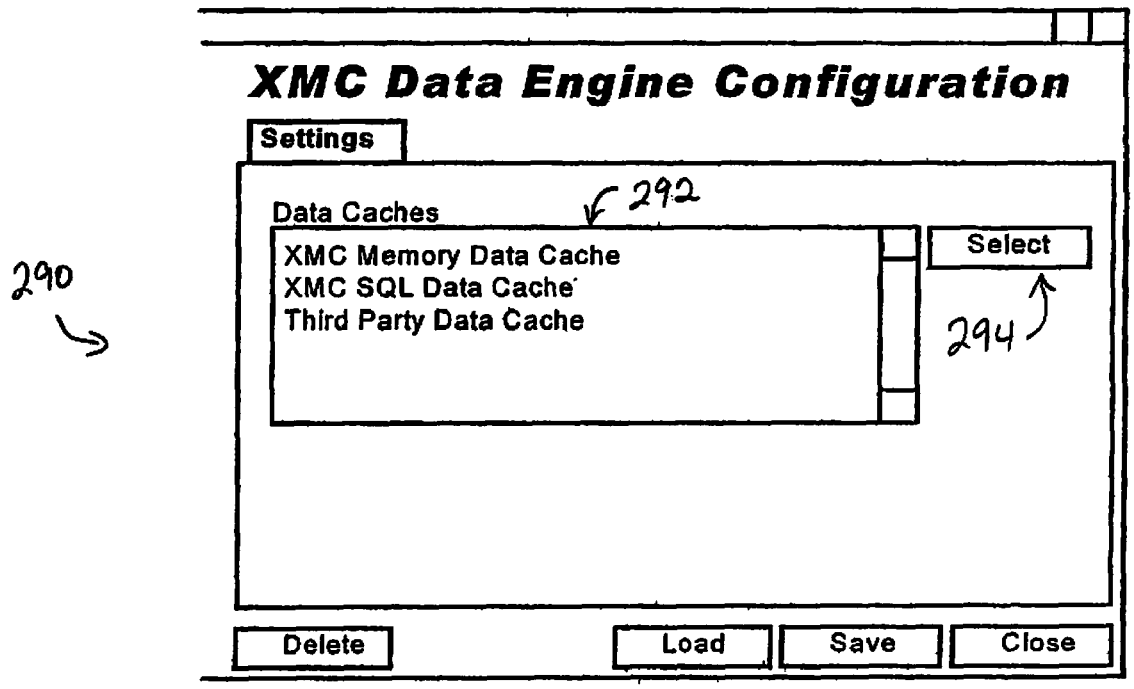

A data store property page 290 depicted in FIG. 13 is used to configure the data store component 150 by selecting and configuring the data cache or caches 152 used and the specific caching strategies for each. The following user-interface elements make up the data store property page 290.

A "Data Caches" list box 292 contains a list of all data caches 152 available to the system 120. The list of available data caches 152 may be acquired either by directly enumerating the data cache OLE Category of components or by querying the data store component 150 for a list of active data caches 152.

A "Select" button 294 adds the currently selected item in the "Data Caches" list box 290 to the currently selected data store component 150 in the master node list.

Figure 14:
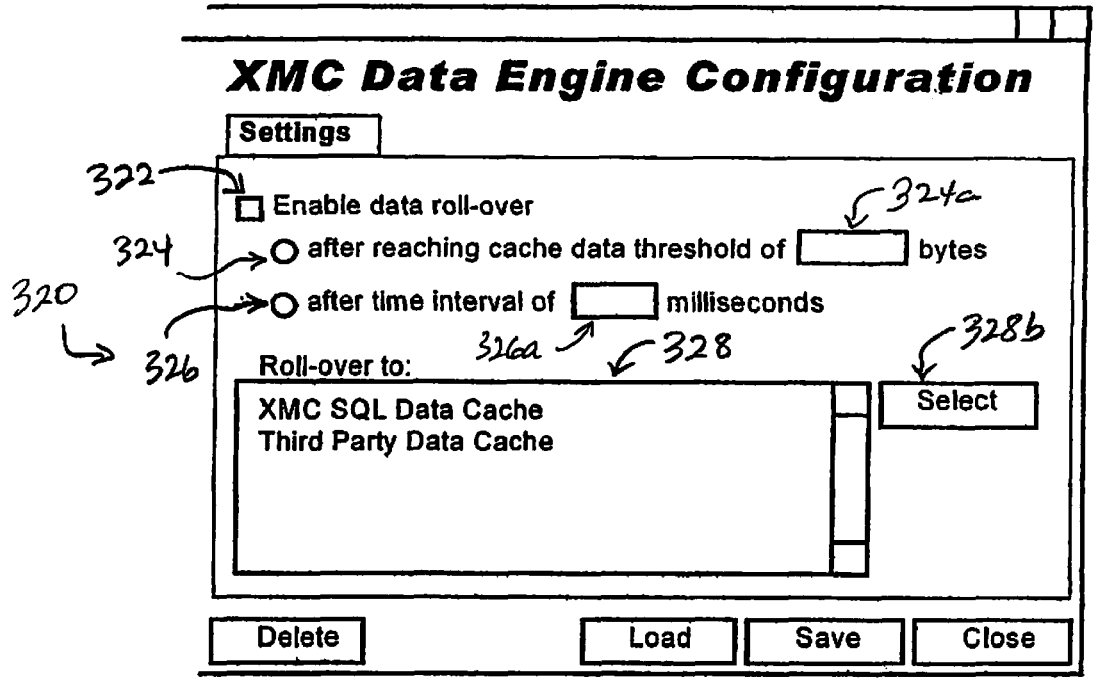

Referring now to FIG. 14, depicted therein is a data cache property page 320 that allows the user to configure the specific caching strategy to be used by each data cache 152. The following user interface elements make up the data cache property page 320.

An "Enable data roll-over" check-box 322 allows the user to enable/disable data roll-over. When enabled, data placed in a particular data cache 152 can roll-over into another, or secondary, data cache 152 upon meeting certain criteria specified by other of the user-interface elements forming the data cache property page 320.

An "After reaching cache data threshold of" radio button 224, if selected, determines that roll-over occurs when a certain number of bytes are cached in the primary data cache, assuming that data cache roll-over is also enabled by check box 322. A caching threshold data field 324a allows the user to specify the data cache threshold. After reaching the roll-over threshold level, all data currently in the primary data cache 152a is copied to the secondary data cache 152b.

An "After time interval of" radio button 326, when selected determines that roll-over occurs at specifically set time intervals, again assuming that data cache roll-over is enabled by check box 322. A time interval data field 326a allows the user to specify the duration of the time interval. Upon the expiration of each time interval all data in the primary data cache 152a is automatically copied over to the secondary data cache 152b and then removed from the primary cache 152a.

A "Roll-over to" list-box 328 contains a list of data caches that can be used as secondary caches 152b. The primary cache 152a rolls data over to the secondary cache 152b selected by pressing a "Select" button 328a.

Figure 15:
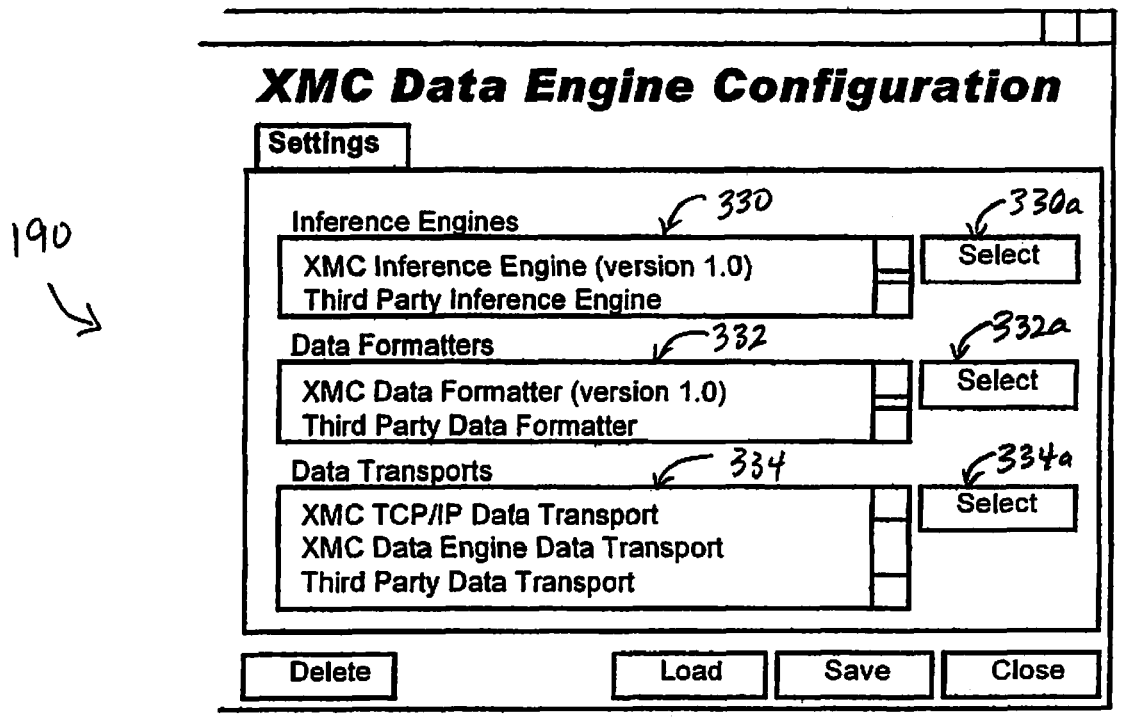

Referring now to FIG. 15, the data output property page 190 is depicted therein in further detail. The data output property page 190 is used to configure the data output module 134 by selecting the data transport components 162, data formatter component 164, and inference engine component 166 that are to make up the data output pipeline. The following user-interface elements make up the data output property page 190.

An "Interface Engines" list-box 330 contains a list of all inference engine component or components 166 that are available to the system 120. A first "Select" button 330a allows one or more of the inference engine components 166 to be selected. As generally described above, each inference engine component 166 is responsible for mapping input values to output values and determining when each data element should actually be sent to the data destination 124.

A "Data Formatters" list-box 332 contains a list of all data formatter components 164 that are available to the system 120. A second "Select" button 332a allows one or more of the data formatter components 164 to be selected. Each data formatter component 164 is responsible for transforming data input into another data format that is output as output data.

A "Data Transports" list-box 334 contains a list of all data transport components 162 that are available to the system 120. A third "Select" button 334a allows one or more of the data transport components 162 to be selected. Each data transport component 162 is responsible for sending the data received to the ultimate data destination 124, such as an enterprise database, analysis system, another data routing system, or the like.

Figure 16:
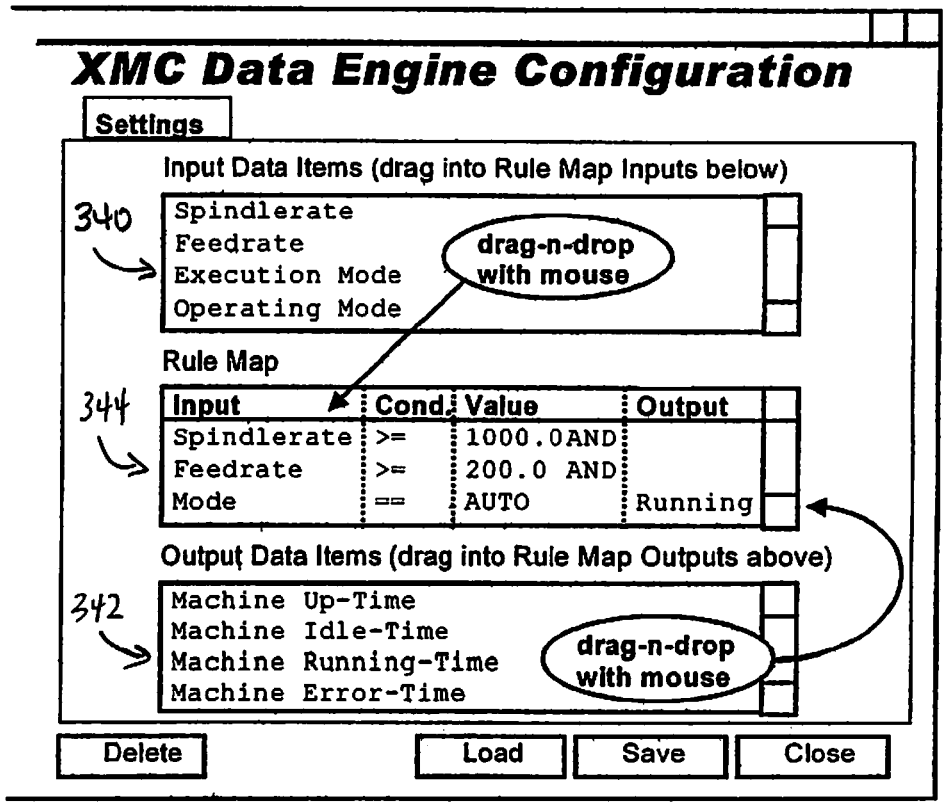

The inference engine property page 196 will now be described in further detail with reference to FIG. 16. The inference engine property page 196 is used to configure the settings defining how the inference engine component 166 actually works. The inference engine component 166 maps inputs received to expected outputs defined by the data transport component 162. When mapping inputs to outputs, the inference engine component 166 optionally uses decision logic to determine whether or not each output should fire (i.e. be sent on to one or more data transport component 162) based on the inputs received. The user interface elements making up the inference engine property page 196 are as follows.

An "Input Data Items" list-box 340 contains a list of all data inputs received from the data input module 130 via the data store component 150. An "Output Data Items" list-box 342 contains a list of all data outputs received from the data output module 134 via the data transport component 162. A "Rule Map" list-box 344 contains a list of rules that define how to map the received data inputs to the outputs.

In this sample inference engine component 166, the user drags items from the Input Data Items list box 340 into the inputs making up the rule-map as listed in the Rule Map list box 344. The rule-map associated with each of the items in the Input Data Items list box 344 defines when to fire output to each defined output.

Figure 17:
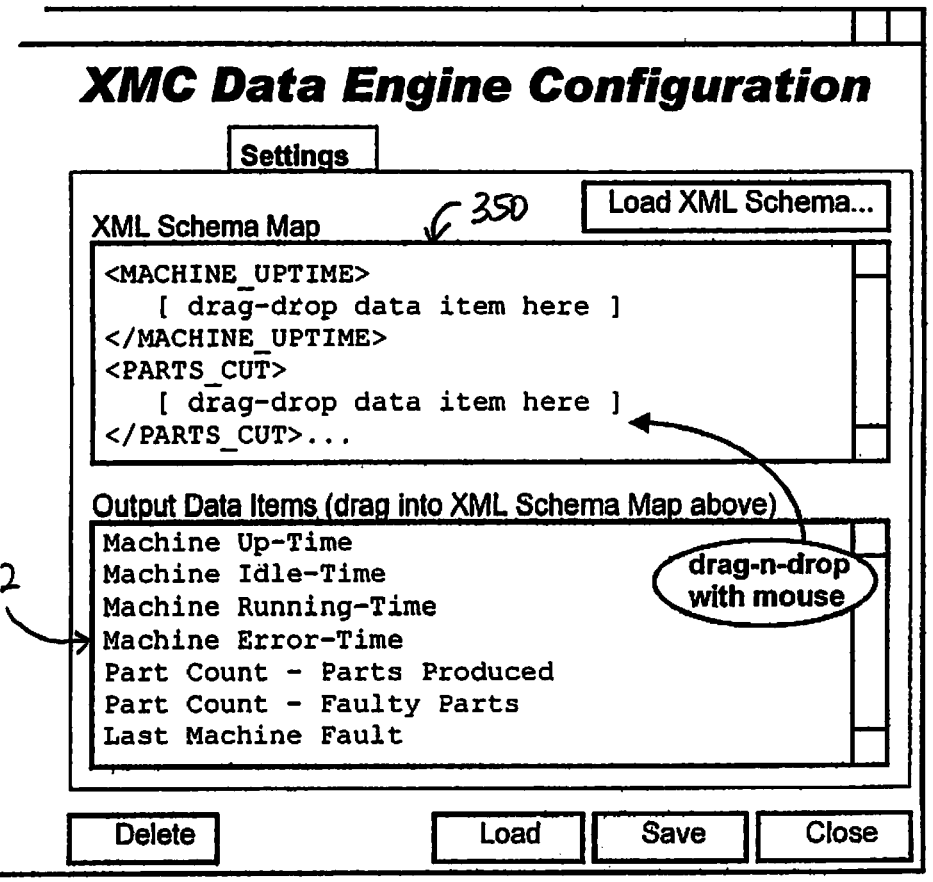

An example data formatter property page 194 is depicted in FIG. 17. The data formatter property page 194 allows the user to configure how the final data output is actually formatted. For example, the example property page 194 depicted in FIG. 17 illustrate how to map data outputs into an XML schema. The following user interface elements make up the data formatter property page 194.

An "XML Schema Map" 350 control contains an editable XML Schema that allows a user to drag an output data item into different portions of the schema essentially 'linking' the data item to that portion of the XML schema. When linked, the final XML data file is built by using the XML schema and then placing data from each output data item into the slots where they are linked into the XML schema.

An "Output Data Items List" list-box 352 contains a list of all data outputs available as defined by the data output module 134 via the data transport component or components 162.

Figure 18:
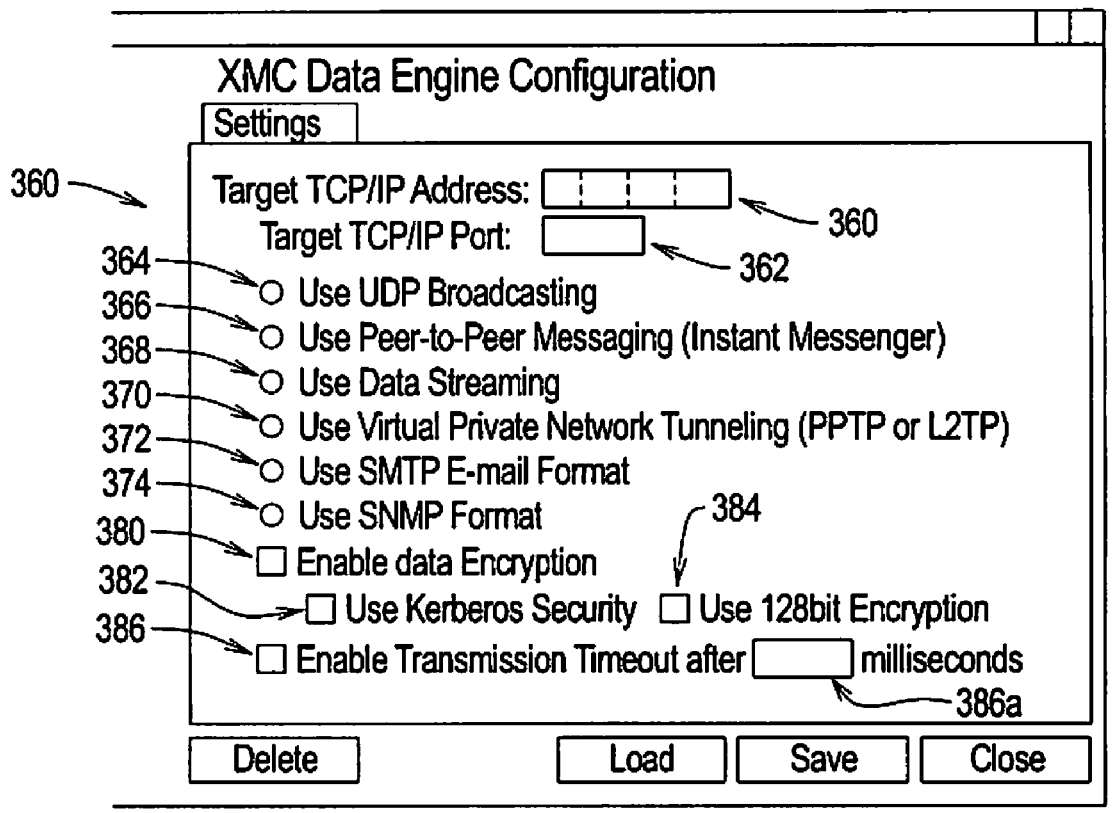

Depicted in FIG. 18 is an example of a data transport property page 192. The data transport property page 192 allows the user to configure the specific settings of each data transport component 162 used to communicate with the data destination or destinations 124. The example property page 192 depicted in FIG. 18 is an example property page for a data transport component 162 that communicates across a TCP/IP based (wire-based or wireless) network. The data transport property page employs the following user interface elements.

A "Target TCP/IP Address" 360 edit field allows the user to enter the target TCP/IP address of the machine or machines forming destinations where data is to be sent.

A "Target TCP/IP Port" edit field 362 allows the user to specify a set of one or more TCP/IP ports to use on the target TCP/IP address.

A "Use UDB Broadcasting" radio button 364 directs the transport to broadcast the output data using the UDP broadcasting protocol and ignore the target TCP/IP address as data will be sent to all machines forming data destinations 124 on the network 126.

A "Use Peer-to-Peer Messaging" radio button 366 directs the transport to use a peer-to-peer messaging protocol such as the one used with Windows Instant Messenger, where data is sent immediately to the target machine forming the data destination 124 and may optionally be displayed in an Instant Messenger viewing application such as Windows Messenger.

A "Use Data Streaming" radio button 368 directs the transport to use a data streaming technology where the data outputs are streamed to the target(s) in a manner similar to that of a streaming music or video source. Optionally, the data outputs may also be interleaved into an existing music, video, or other data streaming data source.

A "Use Virtual Private Networking Tunneling" radio button 370 directs the transport to use a tunneling technology, where the data packets making up the output data are embedded within another packet type, optionally encrypted and secured, and then sent to the target over another protocol such as HTTP, or in this case the PPTP or L2TP protocol. SOAP or XML messaging is another manner of tunneling where the data is placed within a SOAP or XML 'envelope' and then sent over to the output target using the SOAP or other XML messaging protocol.

A "Use SMTP E-Mail Format" radio button 372 directs the transport to package the output data sets into an e-mail format and sends it to the target. Further configuration may be required to actually setup a specific e-mail address for the recipient.

A "Use SNMP Format" radio button 374 directs the transport to use the SNMP transport to communicate with the output target.

An "Enable Data Encryption" check-box 380 enables data encryption such that the data is encrypted before transmission. A "Use Kerberos Security" check-box 382 enables Kerberos security. A "Use 128 bit Encryption" check-box 384 enables 128-bit encryption for the output data packets.

An "Enable Transmission Timeout" check-box 386 enables transmission time-out on each communication with the target. When enabled, the sender only waits for an amount of time specified in a data field 386a for a response from the data destination 124, after which response data received from the target is ignored.

The example data routing system 120 is a modular system made up of a set of components as generally described above. In this case, each component is based on a component technology, such as OLE/COM technology defined by Microsoft Corporation.

Optionally, each component uses a separate 'parallel' ActiveX component to implement all user interface aspects of the main component, also as generally described above. Each ActiveX component may be implemented either within the main component module or separately in its own module. Bundling each object within one module is not required as they may be located at any location (i.e. across a network, and so forth), but doing so may optimize all communication between modules. How and where components are implemented is more of a logistical decision because, once components are built and deployed to the field, it is difficult to update a single component if all components are implemented within a single DLL or EXE module.

Figure 19:
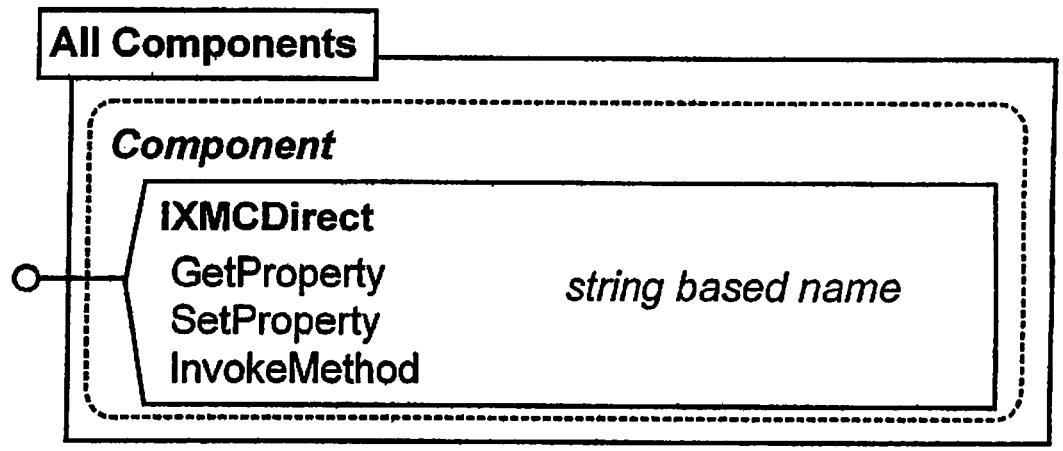

FIG. 19 illustrates that the components forming the data routing system conform to a single interface identified as the IXMCDirect interface. OLE Categories are used to determine how many components fall into a certain group of components. Components used by the example data routing system 120 fall into the following categories:

Data Input Components—Typically, this category includes a single data collector component, but multiple data input components may be used in a large distributed environment.

Data Source Components—Many data source components are often used at the same time.

Data Output Components—Many data output components are often used at the same time, with each data output component defining at least part of a data output pipeline.

Inference Components—One or more inference engine components are used by each data output component.

Data Formatter Components—One or more data formatter component components are typically used by each data output module.

Data Transport Components—One or more data transport components are typically used by each data output module.

The IXMCDirect interface depicted in FIG. 19 is used for most communications between components of the data routing system 120. The IXMCDirect interface is made up of the following functions, which are specified in standard OLE/COM IDL format.

A GetProperty method is used to query a specific property from the component implementing the interface.

A SetProperty method is used to set a specific property from the component implementing the interface.

An InvokeMethod method is used to invoke a specific action on the component implementing the interface. An action can cause an event to occur, carry out a certain operation, query a value, and/or set a value within the component implementing the method.

More detailed descriptions of each of the methods implemented by objects implementing the example IXMCDirect interface are described below.

The IXMCDirect:GetProperty method is used to query the property corresponding to the property name 'pszPropName'. Each component defines the properties that it supports. The following table summarizes the GetProperty method implemented by the example IXMCDirect interface:

| Syntax | HRESULT GetProperty( LPCTSTR pszPropName, LPXMC_PARAM_DATA rgData, DWORD dwCount ); |
|---|---|
| Parameters | LPCTSTR pszPropName - string name of the property to query.<br>LPXMC_PARAM_DATA rgData - array of XMC_PARAM_DATA types that specify each parameter corresponding to the property. For example, a certain property may be made up of a number of elements - in this case an array of XMC_PARAM_DATA items is returned, one for each element making up the property. In most cases a property is made up of a single element, thus a single element array is passed to this method. For more information on the XMC_PARAM_DATA type, see below. |

-continued

| | DWORD dwCount - number of XMC_PARAM_DATA elements in the rgData array. |
|---|---|
| Return Value | HRESULT - NOERROR on success, or error code on failure. |

The IXMCDirect:SetProperty method is used to set a property in the component corresponding to the 'pszPropName' property. For the set of properties supported by the component, see the specific component description. The following table summarizes the SetProperty method implemented by the example IXMCDirect interface:

| Syntax | HRESULT SetProperty( LPCTSTR pszPropName, LPXMC_PARAM_DATA rgData, DWORD dwCount ); |
|---|---|
| Parameters | LPCTSTR pszPropName - string name of the property to set.<br>LPXMC_PARAM_DATA rgData - array of XMC_PARAM_DATA types that specify each parameter corresponding to the property. For example, a certain property may be made up of a number of elements - in this case an array of XMC_PARAM_DATA items is returned, one for each element making up the property. In most cases a property is made up of a single element, thus a single element array is passed to this method. For more information on the XMC_PARAM_DATA type, see below.<br>DWORD dwCount - number of XMC_PARAM_DATA elements in the rgData array. |
| Return Value | HRESULT - NOERROR on success, or error code on failure. |

The IXMCDirect:InvokeMethod method is used to call a specific method implemented by the component. For more information on the methods supported, see the description of the specific component. The following table summarizes the InvokeMethod method implemented by the example IXMCDirect interface:

| Syntax | HRESULT InvokeMethod( DWORD dwMethodIdx, LPXMC_PARAM_DATA rgData, DWORD dwCount ); |
|---|---|
| Parameters | DWORD dwMethodIdx - number corresponding to the specific method to invoke. For more information on the method indexes available, see the set of namespaces defined for the component.<br>LPXMC_PARAM_DATA rgData [optional] - array of XMC_PARAM_DATA types that specify each parameter for the method called.<br>For more information on the XMC_PARAM_DATA type, see below.<br>NOTE:<br>if no parameters exist for the method called, a value of NULL must be passed in.<br>DWORD dwCount [optional] - number of XMC_PARAM_DATA elements in the rgData array.<br>NOTE:<br>if no parameters exist for the method called, a value of 0 (zero) must be passed in for this parameter.<br>LPXMC_PARAM_DATA rgData [optional] - namespace associated with the instance of the custom extension module added. |
| Return Value | HRESULT - NOERROR on success, or error code on failure. |

This methods supported by each component making up the system 120 will now be described. Initially, the general methods supported by the majority of the components forming the system 120 will be first be described; the methods supported by each individual component will then be discussed.

The XMC_DE BROWSE_GET_COUNT general method returns the number of data items in the browse set supported by the component and is described in the following table.

| | |
|---|---|
| Index | 8020 |
| Data In | None |
| Data Out | rgData[0] - (number) DWORD, number of browse elements. |

The XMC_DE_BROWSE_GET_ITEMS general method returns the number of data items in the browse set supported by the component and is described in the following table:

| | |
|---|---|
| Index | 8021 |
| Data In | rgData[0] - (number) DWORD, maximum number of elements to collect. |
| Data Out | rgData[0] - (number) number of elements collected, total number of elements will equal (rgData[0] * 2 + 1). rgData[1] - (string) name of the first browse element. rgData[2] - (number) adt of the first browse element. rgData[1 + n*2] - (string) name of the n'th browse element. rgData[2 + n*2] - (number) adt of the n'th browse element. |

The XMC_DE_SYSTEM_CONNECT_CMPNT general method is used to connect one server to another so that they may interact with one another and is described in the following table:

| | |
|---|---|
| Index | 8000 |
| Data In | rgData[0] - (number) DWORD, type of component. The type of component is a value that is server specific. For component type information, see the description for this method under each server's description. rgData[1] - (string) LPTSTR, component class id as an ASCII string. |
| Data Out | None. |

The XMC_DE_SYSTEM_DISCONNECT_CMPNT general method is used to disconnect one server from another so that they stop interacting with one another and is described in the following table:

| | |
|---|---|
| Index | 8001 |
| Data In | rgData[0] - (number) DWORD, type of component. The type of component is a value that is server specific. For component type information, see the description for this method under each server's description. rgData[1] - (string) LPTSTR, component class id as an ASCII string. |
| Data Out | None. |

The XMC_DE_DATA_PROCESS general method is called by a client to process data where a data set is input, processed in some way by the server, and then the resulting data is returned as output. The XMC_DE_DATA_PROCESS method is described in the following table:

| | |
|---|---|
| Index | 8063 |
| Data In | rgData[0] - (number) DWORD, number of data items input. rgData[1 + n*2] - (string) LPCTSTR, name of the data item input. rgData[2 + n*2] - (number or string), value of the data item. |
| Data Out | rgData[0] - (number) DWORD, number of data items output. rgData[1 + n*2] - (string) LPCTSTR, name of the data item output. rgData[2 + n*2] - (number) value of the data item. |

The XMC_DE_DATA_PROCESS CONFIGURE general method is used to configure what type of data is returned when processing a given data item. For example in the server may be configured to return the minimal amount of data on each read (i.e. just the data item value), or the server may be requested to return more substantial data. The XMC_DE_DATA_PROCESS_CONFIGURE method is described in the following table:

| | |
|---|---|
| Index | 8062 |
| Data In | rgData[0] - (number) DWORD, flag describing the type of data to be returned when processing data. The following flags are supported: XMC_DE_READ_DATA_FLAG_TIMESTAMP - requests that the time stamp recorded when processing the data is returned. NOTE: by default, the data item value is always returned. |
| Data Out | None. |

The XMC_DE_DATA_READ general method is called by a client application to poll for data from the server and is defined in the following table:

| | |
|---|---|
| Index | 8061 |
| Data In | rgData[0] - (string) LPCTSTR, name of the data item to read. |
| Data Out | rgData[0] - (number or string), data item value. rgData[1] - (OPTIONAL number) DWORD, data item timestamp as a system time value. NOTE: Since the last items are optional, only those items specified when configuring the data to receive are actually sent. |

The XMC_DE_DATA_READ_CONFIGURE general method is used to configure what type of data is returned when reading a given data item. For example, the server may be configured to return the minimal amount of data on each read (i.e. just the data item value) or the server may be requested to return more substantial data. The following table defines the XMC_DE DATA_READ_CONFIGURE method:

| | |
|---|---|
| Index | 8060 |
| Data In | rgData[0] - (number) DWORD, flag describing the type of data to be returned on each read. The following flags are supported: XMC_DE_READ_DATA_FLAG_TIMESTAMP - requests that the time stamp recorded when reading the data is returned. NOTE: by default, the data item value is always returned. |
| Data Out | None. |

The XMC_DE_DATA_WRITE general method is used to write data to a server and is described in the following table:

| | |
|---|---|
| Index | 8064 |
| Data In | rgData[0] - (number) DWORD, number of data items. rgData[1 + n*2]- (string) LPCTSTR, name of the data item. rgData[2 + n*2] - (number or string), value of the data item. |
| Data Out | None. |

The XMC_DE_EVENT_ENABLE general method enables/disables a previously subscribed data item in the subscription list maintained by the server. Only enabled subscriptions actually fire. The XMC_DE_EVENT_ENABLE method is defined in the following table:

| | |
|---|---|
| Index | 2892 |
| Data In | rgData[0] - (number) DWORD, cookie (unique identifier) associated with the subscription. This value is returned to the client when calling the subscription XMCAPI above. NOTE: using a cookie value of zero (0) will enable/disable ALL items subscribed to the server. rgData[1] - (number) BOOL, TRUE to enable the subscription(s), FALSE to disable the subscription(s). Only enabled subscriptions actually fire events. |
| Data Out | None. |

This XMC_DE_EVENT_RECEIVE_DATA general method is called by the server (and implemented by the client) when each subscribed event fires and is described in the following table:

| | |
|---|---|
| Index | 8045 |
| Data In | rgData[0] - (number) DWORD, subscription cookie corresponding to the subscribed data item. rgData[1] - (number or string), data item value. rgData[2] - (OPTIONAL number) DWORD, data item timestamp as a system time value. rgData[3] - (OPTIONAL string) LPSTR, data item ASCII text name. rgData[4] - (OPTIONAL number) DWORD, data item unique cookie. NOTE: Since the last three items are optional, only those items specified when configuring the data to receive are actually sent. If, for example, one or more data items are NOT requested, then the items are returned in slots shifted up toward rgData[1]. For example if only the data item name is requested in addition to the default data items, the data returned would look like the following: rgData[0] - (number) DWORD, subscription cookie. rgData[1] - (number or string), data item value. rgData[2] - (string) LPSTR, data item name. |
| Data Out | None. |

The XMC_DE_EVENT_RECEIVE DATA_CONFIGURE general method is used to configure what type of data is returned on each event that is fired. For example in the server may be configured to send the minimal amount of data on each event (i.e. subscription cookie and data item value), or the server may be requested to return more substantial data. The XMC_DE_EVENT_RECEIVE_DATA_CONFIGURE method is defined in the following table:

| | |
|---|---|
| Index | 8044 |
| Data In | rgData[0] - (number) DWORD, flag describing the type of data to be returned on each event. The following flags are supported: XMC_DE_EVENT_DATA_FLAG_TIMESTAMP - requests that the time stamp recorded when reading the data is returned. XMC_DE_EVENT_DATA_FLAG_NAME - requests that the data items ASCII text name be returned. XMC_DE_EVENT_DATA_FLAG_DATA_COOKIE - requests that the unique data item cookie corresponding to the read made for the data item be returned. NOTE: by default, the subscription cookie and data item value are always returned. |
| Data Out | None. |

The XMC_DE_EVENT_SUBSCRIBE general method subscribes to a given data item activating the event interface when the subscription criteria are met for the data item. All subscribing components use the IXMCDirect interface to receive events received from the server for which they are subscribed. The XMC_DE_EVENT_SUBSCRIBE method is described in the following table:

| | |
|---|---|
| Index | 2890 |
| Data In | rgData[0] - (number) DWORD, flags describing the initial state of the subscription. The following flags are supported: XMC_DE_EVENT_FLAG_ENABLED - subscription is immediately enabled upon subscription. XMC_DE_EVENT_FLAG_DISABLED - subscription is disabled upon making the subscription. The Enable function must be called to enable the subscription. rgData[1] - (number) DWORD, number of subscription criteria rules. rgData[2 + (2*n)] - (number) DWORD, event condition type where the following types are supported: XMC_CNC_EVENTCONDITION_DATA_CHANGE - any data changes in the data type above will trigger the event. |

| | |
|---|---|
| | XMC__CNC__EVENTCONDITION__DATA__EQUAL |
| | XMC__CNC__EVENTCONDITION__DATA__LESSTHAN |
| | XMC__CNC__EVENTCONDITION__DATA__GREATERTHAN |
| | XMC__CNC__EVENTCONDITION__DATA__AND |
| | XMC__CNC__EVENTCONDITION__DATA__OR |
| | Each of the conditions above are used in a combined manner. Where the logical condition (=, <, >) are applied for each type respectively. |
| | For example, in an array that contains the following items: |
| | rgData[2] = 4 (4 condition values) |
| | rgData[3] = XMC__CNC__EVENTCONDITION__EQUAL |
| | rgData[4] = 3.0 |
| | rgData[5] = XMC__CNC__EVENTCONDITION__LESSTHAN |
| | rgData[6] = 3.0 |
| | rgData[7] = XMC__CNC__EVENTCONDITION__OR |
| | rgData[8] = 1.0 |
| | rgData[9] = XMC__CNC__EVENTCONDITION__GREATERTHAN |
| | rgData[10] = 5.0 |
| | the array would be evaluated using the following logic: |
| | If (DATA <= 3.0 OR DATA > 5.0) then Trigger Event |
| | rgData[3 + (2*n)] - (number) double, the value for the condition. See above. |
| Data Out | rgData[0] - (number) DWORD, cookie (unique identifier) representing the subscription. |

The XMC_DE_EVENT_UNSUBSCRIBE general method removes a previously subscribed data item from the subscription list maintained by the server and is defined in the following table:

| | |
|---|---|
| Index | 2891 |
| Data In | rgData[0] - (number) DWORD, cookie (unique identifier) associated with the subscription. This value is returned to the client when calling the subscription XMCAPI above. NOTE: using a cookie value of zero (0) will unsubscribe ALL items subscribed to the server. |
| Data Out | None. |

The XMC_DE_SYSTEM_INITIALIZEHW general method is used to initialize any hardware systems associated with the component and is defined in the following table:

| | |
|---|---|
| Index | 500 |
| Data In | None. |
| Data Out | None. |

The XMC_DE_SYSTEM_SHUTDOWNHW general method is used to shutdown any hardware systems associated with the component and is defined by the following table:

| | |
|---|---|
| Index | 501 |
| Data In | None. |
| Data Out | None. |

The following discussion will define which of the general methods implemented are implemented by particular components of the system 120.

The data collection component 140 implements the general methods described above as indicated in the following table:

| Method | Implemented | Not Implemented |
|---|---|---|
| XMC_DE_BROWSE_GET_COUNT | x | |
| XMC_DE_BROWSE_GET_ITEMS | x | |
| XMC_DE_DATA_PROCESS | | x |
| XMC_DE_DATA_PROCESS_CONFIGURE | | x |
| XMC_DE_DATA_READ | x | |
| XMC_DE_DATA_READ_CONFIGURE | x | |
| XMC_DE_DATA_WRITE | | x |
| XMC_DE_EVENT_ENABLE | x | |
| XMC_DE_EVENT_RECEIVE_DATA | x | |
| XMC_DE_EVENT_RECEIVE_DATA_CONFIGURE | x | |
| XMC_DE_EVENT_SUBSCRIBE | x | |
| XMC_DE_EVENT_UNSUBSCRIBE | x | |
| XMC_DE_SYSTEM_CONNECT_CMPNT | x | |
| XMC_DE_SYSTEM_DISCONNECT_CMPNT | x | |
| XMC_DE_SYSTEM_INITIALIZEHW | | x |
| XMC_DE_SYSTEM_SHUTDOWNHW | | x |

The following special notes apply to some of the general methods implemented by the data collection component 140.

The following component types are valid for the XMC_DE_SYSTEM_CONNECT_CMPNT method as implemented by the data collection component 140: the XMC_DE_CMPNT_TYPE_XMCDSRC, which specifies a data source component 142.

The following component types are valid for the XMC_DE_SYSTEM_DISCONNECT_CMPNT method as implemented by the data collection component 140: XMC_DE_CMPNT_TYPE_XMCDSRC, which specifies an data source component 142.

The data source component 142 implements the general methods described above as indicated in the following table:

| Method | Implemented | Not Implemented |
| --- | --- | --- |
| XMC_DE_BROWSE_GET_COUNT | x | |
| XMC_DE_BROWSE_GET_ITEMS | x | |
| XMC_DE_DATA_PROCESS | | x |
| XMC_DE_DATA_PROCESS_CONFIGURE | | x |
| XMC_DE_DATA_READ | x | |
| XMC_DE_DATA_READ_CONFIGURE | x | |
| XMC_DE_DATA_WRITE | | x |
| XMC_DE_EVENT_ENABLE | x | |
| XMC_DE_EVENT_RECEIVE_DATA | x | |
| XMC_DE_EVENT_RECEIVE_DATA_CONFIGURE | x | |
| XMC_DE_EVENT_SUBSCRIBE | x | |
| XMC_DE_EVENT_UNSUBSCRIBE | x | |
| XMC_DE_SYSTEM_CONNECT_CMPNT | | x |
| XMC_DE_SYSTEM_DISCONNECT_CMPNT | | x |
| XMC_DE_SYSTEM_INITIALIZEHW | x | |
| XMC_DE_SYSTEM_SHUTDOWNHW | x | |

There are no special notes for the methods implemented by the data source components 142.

The data store component 150 implements the general methods described above as indicated in the following table:

| Method | Implemented | Not Implemented |
| --- | --- | --- |
| XMC_DE_BROWSE_GET_COUNT | x | |
| XMC_DE_BROWSE_GET_ITEMS | x | |
| XMC_DE_DATA_PROCESS | | x |
| XMC_DE_DATA_PROCESS_CONFIGURE | | x |
| XMC_DE_DATA_READ | x | |
| XMC_DE_DATA_READ_CONFIGURE | x | |
| XMC_DE_DATA_WRITE | | x |
| XMC_DE_EVENT_ENABLE | x | |
| XMC_DE_EVENT_RECEIVE_DATA | x | |
| XMC_DE_EVENT_RECEIVE_DATA_CONFIGURE | x | |
| XMC_DE_EVENT_SUBSCRIBE | x | |
| XMC_DE_EVENT_UNSUBSCRIBE | x | |
| XMC_DE_SYSTEM_CONNECT_CMPNT | x | |
| XMC_DE_SYSTEM_DISCONNECT_CMPNT | x | |
| XMC_DE_SYSTEM_INITIALIZEHW | | x |
| XMC_DE_SYSTEM_SHUTDOWNHW | | x |

The following special notes apply to each of the general methods implemented by the data store component 150.

The following component types are valid for the XMC_DE_SYSTEM_CONNECT_CMPNT method on the data store component 150:

XMC_DE CMPNT_TYPE_XMCDCACHE, which specifies a data cache 152;

XMC_DE CMPNT_TYPE_XMCDC, which specifies a data collection component 140 that is connected with events; and XMC_DE_CMPNT_TYPE_XMCDO, which specifies a data transport component 162 that is connected with events.

The following component types are valid for the XMC_DE_SYSTEM_DISCONNECT_CMPNT method as implemented by the data store component 150:

XMC_DE_CMPNT_TYPE_XMCDCACHE, which specifies a data cache 152;

XMC_DE_CMPNT_TYPE_XMCDC, which specifies a data collection component 140 that is connected with events; and XMC_DE CMPNT_TYPE_XMCDO, which specifies an XMC data output module 134 that is connected with events.

The data store component 150 implements the general methods described above as indicated in the following table:

| Method | Implemented | Not Implemented |
|---|---|---|
| XMC_DE_BROWSE_GET_COUNT | x | |
| XMC_DE_BROWSE_GET_ITEMS | x | |
| XMC_DE_DATA_PROCESS | | x |
| XMC_DE_DATA_PROCESS_CONFIGURE | | x |
| XMC_DE_DATA_READ | x | |
| XMC_DE_DATA_READ_CONFIGURE | x | |
| XMC_DE_DATA_WRITE | x | |
| XMC_DE_EVENT_ENABLE | x | |
| XMC_DE_EVENT_RECEIVE_DATA | x | |
| XMC_DE_EVENT_RECEIVE_DATA_CONFIGURE | x | |
| XMC_DE_EVENT_SUBSCRIBE | x | |
| XMC_DE_EVENT_UNSUBSCRIBE | x | |
| XMC_DE_SYSTEM_CONNECT_CMPNT | | x |
| XMC_DE_SYSTEM_DISCONNECT_CMPNT | | x |
| XMC_DE_SYSTEM_INITIALIZEHW | | x |
| XMC_DE_SYSTEM_SHUTDOWNHW | | x |

There are no special notes for the methods implemented by the data store component 150.

The data output component 160 implements the general methods described above as indicated in the following table:

| Method | Implemented | Not Implemented |
|---|---|---|
| XMC_DE_BROWSE_GET_COUNT | x | |
| XMC_DE_BROWSE_GET_ITEMS | x | |
| XMC_DE_DATA_PROCESS | | x |
| XMC_DE_DATA_PROCESS_CONFIGURE | | x |
| XMC_DE_DATA_READ | x | |
| XMC_DE_DATA_READ_CONFIGURE | x | |
| XMC_DE_DATA_WRITE | | x |
| XMC_DE_EVENT_ENABLE | x | |
| XMC_DE_EVENT_RECEIVE_DATA | x | |
| XMC_DE_EVENT_RECEIVE_DATA_CONFIGURE | x | |
| XMC_DE_EVENT_SUBSCRIBE | x | |
| XMC_DE_EVENT_UNSUBSCRIBE | x | |
| XMC_DE_SYSTEM_CONNECT_CMPNT | x | |
| XMC_DE_SYSTEM_DISCONNECT_CMPNT | x | |
| XMC_DE_SYSTEM_INITIALIZEHW | | x |
| XMC_DE_SYSTEM_SHUTDOWNHW | | x |

The following special notes methods apply to the general methods as implemented by the data output component 160.

The following component types are valid for the XMC_DE_SYSTEM_CONNECT_CMPNT as implemented by the data output component 160:
  XMC_DE_CMPNT_TYPE_XMCINFERENCE, which specifies an inference engine component 166;
  XMC_DE_CMPNT_TYPE_XMCDFORMAT, which specifies a data formatter component 164; and
  XMC_DE_CMPNTTYPE_XMCDTRANSPORT, which specifies a data transport component 162.

The following component types are valid for the XMC_DE_SYSTEM_DISCONNECT_CMPNT as implemented by the data output component 160:
  XMC_DE_CMPNT_TYPE_XMCINFERENCE, which specifies an inference engine component 166.
  XMC_DE_CMPNT_TYPE_XMCDFORMAT, which specifies an data formatter component 164.
  XMC_DE CMPNT_TYPE_XMCDTRANSPORT, which specifies an data transport component 162.

The inference engine component 166 implements the general methods described above as indicated in the following table:

| Method | Implemented | Not Implemented |
|---|---|---|
| XMC_DE_BROWSE_GET_COUNT | x | |
| XMC_DE_BROWSE_GET_ITEMS | x | |
| XMC_DE_DATA_PROCESS | x | |
| XMC_DE_DATA_PROCESS_CONFIGURE | x | |
| XMC_DE_DATA_READ | | x |
| XMC_DE_DATA_READ_CONFIGURE | | x |
| XMC_DE_DATA_WRITE | x | |
| XMC_DE_EVENT_ENABLE | | x |

| Method | Implemented | Not Implemented |
| --- | --- | --- |
| XMC_DE_EVENT_RECEIVE_DATA | | x |
| XMC_DE_EVENT_RECEIVE_DATA_CONFIGURE | | x |
| XMC_DE_EVENT_SUBSCRIBE | | x |
| XMC_DE_EVENT_UNSUBSCRIBE | | x |
| XMC_DE_SYSTEM_CONNECT_CMPNT | | x |
| XMC_DE_SYSTEM_DISCONNECT_CMPNT | | x |
| XMC_DE_SYSTEM_INITIALIZEHW | | x |
| XMC_DE_SYSTEM_SHUTDOWNHW | | x |

There are no special notes for the methods implemented by the inference engine component 166.

The data formatter component 164 implements the general methods described above as indicated in the following table:

| Method | Implemented | Not Implemented |
| --- | --- | --- |
| XMC_DE_BROWSE_GET_COUNT | x | |
| XMC_DE_BROWSE_GET_ITEMS | x | |
| XMC_DE_DATA_PROCESS | x | |
| XMC_DE_DATA_PROCESS_CONFIGURE | x | |
| XMC_DE_DATA_READ | | x |
| XMC_DE_DATA_READ_CONFIGURE | | x |
| XMC_DE_DATA_WRITE | x | |
| XMC_DE_EVENT_ENABLE | | x |
| XMC_DE_EVENT_RECEIVE_DATA | | x |
| XMC_DE_EVENT_RECEIVE_DATA_CONFIGURE | | x |
| XMC_DE_EVENT_SUBSCRIBE | | x |
| XMC_DE_EVENT_UNSUBSCRIBE | | x |
| XMC_DE_SYSTEM_CONNECT_CMPNT | | x |
| XMC_DE_SYSTEM_DISCONNECT_CMPNT | | x |
| XMC_DE_SYSTEM_INITIALIZEHW | | x |
| XMC_DE_SYSTEM_SHUTDOWNHW | | x |

There are no special notes for the methods implemented by the data formatter component 164.

The data transport component 162 implements the general methods described above as indicated in the following table:

| Method | Implemented | Not Implemented |
| --- | --- | --- |
| XMC_DE_BROWSE_GET_COUNT | x | |
| XMC_DE_BROWSE_GET_ITEMS | x | |
| XMC_DE_DATA_PROCESS | | x |
| XMC_DE_DATA_PROCESS_CONFIGURE | | x |
| XMC_DE_DATA_READ | | x |
| XMC_DE_DATA_READ_CONFIGURE | | x |
| XMC_DE_DATA_WRITE | x | |
| XMC_DE_EVENT_ENABLE | | x |
| XMC_DE_EVENT_RECEIVE_DATA | | x |
| XMC_DE_EVENT_RECEIVE_DATA_CONFIGURE | | x |
| XMC_DE_EVENT_SUBSCRIBE | | x |
| XMC_DE_EVENT_UNSUBSCRIBE | | x |
| XMC_DE_SYSTEM_CONNECT_CMPNT | | x |
| XMC_DE_SYSTEM_DISCONNECT_CMPNT | | x |
| XMC_DE_SYSTEM_INITIALIZEHW | | x |
| XMC_DE_SYSTEM_SHUTDOWNHW | | x |

There are no special notes for the methods implemented by the data transport component 162.

All methods exposed by each component in the example data routing system 120 use a standard parameter set to describe data used to set and query properties as well as to invoke methods. The standard parameters are in the following format:

```
pObj->InvokeMethod(LPXMC_PARAM_DATA rgData, DWORD
dwCount);
```

Each element in the rgData array corresponds to a parameter, with the first element in the array corresponding to the first parameter.

The XMC_PARAM_DATA structure can contain either a numerical or a string value and is defined as follows:

```
typedef struct tagXMC_PARAM_DATA
{
    LNG_PARAM_DATATYPE adt;
    union
    {
        double df;
        LPTSTR psz;
    };
}XMC_PARAM_DATA;
```

The 'adt' member of the XMC_PARAM_DATA structure describes the data contained within the XMC_PARAM_DATA structure. The values are described below:

| LNG_PARAM_DATATYPE | Description |
| --- | --- |
| LNG_ADT_NUMBER | Use this value when passing a numerical value via the 'adt' member of the XMC_PARAM_DATA structure. |
| LNG_ADT_STAT_STRING | Use this value when passing a static string value via the 'psz' member of the XMC_PARAM_DATA structure. Static strings do not need to be freed from memory. |
| LNG_ADT_MEM_STRING | Use this value when passing a string value via the 'psz' member of the XMC_PARAM_DATA structure. LNG_ADT_MEM_STRING denotes that the string must be freed from memory during cleanup. |
| LNG_ADT_NOP | This value is used to ignore items within the XMC_PARAM_DATA array. When specifies, this parameter is not used. |

When querying and setting boolean TRUE/FALSE values, any non-zero value is considered TRUE, whereas a zero value is considered FALSE.

As described herein, the data routing system 120 is designed to collect data from one or more data origins 122, perform some decision logic on the data collected, and then send the data to one or more data destinations 124 based on the outcome of the decision logic run on the data inputs.

Figure 20:
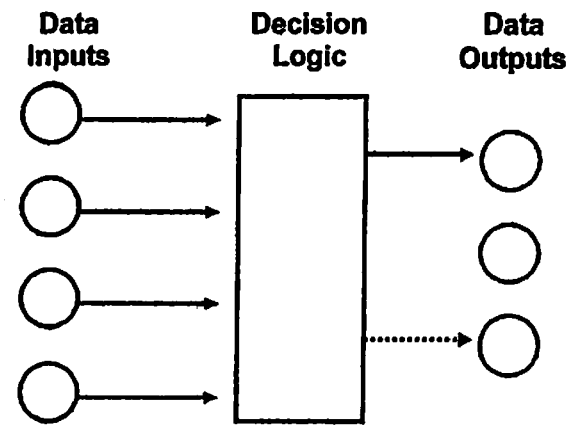
FIGS. 20 and 21 are highly schematic block diagrams depicting alternate relationships of data inputs, data outputs, and decision logic that may be used by the example data routing systems of FIGS. 1 and 2.

For example, data inputs may be data items describing the current state of a machine tool, automobile or other machine as shown in FIG. 20. The decision logic would then use these data inputs to determine the overall health or efficiency of the machine. Data outputs would be used to describe the machine's health or efficiency. This model thus operates as a data 'router', where data is routed from one or more input to one or more output based on the decision logic run on the inputs. Typically this model is used to 'cook-down' a wide array of data inputs that are very detailed in nature, to a more general set of data outputs that describe the overall performance, state or behavior of the machine.

Figure 21:
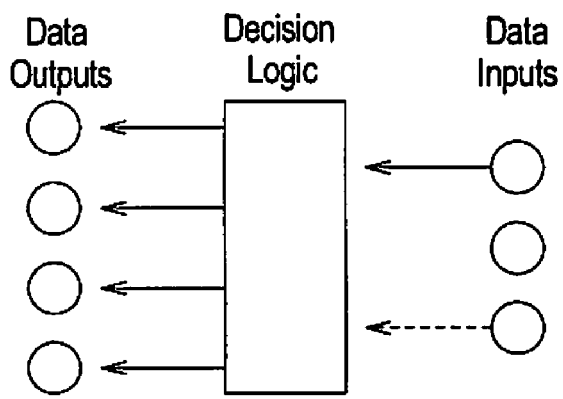

However, this overall model can easily run in the reverse where the data input and output roles are reversed. In such an example, as generally shown in FIG. 21 the inputs are general in nature and then decision logic is used to determine the specific detailed outputs necessary to carry out a given behavior or action or to enter a given state.

For example using the latter model, a general input to a machine tool may be something like 'mill a pocket' at a certain point. The decision logic in turn would then figure out all of the necessary tools, feedrate, spindlerate and moves necessary to create the pocket on the part. Once determined, the decision logic would 'output' the values as a set of detailed output values such as the specific feedrate, the specific spindlerate and the move profile to use. Each output would then be sent directly to the machine controller hardware that actually ran the servo algorithms to move the tool and cut the part.

In another example, general inputs may be used to direct the path for which a car, airplane, ship or other mobile machine moved to a given destination. For example, a general set of instructions would make up the inputs such as follow road 'x' to intersection 'y', turn left at intersection 'y', drive to house 'b'. The decision logic in this example would then be used to determine how to drive along road 'x' (making sure to track the right hand side of the road by following the yellow or white lines painted on the road), decision logic would determine when the intersection sought had been reached, how to negotiate the turn and drive to house 'b'. When making each of these decisions the decision logic system would more than likely require additional, more detailed input from sensor systems. Each output could then take a more detailed form such as the speed that the car or other mobile should drive, and the steering adjustments needed to track and follow the desired path on the selected road.

II. Second Embodiment

Command Distribution

The present invention relates to systems and methods for processing various types of commands transmitted between one or more command sources and one or more command targets forming part of a larger command system. The present invention is of particular significance when the command system is part of a motion control system, and that application will be referred to on occasion below. As used herein, the term "command" refers to information that allows an operation to be executed on a command target.

The present invention may be implemented using any one or more of a number of different system designs. A self contained system 520 of the present invention will be described below with reference to FIGS. 22-29. The self contained system 520 describes a command processor component that implements all command processing functionality within a single component. A modular design will be described with reference to FIGS. 30-35. The modular design describes a command processor system made up of the command processor component and one or more command execution components. The example self contained and modular designs are described below with reference to a module interaction description and a set of use cases that describe how the modules interact with one another when carrying out common operations.

In the present application, the term "module" is used to refer to a binary block of computer logic that contains functions, objects, components, ActiveX components, .NET source, HTML, XML and/or other computer code that can be executed in real-time or in script form. Several examples of a module include an executable EXE, a dynamic link library DLL, an OLE component or set of components housed within a DLL or EXE, an ActiveX Control, an HTML or XML based Control, a VB script source file, a Java Serverlet, Java Control, Java Object, .NET Package, etc. The term "component" as used herein refers to a logical organization of computer logic designed to perform a set of operations. Several examples of a component are an OLE Component, an ActiveX Control, an HTML or XML based Control, an HTML or XML based object, a .NET object, a Visual Basic based object, etc.

Figure 22:
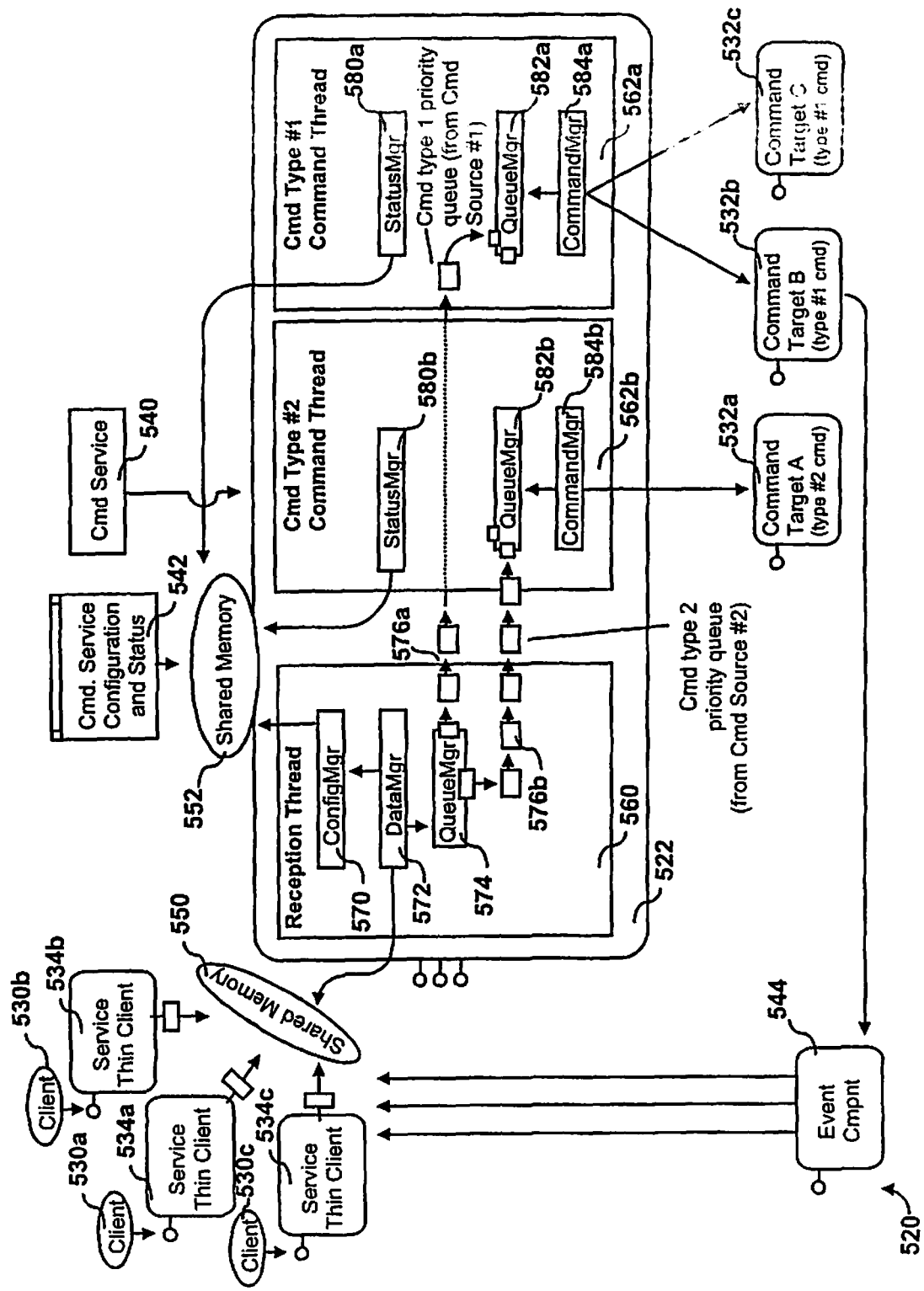
FIG. 22 is a module interaction map depicting the interaction of modules of a command processor system of a first embodiment of the present invention.

Referring now to FIG. 22 of the drawing, depicted therein at 520 is a command processing system constructed in accordance with the principles of a self contained system 520 of the present invention. The self contained system 520 comprises a command processor 522 implemented such that all command processing takes place within a single component. The self contained system 520 may allow for faster command processing than command processing systems using alternative designs.

The command processor 522 is designed to run as an individual COM+ Component either in a stand alone manner under COM+. In the context of a motion system, the command processor 522 may be designed to operate under a Windows NT Service application for providing motion services (e.g., XMC Service). When run under COM+, the command processor 522 may receive commands in various forms, including SOAP (simple object architecture protocol), Web Services, COM method calls, and by monitoring a section of shared memory for command requests. Various other command input methods may also employed.

The example command processing system 520 comprises the command processor component 522, one or more command source components 530, and one or more command target components 532. The example command sources 530 are each associated with a service client 534. The example command processing system 520 further comprises a command service module 540 and a command service configuration and status module (configuration and status module) 542. In some situations, the command processing system 520 may further comprise an event component 544.

The example command processor 522 receives, runs, and responds to commands received through first and second areas 550 and 552 of shared memory in the system 520. The command processor may optionally run as a COM+ component that services SOAP or other Web Service requests directly or via COM+. The command processor 522 may optionally communicate with the command target components 532 across a network, depending on the overall system architecture. As used herein, the term "network" refers to a link between two or more computer systems and may be in the form of a packet based network, a streaming based network, broadcast based network, or peer-to-peer based network. Several network examples include a TCP/IP network, the Internet, an Intranet, a wireless network using WiFi, a wireless network using radio waves and/or other light based signals, etc.

If the sent commands relate to a command operation that must run as a set of commands or not at all, the command processor 522 may employ command 'framing' to ensure that the commands are run as a set. U.S. Pat. No. 6,480,896 to the present Applicant describes a system of command framing in the context of a motion control system.

The example service clients 534 are thin service components associated with specific clients or types of clients that interface with the shared memory used to communicate command requests to the command processor 522. Each service client 534 may also relay input to the command processor 522 by receiving commands via some other protocol such as TCP/IP, SOAP Messaging, or the like that is transferred either locally or across a network. Once received, the command is then converted into the appropriate shared memory format to direct the command processor 522 that a new command is ready for processing. Optionally the service client 534 may communicate either locally or across a network using OLE/COM interface methods of the command processor 522. This method is typically not as fast, but can allow for architectural flexibility.

In the context of a motion control system, the command sources 530 may be formed by an application programming interface for motion systems 530a (e.g., XMC API), a system for processing data 530b (e.g., XMC Data Router), and/or other clients 530c.

The command targets 532 are sets of components used to monitor devices or machines. Each of the command targets 532 may be created for particular device or machine or class of devices or machines. The terms "device" or "machine" as used herein refer to a physical asset used to perform a specified task. For example, a machine may be a CNC Mill used to shape metal, a pick-n-place machine used to position parts on a circuit board, a robotic machine used to perform surgery, a medical data input device used to collect the vitals from a human being (i.e. blood glucose meter, asthma meter, etc), a gaming device used when playing a game, a robotic toy, an animatronics figure, a robotic machine used to deliver goods to a warehouse or to people, an automobile, truck or farm vehicle, a boat or ship that maneuvers in water, a airplane, jet, helicopter and/or spacecraft. Basically any self powered machine or device (mobile or not) that is either directly controlled by humans or automatically controlled via a computer based system.

In the context of a motion control system, the command targets may be formed by a system of transmitting data to a motion system (data engine) 534a (e.g., XMCDE Data Engine system), a system for automating control of a CNC motion system (CNC control system) 534b (e.g., XMC CNC Automation system), and/or a system for automating control of a GMC motion system (GMC control system) 534c (e.g., XMC GMC Automation system).

The configuration and status module 542 allows the user to configure the service and gain status on how the application is running. The example command service module 542 is a very thin Windows NT Service that optionally hosts the command processor 522, thereby allowing the command processor to run even while the current user is not logged into the system.

The event component 544 sends event data received from one of the data sources formed by the target components 532 to one or more 'listening' client components 534 associated with the command sources 530. The term "data" as used herein refers to any numeric or string data values collected from a target machine or device in an analog or digital format that is made compatible for computer systems. Examples of data types that represent data items include BIT, BYTE, WORD, DWORD, LONG, REAL, DOUBLE, FLOAT, STRING, ASCII STRING. Data may be collected from data sources using various methods such as reading register values on the data source, reading shared memory provided by the data source, sending commands to the data source for which a data response is given containing the data requested, reading variables provided by the data source, reading and writing to variables in a sequence necessary to produce data values, querying data using a proprietary or standard data protocol, and/or calling a function provided by the target data source.

As shown in FIG. 22, the example command processor 522 comprises several C++ objects and Windows NT threads that interact with one another to route the commands received to the appropriate target components that ultimately carry out the specifics of the command requested. In particular, the example command processor 522 comprises a reception thread 560 and one or more command threads 562.

The reception thread 560 is responsible for receiving commands placed in the shared memory 552. The reception thread 560 continually scans the shared memory 552 for new commands triggered by the use of global events.

In the context of a motion control system, the command threads 562 are of two types, where a first command thread 562a processes commands associated with the data engine 534a and the second command thread 562b processes commands associated with the CNC motion system 534b and the GMC motion system 534c.

The following C++ objects are used to implement portions of the example command processor 522.

The reception thread 560 comprises a ConfigMgr object 570, a DataMgr object 572, and a QueueMgr object 574. The ConfigMgr object 570 accesses configuration information placed in the shared memory area 552 by the configuration and status module 542. The DataMgr 572 pulls commands from the memory area 550 shared with the service clients 534. The example QueueMgr object 574 manages one or more priority queues 576 servicing the command threads 562.

The command threads 562 each comprise a StatusMgr object 580, a QueueMgr object 582, and a CommandMgr object 584. The StatusMgr object 580 is manages and updates the status area 552 of the shared memory used by the configuration and status module 542. The status information managed and updated by the StatusMgr object 580 may be displayed to provide a user with visual feedback on what the command threads 562 are actually doing at each point in time, as well as the number of elements in the command queues. The CommandMgr object 584 carries out each command by calling the appropriate target components 532.

The interaction of the objects, threads and components forming the command processor 522 will now be described in several common use cases. The following use cases will be described below: Initialization, System Start, Command Processing (First Command Thread), Command Processing (Second Command Thread), Receiving Data, and Receiving Events. The steps making up each use case are described in the order in which they occur.

Figure 23:
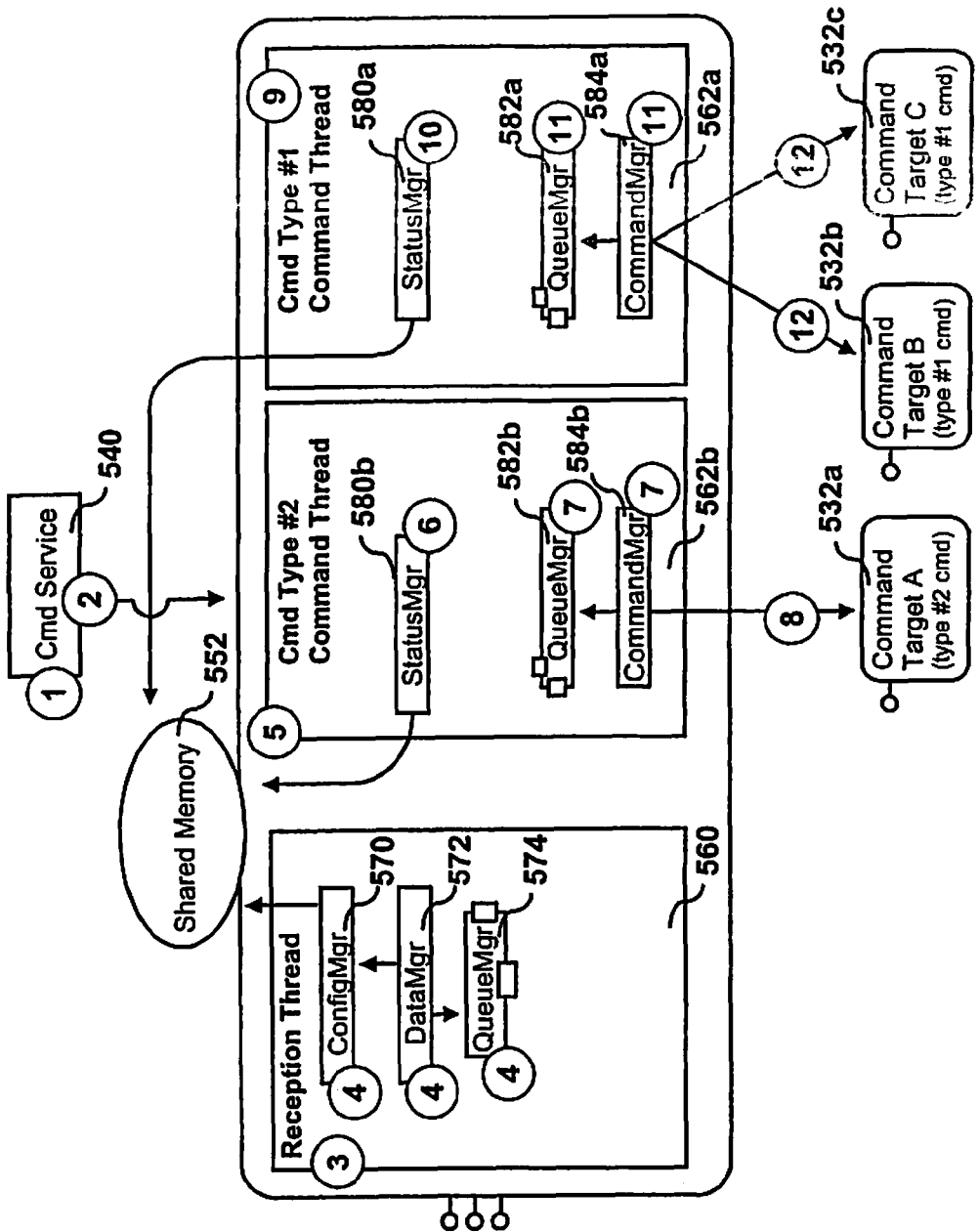
FIGS. 23-29 are use case maps illustrating common uses cases that occur during operation of the example command processing system of FIG. 22.

Referring now to FIG. 23, the Initialization use case will first be described. Initialization takes place when an application, such as the command services application 540, first starts up and loads the command processor 522. During this process each of the threads are started and all C++ objects are initialized.

The following steps take place when initializing the command processor 522. In step 1, the application hosting the command processor 522, such as the XMC Windows NT Service or COM+ DLLHOST, starts up. In step 2, the host application creates the component forming the command processor 522. When first created, the component forming the command processor 522 creates and starts the reception thread 560 in step 3. In step 4, ConfigMgr, DataMgr and QueueMgr objects 570, 572, and 574 used by the reception thread 560 are created and initialized.

In step 5, the second command thread 562b is created and started. In step 6, an instance of the StatusMgr object 580b is created and initialized. Once created, this component 580b may be used to update status information on the overall initialization process. In step 7, instances of the QueueMgr and CommandMgr objects 582b and 584b are created and initialized. In step 8, the CommandMgr object 584b creates an instance of its associated target component 532a.

In step 9, the command thread or threads 562 are created and started. In step 10, an instance of the StatusMgr object 580a is created and initialized, allowing status information on the initialization progress of the command thread 562a to be set. In step 11, an instance of the CommandMgr and QueueMgr objects 582a and 584a used by the thread 562a are created and initialized.

At step 12, the CommandMgr creates an instance of the command targets 532b and 532c. In the context of a motion control system, a multi-system configuration may optionally use separate threads to process CNC and GMC commands respectively.

After completing the initialization, the reception thread 560 places itself in the 'paused' state so that it will not process any commands until resumed. At this point the command processor 522 is initialized and ready to be started.

Once initialized, the reception thread 560 must be resumed from its paused state prior to use of the system 520. No commands are processed until the reception thread 560 is resumed.

Figure 24:
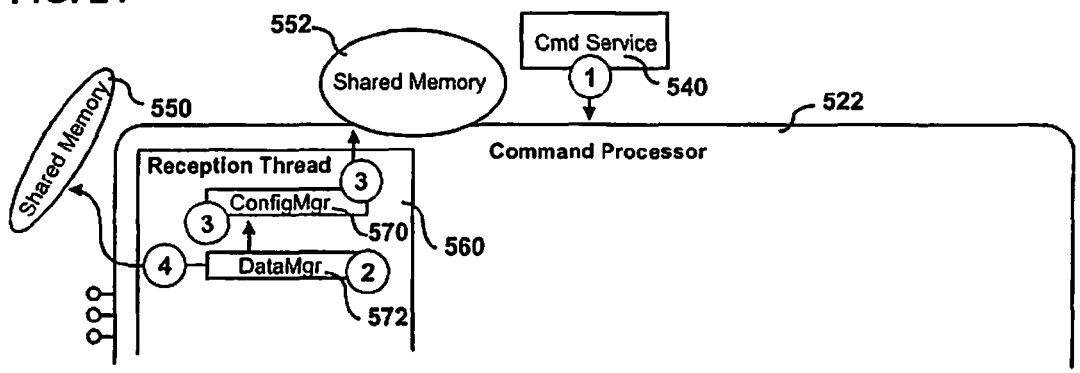

Referring now to FIG. 24, the following steps occur when starting the command processor 522. In step 1, the hosting command service application 540 calls a method on the command processor 522 component to 'start' the command processing. In step 2, upon receiving the 'start' call, the command processor 522 component resumes the reception thread 560 causing the DataMgr object 572 to first query for any configuration changes.

In step 3, the DataMgr object 572 queries the ConfigMgr object 574 for any configuration changes such as a new priority for the reception thread 560, etc. The ConfigMgr object 570 queries the configuration shared memory for any settings. Once started as shown at step 4, the DataMgr object 572 resumes normal operation and continually checks for new commands in the shared memory.

At this point all commands received are processed normally. The following sections describe how two of the main command types are processed; namely the example command threads 562a and 562b.

Figure 25:
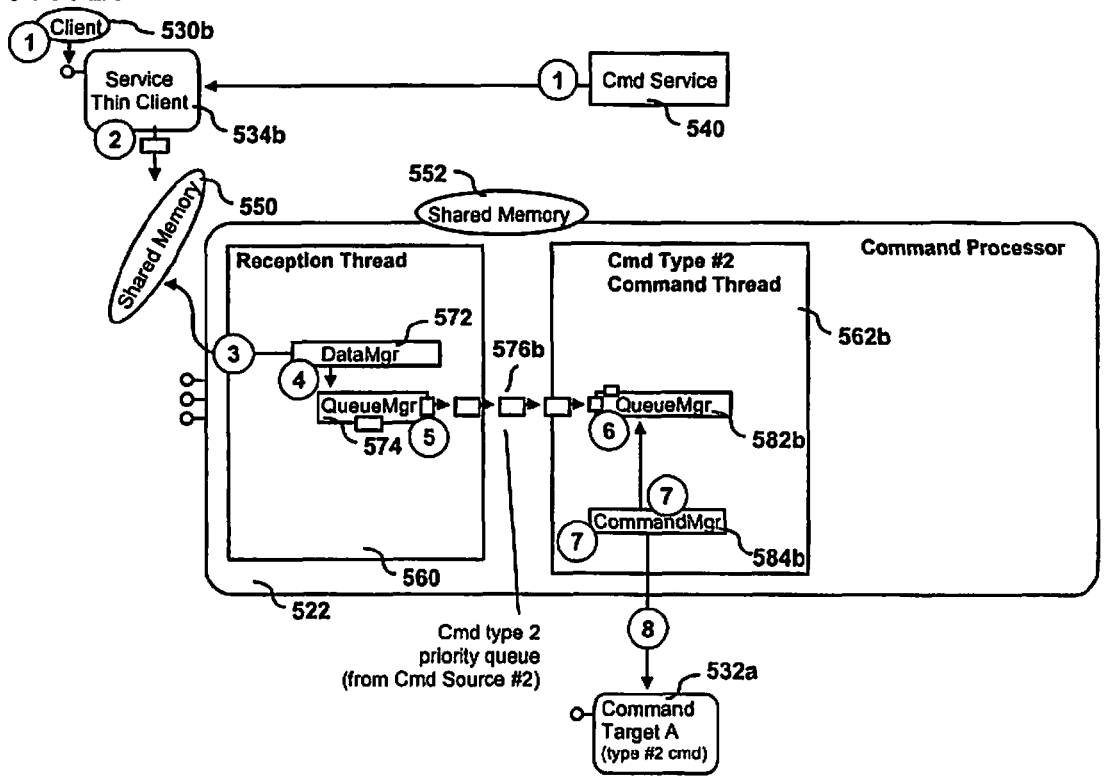

Referring first to FIG. 25, depicted therein is the processing implemented by the second type of command thread 562b. In general, all commands associated with the command target 532a are processed are routed to the first command target 532a. Examples of the commands sent to the command target 532a are Start' or 'Pause' and these commands will be referred to as first type commands.

The following steps occur when processing commands destined for the command target 532a. In step 1, the command source 530b calls the service client 534b requesting that a given first type command be run. As generally discussed above, some commands may be initiated by the host itself, a user interface application, or even a protocol listener used to convert and route command requests using the service client 534b.

In step 2, the service client 534b packages the command into an area within the shared memory area 550 specifically allocated for that instance of the service client 534b. Within the command processor 522, the reception thread 560 is continually monitoring the shared memory 550 for new commands as shown in step 3. Upon detecting a new command, the DataMgr object 572 extracts the command information from the shared memory area 550.

In step 4, the DataMgr object 572 passes the command information to the QueueMgr object 574. In step 5, the QueueMgr object 574 packages the command information into a queue command element and places the command in the priority queue 576b. The element may be placed at a location in the queue based on the element's priority so that high priority commands are processed sooner than low priority commands.

Within the command threads 562, the QueueMgr object 574 implicitly receives the queued command (i.e. it is the same queue accessed in the reception thread 560) as shown in step 6.

As shown in step 7, the CommandMgr object 584b, which continually checks for new commands to run in the command thread 562b, detects a new command and pulls it from the QueueMgr object 582b. And finally in step 8, the CommandMgr object directs the command to the command target component 532a, which carries out the requested command.

At this point the command is complete. However, the mechanism just described does not allow notification back to the service client 534b that requested the command. This type of command is known as a 'broadcasted' command, where the command is sent without sending back status on the results of the command carried out.

Figure 26:
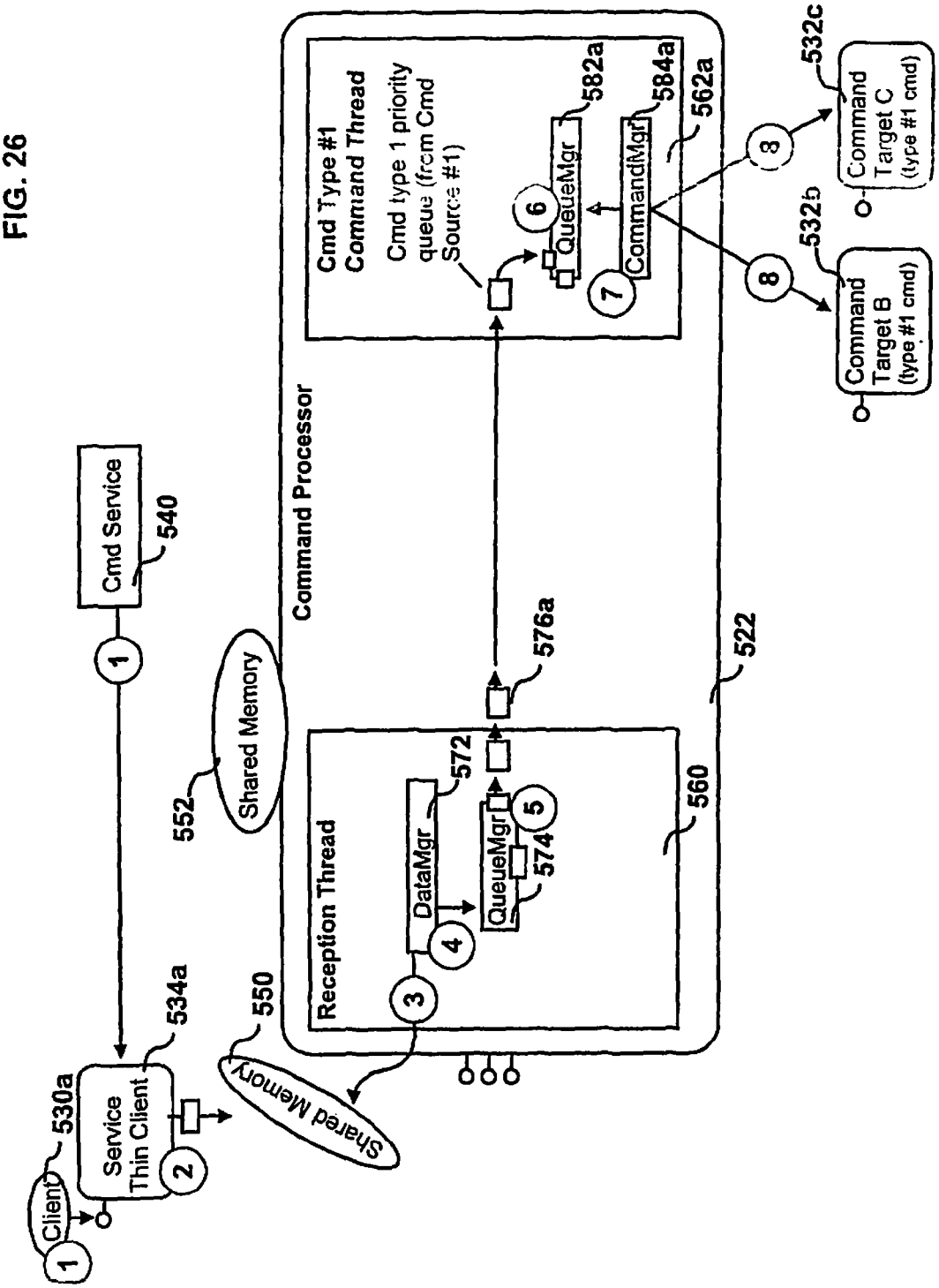

As shown in FIG. 26, the first command thread 562a operates in a manner similar to that of the second command thread 562b, except that commands routed through the first command thread 562a are routed to one of the command targets 532b and 532c instead of the command target 532a.

The following steps occur when processing commands destined for the command targets 532b and 532c.

In step 1, the service client 530 calls the Service Thin Client requesting to run a given first type command. Again, some commands may be initiated by the host itself, a user interface application, or even a protocol listener used to convert and route command requests using the service client 534.

In step 2, the service client 534a packages the command into the area within the shared memory area 550 specifically allocated for that instance of the service client 534a.

Within the command processor 522, the reception thread 560 is continually monitoring the shared memory for new commands as shown in step 3. Upon detecting a new command, the DataMgr object 572 extracts the command information from the shared memory.

As shown in step 4, the DataMgr object 572 passes the command information to the QueueMgr object 574. At step 5, the QueueMgr object 574 packages the command information into a queue command element and places the command in the priority queue 576a. The element may be placed at a location in the queue based on the elements priority so that high priority commands are processed sooner than low priority commands.

As shown at step 6, within the command thread 562a, the QueueMgr object 582a implicitly receives the queued command (i.e. it is the same queue accessed in the reception thread 560).

At step 7, the CommandMgr object 584a, which continually checks for new commands to run in the command thread 562a, detects a new command and pulls it from the QueueMgr object 582a.

And finally at step 8, the CommandMgr object 584a directs the command to the command target component 532b and/or 532c which carries out the requested command.

At this point the command is complete. Again, no notification is sent back to the service client 534 who requested the command. This example command is known as a 'broadcasted' command where the command is sent without sending back status on the results of the command carried out.

Figure 27:
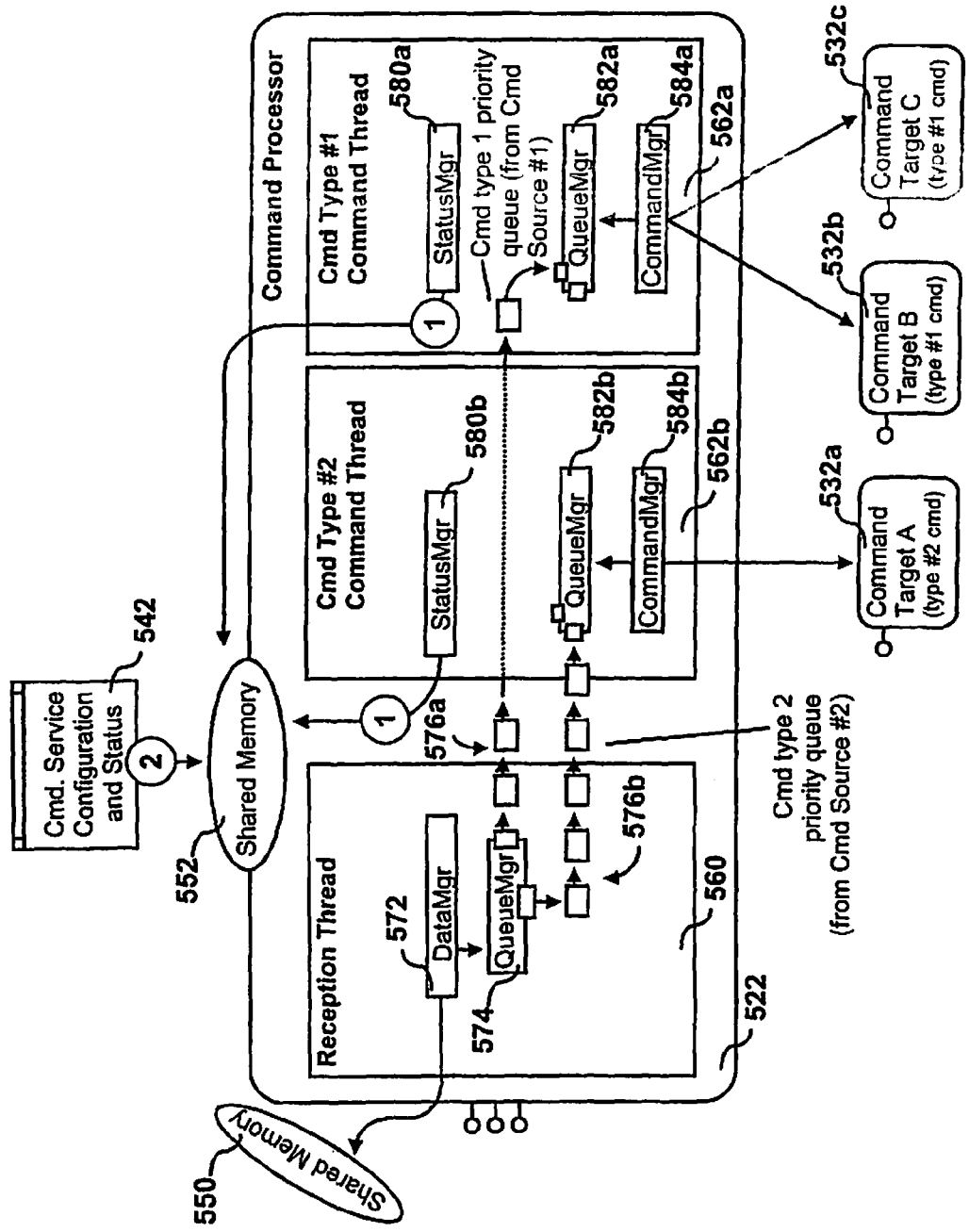
Figure 28:
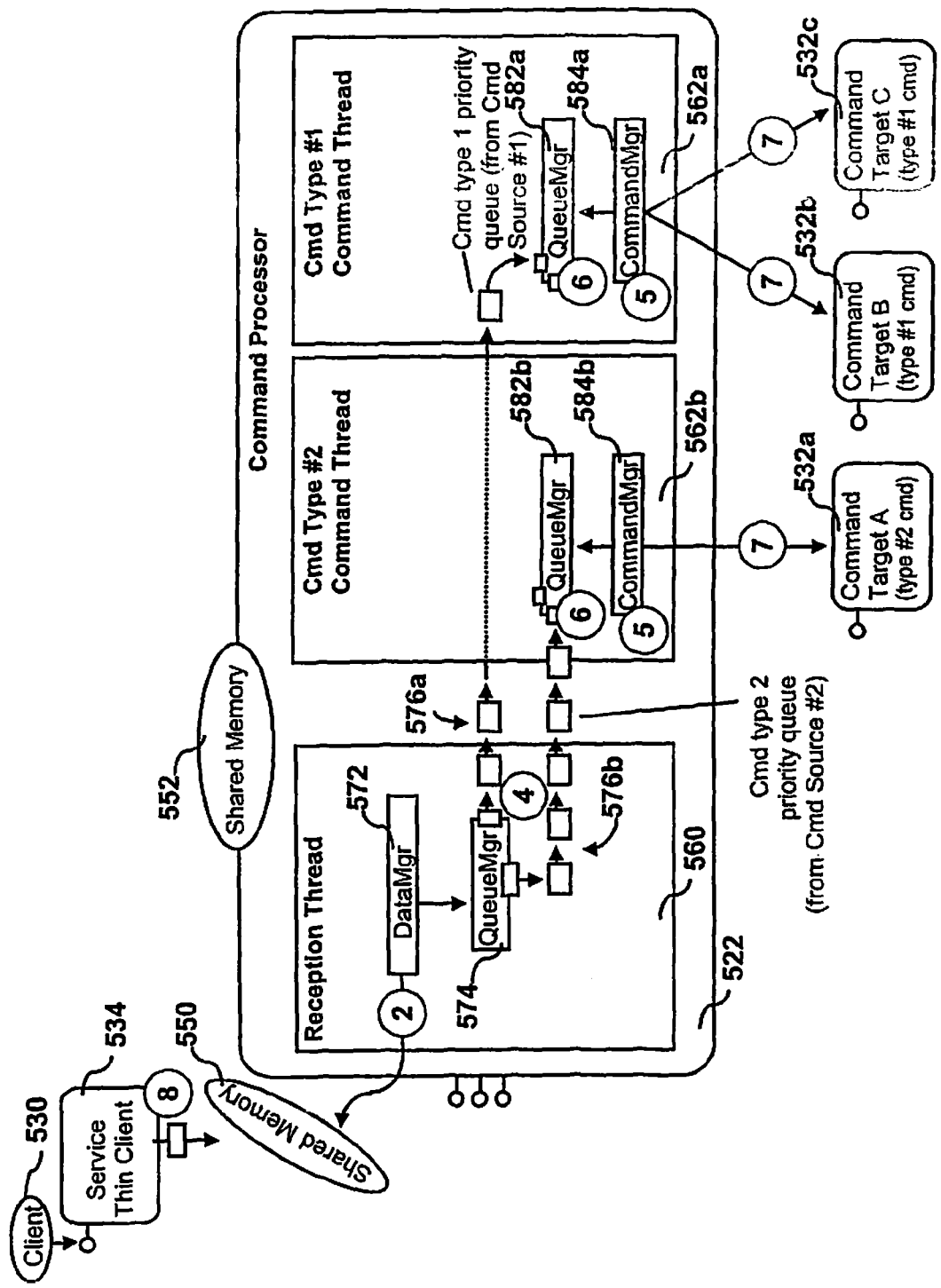

While running the command processor 522, often it is important to display visual feedback on what the command processor 522 is actually doing. For example, the user may want to know whether the command processor 522 is currently processing a command or how many commands are in the various command queues. The use case illustrated in FIG. 27 illustrates how such user feedback can be attained while running the command processor 522.

The following steps occur when updating status while processing each command.

In a step 1, the StatusMgr objects 580a and 580b collect status information while each of the command threads 562a and 562b run. All status information is saved to the status/configuration shared memory area 552.

In step 2, each application requesting status information reads the shared memory area 552 where the status information was placed.

The service client 534 that requested a command be run will want or need feedback on the results of the command and in many cases data that results from running the command. The use case depicted in FIG. 28 describes how feedback data may be returned to service clients 534.

The following steps occur when data and results are to be returned to the service client 534.

In step 1, the service client 534 places the command into the shared memory area 550. Included with the command information is the name of the global event for which the service client 534 is waiting and which should be set by the command processor 522 upon completion of the command.

As shown in step 2, upon receiving the command, the DataMgr object 572 extracts the command information from the shared memory area 550, including the name of the global event. At step 3, all command information is passed to the QueueMgr object 574.

As shown at step 4, the QueueMgr object 574 packages the command information into a command element that is then placed within the appropriate command priority queue 576a and/or 576b.

In step 5, the CommandMgr objects 584 within the command threads 562 detect the command by querying the QueueMgr object 582b. In step 6, the QueueMgr objects 582 return the command element or elements to the CommandMgr objects 584.

In step 7, the CommandMgr objects 584 run the command by delegating it to the appropriate command target 532. Upon completion of the command, the CommandMgr objects 584 update the shared memory 552 referenced by the command element with the return result and any data returned by the command targets 532. Once all data is updated, the CommandMgr objects 584 set the global event referenced by the command element, notifying other components of the command processor 522 that execution of the command is complete.

In step 8, the event that the service client 534 is waiting on is released, thus freeing the service client 534 to continue with the data placed in the shared memory area 552 back in step 7. At this point the command processing for the command is complete.

Figure 29:
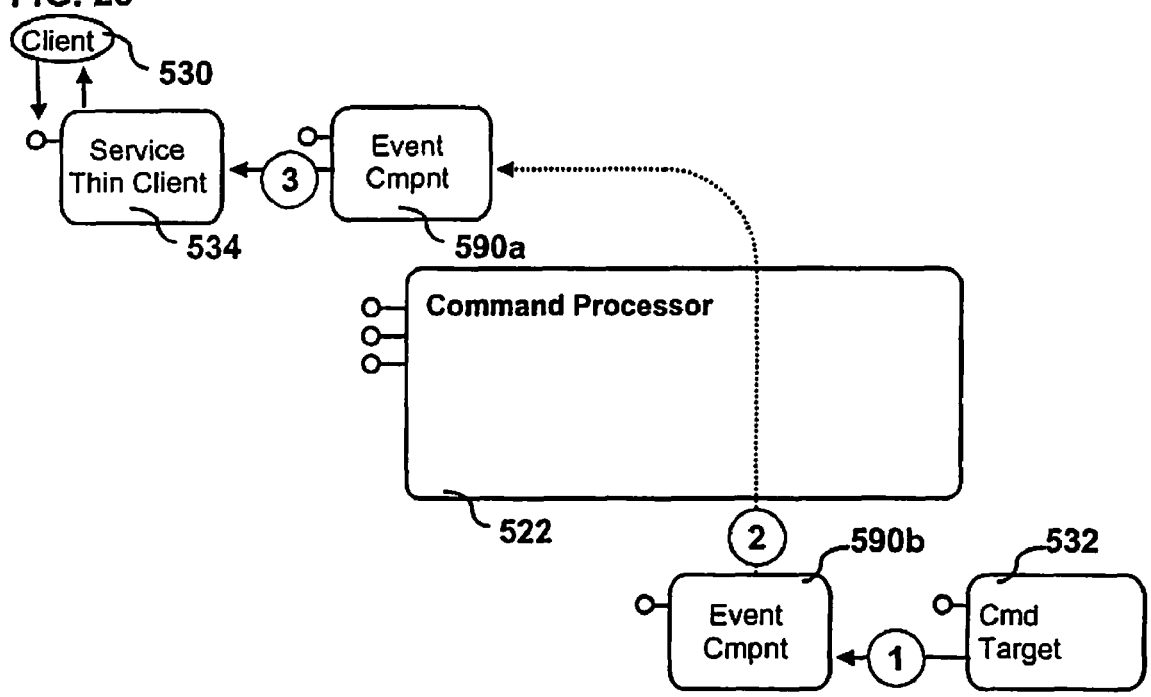
Figure 30:
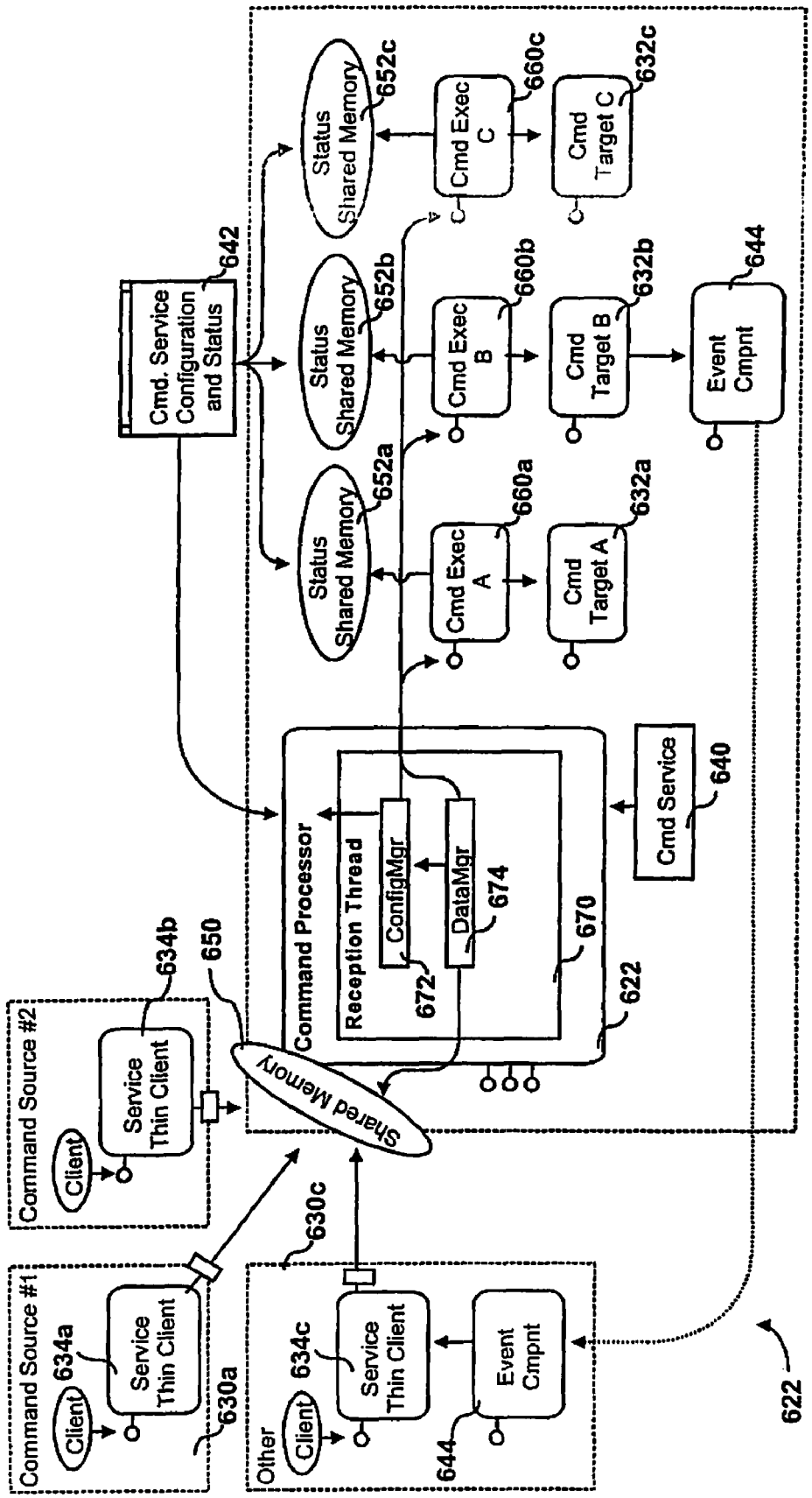
FIG. 30 is a module interaction map depicting the interaction of modules of a command processor system of a second embodiment of the present invention.

In some cases, it is desirable for the service client 534 to receive 'unsolicited' updates when certain events occur. FIG. 29 depicts the situation in which the service client 534 receives updates upon the occurrence of certain events. To receive events, the event component 544 is accessible by the command client 534 and the command target 532. In addition, the service client 534 calls a command source 530 to 'subscribe' to the event. Once subscribed, the event is fired to the service client 534 when the event condition is met. The following steps occur when events are sent back to the service client 534.

In a first step, when the event condition is met, the component that is the source of the event fires the event using the event component 544. In step 2, the event component 544 sends the 'global' event to all instances of the event component 544. In step 3, the instance of the event component 544 used by the service client 534 picks up the event and calls an event handler on the service client 534. At this point the event routing has completed.

Referring now to FIGS. 30-35, a modular design of a command processing system 620 of the present invention will now be described. The command processing system 620 comprises command processor 622. The command processing system 620 is more scaleable than the command processing system 520 described above in that it can support any type of command without requiring any changes within the command processor 622.

In general, two component types interact with one another to process commands received: the command processor 622 and a number of command execution components that will be described in further detail below. As with the system 520 described above, the system 620 transfers commands between one or more command sources 630 and one or more command targets 632. Each command source 630 is associated with a service client 634. The system 620 further comprises a command services module 640 and a configuration and status module 642. The system 620 further defines shared memory areas 650 and 652*a*, 652*b*, and 652*c*.

To process commands, the command processor 622 routes each command received to an appropriate command execution component 660 designated to handle the type of command received.

Optionally, each of the command execution components 660 may be given a global priority that dictates how and when the command processor 622 sends commands thereto. For example, FIG. 22 shows how three different types of commands associated with three types of command targets 632*a*, 632*b*, and 632*c* may be supported. The design is specifically intended to support many different kinds of commands, including commands not yet defined by the command implementer of the command processor 622 and/or commands defined by a third party. The design of the command processing system 620 thus allows for supporting many different types of commands without requiring changes in the overall command processor 522 architecture. Another advantage of the design of the command processing system 620 is that this design allows for the deployment of new command types to the field where the command processor 522 is already in use.

Figure 31:
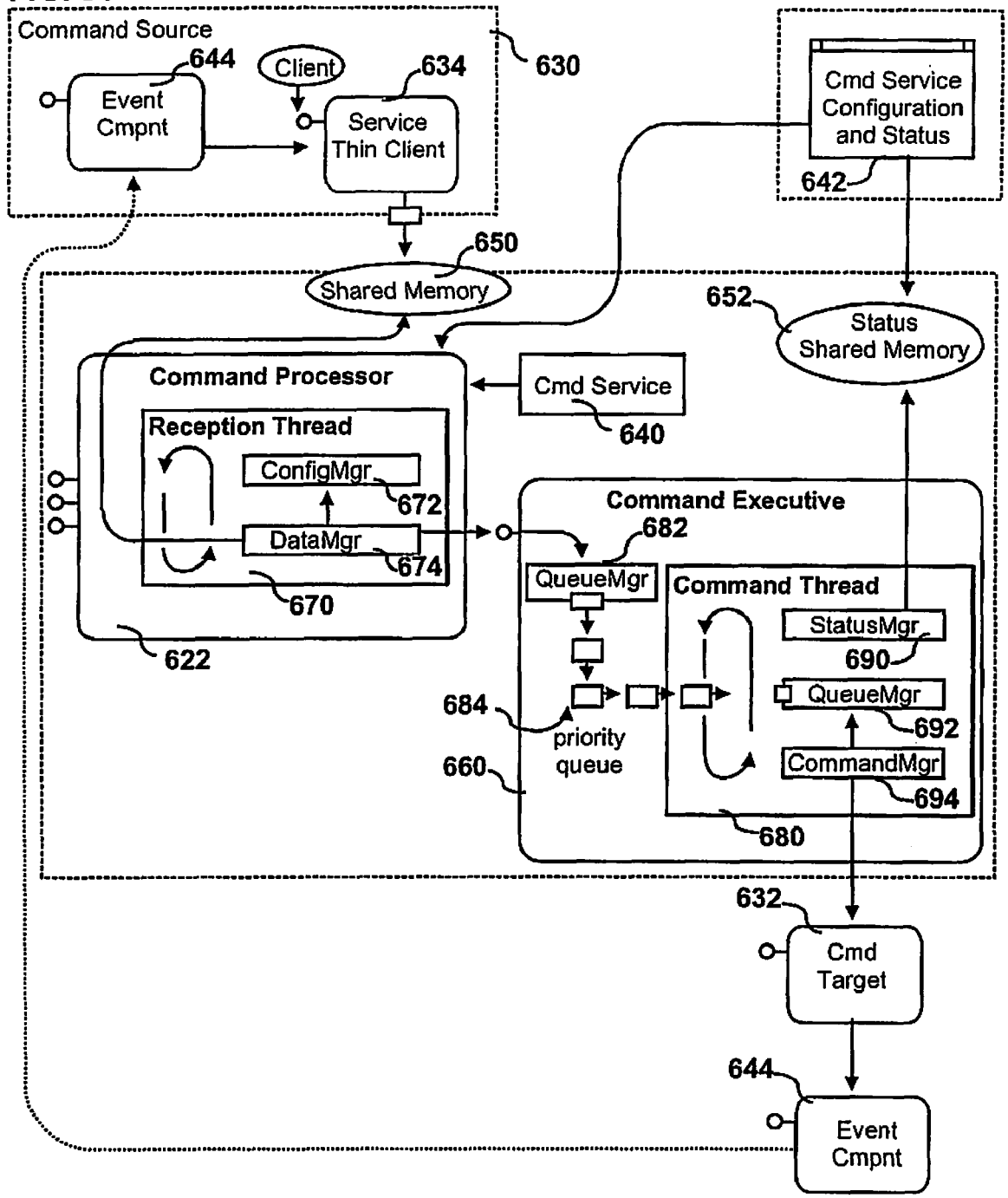
FIGS. 31-35 are use case maps illustrating common uses cases that occur during operation of the example command processing system of FIG. 30.

FIG. 31 is a slightly more detailed block diagram illustrating the command processor 622 and each command execution components 660.

The service client 634 functions as an interface between a shared memory area 650 and is used to communicate command requests to the command processor 522. The service clients 634 may also be used to relay input to the command processor 522 by receiving command via some other protocol such as TCP/IP, SOAP Messaging, etc., that is transferred either locally or across a network. Once received, the command is then converted into the appropriate shared memory format to direct the command processor 522 that a new command is ready for processing. Optionally, the service client 634 may communicate either locally or across a network using the OLE/COM interface methods of the components forming the command processor 622. This method is not as fast, but can allow for architectural flexibility.

The command processor component 622 receives and delegates each command to the appropriate command execution component 660. The command processor component 622 may also run optionally as a COM+ component that services SOAP or other Web Service requests, either directly or via COM+. Optionally, the command processor 622 may communicate with the command execution components 660 across a network.

Command execution components 660 are responsible for running the set of commands associated with the component. For example, individual command execution components 660*a*, 660*b*, and 660*c* run commands that are destined for the target component 632*a*, 632*b*, and 632*c*, respectively. Optionally each individual command execution component 660 may run as a COM+ component. Again, this may not optimize system speed, but can provide desirable architectural flexibility.

The command execution components 660 may support using Artificial Intelligence to break down generic commands into a set of more complex commands used to carry out a task. As used herein, the term "artificial intelligence" refers to algorithms such as Neural Networks, Genetic Algorithms, Fuzzy Logic, Expert Systems, combinations of all listed and other computer based decision making and pattern matching based systems. For example, a generic command may state to lift up a box. This command would then be broken down into the sequence of moves given the current position of a loader arm, necessary to pick up the box. The command execution component 660 may use Artificial Intelligence to do such a breakdown.

When communicating to the target component 632, the command execution component 660 may do so either locally or across a network depending on the overall system architecture. In the event that the commands sent contain a critical operation that must run as a set of commands or not at all, the command processor may employ a form of command 'framing' as generally described above.

The example command service component 640 is a very thin Windows NT Service that optionally hosts the command processor 622 thus allowing the command processor to run even while the current user is not logged into the system. It should be noted that future versions may not need this service as COM+ supports running components as a services. Since the command processor component 622 optionally supports COM+ it may also be run as a service in COM+.

The configuration and status module application 642 allows the user to configure the command processor 622 and various command execution components 660 and obtain status on how each component is running.

The command targets 632 are or may be similar to the command targets 532 described above, and the command targets 632 will not be described again herein beyond what is necessary for a complete understanding of the present invention.

Like the event component 544 described above, the event component 544; sends event data received from one of the various command targets 632 to one or more 'listening' service clients 634.

The details of the example command processor 622 will now be described in detail. The example command processor 622 comprises several C++ objects and a Windows NT thread that interact with one another to route the commands received to the appropriate command execution component 660.

The command process comprises a reception thread 670 that receives commands placed in the shared memory area 650. The thread 670 continually scans for new commands in the shared memory area 650. The new commands may be triggered by the use of global events.

The following example objects are C++ objects used to implement portions of the command processor 622. A ConfigMgr object 672 pulls configuration information set in the shared memory area 650 by the configuration and status module 642. A DataMgr object 674 pulls commands stored by the service client 634 in the shared memory area 650.

The command execution components will now be described in further detail. Within the command execution component 660 several C++ objects and a Windows NT thread interact with one another to run the commands received.

Each command execution component 660 comprises a command thread 680. The command threads 680 process commands destined for the command target 632 that supports the command set associated with the command execution component 660.

The following C++ objects are used to implement portions of the command execution component 660. A QueueMgr object 682 is responsible for managing the various priority queues 684 servicing the command threads 662.

A StatusMgr object 690 manages and updates the status area of the shared memory used by the configuration and status module 642. The status information updated is used to allow visual feedback on the state of the command threads 562 as well as the number of elements in the command queues 684.

A CommandMgr object 692 carries out each command by calling the appropriate command targets 632.

The interaction of the objects, threads and components of the command processing system 620 will now be described in reference to several common use cases that take place on the command processor 622 during normal use. The following use cases will be described in detail below: Initialization, Command Processing, Receiving Events, and Updating Status.

Figure 32:
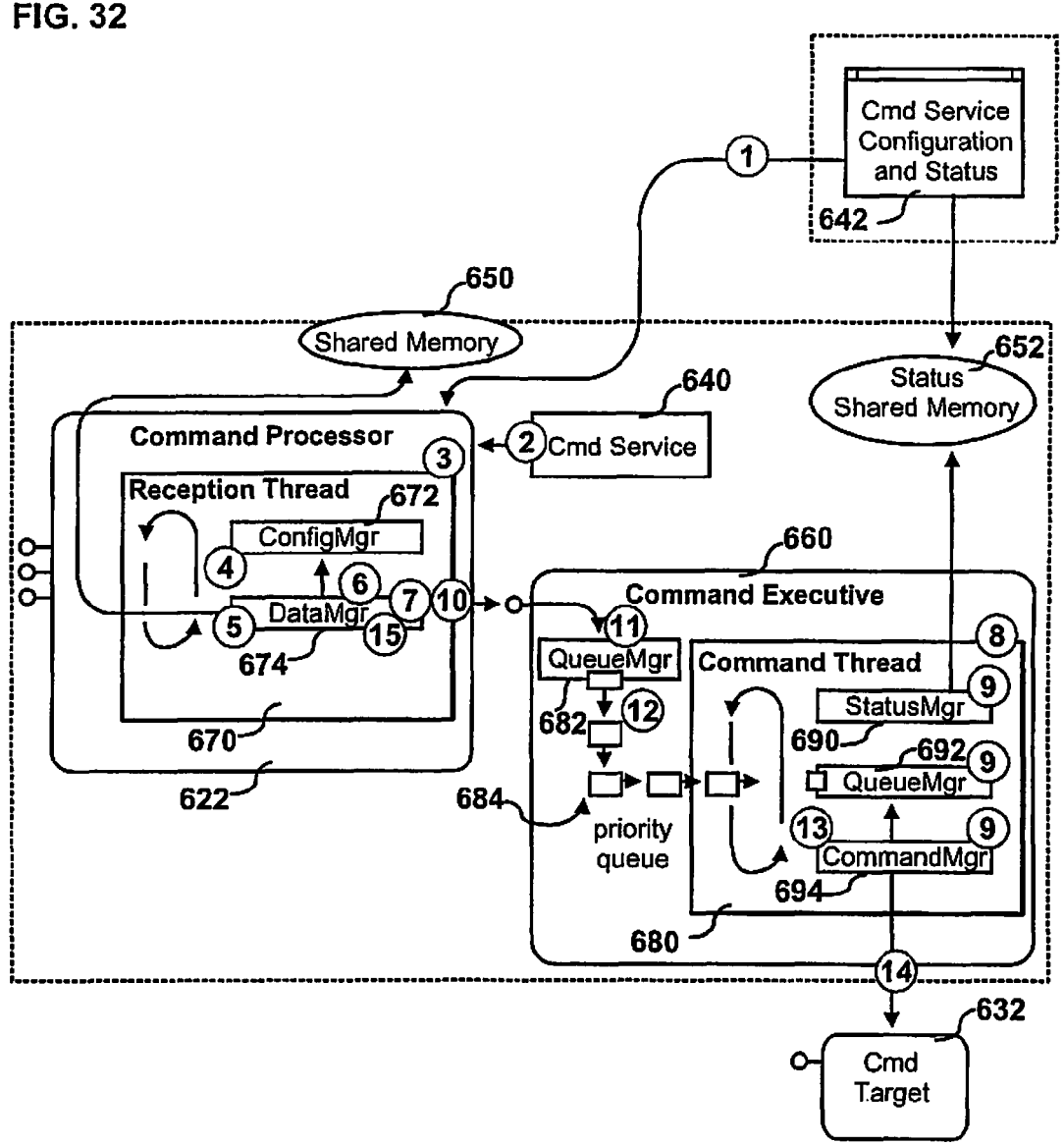

As shown in FIG. 32, when initializing the system, the following steps take place. In step 1, before actually starting the initialization of the component, the user may optionally change the configuration of the component using the configuration and status application 642, which allows the user to configure the command processor 622 and/or all command execution components 660.

At step 2, when actually initializing the component, the command target 632 (optionally a DLLHOST used when run as a COM+ server) creates the command processor component 622 and directs it to initialize itself.

At step 3, when created, the command processor 622 creates the reception thread 560 and runs it. Within the reception thread 560 the ConfigMgr is initialized at step 4. At step 5, the reception thread 560 initializes the DataMgr object 674.

During its initialization, the DataMgr object 674 queries the ConfigMgr object 672 for settings previously made by the user. For example, the list of command execution components 660 installed is queried.

At step 7, the DataMgr object 674 then creates each command execution component 660. When created, each command execution component 660 creates its command thread 680 and starts running it at step 8. Within the command thread 680, the StatusMgr, QueueMgr and CommandMgr objects are next initialized at step 9.

Upon completion of the command execution component 660 creation, at step 10 the DataMgr object 674 within the reception thread 670 of the command processor 622 sends a command to the command execution component 660 directing the execution component 660 to initialize itself.

At step 11, the initialization command is received by the QueueMgr object 692 in the command execution component 660. At step 12, the QueueMgr object 692 immediately places the command received into the command queue 684.

Within the command thread 680 of the command execution component 660, at step 13 the CommandMgr object 694 queries the QueueMgr object 692 for any new commands and pulls the initialize command from the queue (previously placed in the queue in step 12 above).

The CommandMgr object 694 creates the appropriate command target 632 at step 14, which runs the commands in the set associated with the specific command execution component 660. The command target 632 is also directed to initialize itself making it ready to process commands. Upon completing the initialization, the CommandMgr 694 unlocks the Windows Event associated with the command signifying that the command has been completed.

Referring back to the DataMgr object 674 within the reception thread 670 in the command processor component 622, the DataMgr object 674 detects that the command has been completed and prepares to run more commands as shown at step 15.

The creation process, in which the command processor 622 and command execution components 660 are created, and the initialization process may optionally be separated. In this case, a specific command is first created and then a specific 'initialize' command is then sent to the command processor directing it to prepare for receiving commands. In such a situation, the command processor 622 could block (wait until the initialization command completed) and then return the results of the initialization back to the configuration and status application 642 (or other host, such as DLLHOST, or a service client 634 using DLLHOST).

At this point the command processor 622 is running and ready to process commands from the service client or clients 534.

Figure 33:
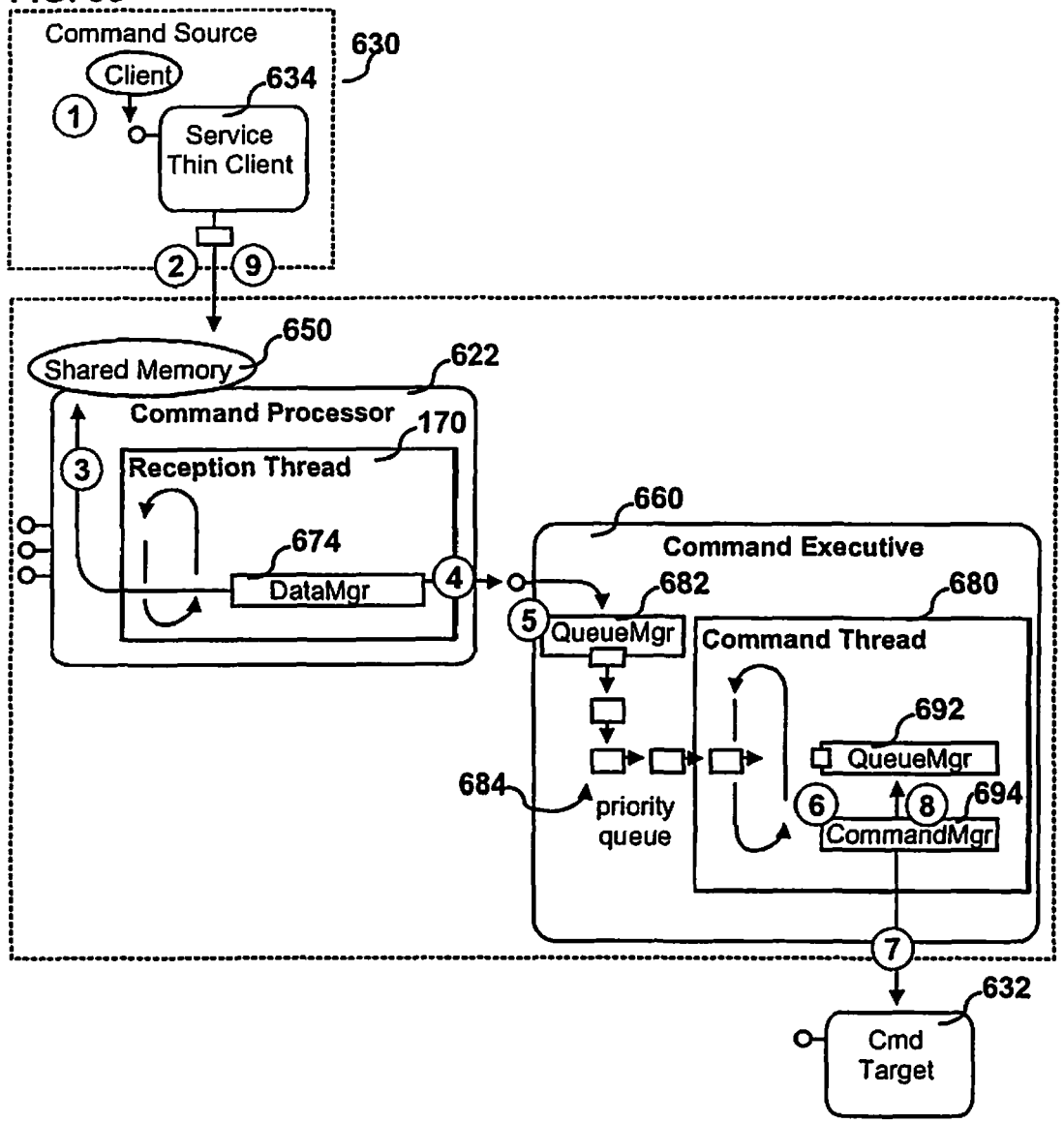

Referring now to FIG. 33, the following steps take place when processing a given command. In step 1, the service client 634 software calls the service client 634 directing it to run a given command.

In the step 2, the service client 634 then places the command information into the shared memory area 650 designated by the command processor 622 for the specific instance of the service client 634 (this designation occurs when first creating the service client 634). Optionally, the service client 634 then waits for the command processor 622 to signal that the event has completed. This signaling occurs either through information passed through the shared memory or with a global synchronization object, like a Windows NT Event object.

In step 3, the DataMgr object 674 of the reception thread 670 in the command processor 622 detects that a command is ready in the shared memory 650. The command information is extracted from the shared memory 650.

In step 4, the DataMgr object 674 sends the command information to the command execution component 660.

Upon receiving the command information, the information is routed to the QueueMgr 692 which then places the command information into the command queue at step 5. Optionally, the command information is placed into the queue 684 at a location specified by the command priority. For example, a high priority command may be placed at the beginning of the queue (i.e. pulled off the queue first) whereas a low priority command may be placed at the end of the queue (i.e. pulled off the queue last).

In step 6, the CommandMgr 694 within the command thread 680 queries the QueueMgr 692 for any commands that may exist and, if one does exist, pulls the command from the front of the command queue 684.

The command is then run at step 7 by passing the command to the command target 632 used to run the command. For example, second type command might be passed to the second command target 660*b*.

At step 8, upon completion of the command, the CommandMgr 694 copies all return data into the shared memory 650 and then either toggles information in the shared memory 650 associated with the command or signals a synchronization object, such as a Windows NT Event, to signify that the command has completed.

In step 9, the service client 634 detects that the command has completed and picks up any return data placed in the shared memory 650 and returns it to the command source 530.

At this point the command processing has completed.

Figure 34:
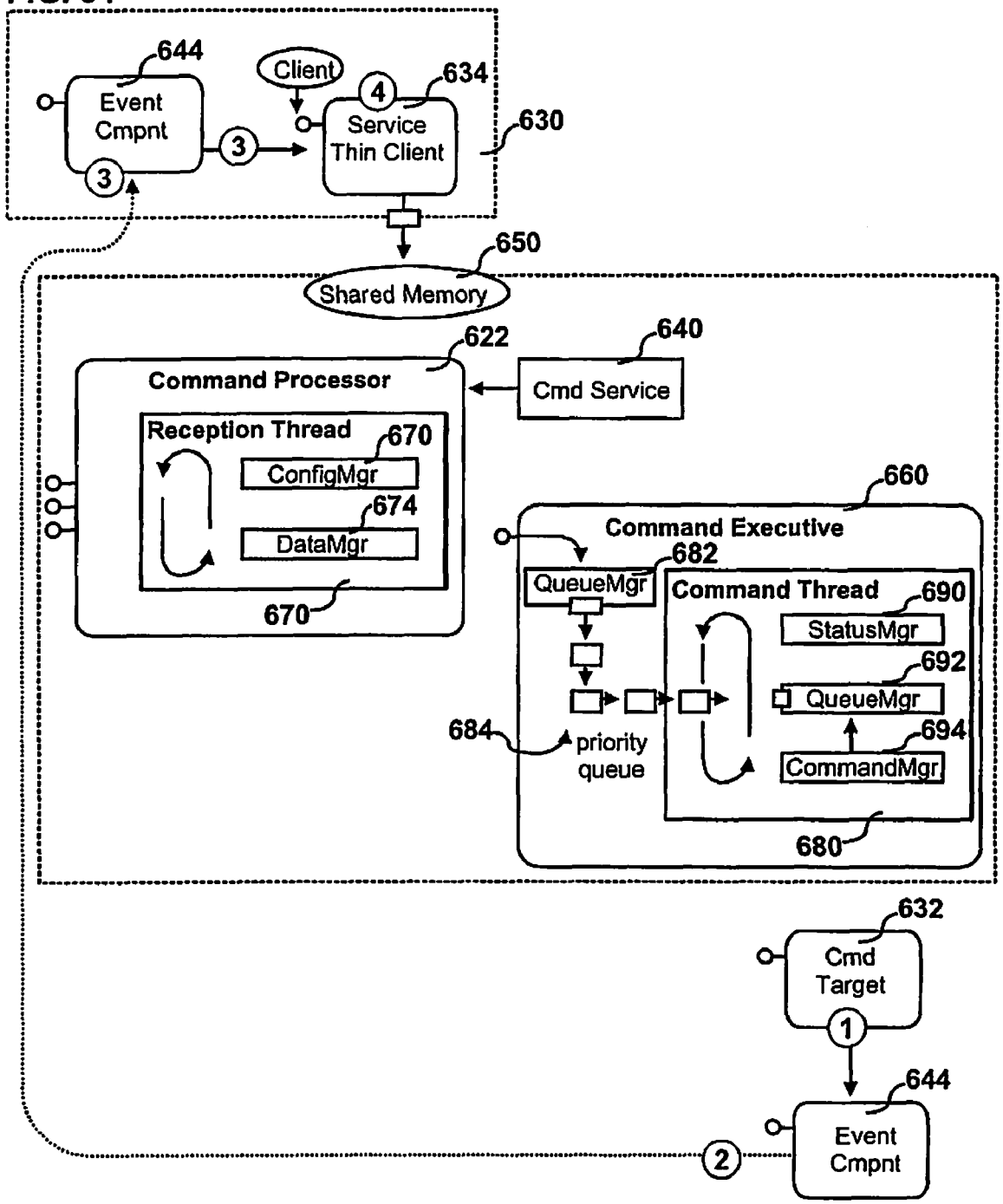

Referring now to FIG. 34, the following steps occur when the service client 634 receives unsolicited events from the command target 632.

When the event condition is met (the event condition being previously configured), the command target 632 fires the event using the event component 644 as shown in step 1. In step 2, the event component 644 fires the event to all listening components including other instances of the event component 644. In step 3, the instance of the event component 644 used by the service client 634 picks up the event and routes it to the service client 634. The service client 634 then routes the event information to the command source 630.

At this point the event processing is complete.

Figure 35:
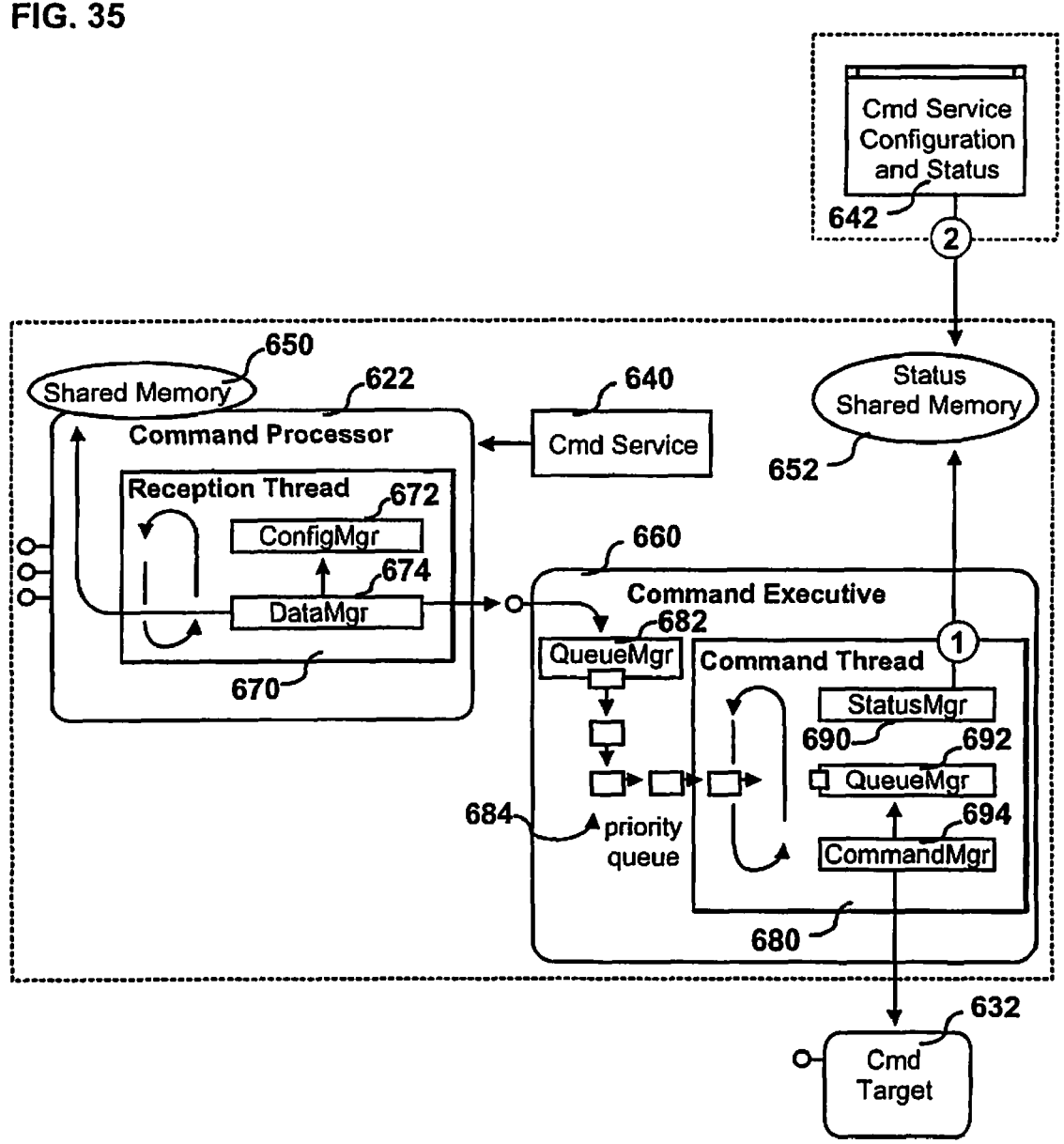

Referring now to FIG. 35, the following steps take place when updating status information while the command processor component 622 and command execution component 660 process commands.

In step 1, during each loop within each command execution component 660 status information is continuously updated using the StatusMgr object 690. For example, the number of commands in the command queue 684 may be set in the status shared memory 652.

The configuration and status module 642 is then able to pick up the information from the shared memory and display it to the user, thus notifying the user of the status of each command execution module 660 (and optionally command processor 622) components. Optionally, a separate thread may be used to monitor status information so as to not slow down or otherwise interfere with the command thread.

As generally described above, the example command processor 622 is a modular system made up of a set of components (i.e. each component is based on a component technology such as OLE/COM from Microsoft Corporation). Optionally, each component uses a separate 'parallel' ActiveX component to implement all user interface aspects of the main component. Each ActiveX component may be implemented either within the main component module or separately in its own module. Bundling each object within one module is not required as the objects may be located at any location (i.e. across a network, and so forth), but doing so may optimize communication between modules. The exact location of the components in any given implementation of the present invention is merely a logistical decision. Once components are built and deployed, it is difficult to update a single component if all components are implemented within a single DLL or EXE module.

Figure 36:
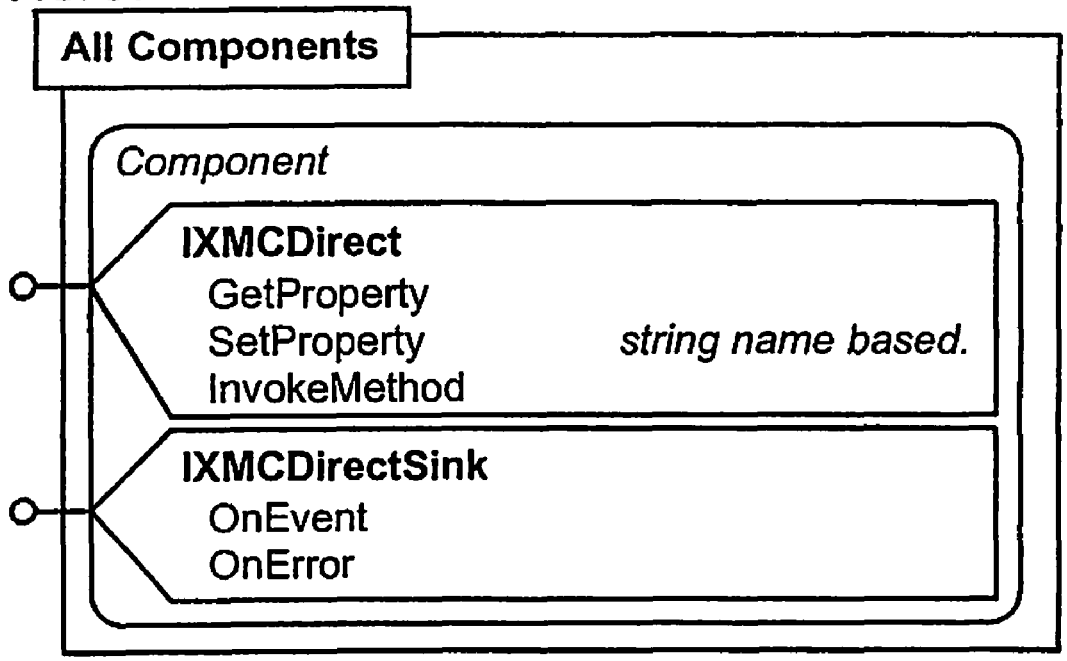
FIG. 36 depicts a component interface implemented by all components of the example command processing system of FIG. 30.

As shown in FIG. 36, the example components forming the command processor 622 implement, at a minimum, a single interface: the IXMCDirect interface. Optionally, components that receive events from other components can implement the IXMCDirectSink interface as well.

OLE Categories are used to determine how many components fall into a certain group of components. Currently the following categories are used:

command processor components—Typically there is only one command processor component 622. However, in the event that the command processor improves over time and has future more improved versions, each new and improved version would fall into this category of components.

command execution components—command execution components 660 are used to process a set of commands of a given type. For example, the first command target 632*a*, the second command target 632*b*, and the third command target 132*c* represent command types that may each have an associated command execution component 660.

The IXMCDirect interface is used for most communications between all components making up the command processor 622 Technology. The following methods make up this interface (as specified in the standard OLE/COM IDL format):

GetProperty—This method is used to query a specific property from the component implementing the interface.

SetProperty—This method is used to set a specific property from the component implementing the interface.

InvokeMethod—This method is used to invoke a specific action on the component implementing the interface. It should be noted that an action can cause an event to occur, carry out a certain operation, query a value and/or set a value within the component implementing the method.

A more detailed description of each method implemented by the object is described below.

| IXMCDirect::GetProperty | |
|---|---|
| Syntax | HRESULT GetProperty( LPCTSTR pszPropName, LPXMC_PARAM_DATA rgData, DWORD dwCount ); |
| Parameters | LPCTSTR pszPropName - string name of the property to query.<br>LPXMC_PARAM_DATA rgData - array of XMC_PARAM_DATA types that specify each parameter corresponding to the property. For example, a certain property may be made up of a number of elements - in this case an array of XMC_PARAM_DATA items is returned, one for each element making up the property. |

| IXMCDirect::GetProperty | |
|---|---|
| | In most cases a property is made up of a single element, thus a single element array is passed to this method. For more information on the XMC_PARAM_DATA type, see below. DWORD dwCount - number of XMC_PARAM_DATA elements in the rgData array. |
| Return Value | HRESULT - NOERROR on success, or error code on failure. |

This method is used to query the property corresponding to the property name 'pszPropName'. Each component defines the properties that it supports.

| IXMCDirect::SetProperty | |
|---|---|
| Syntax | HRESULT SetProperty( LPCTSTR pszPropName, LPXMC_PARAM_DATA rgData, DWORD dwCount ); |
| Parameters | LPCTSTR pszPropName - string name of the property to set. LPXMC_PARAM_DATA rgData - array of XMC_PARAM_DATA types that specify each parameter corresponding to the property. For example, a certain property may be made up of a number of elements - in this case an array of XMC_PARAM_DATA items is returned, one for each element making up the property. In most cases a property is made up of a single element, thus a single element array is passed to this method. For more information on the XMC_PARAM_DATA type, see below. DWORD dwCount - number of XMC_PARAM_DATA elements in the rgData array. |
| Return Value | HRESULT - NOERROR on success, or error code on failure. |

This method is used to set a property in the component corresponding to the 'pszPropName' property. For the set of properties supported by the component, see the specific component description.

| IXMCDirect::InvokeMethod | |
|---|---|
| Syntax | HRESULT InvokeMethod( DWORD dwMethodIdx, LPXMC_PARAM_DATA rgData, DWORD dwCount ); |
| Parameters | DWORD dwMethodIdx - number corresponding to the specific method to invoke. For more information on the method indexes available, see the set of namespaces defined for the component. LPXMC_PARAM_DATA rgData [optional] - array of XMC_PARAM_DATA types that specify each parameter for the method called. For more information on the XMC_PARAM_DATA type, see below. NOTE: if no parameters exist for the method called, a value of NULL must be passed in. DWORD dwCount [optional] - number of XMC_PARAM_DATA elements in the rgData array. NOTE: if no parameters exist for the method called, a value of 0 (zero) must be passed in for this parameter. LPXMC_PARAM_DATA rgData [optional] - namespace associated with the instance of the custom extension module added. |
| Return Value | HRESULT - NOERROR on success, or error code on failure. |

This method is used to call a specific method implemented by the component. For more information on the methods supported, see the description of the specific component.

The IXMCDirectSink interface is an event reception point on which one component can send event data to another. The component implementing this interface is the event receiver. The event source calls the interface passing to it event data.

The IXMCDirectSink interface is made up of the following functions.

OnEvent—This method is called by the event source when an event occurs (i.e. the conditions defining the event are met).

OnError—This method is called by the event source when an error occurs.

A more detailed description of each method implemented by the object is described below.

| IXMCDirectSink::OnEvent | |
|---|---|
| Syntax | HRESULT OnEvent( long lApiIdx, SAFEARRAY** ppSA ); |
| Parameters | long lApiIdx - index associated with the event type.. SAFEARRAY** ppSA - pointer to a pointer to a SAFEARRAY containing an array of XMC_PARAM_DATA structures. For more information on the XMC_PARAM_DATA type, see below. |
| Return Value | HRESULT - NOERROR on success, or error code on failure. |
| Notes | The SAFEARRAY passed to this method contains an array of XMC_PARAM_DATA structures. This array has the following entries: |
| rgData[0] | LONG lConnectionCookie - unique cookie associated with this connection to the XMC Motion Server (returned when calling the InitializeHardware method on the XMC Motion Server). |
| rgData[1] | DWORD dwSubscriptionCookie - unique cookie associated with the subscription for which this event has fired. This cookie is returned when making the subscription. |
| rgData[2] | DWORD dwDataCookie - unique cookie associated with the specific data change that triggered the event. This cookie is generated within the XMC Motion Server. |
| rgData[3] | LPCTSTR pszItemName - name of the item or variable for which the subscription is associated. |
| rgData[4] | double dfTimeStamp - number of milliseconds passed from the time that the event pump, implemented by the XMC Motion Server, was first started. |
| rgData[5] | DWORD dwDataCount - number of data values associated with the event (i.e. the number of structure elements that follow). |
| rgData[6 + n] | Number or String - actual data values associated with the event. |

This method is called by the event source and passed the event data in a SAFEARRAY form for easy marshalling across process boundaries.

| IXMCDirectSink::OnError | |
|---|---|
| Syntax | HRESULT OnError( long lApiIdx, SAFEARRAY** ppSA ); |
| Parameters | long lApiIdx - index associated with the event type.. SAFEARRAY** ppSA - pointer to a pointer to a SAFEARRAY containing an array of XMC_PARAM_DATA structures. For more information on the XMC_PARAM_DATA type, see below. |
| Return Value | HRESULT - NOERROR on success, or error code on failure. |

| IXMCDirectSink::OnError | |
|---|---|
| Notes | The SAFEARRAY passed to this method contains an array of XMC_PARAM_DATA structures. This array has the following entries: |
| rgData[0] | LONG IConnectionCookie - unique cookie associated with this connection to the XMC Motion Server (returned when calling the InitializeHardware method on the XMC Motion Server). |
| rgData[1] | DWORD dwSubscriptionCookie - unique cookie associated with the subscription for which this event has fired. This cookie is returned when making the subscription. |
| rgData[2] | DWORD dwDataCookie - unique cookie associated with the specific data change that triggered the event. This cookie is generated within the XMC Motion Server. |
| rgData[3] | LPCTSTR pszItemName - name of the item or variable for which the subscription is associated. |
| rgData[4] | double dfTimeStamp - number of milliseconds passed from the time that the event pump, implemented by the XMC Motion Server, was first started. |
| rgData[5] | HRESULT hrResult - result code of the error for which the event is associated. |
| rgData[6] | LPCTSTR pszError - string description of the error. |
| rgData[7] | LONG ISrcError - error code describing the source of the error. For example, this may be an error code returned by a computer controlled piece of hardware. |
| rgData[8] | LPCTSTR pszSrcError - string describing the source error. |

This method is called by the event source when an error occurs and passed the event error data in a SAFEARRAY form for easy marshalling across process boundaries.

The methods supported by each component making up the system 620 will now be described. In particular, the methods supported by the majority of the components will be described below. For the specific list of methods supported by each component, see the section describing each component.

| XMC_CP_SYSTEM_CONNECT_CMPNT | |
|---|---|
| Index | 8000 |
| Data In | rgData[0] - (number) DWORD, type of component. The type of component is a value that is server specific. For component type information, see the description for this method under each server's description.<br>rgData[1] - (string) LPTSTR, component class id as an ASCII string. |
| Data Out | None. |

This method is used to connect one server to another so that they may interact with one another.

| XMC_CP_SYSTEM_DISCONNECT_CMPNT | |
|---|---|
| Index | 8001 |
| Data In | rgData[0] - (number) DWORD, type of component. The type of component is a value that is server specific. For component type information, see the description for this method under each server's description.<br>rgData[1] - (string) LPTSTR, component class id as an ASCII string. |
| Data Out | None. |

This method is used to disconnect one server to another so that they stop interacting with one another.

| XMC_CP_PROCESS_START | |
|---|---|
| Index | 8500 |
| Data In | None. |
| Data Out | None. |

This method is called to start the command processor technology making it ready to process commands.

| XMC_CP_PROCESS_ENABLE | |
|---|---|
| Index | 8501 |
| Data In | rgData[0] - (number) BOOL - TRUE enables the command processor, FALSE disables it. The command processor only processes commands when it is enabled. |
| Data Out | None. |

This method is used to configure what type of data is returned when processing a given data item. For example in the server may be configured to return the minimal amount of data on each read (i.e. just the data item value), or the server may be requested to return more substantial data.

| XMC_CP_PROCESS_STOP | |
|---|---|
| Index | 8061 |
| Data In | None. |
| Data Out | None. |

This method is called to shut-down the command processor.

| XMC_DE_EVENT_ENABLE | |
|---|---|
| Index | 2892 |
| Data In | rgData[0] - (number) DWORD, cookie (unique identifier) associated with the subscription. This value is returned to the service client 34 when calling the subscription COMMAND SOURCE #1 above.<br>NOTE:<br>using a cookie value of zero (0) will enable/disable ALL items subscribed to the server.<br>rgData[1] - (number) BOOL, TRUE to enable the subscription(s), FALSE to disable the subscription(s). Only enabled subscriptions actually fire events. |
| Data Out | None. |

This method enables/disables a previously subscribed data item in the subscription list maintained by the server. Only enabled subscriptions actually fire.

| XMC_DE_EVENT_RECEIVE_DATA | |
|---|---|
| Index | 8045 |
| Data In | rgData[0] - (number) DWORD, subscription cookie corresponding to the subscribed data item.<br>rgData[1] - (number or string), data item value.<br>rgData[2] - (OPTIONAL number) DWORD, data item timestamp as a system time value.<br>rgData[3] - (OPTIONAL string) LPSTR, data item ASCII text name.<br>rgData[4] - (OPTIONAL number) DWORD, data item unique cookie. |

XMC_DE_EVENT_RECEIVE_DATA

NOTE:
Since the last three items are optional, only those items specified when configuring the data to receive are actually sent. If, for example, one or more data items are NOT requested, then the items are returned in slots shifted up toward rgData[1]. For example if only the data item name is requested in addition to the default data items, the data returned would look like the following:
rgData[0] - (number) DWORD, subscription cookie.
rgData[1] - (number or string), data item value.
rgData[2] - (string) LPSTR, data item name.

Data Out None.

This method is called by the server (and implemented by the service client 534) when each subscribed event fires.

XMC_DE_EVENT_RECEIVE_DATA_CONFIGURE

| | |
|---|---|
| Index | 8044 |
| Data In | rgData[0] - (number) DWORD, flag describing the type of data to be returned on each event. The following flags are supported:<br>XMC_DE_EVENT_DATA_FLAG_TIMESTAMP - requests that the time stamp recorded when reading the data is returned.<br>XMC_DE_EVENT_DATA_FLAG_NAME - requests that the data items ASCII text name be returned.<br>XMC_DE_EVENT_DATA_FLAG_DATA_COOKIE - requests that the unique data item cookie corresponding to the read made for the data item be returned.<br>NOTE:<br>by default, the subscription cookie and data item value are always returned. |
| Data Out | None. |

This method is used to configure what type of data is returned on each event that is fired. For example in the server may be configured to send the minimal amount of data on each event (i.e. subscription cookie and data item value), or the server may be requested to return more substantial data.

XMC_DE_EVENT_SUBSCRIBE

| | |
|---|---|
| Index | 2890 |
| Data In | rgData[0] - (number) DWORD, flags describing the initial state of the subscription. The following flags are supported:<br>XMC_DE_EVENT_FLAG_ENABLED - subscription is immediately enabled upon subscription.<br>XMC_DE_EVENT_FLAG_DISABLED - subscription is disabled upon making the subscription. The Enable function must be called to enable the subscription.<br>rgData[1] - (number) DWORD, number of subscription criteria rules.<br>rgData[2 + (2*n)] - (number) DWORD, event condition type where the following types are supported:<br>XMC_CNC_EVENTCONDITION_DATA_CHANGE - any data changes in the data type above will trigger the event.<br>XMC_CNC_EVENTCONDITION_DATA_EQUAL<br>XMC_CNC_EVENTCONDITION_DATA_LESSTHAN<br>XMC_CNC_EVENTCONDITION_DATA_GREATERTHAN<br>XMC_CNC_EVENTCONDITION_DATA_AND<br>XMC_CNC_EVENTCONDITION_DATA_OR<br>Each of the conditions above are used in a combined manner. Where the logical condition (=, <, >) are applied for each type respectively. |

XMC_DE_EVENT_SUBSCRIBE

For example, in an array that contains the following items:
rgData[2] = 4 (4 condition values)
rgData[3] = XMC_CNC_EVENTCONDITION_EQUAL
rgData[4] = 3.0
rgData[5] = XMC_CNC_EVENTCONDITION_LESSTHAN
rgData[6] = 3.0
rgData[7] = XMC_CNC_EVENTCONDITION_OR
rgData[8] = 1.0
rgData[9] = XMC_CNC_EVENTCONDITION_GREATERTHAN
rgData[10] = 5.0
the array would be evaluated using the following logic:
If (DATA <= 3.0 OR DATA > 5.0) then Trigger Event
rgData[3 + (2*n)] - (number) double, the value for the condition. See above.

| | |
|---|---|
| Data Out | rgData[0] - (number) DWORD, cookie (unique identifier) representing the subscription. |

This method subscribes to a given data item activating the event interface when the subscription criteria are met for the data item. In the example system 620, all unsubscribing components must use the IXMCDirect interface to receive events received from the server for which they are subscribed.

XMC_DE_EVENT_UNSUBSCRIBE

| | |
|---|---|
| Index | 2891 |
| Data In | rgData[0] - (number) DWORD, cookie (unique identifier) associated with the subscription. This value is returned to the service client 34 when calling the subscription COMMAND SOURCE #1 above.<br>NOTE:<br>using a cookie value of zero (0) will unsubscribe ALL items subscribed to the server. |
| Data Out | None. |

This method removes a previously subscribed data item from the subscription list maintained by the server.

XMC_DE_SYSTEM_INITIALIZEHW

| | |
|---|---|
| Index | 500 |
| Data In | None. |
| Data Out | None. |

This method is used to initialize any hardware systems associated with the component.

XMC_DE_SYSTEM_SHUTDOWNHW

| | |
|---|---|
| Index | 501 |
| Data In | None. |
| Data Out | None. |

This method is used to shut down any hardware systems associated with the component.

The command processor component 622 implements the following general methods listed above.

| Method | Implemented | Not Implemented |
|---|---|---|
| XMC_CP_PROCESS_START | X | x |
| XMC_CP_PROCESS_ENABLE | X | x |
| XMC_CP_PROCESS_STOP | X | |
| XMC_DE_EVENT_ENABLE | X | |
| XMC_DE_EVENT_RECEIVE_DATA | X | |
| XMC_DE_EVENT_RECEIVE_DATA_CONFIGURE | X | |
| XMC_DE_EVENT_SUBSCRIBE | X | |
| XMC_DE_EVENT_UNSUBSCRIBE | X | |
| XMC_DE_SYSTEM_CONNECT_CMPNT | X | |
| XMC_DE_SYSTEM_DISCONNECT_CMPNT | X | |
| XMC_DE_SYSTEM_INITIALIZEHW | X | |
| XMC_DE_SYSTEM_SHUTDOWNHW | X | |

There are no special notes for the methods that this component implements.

The command execution components 660 implement the following general methods listed in the general component methods section above.

| Method | Implemented | Not Implemented |
|---|---|---|
| XMC_CP_PROCESS_START | | X |
| XMC_CP_PROCESS_ENABLE | | X |
| XMC_CP_PROCESS_STOP | | X |
| XMC_DE_EVENT_ENABLE | X | |
| XMC_DE_EVENT_RECEIVE_DATA | X | |
| XMC_DE_EVENT_RECEIVE_DATA_CONFIGURE | X | |
| XMC_DE_EVENT_SUBSCRIBE | X | |
| XMC_DE_EVENT_UNSUBSCRIBE | X | |
| XMC_DE_SYSTEM_CONNECT_CMPNT | | X |
| XMC_DE_SYSTEM_DISCONNECT_CMPNT | | X |
| XMC_DE_SYSTEM_INITIALIZEHW | X | |
| XMC_DE_SYSTEM_SHUTDOWNHW | X | |

There are no special notes for the methods that this component implements.

The definitions of all special types used by the methods and properties of each component making up the command processor system 622 will now be described.

XMC_PARAM_DATA Structure

All methods exposed by each component in the example system 622 use a standard parameters set to describe data used to set and query properties as well as invoke methods. The standard parameters are in the following format:
pObj->InvokeMethod(LPXMC_PARAM_DATA rgData, DWORD dwCount);

Each element in the rgData array corresponds to a parameter, with the first element in the array corresponding to the first parameter.

The XMC_PARAM_DATA structure can contain either a numerical or a string value and is defined as follows:

```
typedef struct tagXMC_PARAM_DATA
{
  LNG_PARAM_DATATYPE adt;
  union
  {
    double df;
    LPTSTR psz;
```

```
  };
}XMC_PARAM_DATA;
```

The 'adt' member of the XMC_PARAM_DATA structure describes the data contained within the XMC_PARAM_DATA structure. The values are described below:

| LNG_PARAM_DATATYPE | Description |
|---|---|
| LNG_ADT_NUMBER | Use this value when passing a numerical value via the 'adt' member of the XMC_PARAM_DATA structure. |
| LNG_ADT_STAT_STRING | Use this value when passing a static string value via the 'psz' member of the XMC_PARAM_DATA structure. Static strings do not need to be freed from memory. |
| LNG_ADT_MEM_STRING | Use this value when passing a string value via the 'psz' member of the XMC_PARAM_DATA structure. LNG_ADT_MEM_STRING denotes that the string must be freed from memory during cleanup. |
| LNG_ADT_NOP | This value is used to ignore items within the XMC_PARAM_DATA array. When specifies, this parameter is not used. |

When querying and setting boolean TRUE/FALSE values, any non-zero value is considered TRUE, whereas a zero value is considered FALSE.

The command processor 622 of the present invention may be used on more than just motion based devices and machines, although the present invention is of particular significance in that environment. The principles of the present invention may also be used to send commands to medical devices where each command directs the medical device to carry out a set of operations. It may also be used to send commands to farming equipment, heavy machinery such as tractors, excavators, bulldozers, cranes, semi-trucks, automobiles, drilling equipment, water craft such as submersibles, boats and ships, airplanes (including jets), spacecraft, satellites, and any other kind of mobile device or machine that moves on land, water or within the air or space.

The technology implemented by the present invention may be used to send commands in the following environments:

- office equipment such as printers, fax machines, telephone systems, internet routers, internet firewalls and security cameras and general security systems.
- general consumer devices such as home entertainment systems, televisions, microwaves, ovens, refrigerators, washers and driers, vacuums, hand held music systems, personal digital assistants, toys, musical instruments, etc.
- yard items such as lawn mowers, yard care devices, snow blowers, air blowers, edger's, etc.
- military equipment such as drone airplanes, drone tanks, drone land mobiles, drone boats, tanks, ships, jets and any other mobile or stationary devices used on land, sea or in the air or space.
- various types of factory equipment that may or may not use motion to carry out its task, such as i/o devices, analog devices, CNC machines, General Motion machines, FMS machines, measuring systems, etc.
- animatronics devices such as robot dogs, robotic mannequins, robotic helpers, or other robotic human-like or robotic animal like devices.

The term "command data" as used herein refer to any numeric or string data values used to describe the command and parameters describing how to perform the command. For example, BIT, BYTE, WORD, DWORD, LONG, REAL, DOUBLE, FLOAT, STRING, ASCII STRING are a few command data types that represent commands and/or command parameters. Command data may eventually be sent to the command target by writing register values on the command target, writing to shared memory provided by the command target, sending commands to the command target for which a data response is given containing the data requested, writing to variables provided by the command target, reading and writing to variables in a sequence necessary to carry out the commanded operation, using a proprietary or standard data protocol, calling a function provided by the command target, etc.

III. Third Embodiment

Database Distribution

Referring now to FIGS. 37-43 of the drawing, depicted therein is an example data routing system 720 constructed in accordance with, and embodying, the principles of the present invention. The example data routing system 720 comprises a data engine 722, a data source 724, a data transport 726, and a protocol server 728.

Figure 37:
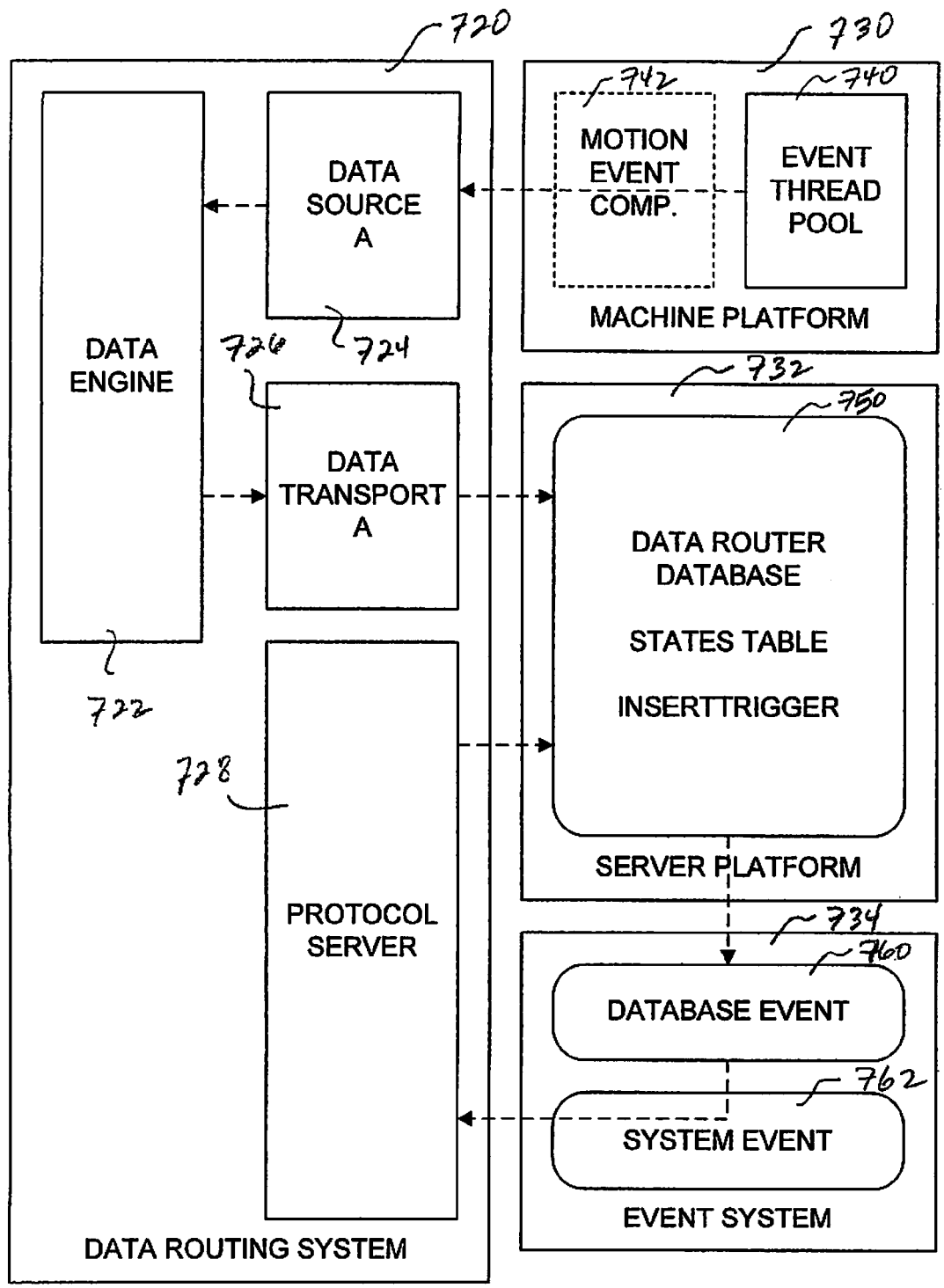
FIG. 37 is a module interaction map depicting interactions of an example data routing system of the present invention with a machine platform, server platform, event system, database client, and/or command processor.
Figure 43:
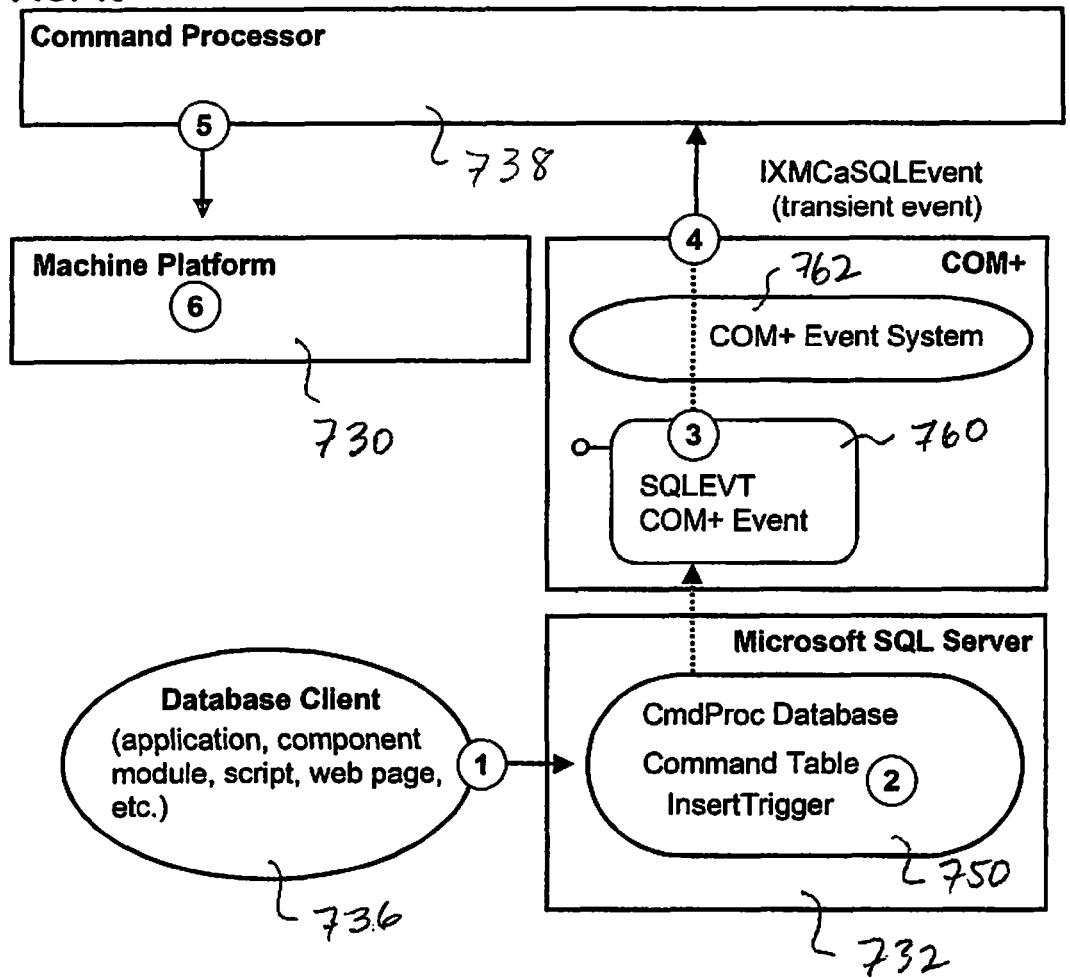
FIG. 43 is a module interaction map depicting an alternative configuration of a data routing system that processes commands via the data router database.

The example data routing system 720 is designed to operate, in a first implementation, in conjunction with a machine platform 730, a database server platform 732, and an event system 734 as shown in FIG. 37. The data example routing system 720 also operates, in a second implementation, in conjunction with a database client 736 and a command processor 738 as shown in FIG. 43.

The data engine 722 is configured to manage the overall data routing system 720. The data source 724 forms an input to the data router system 720 by providing a link to the data source such as the machine platform 730. The example data source 724 provides this link using OLE Automation interfaces. The data transport 726 forms an output of the data router system 720 that sends data to a data target such as the database server platform 732. The protocol server 728 receives events from the event system 734 each time a record is entered into the database server platform 732.

The example machine platform 730 is connected to, or incorporates, a target machine and is configured to unify the data of and access to the target machine. Within the example machine platform 730 is an event thread pool 740 is used to send data to outbound targets such as data source 724 of the data routing system 720. The example machine platform 730 also incorporate an optional motion event component 742 such as that described in the Applicants' U.S. Pat. No. 5,691,897. The contents of the '897 patent is included herein by reference.

The example server platform 732 incorporates or is formed by a Microsoft SQL server that defines a data router database 750. The data router database 750 is configured with a number of tables including a 'States' table that contains all state updates made by the data router system 720 as will be described in further detail herein. The 'States' table also includes an INSERT trigger that fires each time a record is inserted into the table.

The event system 734 comprises a database event 760 and a system event 762. In the example data router database 750, when the INSERT trigger fires, the database event 760 is called and thus notified of the newly inserted data. The example database event 760 is the XMCSQLEVT event, which is a Com+ event as implemented by the example database 750.

The database event 760 uses the system event 762 to notify any outside application, such as the protocol server 728, of data updates made to the 'States' table within the data router database 750. In particular, the example protocol server 728 receives, through the event system 762, events from the database event 760 each time a record is inserted into the 'States' table. Upon receiving each event, the protocol server 728 updates an internal cache for the data item.

When outside clients of the protocol server 728 read the data item, the data from the cache is served up to the client. In addition, the example protocol server 728 may also browse the data router database 750 for all assets, states, and substates to create an address space that reflects the data within the tables defined by the data router database 750.

The protocol server 528 depicted in FIGS. 37-43 is presented simply as an illustration of one example of how the data routing system 720 may be configured. The example protocol server 528 relies on tables and triggers from within data router database and need not configured based on any upstream software that places data within those tables.

Turning now to FIGS. 38-43 of the drawing, depicted therein are a number of use cases illustrating sequences of steps that are performed by one or more of the modules making up the data routing system 720 and the machine platform 730, server platform 732, event system 734, database client 736, and/or command processor 738. In particular, the following use cases are described: initialization of the overall system; how the data items provided by the server are browsed; how the data updates are made on the server; how clients of the server read and receive data; and an alternative configuration of the data routing system 720 that uses data router database 750 to command a motion system associated with the machine platform 730 to perform one or more actions.

Figure 38:
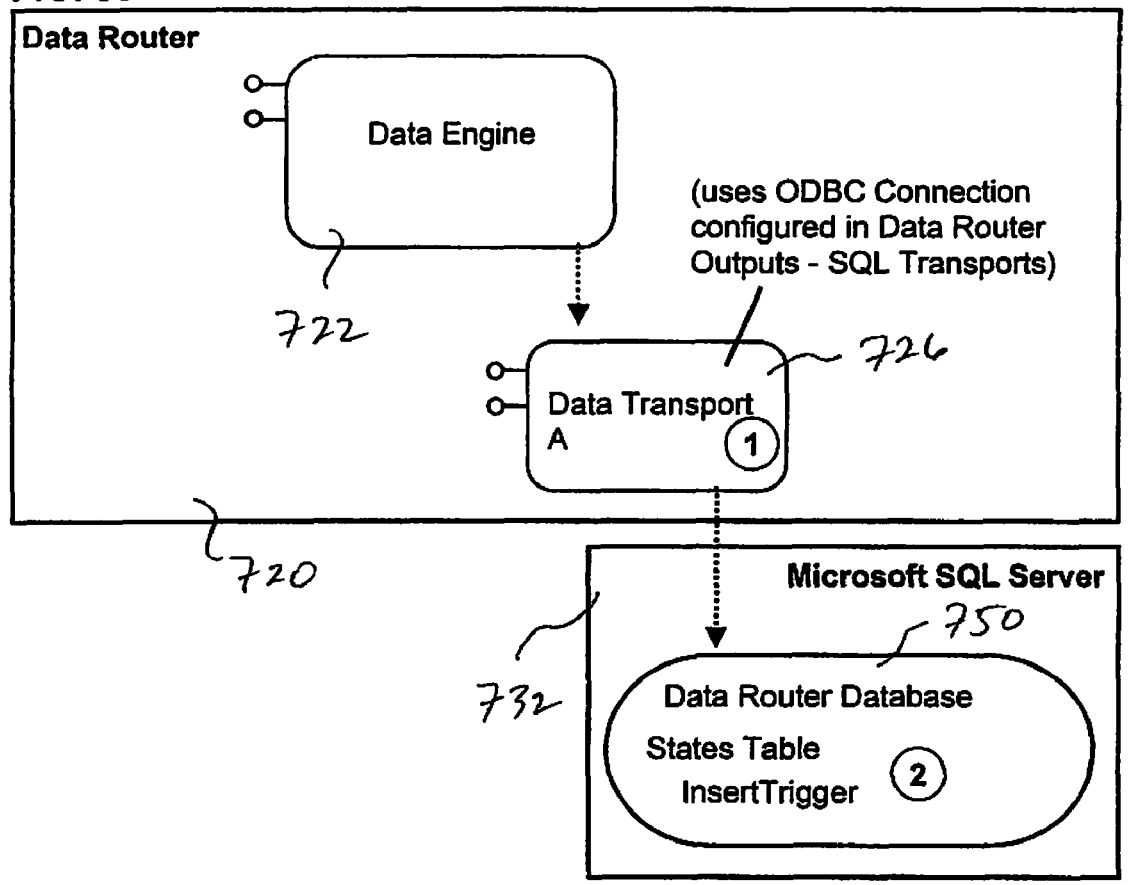
FIG. 38 is a module interaction map depicting the process of initializing the data router database.
Figure 39:
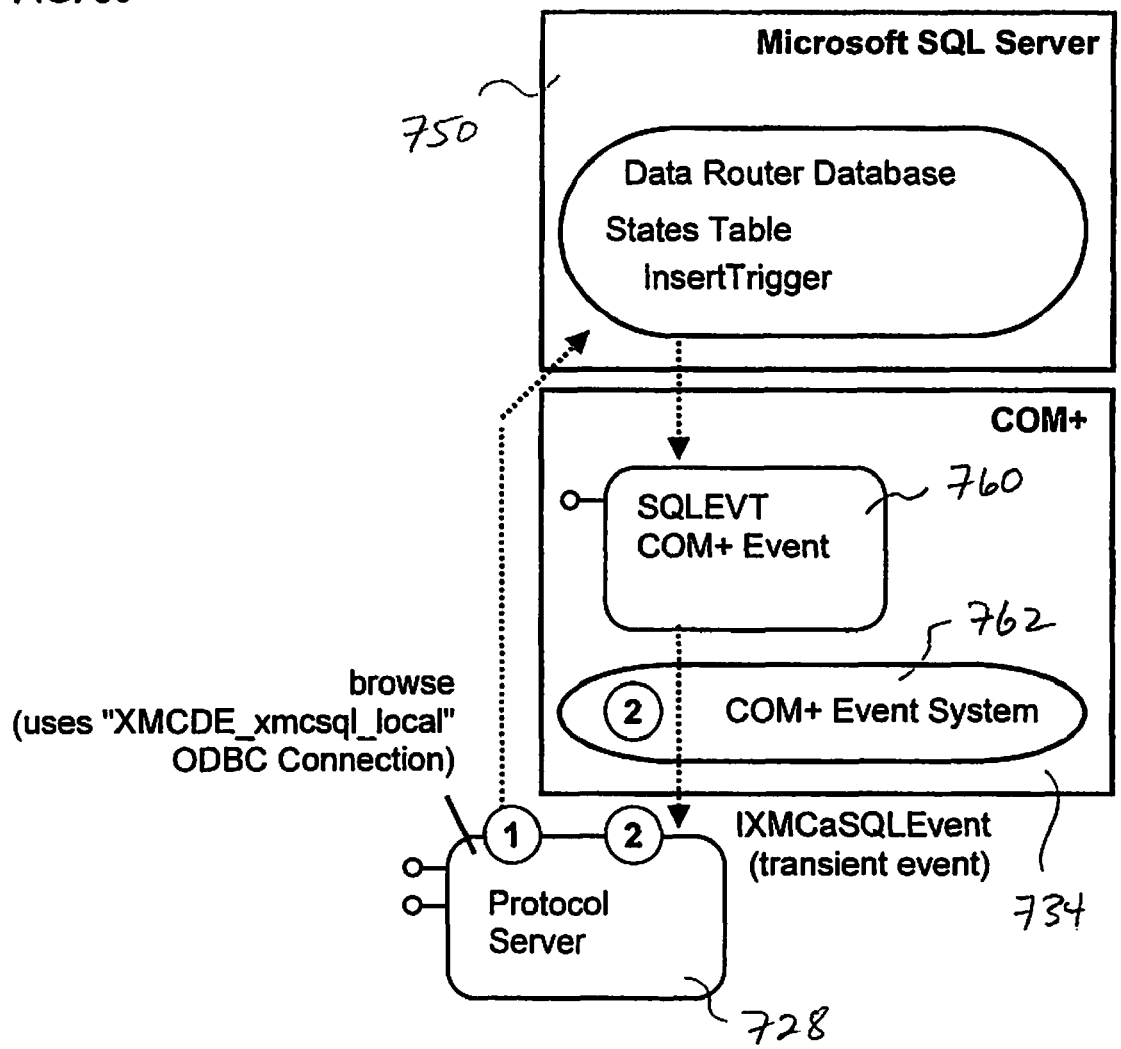
FIG. 39 is a module interaction map depicting the process of initializing the protocol server.

Referring initially to FIGS. 38 and 39 of the drawing, an example of the process of initializing the data routing system 720 is depicted therein. The initialization process is a two step process. First the data router database 750 is initialized as shown in FIG. 38. Second, protocol server 728 is initialized as shown in FIG. 39.

In the example data routing system 720, the data router database 750 is initialized before the protocol server 728 is initialized.

The following steps take place when initializing the example data router database 750. First, a software application portion of the data routing system 720 is used to initialize the database by configuring the data transport 726 and directing the data transport 726 to initialize the data router database 750 by using, for example, an XML data file that describes all assets, states and sub-states that are to be loaded into the database. Second, during this process data transport 726 creates all tables and creates an INSERT Trigger on the 'States' table that calls the XMC SQL Event Class each time a record is inserted into the 'States' table. When the data router database 750 is initialized, the database 750 is ready for use by the protocol server 728.

The protocol server 728 is initialized each time a client application creates an instance of the server 728 to use. FIG. 39 illustrates one example of the process of initializing the protocol server 728. The following steps are performed when the protocol server 728 is initialized. First, the protocol server 728 browses the 'Assets' table to receive a list of all assets as well as the 'StateTagsView' to receive a list of all states and their sub-states. The protocol server 728 uses the list of all assets and list of all states and their sub-states to build the address space of the protocol server 728.

Second, the protocol server 728 subscribes to the event class associated with the database event 760 defined by the event system 734. The example protocol server 728 subscribes to the late bound XMC SQL Event Class provided by the COM+ Event System. At this point the protocol server 728 is ready to use. In the example described herein, an internal item tree, used when browsing items, is built during the first step of the process of initializing the protocol server 728.

Figure 40:
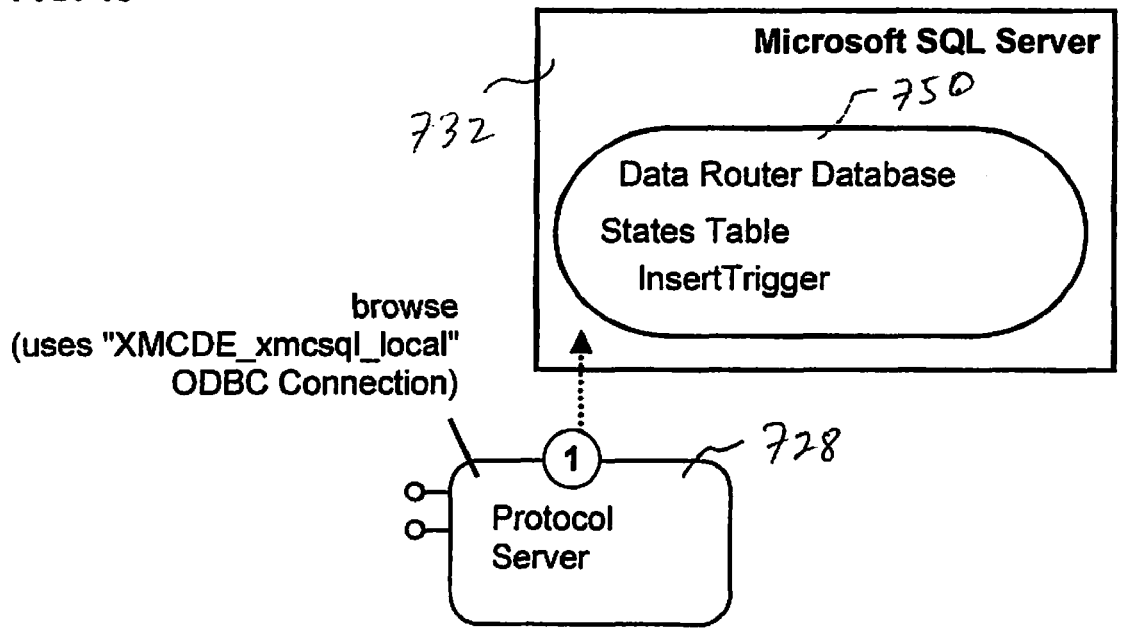
FIG. 40 is a module interaction map depicting the process of browsing for items on the protocol server.

Referring now to FIG. 40 of the drawing, a browsing process implemented by the data routing system 720 will now be described. Browsing is the process if viewing (and walking) the list of items exposed by the protocol server 728. More specifically, browsing is the process of either visually selecting items from a tree of items browsed, or programmatically selecting one or more items from the tree. In addition, browsing may involve walking the tree items. For example, when searching for a given item, a program may iteratively look at each item while it determines if each is the item the program is looking for.

The example item tree used by the process illustrated in FIG. 40 is made up of asset names at the top level, states at the next level, and sub-states at the last 'leaf' level. An example of the item tree is set forth below:

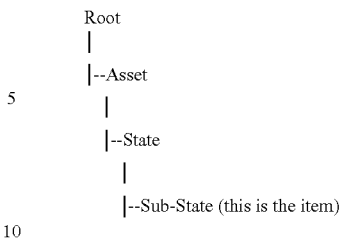

During the browsing process, each of the elements making up the item tree are retrieved from the data router database 750. In the example system depicted in FIG. 40, the Assets are loaded from the 'Assets' table, and the State and Sub-States are retrieved from the 'StateTagsView' view.

The following step takes place when browsing items exposed by the protocol server 728. The protocol server 728 walks the browse tree that was previously built when initializing the server by querying the Assets table and StateTagsView view. Browsing the items allows an application to select which data items are to be monitored.

Referring now to FIG. 41 of the drawing, depicted therein is the data update process. Data updates are received by the protocol server 528 each time a record is inserted into the 'States' table of the data router database 750. In the example depicted in FIG. 41, upon the completion of each insert, the database 750 calls the database event 760 (XMC SQL Event Class), which routes an event to the protocol server protocol server (XMC SQL OPC Server) via the system event 762 (COM+Event System).

The following steps occur when data updates are processed by the system. First, a data event is fired by one of the threads in the event thread pool provided by the motion event component 742 of the machine platform 720. The motion event component 742 may be as described in copending U.S. patent application Ser. Nos. 11/067,327 and 11/375,502. The contents of the '327 and '502 applications are incorporated herein by reference.

Second, the data source 724 receives the event and passes the information up to the data engine 722. Third, the data engine 722 runs the data associated with the received event through a set of rules that determine whether the data should be sent to the data transport 726. In the example data engine 722, if the rule determines that the data should sent, and an 'identity' type is used in the rule, the raw data is sent to the data transport 726. Using an identity type in an data router rule set directs the data router to pass the actual data along with each rule that fires.

Third, upon receiving the data, the data transport 726 inserts the data (along with the raw data) into the 'States' table and an 'ExtraInfo' tables within the data router database 750. Upon completing the INSERT operation into the States table, the data router database then fires and Insert Trigger (OnInsertTrigger). In this particular implementation, Insert Triggers use Microsoft SQL Server and may not run correctly from within the MSDE environment.

Fifth, the OnInsertTrigger calls the database event 760 (XMCSQLEVT COM+Event Class) within its stored procedure. The Asset, State, Sub-State, raw data and time-stamp of the INSERT trigger are all passed to the event class.

Sixth, the event system 734 (COM+) routes the database event 760 (XMC SQL Event Class event) to the protocol server 728, which has already subscribed to such events during its initialization process. Upon receiving the event, the protocol server 728 stores the data received in its data cache for the item. It should be noted that data updates do not directly trigger updating clients of the protocol server 728, but instead continually refresh its internal data cache of data items.

Figure 42:
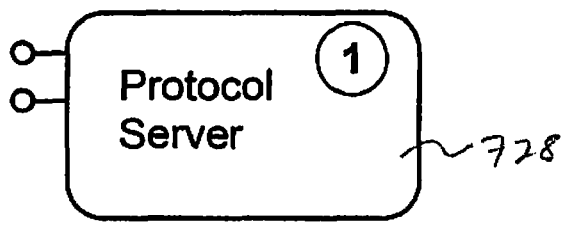
FIG. 42 is a module interaction map depicting the process of reading data.

Turning now to FIG. 42 of the drawing, the process of reading data will be described in further detail. The data reading process is carried out by each client. The client can read data Data directly or using updates via an event that fires periodically. In either case, data is transferred during this process from the protocol server 728 to the client application. As shown in FIG. 42, when reading data, data is served to the client application either via a periodic update, when data changes, or when the client directly asks for the data.

Referring now to FIG. 43 of the drawing, the process of commanding a motion system using the data routing system 720 will now be described. The implementation of the invention described with reference to FIGS. 38-42 describe the process of reading data from a motion system. However, the architecture of the data routing system 720 of the present invention may be used to command a motion system to perform one or more actions.

As described above, the data routing system 720 is used in conjunction with the client application 736 and command processor 738 in FIG. 43. The client application 736 is a software application, component module, script, web page, or the like that determines a series of motion steps to be carried out. The command processor 738 generates commands that carry out the series of motion step defined by the client application 736. The command processor 738 may be implemented using the command processor described in U.S. patent application Ser. No. 10/991,905, which is included by reference herein in its entirety.

To process command via database input, the following steps occur. First the database client inserts commands into the Command table found within the data router database 750. Second, when inserted, all inserted command information (including the command and its parameters, and optionally the return data routing location such as a table where return data is to be placed) is sent to the XMCSQLEVT COM+ Event Class to fire. Third, the COM+Event System fires the late coupled events (LCE) to any subscribers that may exist.

Fourth, the XMCSQLEVT COM+ Event Class supports the IXMCaSQLEvent interface, which is called on all subscribers to the event class each time the event fires. Upon receiving the events, the command processor 738, processes the events by sending the commands to the target motion system(s) designated to receive the commands. Note, there are several way t the command processor may deliver the commands to target motion systems: The command processor may send the commands to motion systems specified in the event parameters, or the command system may send the commands to motion systems pre-configured in the command processor to receive specific (or all) events, or the command processor may broadcast the events to all motion systems connected to it.

Sixth, upon receiving the command(s), each motion system carries out the commands using the command+all of its parameter data. If data is to be returned, the return data is sent back to the command processor who then in-turn routes the data back to the routing target. Optionally, the data router 720 may be used to return information as well.

The system described in this document is a very modular system made up of a set of components. For example, each component may be based on a component technology such as OLE/COM from Microsoft Corporation. Detailed descriptions of the interfaces of the example components used for communication between the various pieces making up the system are set forth below.

Upon receiving an insert instruction into a designated table (i.e. the States table in the data router database 736 (or a Command table in the command processor database) a pre-configured event trigger is fired by the data router database 750 that sends the inserted data to the database event 760 (XMCSQLEVT module). In the example described herein, the event trigger calls the module's IXMCaSQLEvent interface. The example IXMCaSQLEvent interface will be described in further detail below.

The IXMCaSQLEvent interface is used by server platform 732 to send event information to any subscribers of the XMC SQL Event Class.

Method Summary

The IXMCaSQLEvent interface is made up of the following functions.

OnInsertTrigger—This method is used to send the data to each event subscriber as a single string.

OnInsertTriggerEx—This method is used to send data to each event subscriber as a set of strings.

A more detailed description of each method implemented by the object is described below.

| IXMCaSQLEvent::OnInsertTrigger | |
|---|---|
| Syntax | HRESULT OnInsertTrigger( BSTR bstrData ); |
| Parameters | BSTR bstrData - comma delimited string containing all event data. |
| Return Value | HRESULT - NOERROR on success, or error code on failure. |

This method is used send data to all event subscribers as a single comma delimited string. Event interfaces may send most data types, but this interface currently only supports sending strings.

| IXMCaSQLEvent::OnInsertTriggerEx | |
|---|---|
| Syntax | HRESULT OnInsertTriggerEx( BSTR bstrTime, BSTR bstrAsset, BSTR bstrState, BSTR bstrSubState, BSTR bstrData ); |
| Parameters | BSTR bstrTime - string representing the time-stamp of the data. BSTR bstrAsset - string containing the name of the asset from which the data originated. BSTR bstrState - string containing the state description of the data item. BSTR bstrSubState - string containing the sub-state description of the data item. BSTR bstrData - string containing the actual data. NOTE: optionally 'real' string data may be wrapped with quotes where as numeric data may not. For example the string "foo" may be sent as "'foo'", where as the number "1.22" may be sent as "1.22". |
| Return Value | HRESULT - NOERROR on success, or error code on failure. |

This method sends event data to each subscriber in a form where each parameter is broken into a separate string for convenience.

A number of technologies may be used to implement the data routing system 720 or in conjunction with the data routing system 720. The machine platform 730 may be implemented by, incorporate, or be connected to a motion system as described in one or more of the following U.S. patents, the contents of which are incorporated herein by reference: U.S. Pat. Nos. 5,691,897; 5,867,385; 6,480,896; 6,513,058; and 6,885,898.

The data router 720 may be implemented by, incorporate, or be connected to a data router system as described in one or more of the following U.S. patent application, the contents of which are incorporated herein by reference: U.S. Ser. No. 10/844,025.

The command processor 738 may be implemented by, incorporate, or be connected to a motion system as described in one or more of the following U.S. patent application, the contents of which are incorporated herein by reference: U.S. Ser. No. 10/991,905.

OPC technology, along with its formal specifications, forms an example of a protocol for implementing the Protocol Server. OPC is a software technology used to connect to various enterprise systems in the industrial automation market, such as MES systems, machine monitoring systems, and the like. Traditionally this technology has been used to connect PLC and sensor data to such systems. Combining XMC with OPC provides an elegant way to connect machine tool and motion control data into these systems as well. For more information on OPC, see www.opcfoundation.orq.

The Microsoft SQL Database Server and related technologies may be used to implement the server platform 732. The Microsoft SQL Database Server documentation, which is available online, contains specific information on how INSERT Triggers work and how one may call an external COM or COM+ component.

The event system 734 may be implemented using the COM+Event System. The COM+Event System provides support for decoupled events. When decoupled events are supported, both the data publisher and the data subscriber are independent of one another. Decoupled events are otherwise known as a loosely coupled event (LCE). COM+ Events are just one of the many COM+ Services used by each of the components making up the system. For example, since the example protocol server 728 is a COM+ Application, it automatically takes advantage of object pooling, and message queue communications provided by COM+.

The Microsoft COM (Component Object Model) describes the component model that all components described within the example system are based upon.

IV. Fourth Embodiment

Enterprise System

Figure 44:
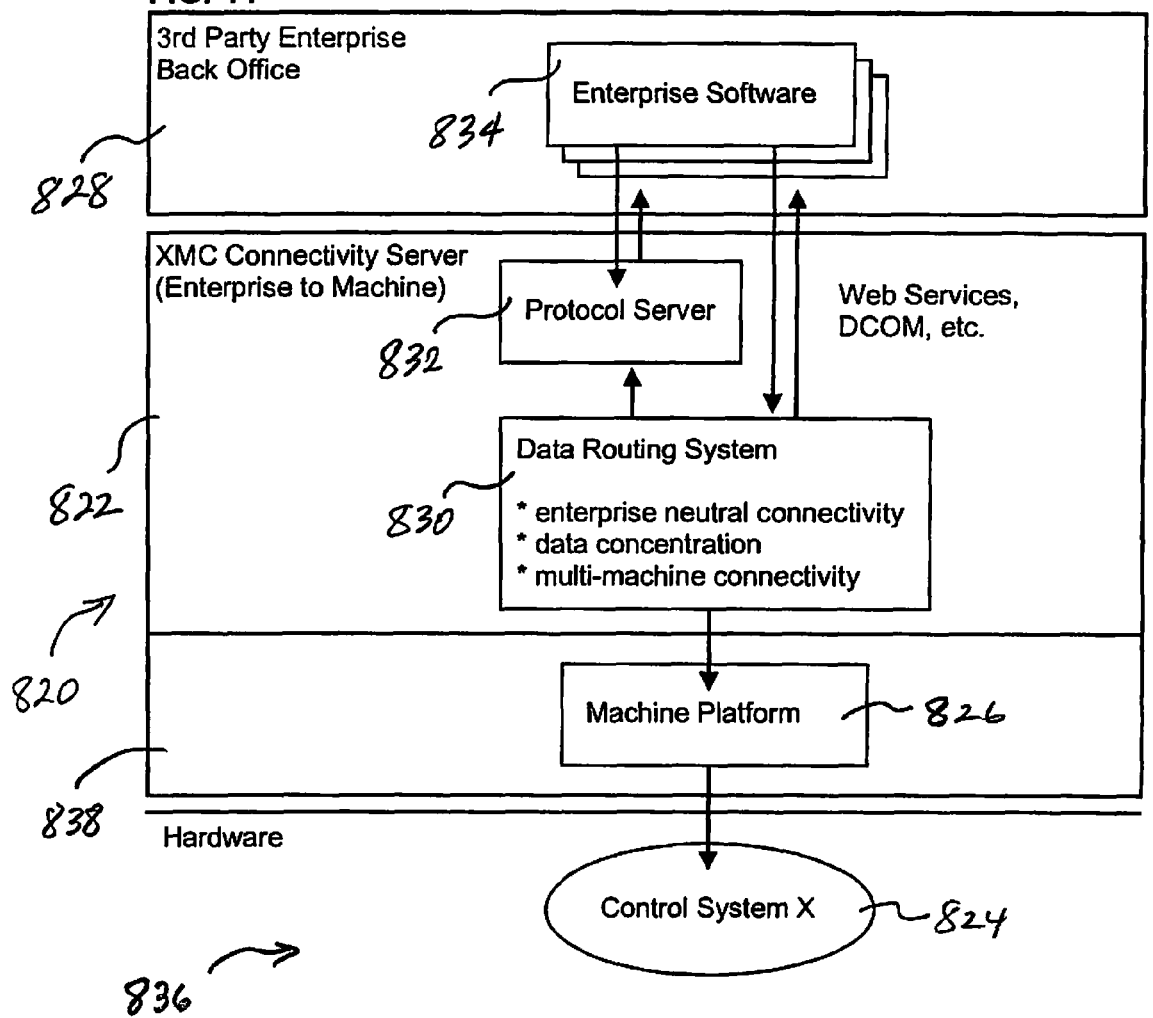
FIG. 44 is a module interaction map depicting a single asset configuration of a data collection system of the present invention.

Referring now to FIG. 44 of the drawing, depicted therein is an example data collection system 820 constructed in accordance with, and embodying, the principles of the present invention. The example data collection system 820 comprises a connectivity server layer 822 configured to collect data from at least one hardware device or asset 824 through a machine platform 826. In the example data collection system, the data collected by the connectivity server layer 822 is distributed to a back office system layer 828.

The connectivity server layer 822 comprises a data routing system 830 and a protocol server 832. The back office system layer 828 comprises at least one enterprise software system 834. The assets 824 form a machine layer 836, and the machine platform or platforms 826 form a platform layer 838.

The data routing system 830 uses application called Enterprise Manager to configure, run and monitor a server technology that runs behind the scenes called the Enterprise Server. The Enterprise Server is the technology that actually collects data from the hardware device or asset 824 in an intelligent manner. The enterprise software system 834 and the Enterprise Server form the data collection system 820.

The machine intelligence offered by the data routing system 830 allows better data collection that shows how a machine asset 824 is operating. This machine intelligence infers the current state of the machine asset 824 based on the state of given inputs and then sends the resulting outputs to a desired data target for later analysis based on predefined rules. Alternatively, data inputs read from each asset 824 may be sent directly up to the enterprise software for direct analysis at that level.

There are several ways the data collection system 820 may be used to monitor assets. The following discusses each of the configuration options that are available.

In FIG. 44, the data collection system 820 is illustrated in the context of collecting data from a single asset 824. FIG. 44 illustrates how the data routing system 830 is used along with the machine platform 826 to connect an enterprise software system 834 to receive data from the machine asset 824.

A low-cost computer server PC may be used to run the software making up the data collection system 820. In the example system 820, the data routing system 830 is a software layer that 'routes' data from each individual asset 824 to various up-stream enterprise software systems 834. The protocol server 832 provides connectivity to data items processed by the data routing system 830 using a protocol specification, such as may be developed by a standards body or other company or group.

The machine platform 826 is a controller neutral layer used for all controller communication that defines a universal API and variable model. Using the universal API and variable model of the machine platform 826, data items easily flow from the target control of the asset 824 to the data routing system 830 for further routing to the enterprise software system 834. Typically the single instance model is only used in environments where a dedicated computer is available for each asset 824 that is to be monitored.

Figure 45:
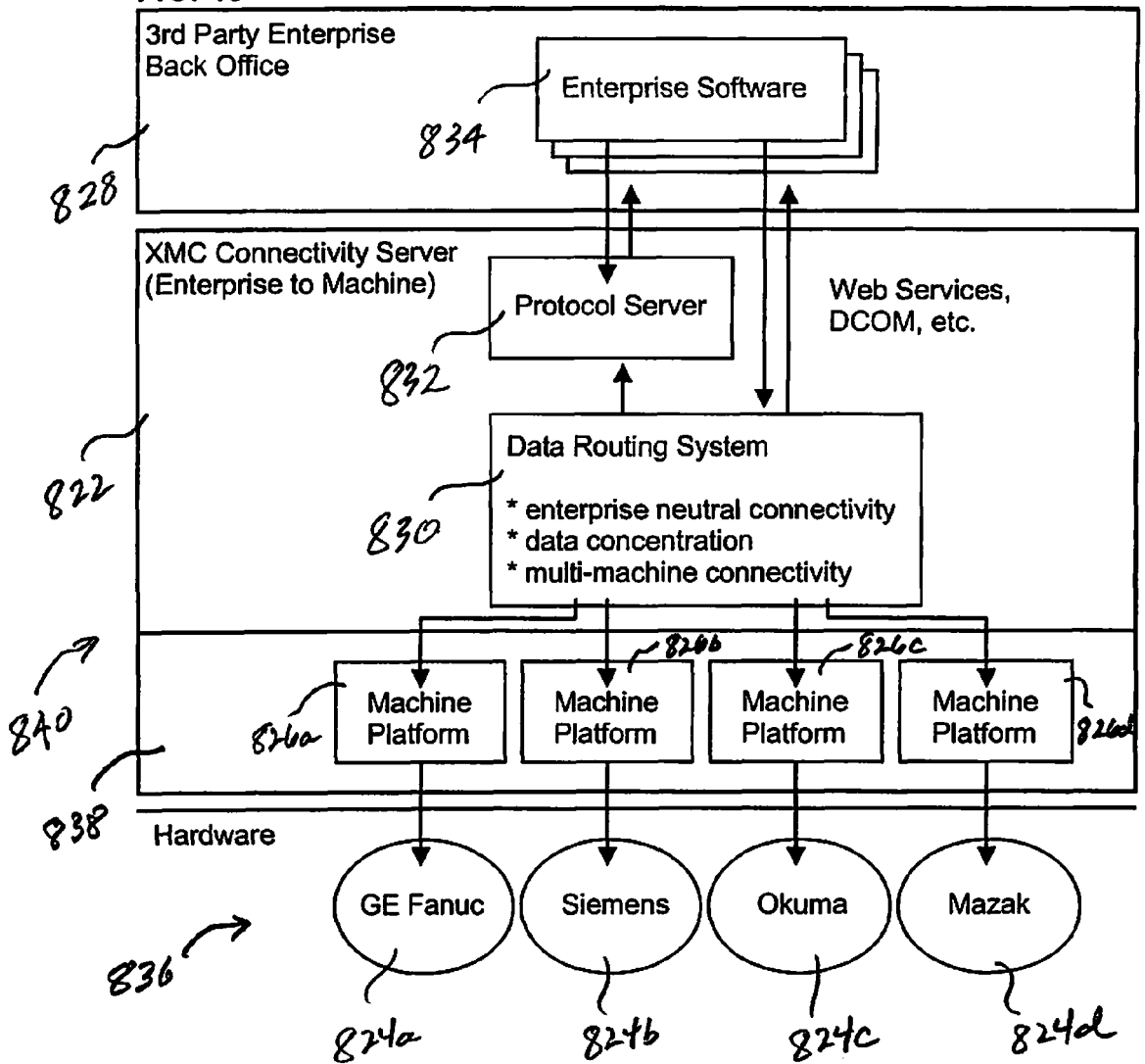
FIG. 45 is a module interaction map depicting a multi-asset connectivity configuration of a data collection system of the present invention.

In situations where a PC is not dedicated to the target control system, the data collection system may be implemented using a multi-asset connectivity model as shown at 840 in FIG. 45. The multi-asset model allows for the connectivity server to communicate with two or more machine assets 824 and route all data received from the group to one or more enterprise software systems 834.

The example multi-asset data collection system 840 employs the data routing system 830, protocol server 832, and enterprise software 834 as described above. In addition, the example machine assets are identified as machine control industry products such as a GE/Fanuc asset 824a, Siemens asset 824b, Okuma asset 824c, and a Mazak asset 824d. Each of the assets 824a-d connects to the data routing system 230 through an associated machine platform 826a, 826b, 826c, and 826d.

By using multiple instances of the machine platform 826, the data routing system 830 is capable of managing connectivity with a wide range of machine assets 824. Because the machine platforms 826a-d are controller neutral, all of the example assets 824a-d may be handled in the same manner by the data routing system 830.

Figure 46:
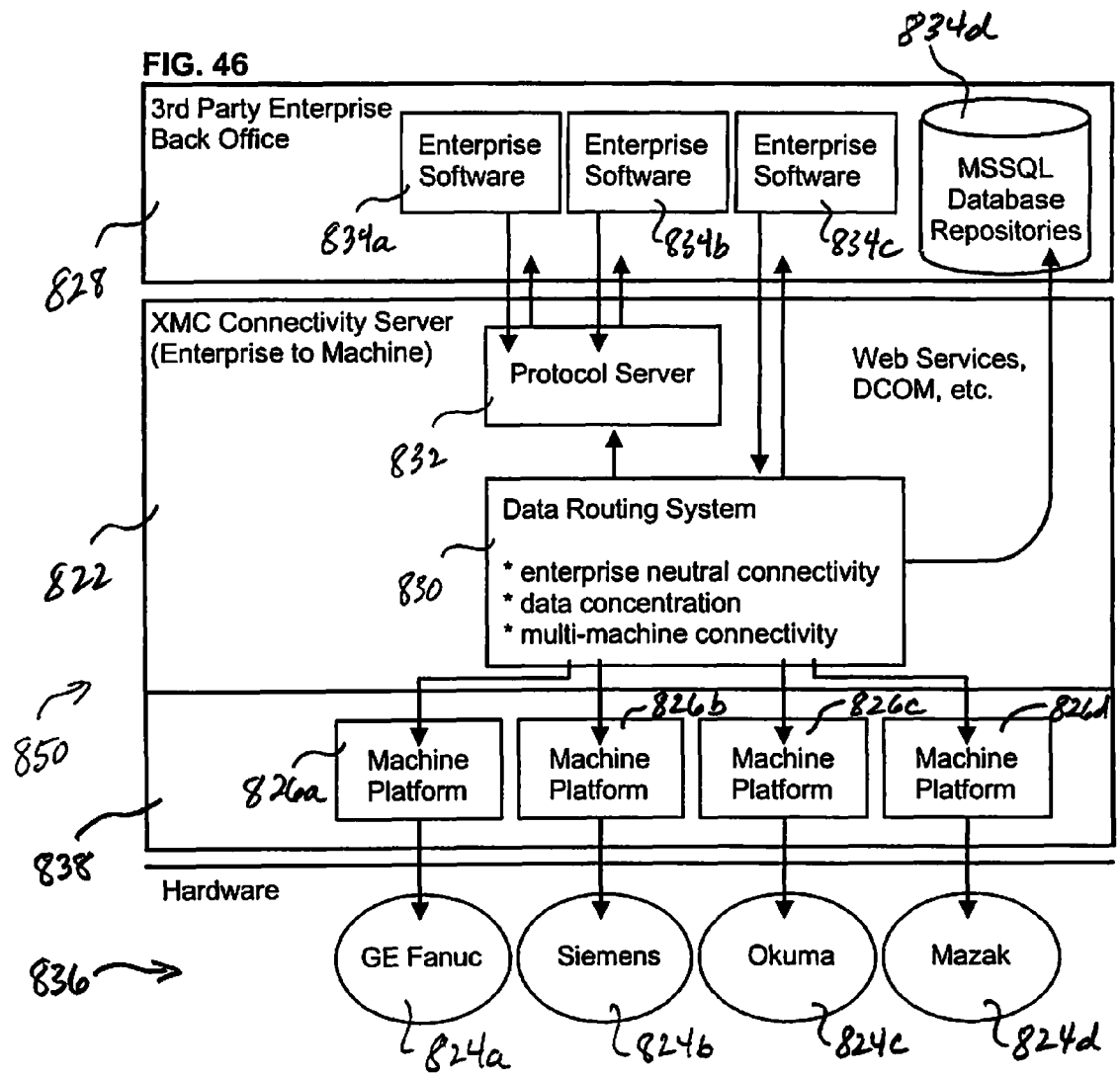
FIG. 46 is a module interaction map depicting a multi-asset and multi-enterprise software connectivity configuration of a data collection system of the present invention.

The example data collection systems 820 and 840 illustrate that these systems are capable of communicating to one or more target controllers or assets 826. As shown at 850 in FIG. 46, a data collection system of the present invention is also flexible enough to communicate with multiple enterprise software systems 834 forming part of the back office system layer 828.

In particular, the data routing system 830 may be configured to connect to multiple enterprise software systems 834 as well. The example data collection system 850 employs the data routing system 830, protocol server 832, and enterprise software 834 as described above. Again, the data routing system 830 collects data from the GE/Fanuc asset 824*a*, Siemens asset 824*b*, Okuma asset 824*c*, and a Mazak asset 824*d* through the associated machine platform 826*a*, 826*b*, 826*c*, and 826*d*. In addition, the data routing system 830 is capable of communicating with first, second, and third enterprise software systems 834*a*, 834*b*, 834*c*, and 834*d* either directly or through the protocol server 823.

The enterprise software systems 834 may include: enterprise software systems such as the systems 834*a* and 834*b* that communicate with the data routing system 830 through the protocol server 832 (referred to as protocol clients), enterprise software systems such as the system 834*c* that directly program to the data routing system 830 (referred to as custom clients), and/or enterprise software systems such as the system 834*d* formed by an external database such as Microsoft SQL.

As described above, a data collection system of the present invention, such as the data collection systems 820, 240, and 850, are designed to route data from one or more discrete motion based assets 824 to one or more enterprise software systems 834. The example data collection systems 820, 840, and 850 employ a layered architecture comprising the connectivity server layer 822, the back office layer 828, the hardware layer 836, and the machine platform layer 838. During the process of routing data from the assets 824 to the enterprise software systems 834, a general data flow takes place through this layered architecture.

Figure 47:
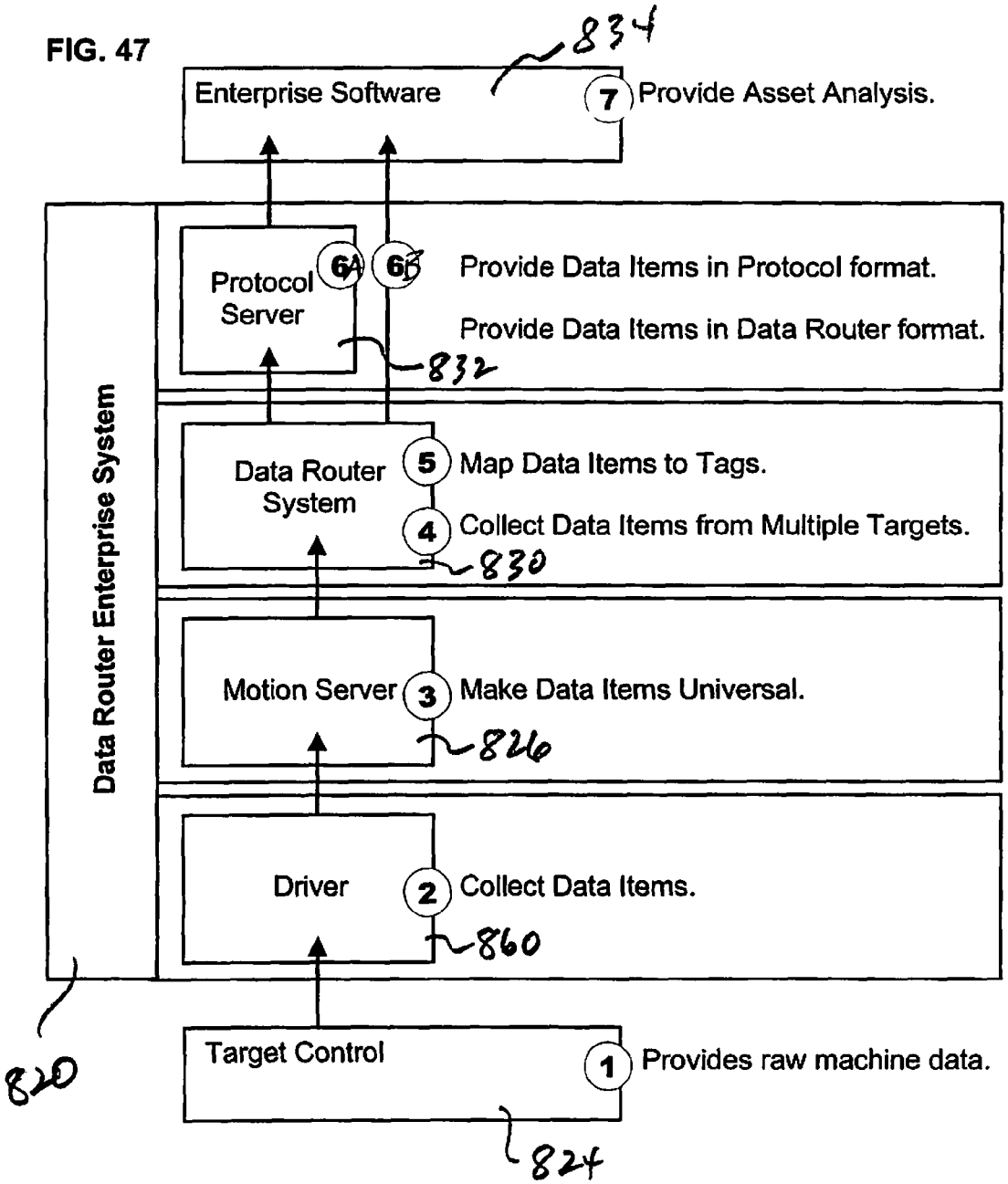
FIG. 47 depicts the flow of data though the data collection system depicted in FIGS. 44-46.

Each of the layers 822, 828, 836, and 838 has a specific purpose, and the purposes of these layers will be described below in the context of FIG. 47.

The hardware layer 836 is the lowest layer. The target systems or assets 824 define this hardware layer 836. As shown at step 1 in FIG. 47, the target systems or assets 824 produce the raw machine data describing the state of the machine or asset 824 at any given point in time. For example, a machine used on the factory floor may produce machine state data, whereas an RFID tag, global positioning locator or combination of the two, may produce the location and identification of a given asset 824 at a point in time. As another example, a vehicle, boat or plane may produce data about its operating state in addition to its location, etc.

Each asset 824 is associated with a driver 860 designed to work with a specific target system or asset 824. In particular, as shown at step 2, each driver 860 implements the target specific communication protocols, target specific language, and/or uses the target specific application programming interface (API) to collect the data from the target system or asset 824. For example, a target system 824 may be a control system used to run a machine on the factory floor. Alternatively the target system may be a GPS locator, or RFID tag attached to an asset 824, or the target system may be a control system within a vehicle, boat, airplane or other asset 824. In any of these examples, the driver 860 is configured at least to collect data its associated target system 824.

The machine platform 826 may be a motion server that, as shown at step 3, makes all data received universal by providing a consistent programming interface and data model to up-stream software.

In the connectivity server layer 822, the data routing system 830 is configured to collect data from multiple assets 824 through multiple instances of the machine platforms 826 such as one or more motion servers as shown at step 4. The data routing system 830 further maps all data items received by the data routing system 830 from each asset 824 to designer defined tags as shown at step 5. This model allows the designer to decide what data tags will make up their overall system thus allowing the overall architecture to better fit each enterprises needs.

Also in the connectivity layer 822, the protocol server 832 provides access as shown at step 6A to all data router data items defined above to any client application of the protocol server 832, such as one or more of the enterprise software systems 834 as described above. In addition, as shown at step 6B, data items may be provided in a data router specific model so that custom enterprise applications 834 may access the data item without using the protocol server 832.

In the back office layer 828, the enterprise software systems 834 provide data analysis and storage of all data received as shown at step 7.

Internally the data routing system 830 performs two tasks as it manages the data pipeline: first, the data routing system 830 collects data from a set of assets 824; and second, the data routing system 830 then maps the data items to data tags that are sent along with the data to each enterprise software system 834.

Figure 48:
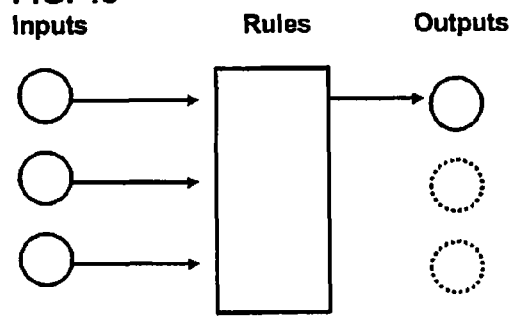
FIG. 48 is a highly schematic block diagram depicting the data 'pipe-line'.

To route data from the assets 824 to the enterprise software system 834, the data routing system 830 employs user definable rules that map one or more inputs to one or more outputs as generally shown in FIG. 48. By default, each rule is configured to implement a pass-through that allows the raw data and data item to pass through to the enterprise software system 834.

Alternatively, each data item may also be fed into a set of rules that allow combining data items and adding intelligence to each data item that fires. When a data output fires, associated actions take place. For example, when a data output fires it may send the raw data, its tag and any associated data (such as special codes, etc) to the target enterprise software system 834. Optionally, the data outputs may fire based on the evaluation of the rules associated with each output. Rules are evaluated against data inputs received from the machine platform 826.

Referring now to FIG. 49, the data collection system 820 allows the user to add and configure the inputs, outputs, and rules that direct which outputs are to fire. The multi-layered software architecture implemented by the data collection system 820 allows for easily expandable controller connectivity that may take place independent of the details of any of the enterprise software systems 834. Simple plug-n-play drivers may be added at a later date to already deployed systems in the field thus making overall factory roll-outs easy to deploy over time.

The data collection system 820 uses a consistent interface between each layer in the architecture above, where each layer has its own individual purpose as described in detail elsewhere. The data routing system 830 is a very modular component based system that allows for collecting data from various data sources and routing them to various data targets. Optionally, the data routing system 830 allows for the user to combine data items and set rules that dictate when data items fire. All data items may be easily configured using an XML configuration file that specifies all data items, data sub-items and assets 824 in the system.

The protocol server 832 may be configured to provide connectivity to the data router data items via data tags that are defined with the data router's XML configuration file. This model allows each system designer to easily configure their system and the data tags that make up their system in a way that best suits their needs.

As shown in FIG. 49, the machine platform layer 838 may be configured with a MOTION.NET software system 862 and motion administrator 864 that provide programmatic access to the motion server 286. With this software layer 838, the user can program to the motion server 826 using virtually any language such as the Microsoft .NET languages, Java, C++ and Visual Basic 6.0. The data collection system 820 thus uses a component based model that is intuitive and easy to program.

Figure 50:
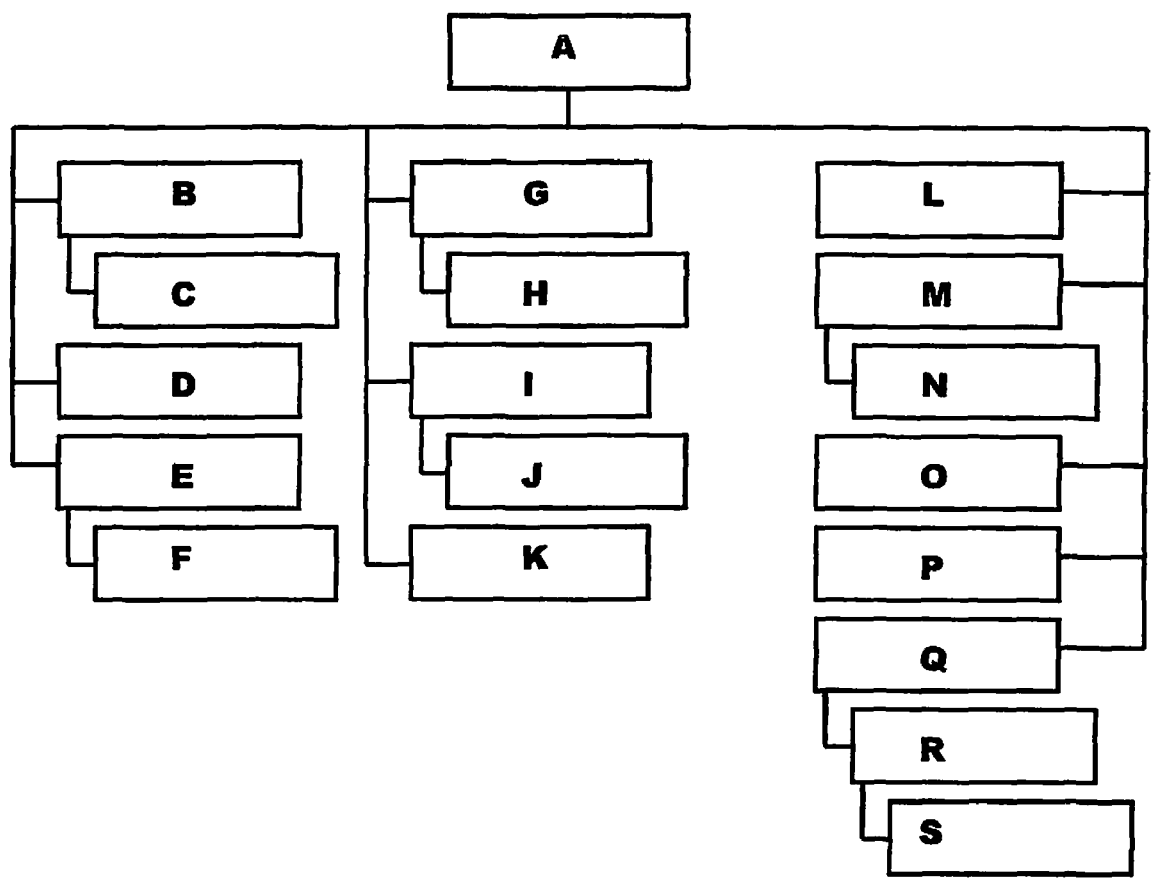
FIG. 50 depicts the components making up the example MOTION.NET software that may be used by the data collection systems of the present invention.

Referring now to FIG. 50, the components making up the programming model include the following:
  A: The system component is the main component used to create all others in the system. In addition, this component gives access to a basic set of information describing the underlying target control.
  B & C: The program components are used to mirror the programs currently managed by the target control.
  D, E & F: The message components are used to get access to both the alarm and operator messages on the target control. Both the current and historical message data may be retrieved.
  G & H: The tool components provide tool information such as tool offset data, etc.
  I & J: The workpiece components provide workpiece information such as workpiece offset data, etc.
  K: The direct connect component provides direct communication access to the target controller.
  L, M & N: The axis components provide axis information such as axis positions, loads, axis type and axis name.
  O: The event components provided event based updates of data to upstream clients.
  P, Q, R & S: The variable components allow for easy data access via a universal variable model that not only allows for variable assignment to control specific data items but also allows for mapping directly to other motion platform API.

The example motion administrator 864 allows the user to configure each instance of the motion server 826, select the target control or asset 824 used, and configure all configuration items specific to the control selected.

The example motion server 826 provides a universal access point to the underlying target controller. The example server 860 may be run as a Windows NT Service, as a serviced component, or stand alone, yet each instance is used to communicate with only one target controller. Using thread, process, and reentrancy synchronization, the example motion server 826 allows multiple instances to be run simultaneously to facilitate communication with multiple control systems.

Each driver 860 is responsible for implementing all asset specific logic necessary to communicate with the asset to read data from, write data to, and cause actions on the underlying system.

The hardware device or asset 824 may optionally embody a control system and take the form of one or more of the following:
  discrete or continuous assets on a factory floor used during a manufacturing process;
  discrete or continuous assets used during food processing;
  a set of vehicles (e.g., a fleet of rental cars, a fleet of semi-trucks used in shipping, logging or other transportation uses, a fleet of police cars, a fleet of emergency vehicles, a fleet of school or other types of busses, and/or a fleet of construction tractors and trucks used at a construction site), which may optionally use computer control systems to coordinate, monitor or control the vehicles overall operation, internal operation, or manner for which the engine, drive train, steering or breaking operate;
  farm equipment used to process agriculture either on the field or during packaging and processing of the food products, which may also use computer control systems in a similar manner as described for vehicles above;
  a set of boats or ships used for water transportation or shipping, which may optionally use computer control systems to coordinate, monitor or control the watercrafts overall operation, internal operation, or manner for which the engine, steering system, or ballast system operate;
  a set of manned or unmanned airplanes or jets used for exploration, data collection, surveillance, security, transportation or shipping, which may optionally use computer control systems to coordinate, monitor or control the aircrafts overall operation, internal operation, or manner for which the engine, flight controls, or other sensors operate;
  a set of construction devices such as skill saws, digital measuring devices, mixers used in construction, which may optionally use computer control systems to coordinate, monitor or control each devices overall operation, internal operation, or motorized operation or parts used therein for that operation; and/or
  assets tagged with radio frequency identification (RFID) tags, or global positioning systems (GPS), such as personnel working in the field, animals within nature (such as wild game, or other animal populations tracked for migration patterns), livestock or other general inventory.

In the case of a mobile asset, the data may be stored by the asset for subsequent uploading, or a mobile communications system may be used between any two or more of the layers described above.

One of ordinary skill in the art will recognize that the present invention may be embodied in forms other than those described above. The scope of the invention should be determined by the following claims and not the foregoing detailed description of the example embodiments.

What is claimed is:
1. A data collection system for distributing data from at least one target asset to at least one software application, comprising:
  a set of at least one machine platforms, where
    each target asset is associated with at least one machine platform,
    data is associated with each target asset, and
    each machine platform transfers the data associated with at least one target asset in at least one of a plurality of machine platform formats;
  a plurality of data sources, where each data source is configured to collect, from at least one machine platform, data in at least one of a plurality of machine platform formats;
  a motion server, where the motion server is configured to convert data in at least one machine platform format to at least one universal format;
  a protocol server, where the protocol server is configured to convert data in the at least one universal format to data in a protocol format; and
  a data routing system, where the data routing system causes the data collection system to operate in a pass through mode in which data is passed from the at least one target asset to the at least one software application in the at least one universal format; and a data processing mode in which data is passed from the at least one target asset to the at least one software application in the protocol format.

2. The system as recited in claim 1, wherein at least one target asset comprises a motorized vehicle.

3. The system as recited in claim 1, wherein at least one target asset comprises a motorized watercraft.

4. The system as recited in claim 1, wherein at least one target asset comprises a global positioning system.

5. The system as recited in claim 1, wherein at least one target asset comprises a radio frequency identifier device.

6. The system as recited in claim 1, wherein at least one target asset comprises a global positioning system and a radio frequency identifier device.

7. A data collection system for distributing data from at least one mobile asset to at least one software application, comprising:

at least one machine platform, where at least one mobile asset is associated with at least one machine platform, data is associated with at least one mobile asset, and each machine platform transfers the data associated with at least one mobile asset in at least one of a plurality of machine platform formats;

a plurality of data sources, where each data source is configured to collect data from at least one machine platform in at least one of the plurality of machine platform formats;

a motion server, where the motion server is configured to convert data in at least one machine platform format to data in at least one universal format;

a protocol server, where the protocol server is configured to convert data in the at least one universal format to data in a protocol format; and a data routing system, where the data routing system operates in a pass through mode in which data is passed from the at least one target asset to the at least one software application in the at least one universal format; and a data processing mode in which data is passed from the at least one target asset to the at least one software application in the protocol format.

8. The system as recited in claim 7, wherein at least one mobile asset comprises a motorized vehicle.

9. The system as recited in claim 7, wherein at least one mobile asset comprises a motorized watercraft.

10. The system as recited in claim 7, wherein at least one mobile asset comprises a global positioning system.

11. The system as recited in claim 7, wherein at least one mobile asset comprises a radio frequency identifier device.

12. The system as recited in claim 7, wherein at least one mobile asset comprises a global positioning system and a radio frequency identifier device.

* * * * *